(12) United States Patent  
Yoshino et al.

(10) Patent No.: US 6,172,348 B1  
(45) Date of Patent: Jan. 9, 2001

(54) HIGH FREQUENCY HEATING APPARATUS

(75) Inventors: Koji Yoshino, Yamatokoriyama; Takashi Kashimoto, Nara; Makoto Shibuya, Yamatokoriyama; Hirohisa Imai, Nara; Akira Ahagon, Kashihara, all of (JP)

(73) Assignee: Matsushita Electric Industrial Co., Ltd., Osaka (JP)

(*) Notice: Under 35 U.S.C. 154(b), the term of this patent shall be extended for 0 days.

(21) Appl. No.: 09/373,644

(22) Filed: Aug. 13, 1999

Related U.S. Application Data

(62) Division of application No. 08/809,436, filed on Apr. 18, 1997, now Pat. No. 5,986,249.

(30) Foreign Application Priority Data

| | | |
|---|---|---|
| Apr. 7, 1994 | (JP) | 6-69498 |
| Oct. 20, 1994 | (JP) | 6-255066 |
| Nov. 9, 1994 | (JP) | 6-274997 |
| Nov. 9, 1994 | (JP) | 6-274999 |
| May 24, 1995 | (JP) | 7-124749 |
| Jul. 12, 1995 | (JP) | 7-175744 |
| Jul. 27, 1995 | (JP) | 7-191700 |

(51) Int. Cl.[7] .............................. H05B 6/72; H05B 6/78  
(52) U.S. Cl. .......................... 219/704; 219/709; 219/710; 219/754; 219/748  
(58) Field of Search ...................... 219/746, 748, 219/749, 752, 753, 754, 745, 695, 696, 697, 751, 704, 705, 706, 708, 709, 710, 711

(56) References Cited

U.S. PATENT DOCUMENTS

| | | | |
|---|---|---|---|
| 4,616,119 | 10/1986 | Shin | 219/746 |
| 4,804,812 | 2/1989 | Tanaka et al. | 219/749 |
| 4,896,005 | 1/1990 | Skubich | 219/746 |
| 4,937,418 | 6/1990 | Boulard | 219/749 |
| 5,283,410 | * 2/1994 | Kim | 219/708 |
| 5,352,873 | 10/1994 | Carlsson et al. | 219/746 |
| 5,512,736 | * 4/1996 | Kang et al. | 219/754 |

FOREIGN PATENT DOCUMENTS

| | | |
|---|---|---|
| 48-52037 | 7/1973 | (JP) . |
| 49-27943 | 3/1974 | (JP) . |
| 52-129038 | 10/1977 | (JP) . |
| 53-61848 | 6/1978 | (JP) . |
| 54-162244 | 12/1979 | (JP) . |
| 55-27186 | 6/1980 | (JP) . |
| 56-11886 | 2/1981 | (JP) . |
| 56-104096 | 8/1981 | (JP) . |
| 57-69197 | 4/1982 | (JP) . |
| 57-137901 | 8/1982 | (JP) . |
| 59-20994 | 2/1984 | (JP) . |
| 59-83393 | 5/1984 | (JP) . |
| 59-85281 | 5/1984 | (JP) . |
| 59-215519 | 12/1984 | (JP) . |
| 60-10584 | 1/1985 | (JP) . |

(List continued on next page.)

* cited by examiner

Primary Examiner—Philip H. Leung  
(74) Attorney, Agent, or Firm—Wenderoth, Lind & Ponack, L.L.P.

(57) ABSTRACT

A high frequency heating apparatus for heating an object to be heated is provided with an electromagnetic wave emission device for emitting electromagnetic waves, a local heating device capable of heating an optional portion of the object by the electromagnetic waves emitted from the emission device, and a control device for controlling the local heating device. The high frequency heating apparatus is further provided with a stage on which the object is placed, a protecting device for protecting the local heating device, a setting device and a detection device, so that the local heating device, the electromagnetic wave emission device or the stage is controlled in accordance with the setting device or the detection device.

14 Claims, 98 Drawing Sheets

FOREIGN PATENT DOCUMENTS

| | | |
|---|---|---|
| 61-240029 | 10/1986 | (JP) . |
| 1-159529 | 6/1989 | (JP) . |
| 1-19351 | 6/1989 | (JP) . |
| 1-30275 | 6/1989 | (JP) . |
| 1-129793 | 9/1989 | (JP) . |
| 1-48629 | 10/1989 | (JP) . |
| 1-292793 | 11/1989 | (JP) . |
| 2-114804 | 9/1990 | (JP) . |
| 3-95312 | 4/1991 | (JP) . |
| 3-173094 | 7/1991 | (JP) . |
| 4-104498 | 4/1992 | (JP) . |
| 4-267094 | 9/1992 | (JP) . |
| 4-64154 | 10/1992 | (JP) . |
| 4-319287 | 11/1992 | (JP) . |
| 5-74566 | 3/1993 | (JP) . |
| 5-144566 | 6/1993 | (JP) . |
| 6-260275 | 9/1994 | (JP) . |
| 6-310268 | 11/1994 | (JP) . |
| 6-338388 | 12/1994 | (JP) . |
| 7-142164 | 6/1995 | (JP) . |
| 7-161469 | 6/1995 | (JP) . |

$$x = 70\cos\theta + 60\cos(10\theta)$$
$$y = 70\sin\theta + 60\sin(10\theta)$$

HIGH FREQUENCY HEATING APPARATUS

This is a Rule 1.53(b) Divisional of Application Ser. No. 08/809,436 filed Apr. 18, 1997, now U.S. Pat. No. 5,986,249.

TECHNICAL FIELD

The present invention relates to a high frequency heating apparatus for heating objects to be heated such as food or the like.

BACKGROUND ART

A microwave oven as a representative high frequency heating apparatus has conventionally been constructed as shown in FIGS. 1–7.

A microwave oven of FIG. 1 is of a general structure employing a turntable 1. In this microwave oven, electromagnetic waves emitted from a magnetron 2 as an electromagnetic wave emission means are transmitted via a waveguide 3 to a heating chamber 4, where the waves are distributed as standing waves that are determined by the shape of the heating chamber 4 and the position of an opening 5 through which the electromagnetic waves are radiated into the heating chamber 4. A food 6 generates heat correspondingly to an electric field component of the standing waves and a dielectric loss of the food 6. The electric power P [V/m³] absorbed per unit volume of the food 6 is expressed by the intensity of an applied electric field E [V/m], the frequency f [Hz], the dielectric constant $\epsilon r$ and the dielectric tangent $\tan\delta$ of the food 6 in an expression (1) below. The heating distribution of the food 6 is generally determined by the distribution of the standing waves of the electromagnetic waves and, hence, the heating distribution on concentric circles is uniform due to a rotating of the turntable 1.

$$P = (5/9) \cdot \epsilon r \cdot \tan\delta \cdot f E^2 x 10^{-10} \, [W/m^3] \qquad (1)$$

In FIG. 1, reference numeral 19 denotes a control means, 22 denotes a motor, 23 denotes a weight sensor, and 27 denotes a fan.

As other examples of the uniforming means, a stirrer system has been employed in which electromagnetic waves are stirred by a constant rotation of a metallic plate inside the heating chamber. Electromagnetic waves are also taken out from the waveguide 3 by a rotary waveguide (emission part) 8 having a coupling part 7 and are emitted through an emission port 9, as shown in FIG. 2, in other words, the opening part itself has been rotated constantly. In this case, the rotary waveguide 8 has been built on a bottom face of the heating chamber 4 and rotated constantly at all times by a motor 10, and the whole of a bottom part of the heating chamber 4 has been covered with a cover 11 of a material allowing the, electromagnetic waves to pass therethrough.

Actually, however, most of the apparatuses in the market are of the turntable type.

Some apparatuses are provided with a plurality of opening parts, wherein an exit for the electromagnetic waves is switched to provide a uniform a heating distribution. FIG. 3 shows an apparatus of the kind having two openings 5 define. in a side wall of the heating chamber 4 (Japanese Patent Laid-Open Publication No. 4-319287).

A plurality of magnetrons and a plurality of waveguides are installer in some cases to constitute a plurality of opening parts (Japanese Patent Laid-Open Publication Nos. 61-181093 and 4-345788).

Alternatively, one waveguide is branched in many directions to form a plurality of waveguides while there is arranged a single magnetron, thereby constituting a plurality of opening parts (Japanese Patent Laid-Open Publication No. 61-240029 and Japanese Utility Model Laid-Open Publication No. 1-129793).

In a different constitution, end faces 14 of two sub waveguides 13 are moved at positions facing a plurality of openings 5, as indicated in FIG. 4, so that the electromagnetic waves may be directed to one opening 5 which apparently is easy for the electromagnetic waves to pass through, to thereby uniform the heating distribution (Japanese Patent Laid-Open Publication No. 5-74566).

In a system of FIG. 5, a metallic part 12 is moved within the single waveguide 3 having a plurality of openings 5, so that the opening 5, which apparently is easy for the electromagnetic waves to pass through, is selected to thereby uniform the heating distribution (Japanese Patent Laid-Open Publication Nos. 3-11588 and 5-121160).

In FIGS. 6 and 7, a plurality of openings are formed at upper and lower parts of the heating chamber, and the openings 5 at the lower part are switched to thereby provide a uniform heating distribution (Japanese Utility Model Laid-Open Publication No. 1-129793).

A feedback control is also executed in some apparatuses by detecting the weight, shape, temperature or dielectric constant of the food 6 or the temperature, humidity or electric field in the heating chamber by sensors.

According to the above-described conventional arrangements. however, in the case where the waveguide and the heating chamber are connected to guide the electromagnetic waves into the heating chamber, all kinds of food could not be heated uniformly by a single opening part, because the position of the optimum opening part to obtain a uniform heating distribution was different for every material or shape of the food.

For example, when a flat food is heated by the conventional microwave oven, the h-eating proceeds from an edge portion of the food, resulting in a large heating irregularity with a central portion of the food left cold.

Considering the position of the opening part, if the opening part s formed near the center of the bottom face of the heating chamber and when a bottom face of the food is heated, the food is uniformly heated if it is a liquid one allowing convection, whereas only the bottom face of the food is raised in temperature if the food is a solid one allowing no convection. In this case, while the concentric heating distribution is made uniform with the use of a turntable, the heating distribution in a radial direction or a vertical direction as viewed from a rotational center of the turntable cannot be improved in spite of the rotation of the turntable.

When the stirrer or rotary waveguide is used to stir the electromagnetic waves, the electric field distribution is changed in such a manner as to switch the opening part in accordance with the rotation of the stirrer or rotary waveguide and, hence, the concentration of electromagnetic waves can be avoided to some extent in the case of defrosting or the like manner of heating requiring the avoidance of the concentration. However, due to the stirring caused by a constant rotation without regard to the kind of food, any kind of food is heated by repeating the same electric field distribution for each rotation of the stirrer or rotary waveguide, thus making it difficult to achieve a perfectly uniform heating distribution.

Even when a plurality of openings are formed, a certain fixed electric field is constituted if the openings are simply opened at the same time. Accordingly, it is hard to provide a uniform heating distribution for every kind of food.

Therefore, there is actually no large difference of the heating distribution between the microwave oven of FIG. 1 and the microwave oven of FIG. 3. A satisfactory cooking result cannot be expected unless the optimum opening is switched or selected for each individual kind of food.

Meanwhile, in the apparatus provided with a plurality of magnetrons and a plurality of waveguides, the control of oscillation of each magnetron is followed by a switching of the waveguides and, hence, the opening through which the electromagnetic waves are to be emitted is switched. Although this arrangement is slightly effective to provide a uniform heating distribution, the increased number of magnetrons raises costs and makes the apparatus heavy and inconvenient to carry.

When a plurality of waveguides are branched in many directions from one waveguide, the opening easy for the electromagnetic waves to pass through cannot be switched perfectly, i.e., a certain amount of electromagnetic waves leak also from the openings not selected. Moreover, a large quantity of sheet metal is needed for the waveguides, causing the apparatus to be expensive and hard to manufacture.

As a solution to the above, end faces 14 of the sub waveguides 13 are moved at positions facing the openings 5, as shown in FIG. 4, to thereby select the opening 5 which apparently is easy for the electromagnetic waves to pass through. Although the heating distribution is provided more or less effectively uniform according to this method, the space for the plurality of sub waveguides 13 and the space for a plurality of shields to prevent the leak of electromagnetic waves when the end faces 14 of the sub waveguides 13 are moved are required in practice. As a result, the whole microwave oven becomes bulky or the effective volume of the heating chamber to the whole apparatus is reduced, leading to such a user's dissatisfaction that the apparatus occupies a considerable space or affords to contain only small food. At the same time, the apparatus becomes heavy and hard to carry. An amount of power is probably consumed to move the end faces 14 of the sub waveguides including the shields at a plurality of positions.

As shown in FIG. 5, even if the metallic part is moved within one waveguide 3 having a plurality of openings 5, it is impossible to completely switch to select the opening easy for the electromagnetic waves to pass. Unrequested openings 5 are also open, through which the electromagnetic waves leak.

In the constitutions of FIGS. 1, 3, 4 and 5, the openings 5 are formed only at a side face of the apparatus, in other words, separated far from the food 6.

If the distance between the opening 5 and the food 6 is large, the rate of the electromagnetic waves not only entering the food 6 directly from the opening 5, but entering the food 6 after reflected at the wall face of the heating chamber 4, etc. is increased. In consequence of this, the heating distribution off the food 6 is disadvantageously changed large by the size of the heating chamber 4, or the position or shape of the food 6.

From the same reason as above, a peripheral portion of the general food 6 tends to be heated more easily.

The arrangement of FIG. 6 or 7 is more useful to providing a uniform heating distribution than the other conventional arrangements. However, the peripheral portion of the food is still easy to heat because of the electromagnetic waves always radiated from the upper part of the heating chamber and, a portion of the food between one and the other openings adjacent to each other at the lower part of the heating chamber is hard to heat.

What is common to these conventional arrangements of FIGS. 1, 3, 4, 5, 6 and 7 is an undesirable probability that the electromagnetic waves will be concentrated only where the openings 5 are formed, causing a heating irregularity.

In the arrangements of FIGS. 3 and 5–7, the distance from the magnetron 2 to the opening 5 is not taken into account.

Generally, whether or not it is easy for the electromagnetic waves to enter the heating chamber 4 is determined by matching of the heating chamber and openings, and is changed depending on the position of the openings 5 in the heating chamber 4, the length of the waveguide 3, the distance between the magnetron 2 and the opening 5, etc. Particularly, the ease at which the electromagnetic waves come out from the waveguide 3 varies with a cycle of $\lambda g/2$ wherein $\lambda$ is the guide wavelength of the electromagnetic waves. Therefore, when a plurality of openings 5 are present, the matching should be adjusted for each opening 5 so as to emit the electromagnetic waves equally from all the openings 5.

Unless the matching is achieved by determining the position of the opening 5 solely to lengthen the distribution, it becomes hard for the electromagnetic waves to enter the heating chamber, whereby the heating efficiency is worsened. In addition, an increased amount of reflecting waves enter the magnetron 2, which necessitates countermeasures to prevent a temperature rise or generation of unnecessary radiation noises.

In the feedback control by detecting the state of food, an initial heating state or a state change from a heating start has been detected or heating completion has been detected with the use of a weight sensor, a humidity sensor, a temperature sensor, an electromagnetic field detection sensor, a steam detection sensor, an alcohol detection sensor or the like. Any of the aforementioned sensors have not been practically designed to carry out such feedback control as to detect the heating distribution or correct the heating irregularity.

SUMMARY OF THE INVENTION

The present invention has been devised to solve the above-described problems inherent in the prior art and is intended to provide a high frequency heating apparatus which can heat an optional portion of an object to be heated and provide a uniform heating distribution over the whole object by a combined heating of optional portions.

Another object of the present invention is to provide a high frequency heating apparatus which can heat an optional portion of an object to be heated and distinguish a portion to be heated and a portion not to be heated.

A further object of the present invention is to provide a high frequency heating apparatus which can maintain or improve the heating efficiency to enhance the reliability.

A still further object of the present invention is to provide a high frequency heating apparatus which can automatically heat an optional portion of an object to be heated, exactly in a manner as set.

In accomplishing the above-described objects, a high frequency apparatus according to the present invention comprises an electromagnetic wave emission means for emitting electromagnetic waves, a local heating means capable of heating an optional portion of an object to be heated by the electromagnetic waves emitted from the electromagnetic wave emission means, and a control means for controlling the local heating means.

BRIEF DESCRIPTION OF THE DRAWINGS

FIG. 43 is descended.

DETAILED DESCRIPTION OF THE PREFERRED EMBODIMENT

Preferred embodiments of the present invention will be described below with reference to the drawings.

Figure 8:
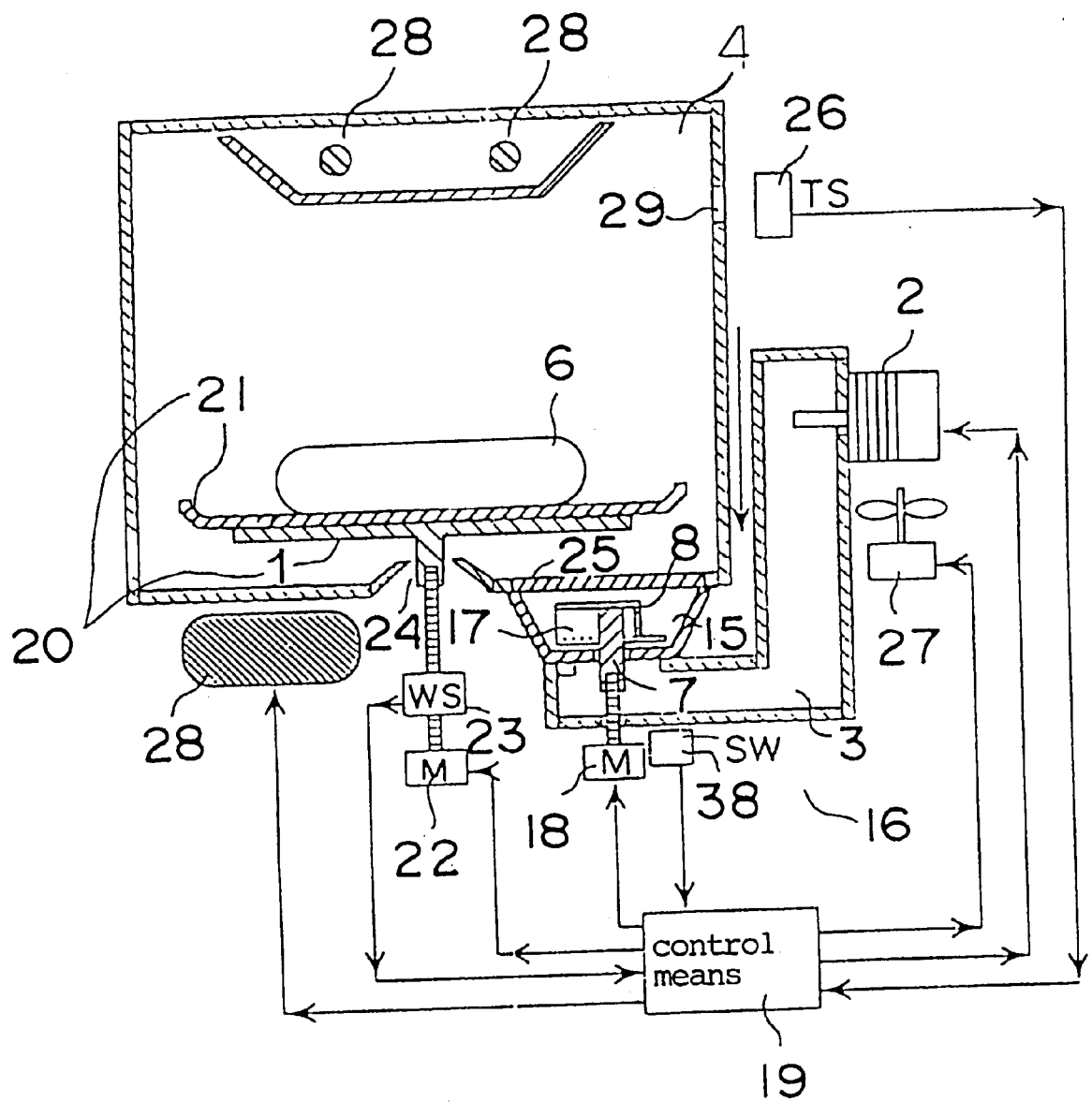
FIG. 8 is a view showing the constitution of a high frequency heating apparatus according to a first embodiment of the present invention.

FIG. 8 is a sectional view showing the constitution of a high frequency heating apparatus according to a first embodiment of the present invention.

Electromagnetic waves emitted from a magnetron 2, which is a representative emission means for emitting electromagnetic waves, are radiated to a heating chamber 4 via a waveguide 3 as a waveguide part and a power feed chamber 15, so that a food 6 as an object to be heated may be heated in the heating chamber 4. The electromagnetic waves in the waveguide 3 heat c optional local portion of the food 6 by means of a rotary waveguide 8 as an emission part arranged in the power feed chamber 15. The waveguide 3 and rotary waveguide 8 will be named together as a local heating means 16 herein. The rotary waveguide 8 has a directivity in an emission direction of the electromagnetic waves, switching the emission direction through the rotation thereof to thereby realize local heating. For this purpose, the rotary waveguide 8 is provided with a coupling part 7 which is coupled with the waveguide 3 to take out the electromagnetic waves, and arranged astride the waveguide 3 and the power feed chamber 15 (heating chamber 4 when the power feed chamber 15 is not provided). An emission port 17 is formed in the rotary waveguide 8 through which the electromagnetic waves taken out from the waveguide 3 are emitted.

The coupling part 7 is connected to a motor 18 as a driving means and can be rotated by the motor 18 and, the rotary waveguide 8 itself is rotated about the coupling part 7. A control means 19 controls the motor 18, so that the direction of the electromagnetic waves can be controlled by the emission port 17 of the rotary waveguide 8, thereby providing control of the local heating.

The food 6 is placed on a stage 20 for subsequent heating of an, optional portion thereof. The stage 20 is set on a glass or ceramic saucer 21 as a wave transmission part constructed on the turntable 1 having a wave shielding metallic part. The stage 20 together with the saucer 21 is rotated by a motor 22 as a stage driving means. At this time, simultaneously with the rotation of the motor 22, the control means 19 performs control in accordance with the weight of the food 6 detected by a weight sensor 23 (control to estimate a driving timing of the rotary waveguide 8, a heating output or a heating end time, etc.). A rotational center of the stage 20 at this moment is at a center 24 of a bottom face of the heating chamber 4. Heating in a rotational direction is made uniform by the constant rotation of the stage 20 or local heating is carried out by stopping and decelerating the stage 20 at a predetermined position. On the other hand, a rotational center of the rotary waveguide 8 is shifted from the center 24 of the bottom face of the heating chamber 4. The emission direction of electromagnetic waves to the food 6 is changed by the direction of the emission port 17, making it possible to switch heating of the center of the food 6 or the periphery of the food 6. In other words, the heating position is changeable in a radial direction of the stage 20, and accordingly, an optional position on the stage 20 can be heated in association with the rotation of the turntable 1.

Due to the arrangement that the rotational center of the stage 20 is at the center 24 of the bottom face of the heating chamber 4, the stage 20 can be formed large or the food 6 may be large-sized and increased in number.

Since a center of the stage 20 agrees with the rotational center thereof, a stage face is controlled not to move up and down during the rotation) and therefore a target position of the food 6 is locally heated with ease. Besides, the food 6 is hard to vibrate and spill.

In a general microwave oven, an opening is often covered with a cover of a low dielectric loss hard to absorb electromagnetic waves from the side of the heating chamber 4. In this embodiment, a cover 25 as a protecting means for the local heating means 16 is provided so as to cover the power feed chamber to thereby reduce a level difference or height difference to the bottom face of the heating chamber 4.

The above cover 25 in this embodiment is different from the conventional opening cover, which will be described more in detail.

The conventional opening cover has been intended primarily to prevent a user from erroneously putting fingers inside or prevent dust from accumulating in the opening. In contrast, according to this embodiment, since the rotary waveguide 8 should be controlled as required in order to locally heat the food, the cover 25 is arranged so as to prevent the scum of the food 6 from scattering to directly hit and stop the rotary waveguide 8, or accumulating in the vicinity of the rotary waveguide 8 and absorbing the electromagnetic waves whereby a target portion of the food cannot be heated. That is, the cover 25 is effective to ensure the local heating by the local heating means 16.

The control means 19 performs control other than the above, e.g., monitors a temperature change of the food 6 by a temperature sensor 26 which detects a temperature distribution of the food 6, or controls the emission of electromagnetic waves from the magnetron 2, the operation of a fan 27 for cooling the magnetron 2 or the operation of a heater 28.

Generally, the interior of the heating chamber 4 rises to 300° C. or so when the heater 28 is used. The glass saucer 21 is sometimes replaced with a metallic one because of limited heat-proof temperatures of glass. A ceramic saucer with high heat-proof temperatures is shared in some cases to eliminate the trouble in exchanging the saucer 21 depending on whether the heating is done by electromagnetic waves or by the heater.

The temperature sensor 26 detects the temperature of the food 6 through an opening 29 at a wall face of the heating chamber 4, thereby detecting a heating distribution. The constitution of the temperature sensor 26 will be additionally depicted here. As an example of the general temperature sensor 26 for detecting the temperature in a non-contact manner, there is an infrared sensor converting the amount of infrared rays emitted from the food 6 to electric signals. The infrared sensor includes a thermopile sensor internally provided with a hot contact and a cold contact, a pyroelectric sensor provided with a chopper, etc. any of which will do in the present invention.

Figure 9:
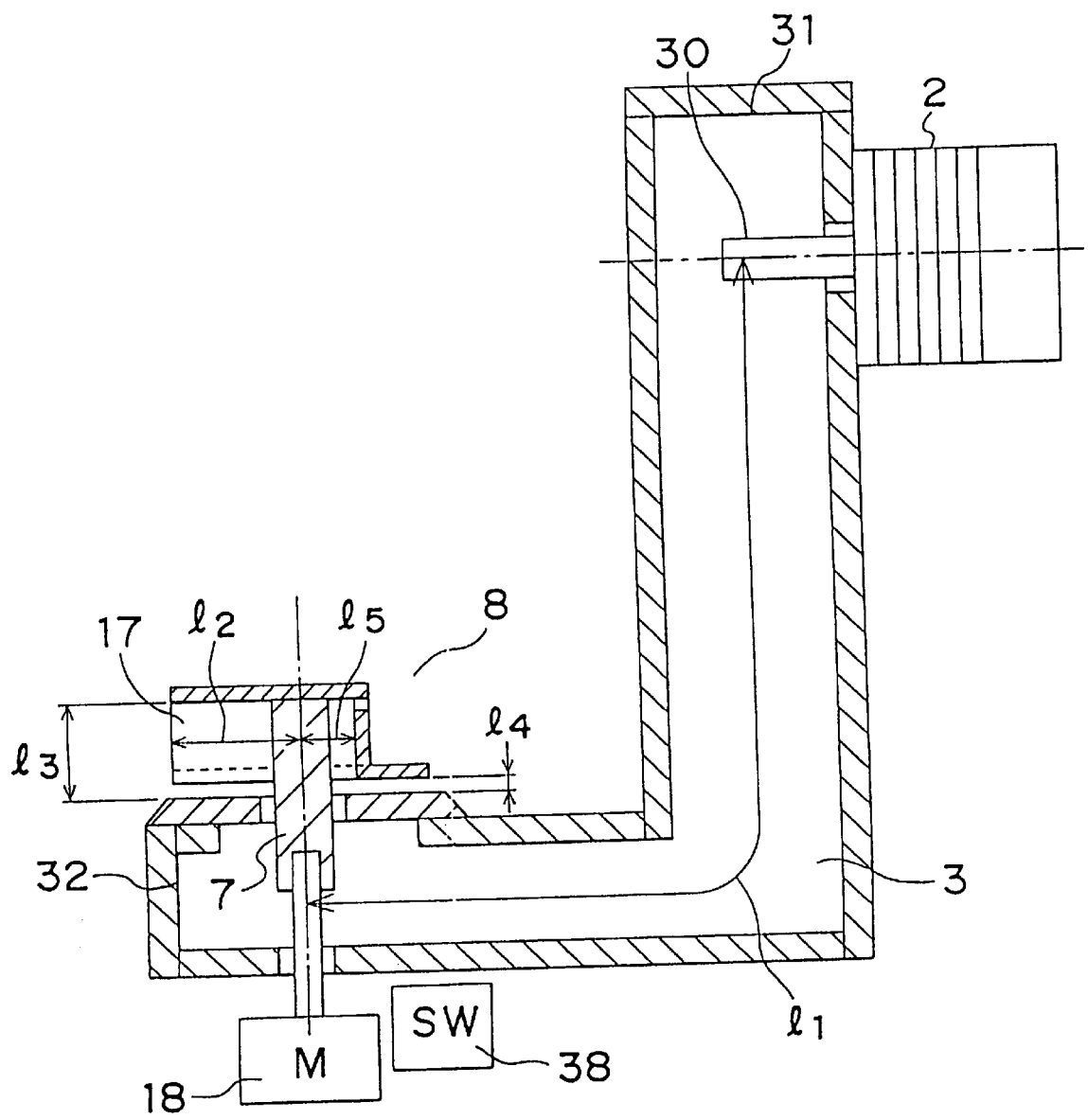
FIG. 9 is a view of the constitution of an essential part of the high frequency heating apparatus shown in FIG. 8.

FIG. 9 is a view of an essential part showing a positional relation of the magnetron 2 and the rotary waveguide 8.

The distance l1 for the electromagnetic waves emitted from an antenna 30 of the magnetron 2 and run to reach the coupling part 7 of the rotary waveguide 8 is set to be approximately an integral multiple of $\lambda g/2$ when $\lambda g$ is a guide wavelength in the waveguide 3, because the electromagnetic waves in the waveguide 3 are standing waves repeatedly and periodically turned intense and weak, a wavelength of which agrees with $\lambda g$. An electric field at the antenna 30 of the magnetron 2 is intense at all times. In the dimensional relation as above, the coupling part 7 of the rotary waveguide 8 always has an intense electric field, so that the electromagnetic waves in the waveguide 3 can be efficiently guided outside the waveguide 3.

If the distance from the antenna 30 of the magnetron 2 to an end pare 31 of the waveguide 3, or the distance from the coupling part 7 to an end part 32 of the waveguide 3, is set to be approximately an odd multiple of $\lambda g/4$ (one, multiple in the drawing), more stable standing waves are generated in the waveguide 3 because an end face of the waveguide is located right where the electric field changes from intense to weak at a position of the odd multiple of $\lambda g/4$.

According to this embodiment, even when the rotary waveguide 8 rotates, the distance from the antenna 30 of the magnetron 2 to the coupling part 7 is constant, and consequently stable standing waves are effectively obtained.

The electric waves guided out from the coupling part 7 are radiated to the heating chamber 4 through the emission port 17. Since the length l2 is a factor determining the directivity, the length may be suitably changed upon necessities. If the length $\psi 2$ is an integral multiple of $\lambda g/2$, the electric field at the emission port 17 can be intense, which, from the expression (1), exerts considerably high efficiency when the food 6 is placed close to the emission port 17.

In the drawing, l3>>l4 is held to facilitate the propagation of electromagnetic waves to the side of 13. Moreover, the length $\psi 5$ is set to be nearly an odd multiple of $\lambda g/4$ to further facilitate the propagation of electromagnetic waves towards 13.

The emission direction of electromagnetic waves is controlled in the above constitution.

Because of the constant distance between the antenna 30 of the magnetron 2 and the emission port 17 at all times, an impedance therebetween is also kept constant at all times, so that a matching state is easy to maintain and a heating efficiency is effectively kept high.

Figure 10A:
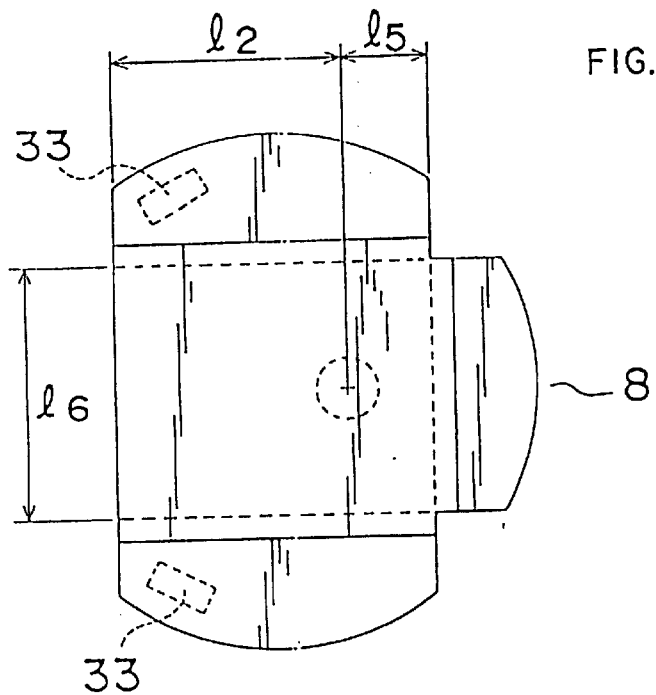
FIG. 10 shows a rotary waveguide and a driving part mounted in the high frequency heating apparatus of FIG. 8, (a) being a top plan view of the rotary waveguide, (b) a longitudinal sectional view of the rotary waveguide and the driving part, and (c) a view showing an engagement state of a cam and a switch of the driving part.
Figure 10B:
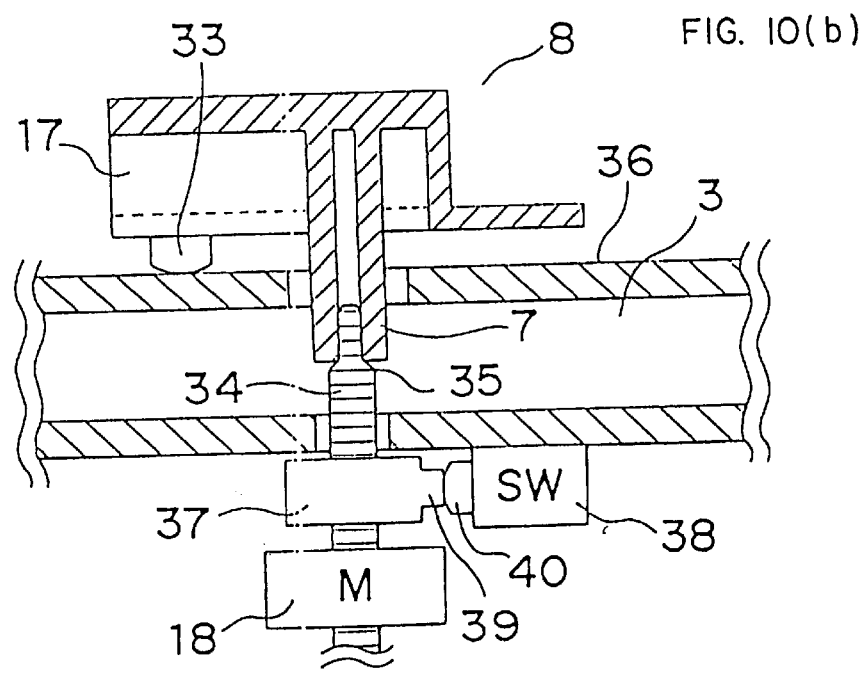
Figure 10C:
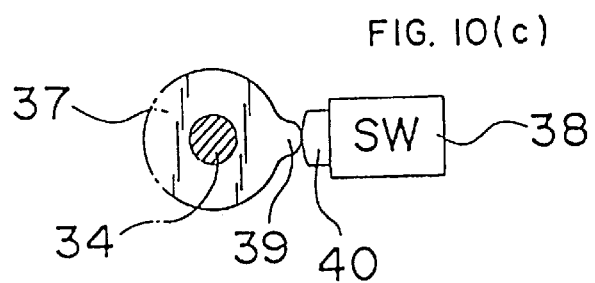

FIG. 10 is a view of the constitution of an essential part of the rotary waveguide 8.

(a) is a view seen from above and (b) is a sectional view seen from sideways. In (a), the length l6 is set to satisfy $$l6 > \lambda_0/2$$

wherein $\lambda_0$ is the wavelength of the electromagnetic waves in vacuum (or in the air) and $\lambda_0/2$ is approximately 61 mm at a frequency of 2.45 GHz, thus achieving the sure emission of the electromagnetic waves. Actually, the length l6 is preferably 65 mm or larger to leave leeway.

The rotary waveguide 8 is supported at three points, namely, two Teflon spacers 33 and a fitting part 35 formed in a shaft 34 of the motor 18, and can accordingly rotate stably.

The spacer 33 has a downward curved face and is easy to slide Any non-conductive material is usable for the spacer 33 so long as it ensures effective support and smooth rotation to the spacer 33. Even if the spacer 33 is made of conductive material, an arrangement that avoids a spark between the spacer and a bottom part 36 will serve the purpose (for instance, by holding the spacer always in tight contact with the bottom part 36 in a manner not to generate a gap therebetween).

(c) shows a cam 37 connected to the shaft 34 and a switch 38 as a position detection means. While the rotary waveguide 8 is rotated by the motor a projecting part 39 of the cam 37 presses a button 40 of the switch 38 every one rotation of the shaft 34. Therefore, the rotational position of the rotary waveguide 8 is detected from a driving time since the button 40 is pressed, and consequently the emission direction of the electromagnetic waves is detected and controlled as required. The control means 19 determines a rotating time of the motor 18 and controls the emission direction from the emission port 17 based on signals from the switch 38. Needless to say, if the motor 18 is required to be more correctly controlled in position or in rotating speed, a stepping motor or the like may be employed.

A reference position may be set to control the motor 18 so that the motor is moved to the reference position at the start or end of heating.

If the motor is controlled at the heating start time, a target portion of the food can be heated accurately. On the other hand, if the motor is controlled at the completion of heating, it eliminates the trouble to confirm the reference position for a next heating.

Figure 11:
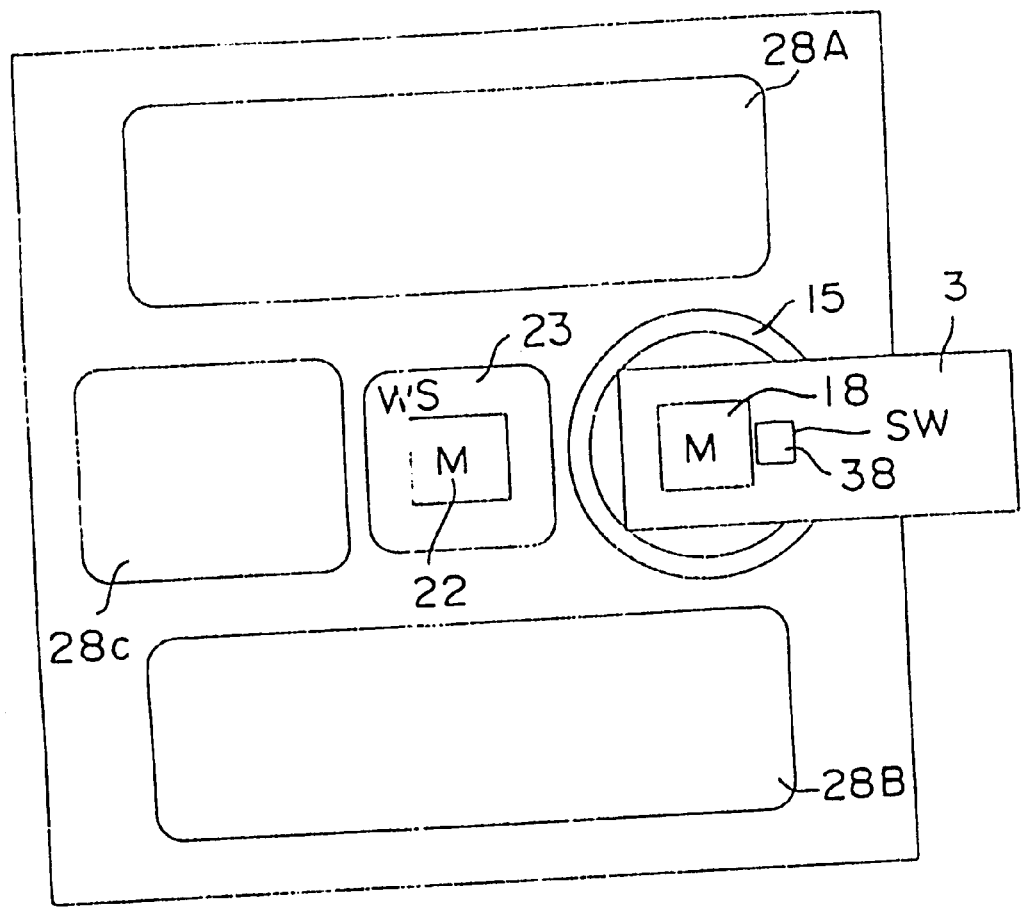
FIG. 11 is a bottom view of the high frequency heating apparatus of FIG. 8.

FIG. 11 is a view showing the constitution of an essential part of the high frequency heating apparatus of the first embodiment, more specifically, the bottom face of the heating chamber 4 of FIG. 8 seen from below. Heaters 28A, 28B and 28C are disposed in a vacant space to coexist with the power feed chamber 15 and weight sensor 23.

For the above configuration, the rotary waveguide 8 is preferably made small in size. That is, the rotary waveguide 8 should be compact and highly directive.

Figure 12:
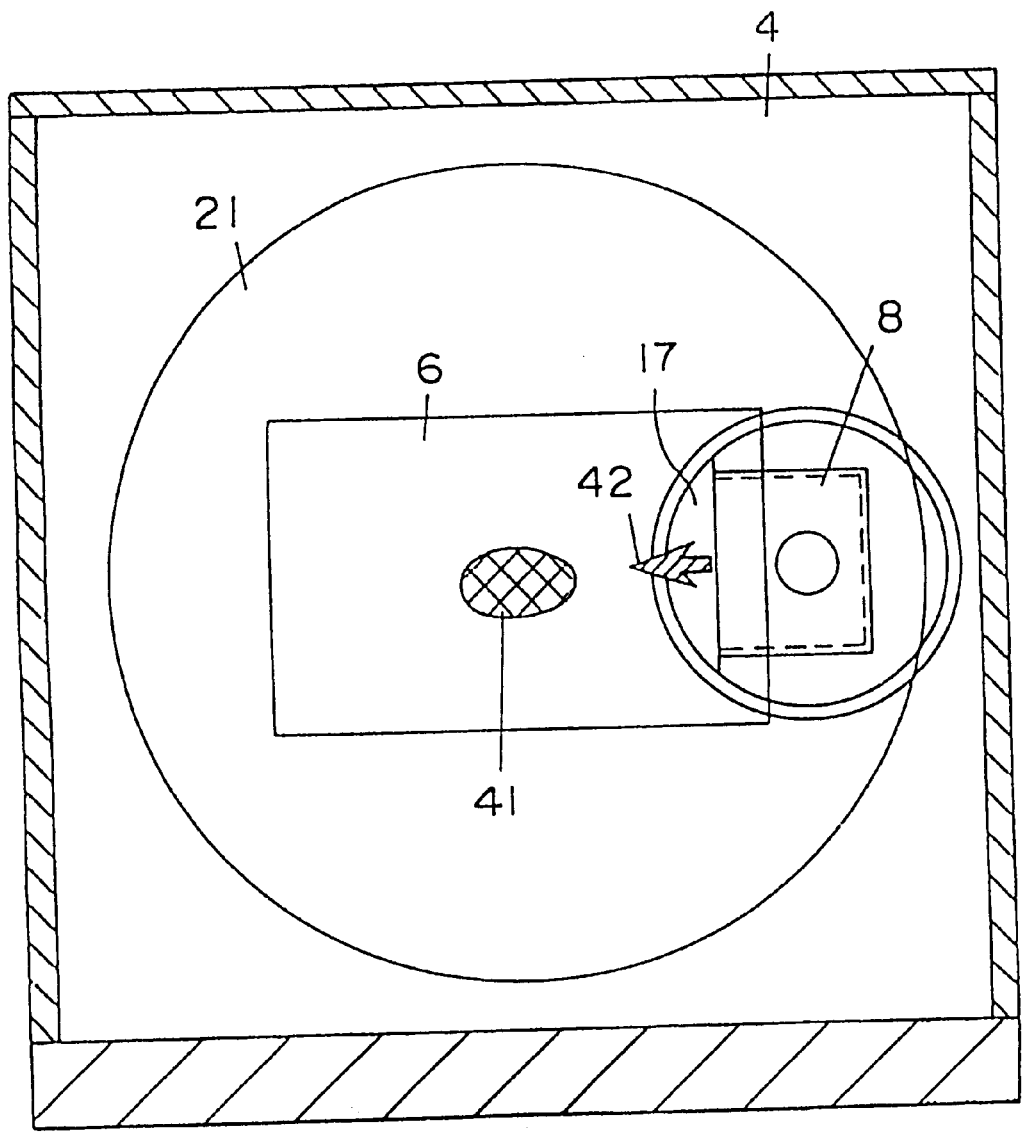
FIG. 12 is a view of a state when a food in a heating chamber of te high frequency heating apparatus of FIG. 8 is heated.
Figure 13:
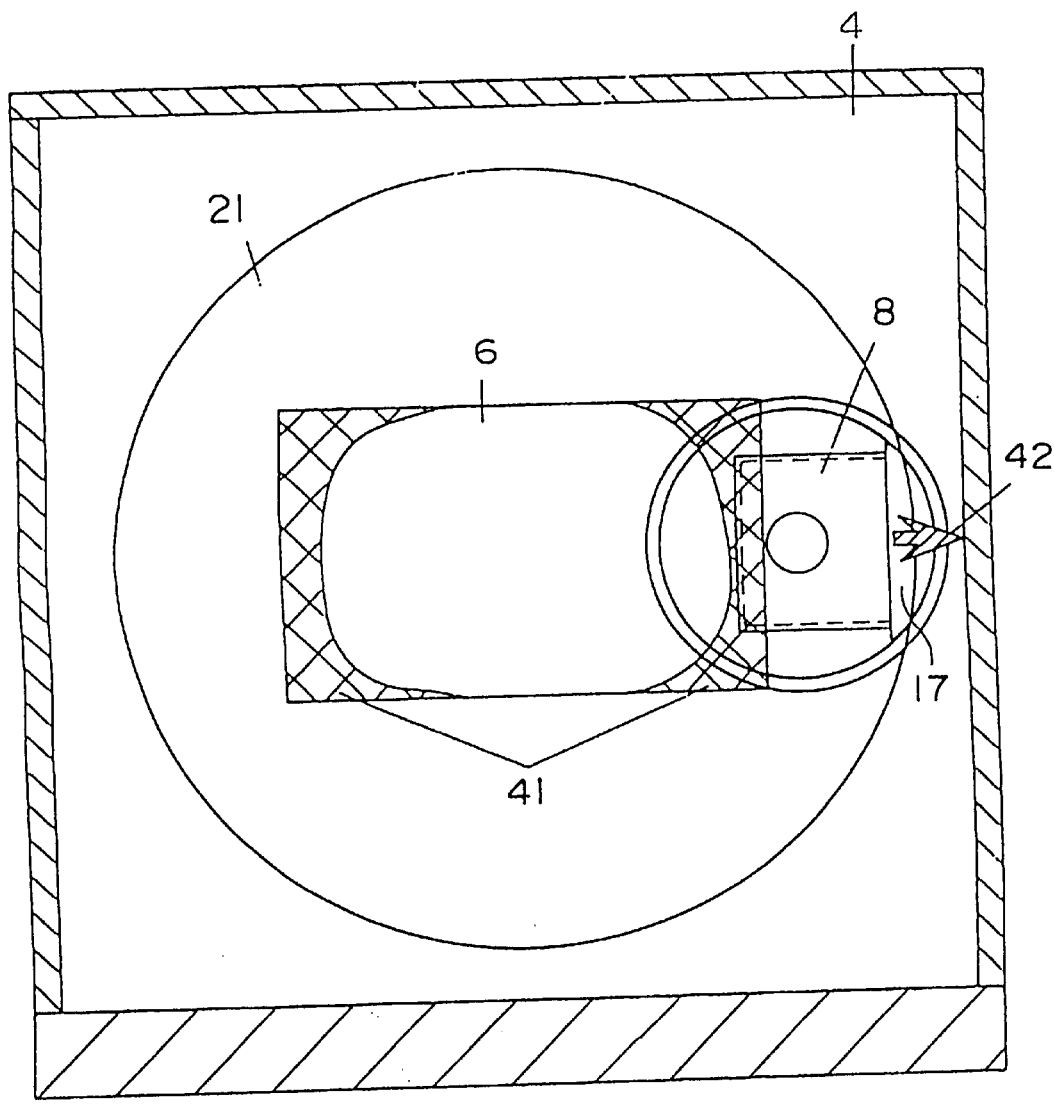
FIG. 13 is a view of a state when the food and the rotary waveguide are rotated from the state of FIG. 12.

FIGS. 12 and 13 are sectional views of FIG. 8 seen from above the food 6. In order to show the directivity of the rotary waveguide 8, a heated portion 41 is indicated in FIGS. 12 and 13 which is obtained after the food 6, which is a flat parallelepiped, is heated with a constant heating output while rotated at a constant speed together with the saucer 21 although the rotary waveguide 8 is stopped at a position of the drawings. Parts actually unseen and hidden by the saucer 21 are also illustrated in the drawings by a solid line for easy understanding. The emission port 17 is directed to the center of the saucer 21 in FIG. 123 while the emission port 17 is rotated 180° from FIG. 12 and directed outward in FIG. 13.

In FIG. 12, the heated portion 41 appears approximately at the center of the food 6 subsequent to the emission of electromagnetic waves 42 from below.

In FIG. 13, the electromagnetic waves 42 enter the food 6 after being reflected at wall faces of the heating chamber 4 and therefore the heated portion 41 is at edges (periphery) of the food 6. Most of conventional microwave ovens show a similar result to FIG. 13 because the electromagnetic waves are reflected at wall faces of the heating chamber before entering the food.

Figure 14:
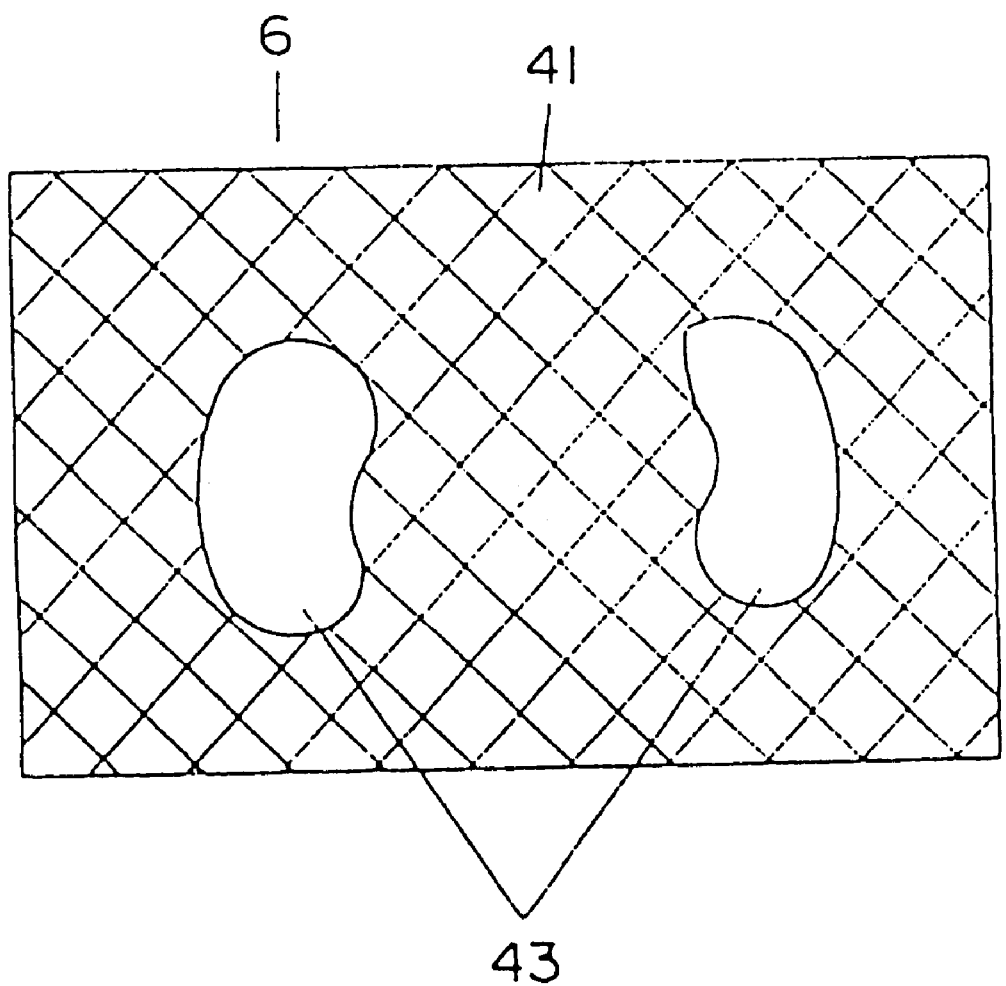
FIG. 14 is a characteristic diagram of a heating distribution of the food when the states of FIGS. 12 and 13 are switched.

FIG. 14 shows the heating distribution of the food 6 resulting from switching of states of FIGS. 12 and 13 (switching of the direction of the emission port 17 with a suitable rate). The heated portion 41 is generated at the center and in the periphery of the food 6. In other words, the food 6 is considerably uniformly heated in comparison with the case of the conventional microwave oven. An unheated portion 43 which is hard to heat is left at a middle area between the center and periphery of the food 6. This unheated portion 43 is heated by local heating in a manner as will be described below.

Figure 15:
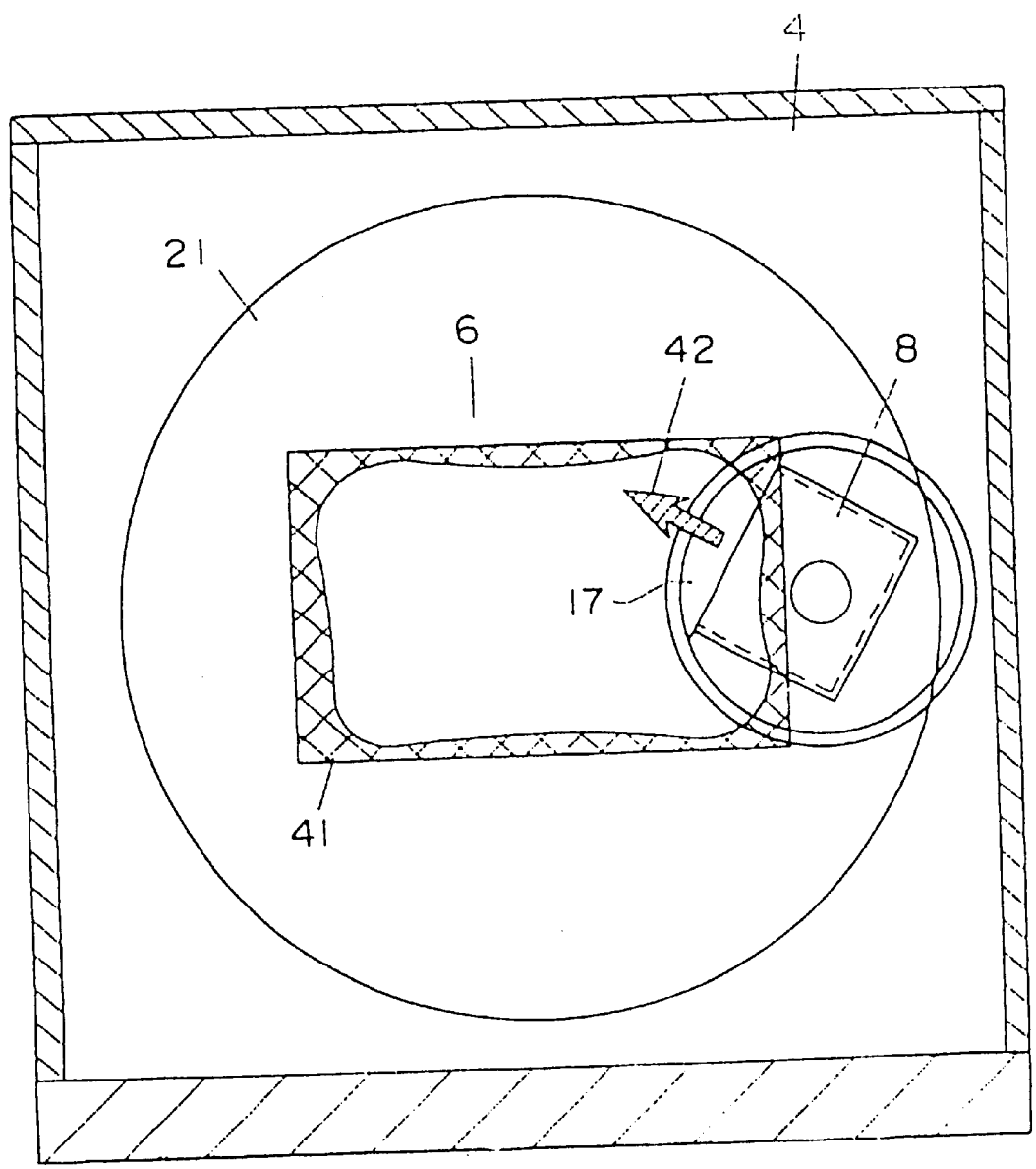
FIG. 15 is a view of a heating state of the food when an emission port of the rotary waveguide is inclined 45° to the food.
Figure 16:
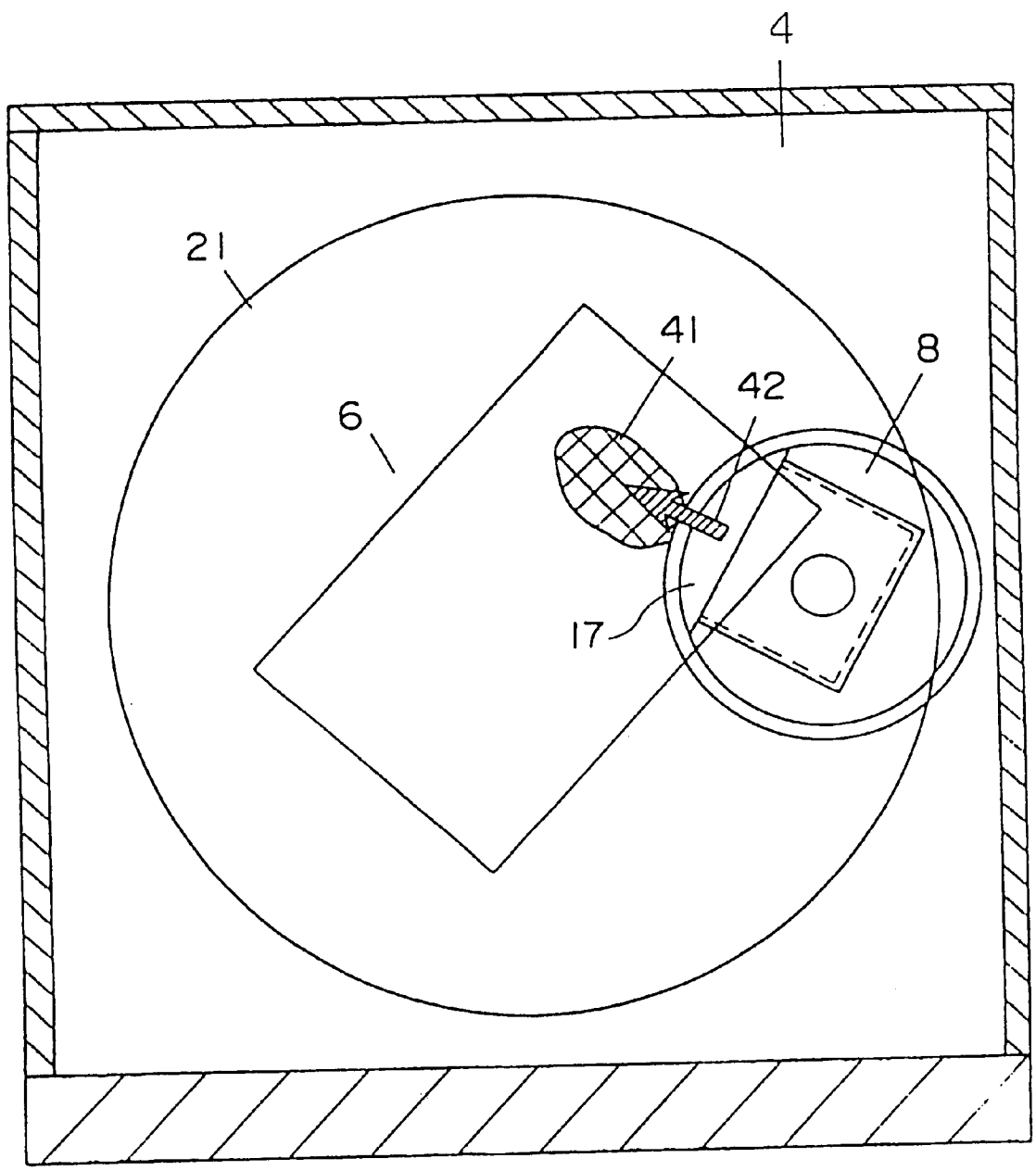
FIG. 16 is a view of a heating state of the food when the emission port of the rotary waveguide is inclined 45° to the food and the rotation of the food is stopped.

FIGS. 15 and 16 are sectional views of the essential part of the high frequency heating apparatus in the embodiment, namely, sectional views of FIG. 8, similar to FIGS. 12 and 13. In order to heat the aforementioned unheated portion 43 at the middle area in FIG. 14, as is easily conceived, the emission port 17 should be directed to between the center (0°) and outside (180°) of the saucer 21. Experiments have shown, however, that this idea bears no satisfactory result when the turntable is rotated at a constant speed. Even if the direction of the emission port is changed a little every time, what is heated is the periphery of the food in most cases unless the emission is concentrated to the center of the food. For example, when the emission port 17 assumes 45°, the result is as shown in FIG. 15, because the saucer 21 is rotated at a constant speed and the heating output is constant. The edges of the food 6 are eventually heated except at a moment when, if it happens, the middle area of the food can be heated during the rotation, and in consequence, the periphery of the food is heated on the average in on, cycle. A state where the middle area can be heated should be maintained and the other state should be avoided in order to heat the middle area.

FIG. 16 results from the continued state where the middle area can be heated with the rotation of the saucer 21 stopped. The emission port 17 has an angle of 45° and the food 6 is stopped at a position of the drawing, and one of the unheated portion 43 hard to heat in FIG. 14 is heated. The food 6 should be moved another 180° to heat the other unheated portion 43. That is, in order to uniformly heat the total food 6, four kinds of operations are required, i.e., three operations in FIGS. 12, 13, 16 and one operation after moving the food 6 by 180° from FIG. 16. The saucer 21 is allowed not to be completely stopped in the middle of the heating or may be decelerated nearly when the middle area can be heated.

The heating output in a state where the middle area can be heated while the saucer 21 is rotated at a constant speed may be set higher than in other states. In practice, the heating output in the state where the middle area can be heated is made a full power and that in other states is set to be 0 or reduced.

The rotation of the saucer 21 may be combined with the control of the heating output.

From the above, three elements, namely, the rotary waveguide 8, the saucer 21 and the magnetron 2 should be controlled in association with each other to locally heat an optional portion of the food.

Figure 17:
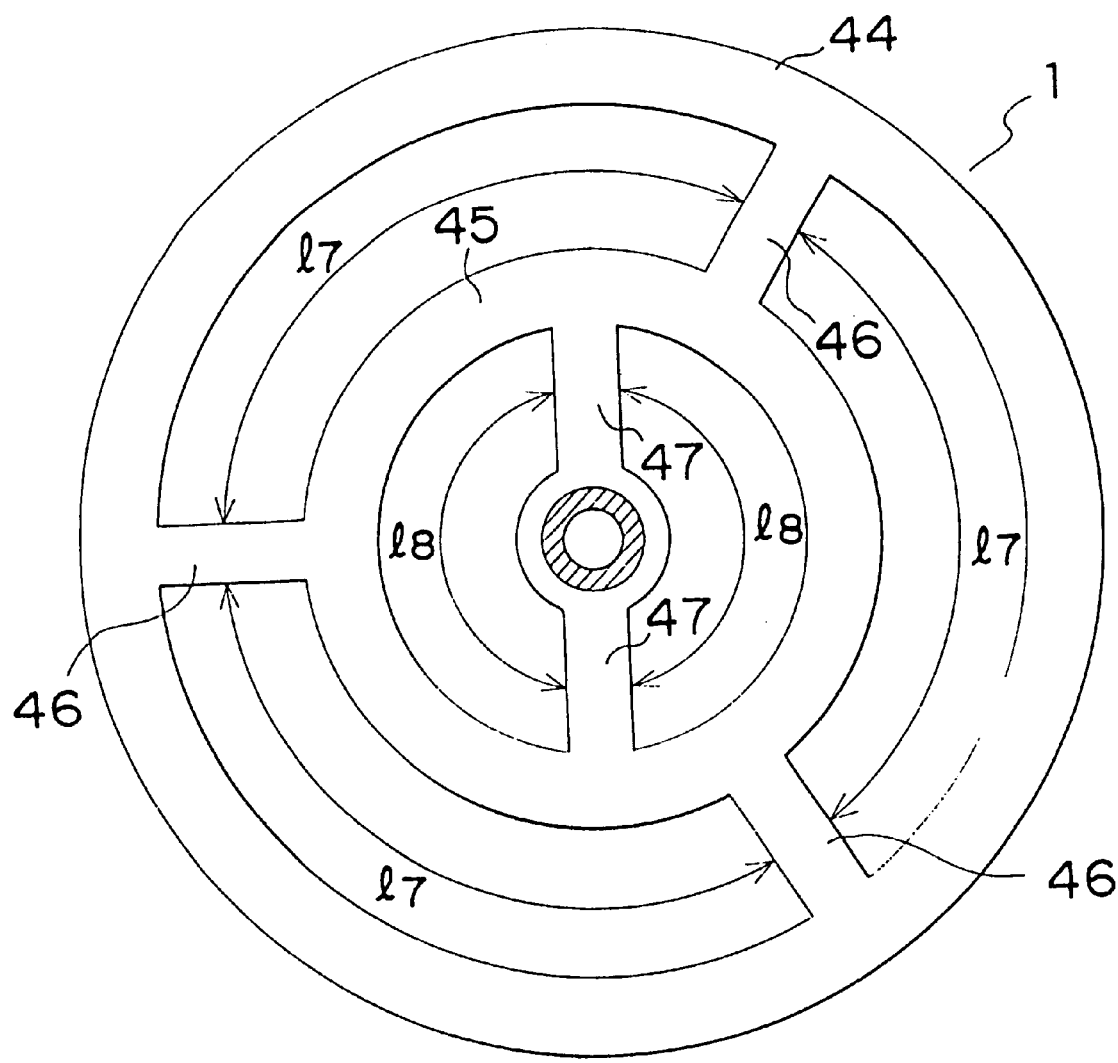
FIG. 17 is a bottom view of a turntable.

FIG. 17 shows the constitution of an essential part, specifically, the turntable 1 of the high frequency heating apparatus of the embodiment, seen from below. The turntable 1 consists of rings 44, 45, shafts 46, 47 and a bearing 48 and is formed of metal to stand the heat of heaters 28A, 28B, 28C. Lengths 17, 18 of a crevice or opening in a rotational direction of the turntable 1 are not smaller than ½ a wavelength of electromagnetic waves to allow the electromagnetic waves to pass through easily.

Although it depends on the directivity of the rotary waveguide 8, the opening in the vicinity of the center of the bottom face of the turntable as indicated by 18 in FIG. 17 is necessary to heat a central bottom face of the food, and the opening in the periphery of the turntable as represented by 17 is necessary to heat the periphery of the food. It is apparent, though, that the opening is not required if the turntable 1 is made of a material such as ceramic or the like which is hard to absorb electromagnetic waves and having a permeability to the electromagnetic waves.

Accordingly, the turntable 1 should be formed of a material resistant to lower heaters 28A, 28B, 28C, or an electromagnetic wave-permeable material may be selected if a heater not raising a temperature at the bottom face of the turntable (a heater of a type circulating hot wind) is used, in place of the lower heaters 28A, 28B, 28C.

Figure 18:
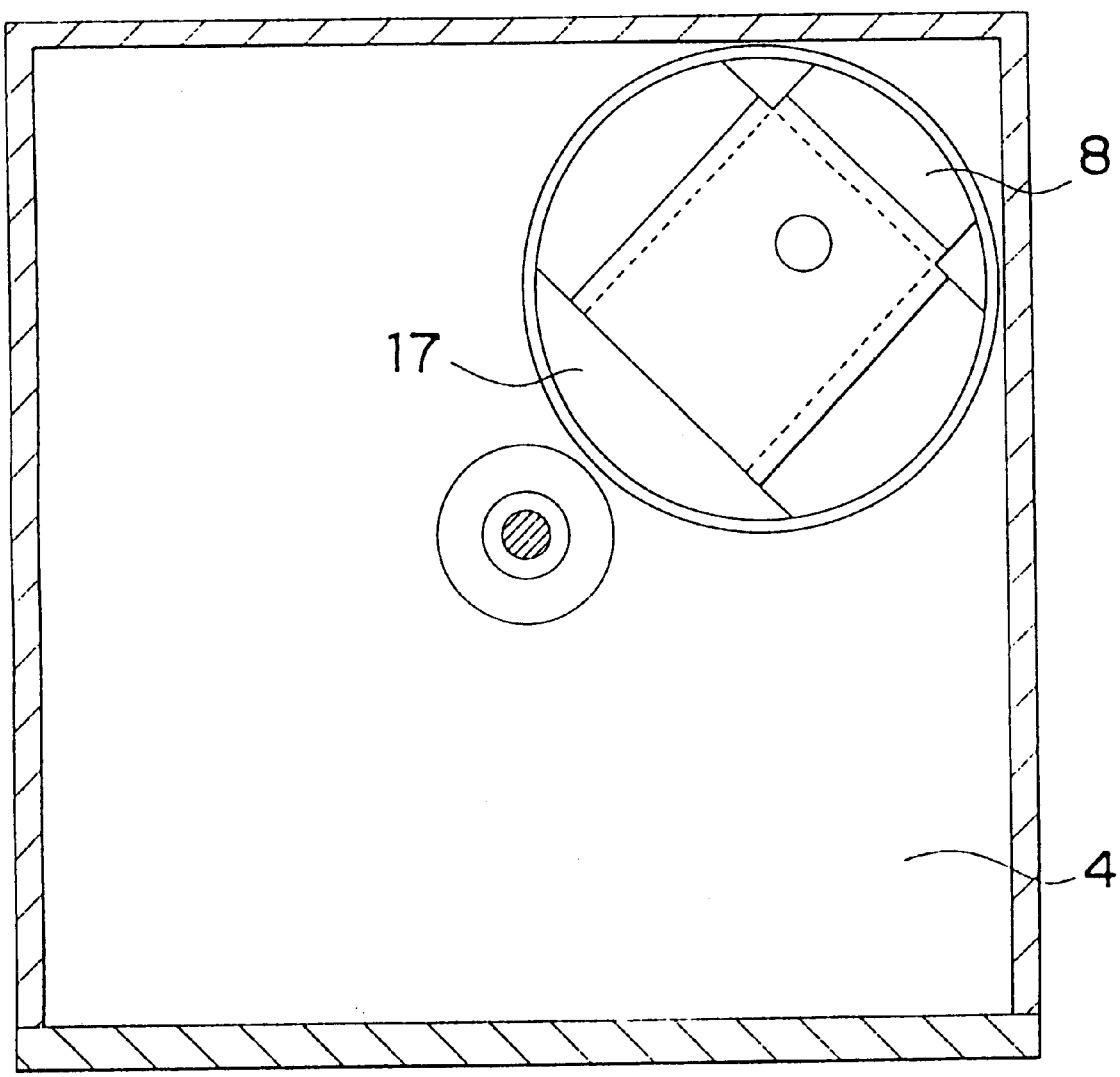
FIG. 18 is a lateral sectional view of a heating chamber of a high frequency heating apparatus according to a second embodiment of the present invention.

FIG. 18 shows a second embodiment of the present invention.

Since the rotary waveguide 8 is installed at a corner of the heating chamber 4 according to the second embodiment, the rotary waveguide 8 can be slightly larger in size, in other words, a degree of freedom of design is increased A driving range of the emission port 17 is set only inside the bottom face of the heating chamber 4 as indicated in the drawing. If the emission port 17 were adapted to work outside the bottom face of the heating chamber 4, the high frequency heating apparatus would become bulky and require special arrangements not to leak the electromagnetic waves outside. The second embodiment is constituted as above to avoid these problems.

Figure 19A:
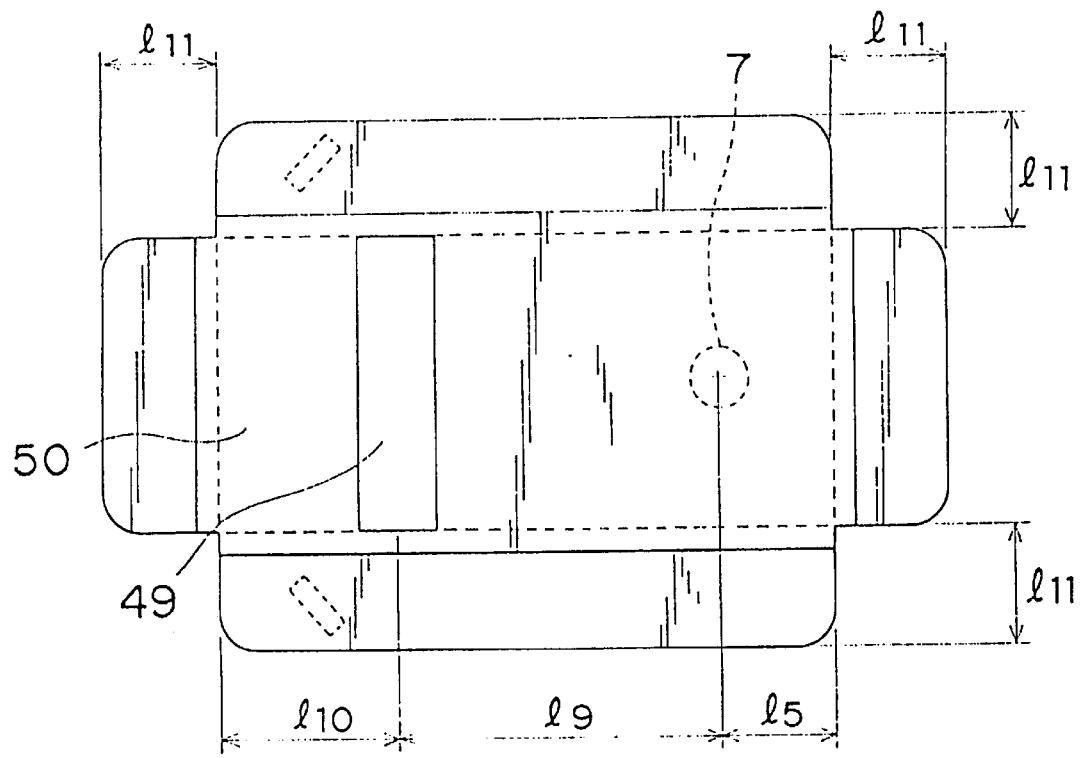
FIG. 19 shows a third embodiment of the present invention, (a) being a top plan view and (b) a longitudinal sectional view of the rotary waveguide.

FIG. 19 is a high frequency heating apparatus according to a third embodiment of the present invention, wherein the rotary waveguide 8 is changed in shape, with exerting the same effect. In FIG. 19(a), end faces in all four directions of the rotary waveguide 8 are bent to be circular, thus increasingly efficiently preventing sparks. The electromagnetic waves are emitted through an opening 49.

In comparison with the first embodiment, the electromagnetic waves tend to be emitted immediately upward from the opening 49.

An internal space 50 can be regarded as a waveguide.

Lengths l5 between the coupling part 7 and the end face of the rotary waveguide and, l9+l10 are respectively about an odd multiple of $\lambda g/4$, so that the standing waves are generated stably.

If the length l9 is set to be approximately an odd multiple of $\lambda g/4$ and the length l10 is set to be approximately an integral multiple of $\lambda g/2$, this is effective to generate standing waves more stably.

Figure 19B:
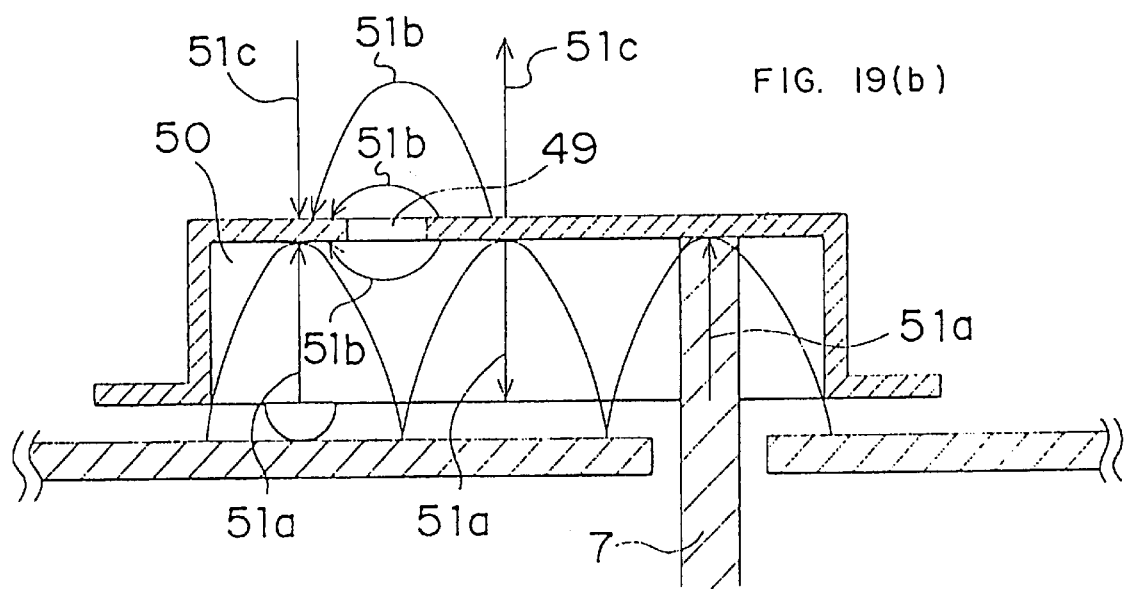

The above will be explained with reference to FIG. 19(b) showing how electric fields are generated at a moment. The electric field is practically repeatedly reversed with a cycle of an inverse number of a frequency. An arrow-headed solid line 51a indicates a direction of representative electric fields having three ridges of standing waves (field loops) generated in the internal space 50. Electric fields indicated by an arrow-headed solid line 51b are generated in the vicinity of the opening 49, and consequently strong electric fields 51c holding the opening 49 therebetween are induced above the opening 49.

The generation of these electric fields 51a and, 51b and 51c takes place concurrently because of the above-described dimensional relationship, and accordingly the electromagnetic waves are emitted from the opening 49 without disturbing the standing waves.

Figure 20A:
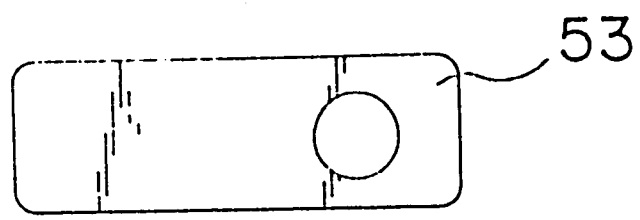
FIG. 20 shows a fourth embodiment of the present invention, (a) being a top plan view and (b) a longitudinal sectional view of a rotary antenna.
Figure 20B:
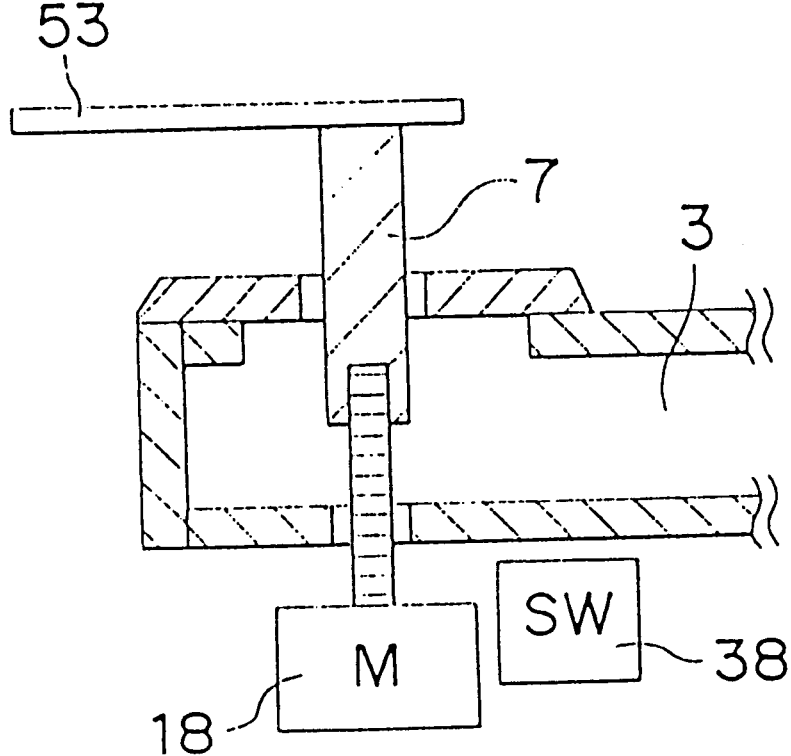

FIG. 20 shows a fourth embodiment, in which a rotary antenna is employed in place of the rotary waveguide.

A conductive sheet body 53 (specifically, iron or stainless sheet body) connected to the coupling part 7 has a directivity, exerting the same effect as discussed hereinabove.

Figure 21A:
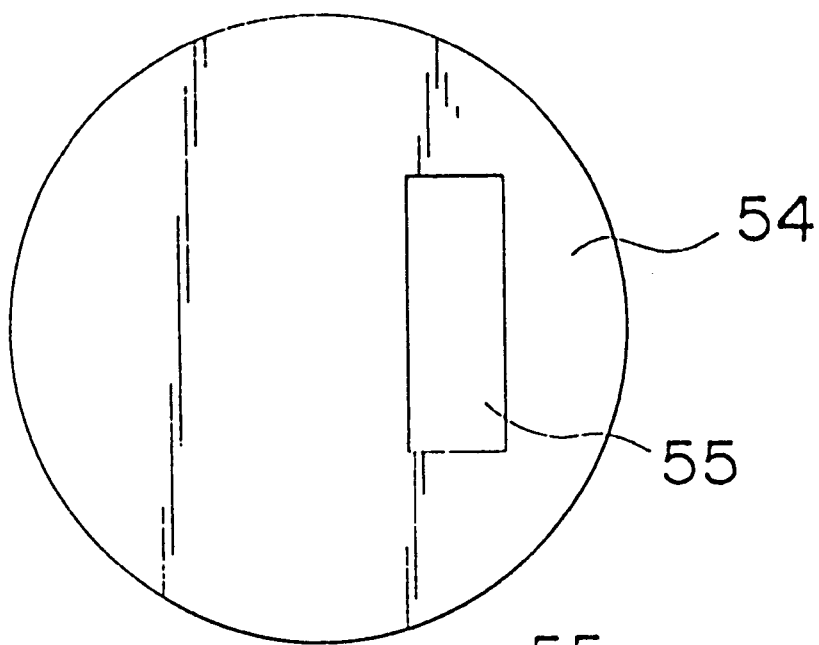
FIG. 21 shows a fifth embodiment of the present invention, (a) being a top plan view and (b) a longitudinal sectional view of a shielding member with an opening.
Figure 21B:
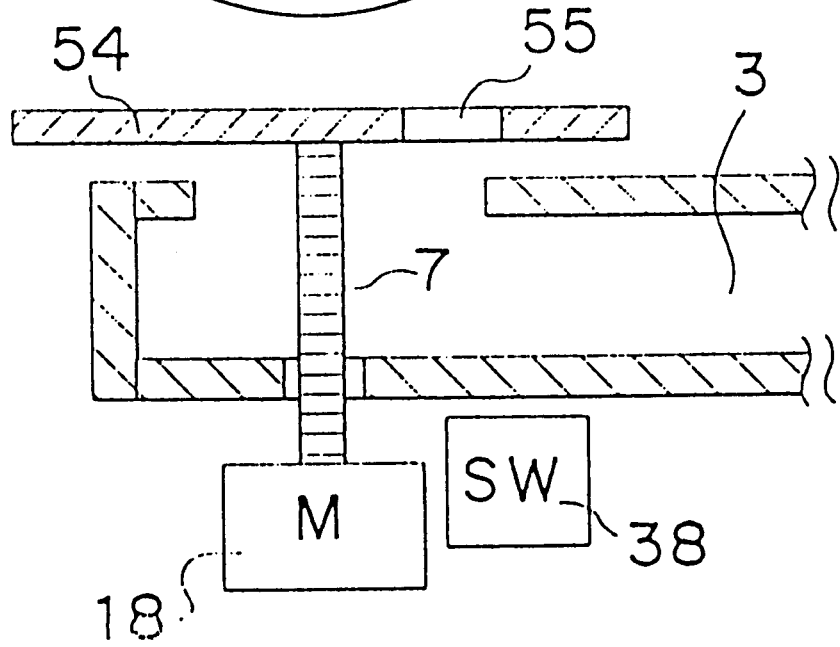

FIG. 21 shows a fifth embodiment. A position where the opening is shut is switched in the constitution of the fifth embodiment.

An opening 55 is formed in an electrically conductive sheet body 54 connected to the coupling part 7, while other parts than the opening 55 are shielded.

The opening 55 accordingly shows a directivity thereby to achieve the same effect. The same effect is expectable in other designs so long as the directivity is secured. The fourth and fifth embodiments are hard to attain the aimed directivity in comparison with the first-third embodiments, while the structure itself becomes simple in the fourth and fifth embodiments without requiring bending, etc.

Figure 22A:
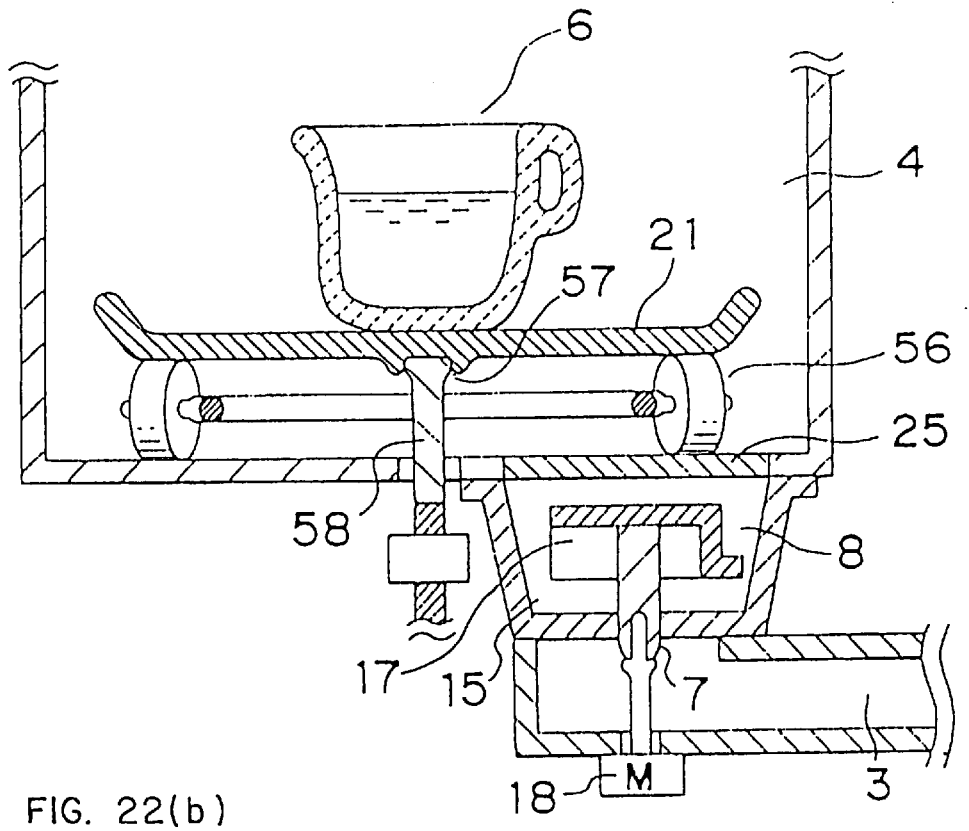
FIG. 22 shows a sixth embodiment of the present invention, (a) being a longitudinal view and (b) a horizontal sectional view of a heating chamber of a high frequency heating apparatus.
Figure 22B:
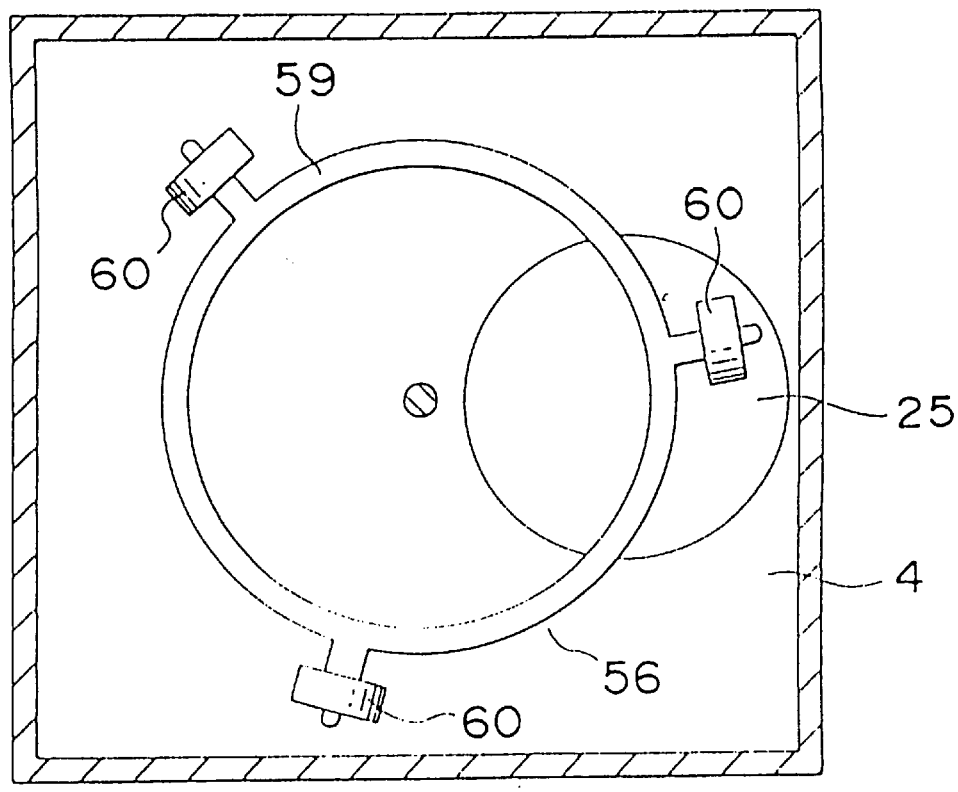
Figure 23:
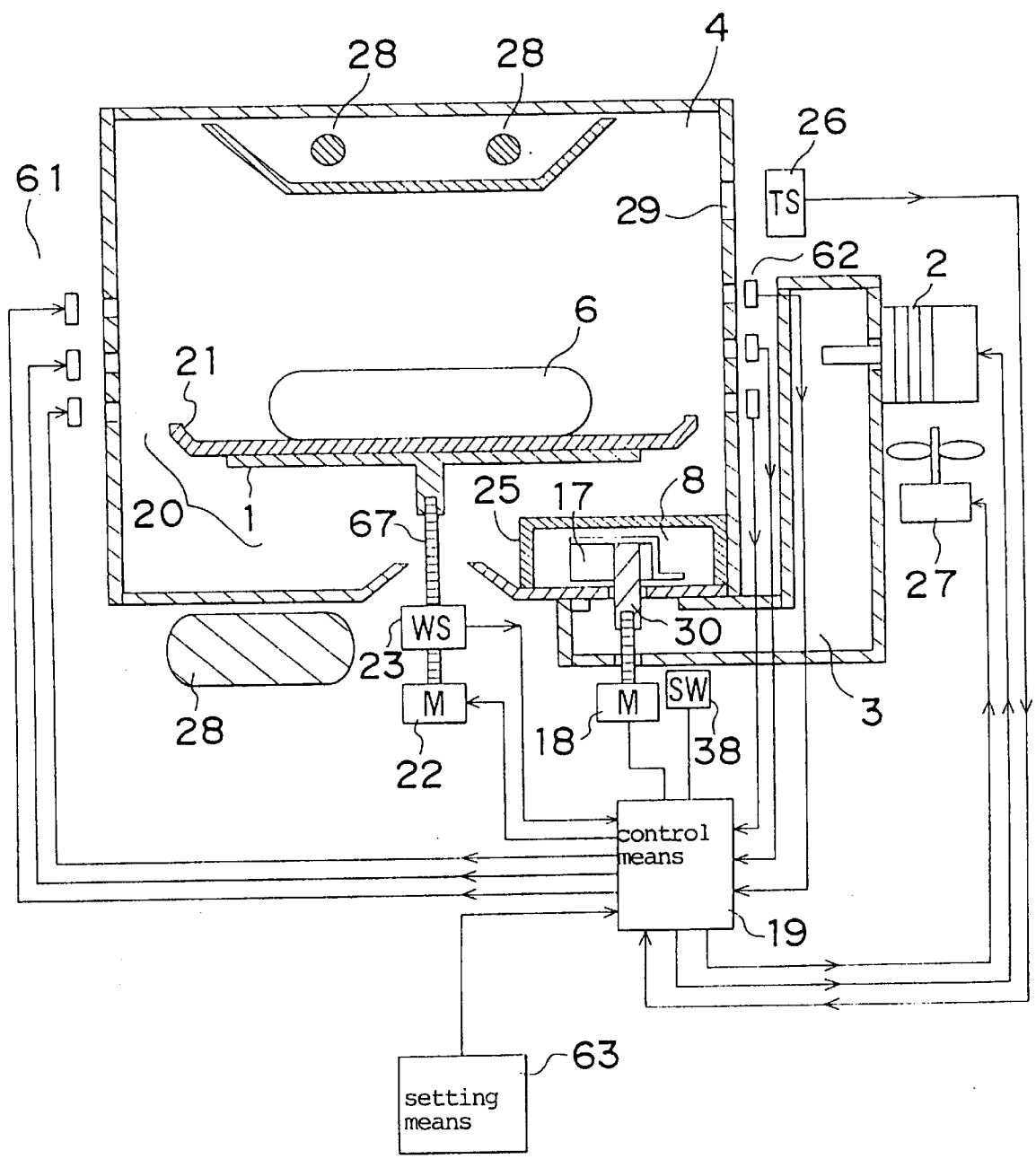
FIG. 23 is a view showing the constitution of a high frequency heating apparatus according to a seventh embodiment of the present invention.

FIG. 22 shows a sixth embodiment of the present invention.

The stage 20 is constituted of the glass saucer 21 and a roller ring 56. A recess 57 is formed in the saucer 20, in which a shaft 58 of another pare is fitted. The stage 20 is rotated while held by the roller ring 56.

(a) is a sectional view and (b) shows the constitution of the roller ring 56 seen from above.

The roller ring 56 has a ring 59 and three rollers 60. The ring and rollers are formed of a material passing electromagnetic waves.

In the above constitution, the electromagnetic waves emitted from the rotary waveguide 8 enter the food 6 without being interrupted.

A target local portion of the food is heated easily. Although not shown in the drawing, the bottom face of the heating chamber 4 is recessed so as to let the rollers 60 smoothly move without a positional shift.

A seventh embodiment of the present invention is shown in FIGS. 23–29. The rotary waveguide 8 projects into the heating chamber 4 in FIG. 23. In this case, the cover 25 is formed like a box to protect the rotary waveguide 8.

The constitution of the embodiment effectively reduces the occupied space below the bottom face of the heating chamber 4, whereas the effective volume of the heating chamber 4 is disadvantageously decreased.

Photosensors 61, 62 as shape detection means are installed in the present embodiment, so that a shape of the food 6 can be detected from whether the light from the light emitting part 61 is received at the photodetecting part 62.

In the case where the food 6 has the same temperature as the saucer 21, the temperature sensor 26 cannot instantaneously detect an area where the food 6 is present. However, data obtained by the photosensors 61, 62 and weight sensor 23 make it possible to determine the area where the food 6 is present before the food 6 is heated.

Since only the area where the food 6 exists can be locally heated heating of parts other than the food 6 is prevented, thus eliminating waste and improving the heating efficiency.

A setting means 63, allowing the user to set the apparatus manually, is provided in the embodiment.

Although portions to be locally heated can be determined simply by the input contents in some cases, the direction of the rotary waveguide 8, the rotation of the turntable 1, the output of the magnetron 2, etc. are controlled in most cases based on the judgment by an area judging and controlling means (not shown) of the control means 19 along with the input contents and data of the temperature sensor 26, photosensors 61, 62 and weight sensor 23.

Figure 24:
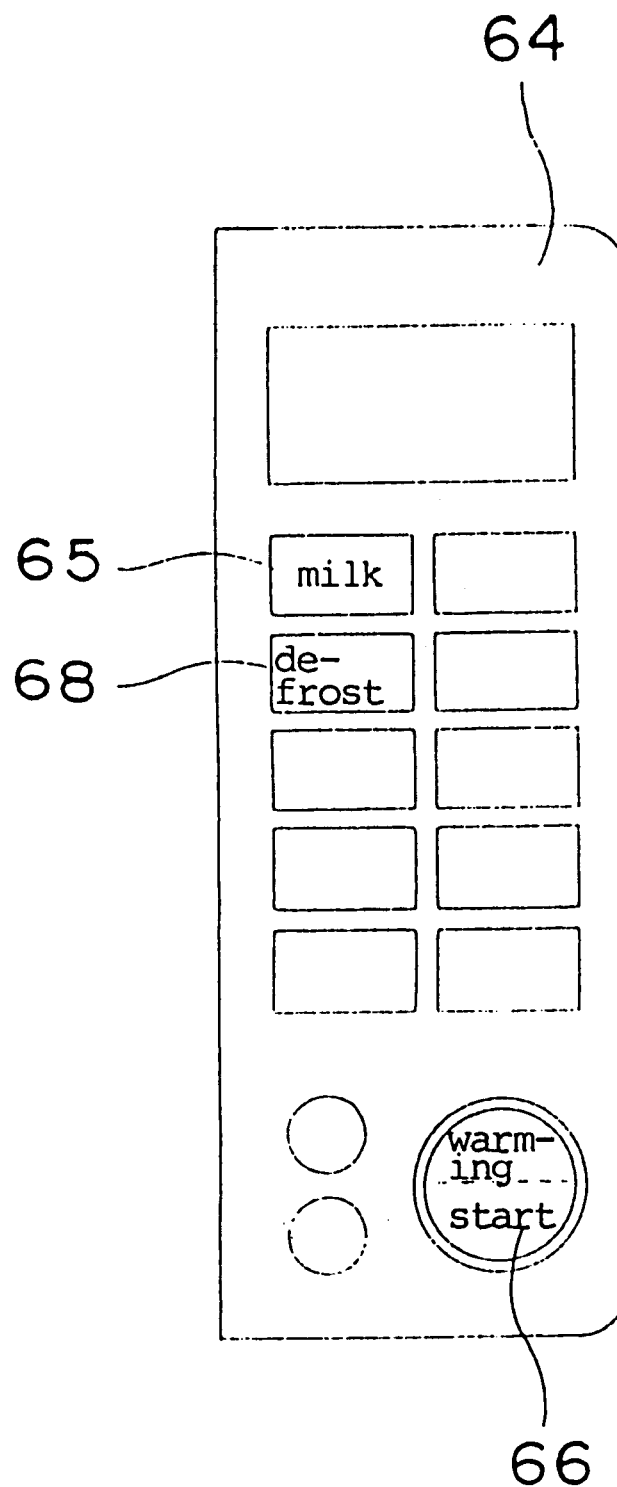
FIG. 24 is a front view of an operation panel of the high frequency heating apparatus of FIG. 23.

FIG. 24 indicates the constitution of an essential part of the high frequency heating apparatus of the embodiment, namely, an operation panel 64 as the setting means 63 referred to above.

In warming milk, the user presses a milk key 65 after bringing the milk in the heating chamber 4 and presses a start key 66. The control means 19 judges that the food 6 is milk based on a signal from the operation panel 64, and detects the amount, shape, location and initial temperature of the milk from signals from the weight sensor 23, photosensors 61, 62 and temperature sensor 26, thereby determining a proper position of the emission port 17. The control means 19 further calculates how much the motor should be moved from the reference position, then driving the motor 18 to start the emission of electromagnetic waves from the magnetron 2.

At this time, if the milk is placed near the emission part, the turntable 1 is stopped and the rotary waveguide 8 is moved to heat immediately below the milk.

If the milk is far from the emission port 17 (e.g., at the opposite side via a shaft 67 of the motor 22), both the turntable 1 and the rotary waveguide 8 are controlled into such a positional relationship that can heat immediately below the milk.

Figure 25:
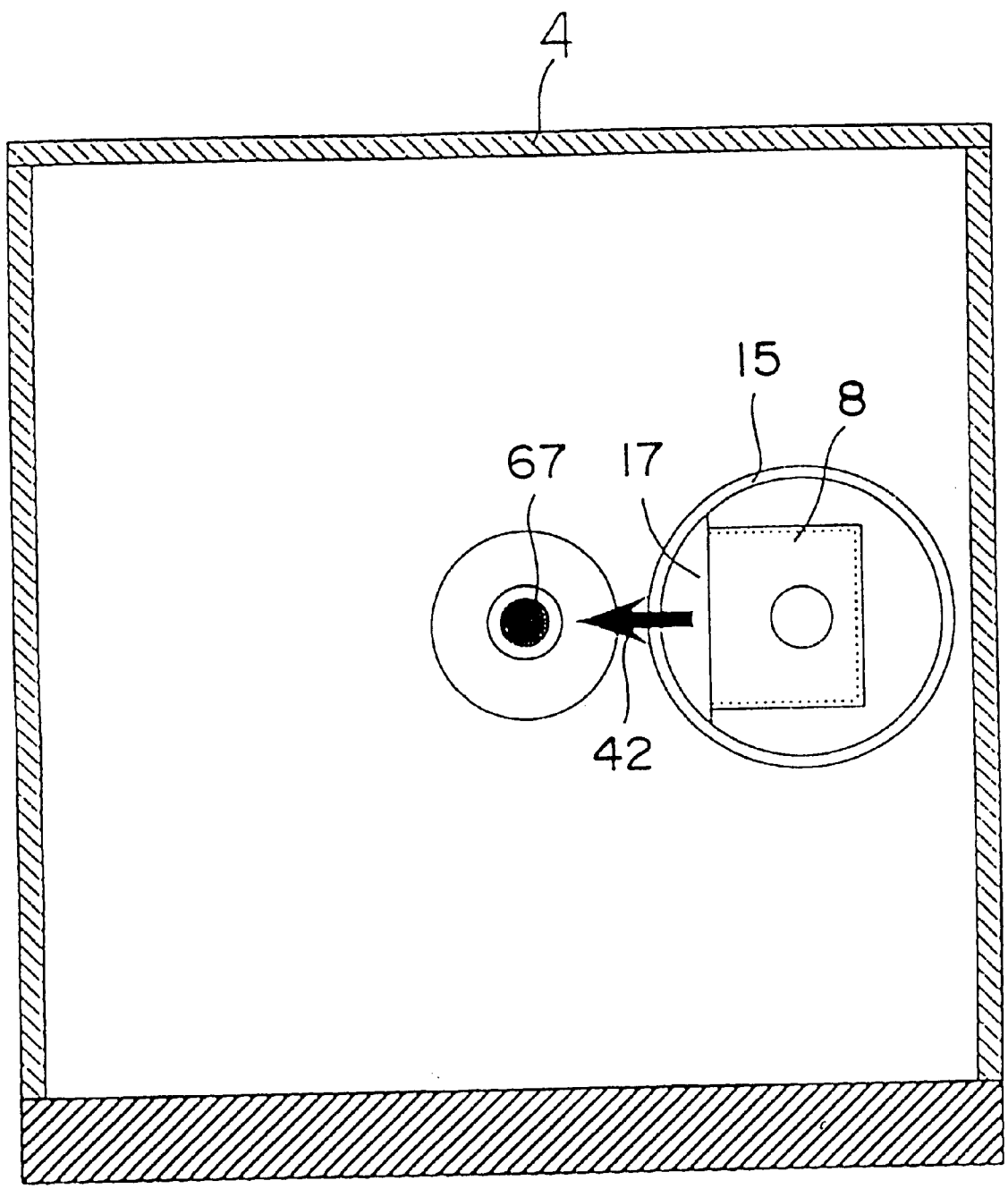
FIG. 25 is a horizontal sectional view of the high frequency heating apparatus of FIG. 23 with an emission port of a rotary waveguide directed to the center.

On the other hand, if the milk is set at the center of the turntable 1, there is no large difference whether the turntable 1 is moved or stopped. If the rotary waveguide 8 is controlled to direct the electromagnetic waves to the center as shown in FIG. 25, the milk is naturally heated immediately therebelow.

When a plurality of cups or bottles of milk are placed in the heating chamber, the turntable 1 and the rotary waveguide 8 are both moved to sequentially heat immediately below the plurality of cups or bottles of milk.

In the case of milk, if the electric fields are concentrated at the bottom face, not only is the heat naturally distributed well owing to the convection, but the matching state is favorable, whereby the heating efficiency is improved.

When it results the same whether the turntable is moved or not, it is better not to move the turntable so as to save energy.

The heating of milk is continued for a time determined by the weight sensor 23 and photosensors 61, 62, or the heating is terminated when the temperature sensor 26 judges that the milk is raised to a proper temperature.

If the turntable 1 or rotary waveguide 8 are repeatedly driven and stopped many times, the operation of the apparatus may become instable because the impedance seen from the magnetron 2 is changed at the driving time of the turntable or rotary waveguide. Therefore, the oscillation of the magnetron 2 is stopped or the heating output of the magnetron 2 is decreased before the turntable or rotary waveguide is started. In contrast, after the turntable 1 or rotary waveguide 8 is stopped, the magnetron 2 is oscillated to increase the output. The operating state of the magnetron 2 is stabilized in this manner, and unnecessary radiation noises from the magnetron 2 are suppressed.

Figure 26:
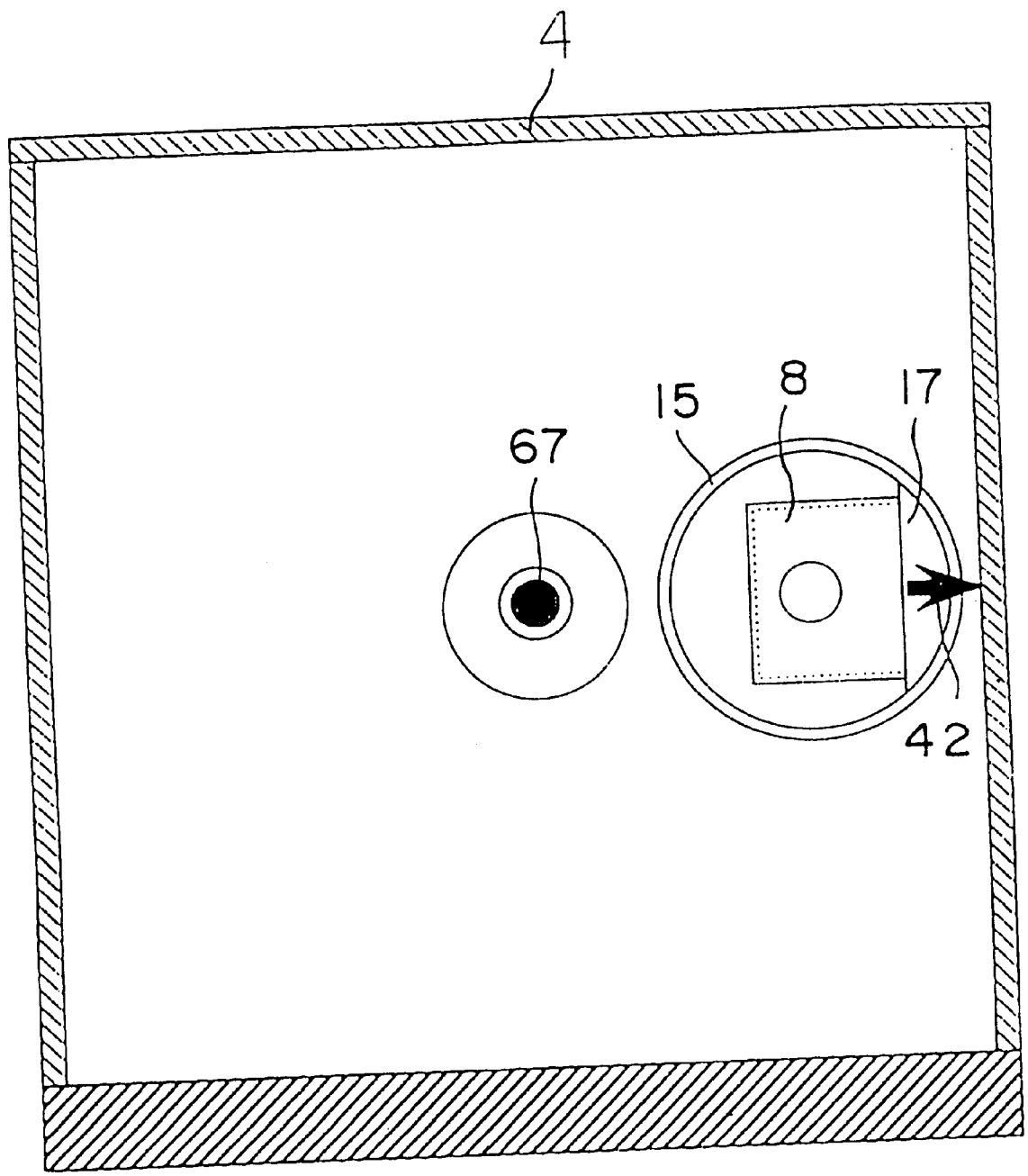
FIG. 26 is a horizontal sectional view of the high frequency heating apparatus of FIG. 23 with the emission port of the rotary waveguide directed to a wall face of a heating chamber.

Incidentally, when a small solid food such as potatoes or the like is to be heated, if the electromagnetic waves are emitted only from below the food a lower portion of the food is heated too much due to the absence of convection. For solving this problem, the electromagnetic waves are emitted in a direction where the food 6 is not present, as shown in FIG. 26. in other words the local heating is avoided and the food is heated by the electromagnetic waves reflected at the wall faces of the heating chamber 4.

Now, it will be described how many shaomais or a flat food 6 such as a pizza is heated.

Figure 27:
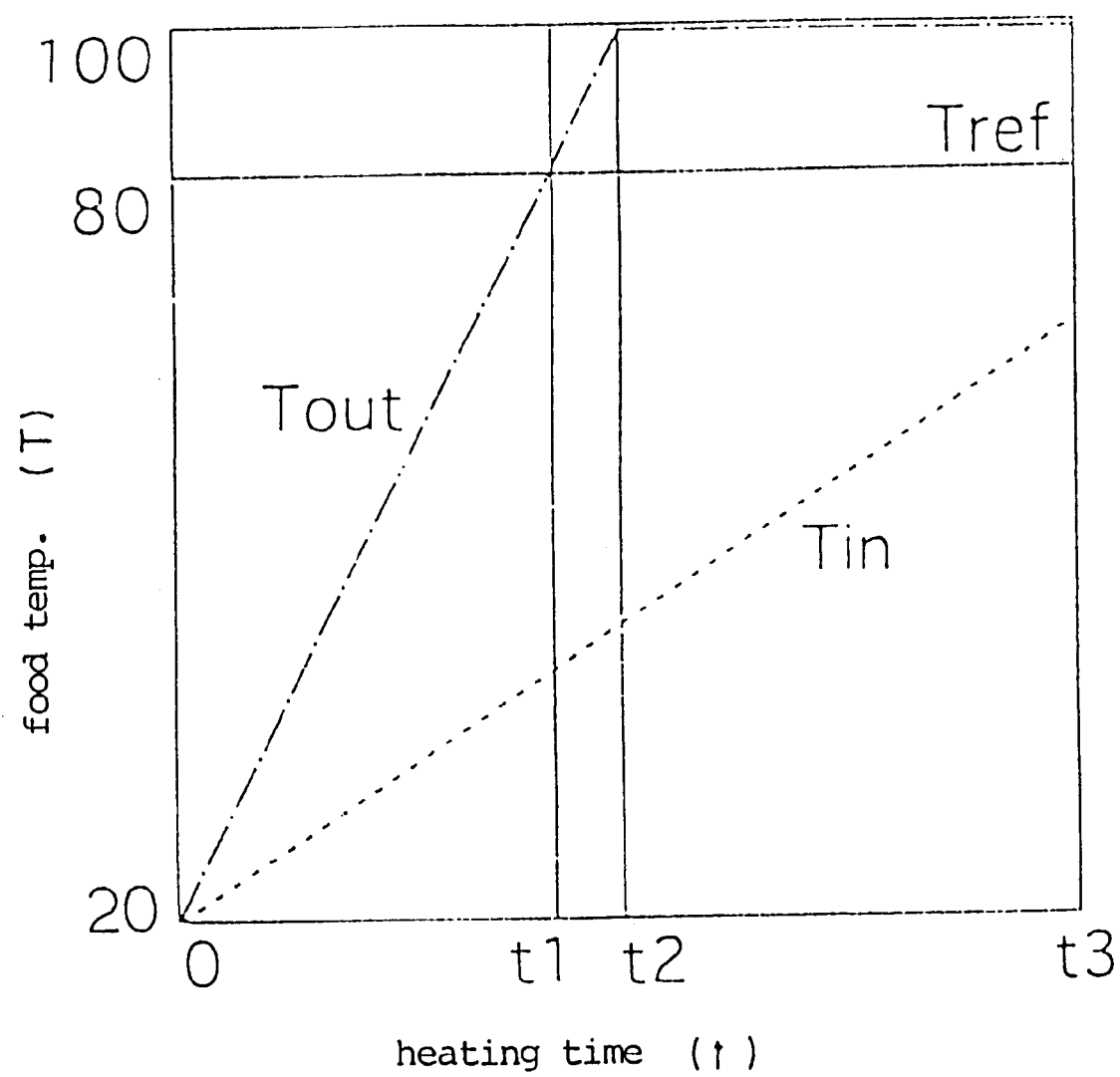
FIG. 27 is a characteristic diagram indicating a relation of the heating time and the temperature of food in the conventional high frequency heating apparatus.

FIG. 27 is a characteristic diagram when the conventional microwave oven is normally used, in which an axis of abscissa indicates a heating time t and an axis of ordinate indicates a temperature T of the food 6.

An average temperature Tout at a peripheral portion of the food 6 and an average temperature Tin at a central portion of the food 6 are not precise values. A target average temperature Tref when the heating is completed is set to be 80° C. When the heating is started, Tout quickly increases while Tin is hard to raise. Tout becomes Tref after the heating for t1 and reaches a saturation temperature (boiling temperature) in t2. If the heating is stopped at this time point, Tin is too low. Under the circumstances, the heating is continued for t3 to raise Tin to an acceptable value, when the heating is terminated. In this case, the peripheral portion of the food 6 is heated too much (Tout>Tref), but the central portion is not sufficiently heated (Tin<Tref). The food is cooked miserably.

Figure 28:
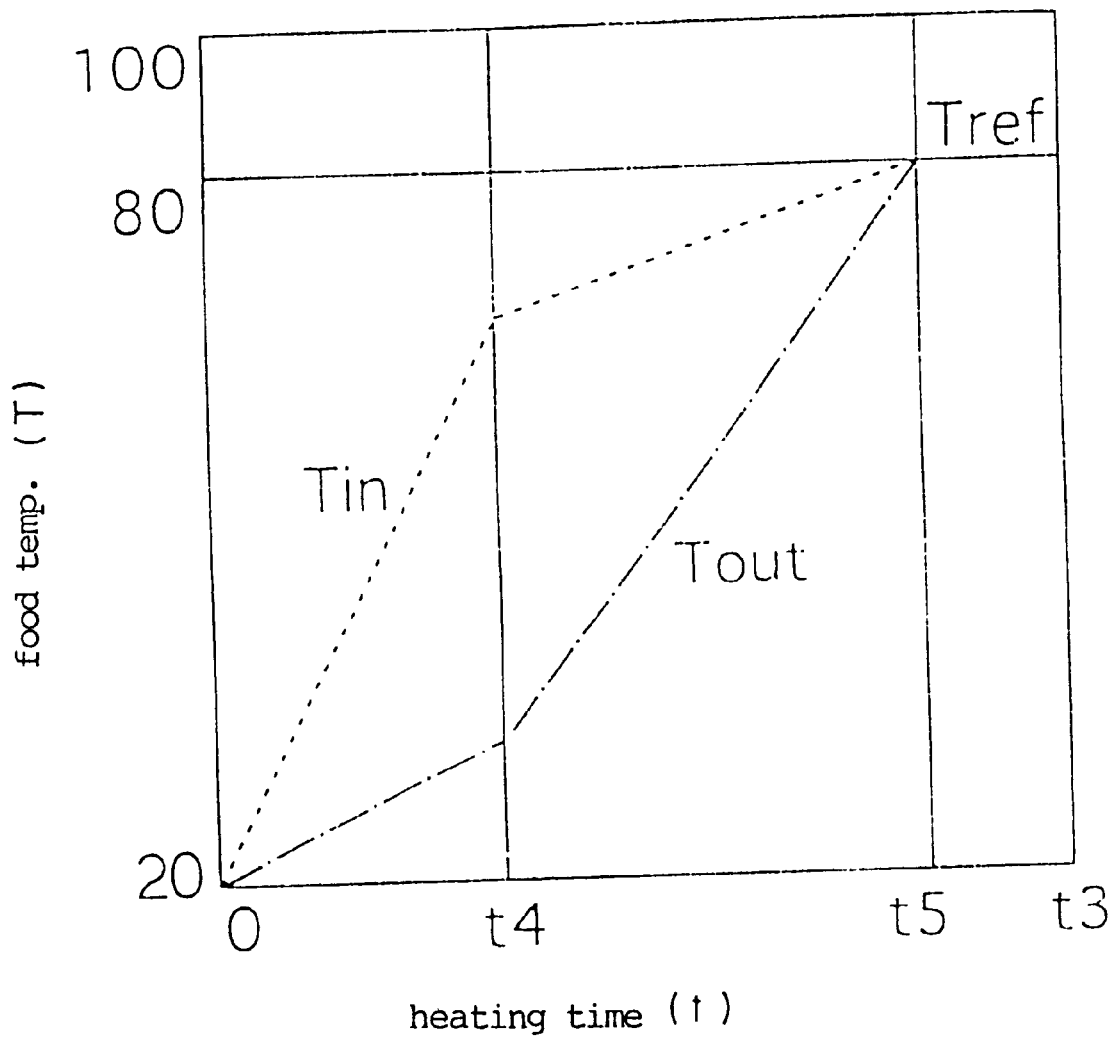
FIG. 28 is a characteristic diagram indicating a relation of the heating time and the temperature of food in the high frequency heating apparatus of the present invention.

On the other hand, FIG. 28 is a characteristic diagram of the embodiment. The effect of the uniformed heating by changing the direction of the emission port 17 once in the middle of heating is confirmed from FIG. 28. At the start of the heating, the emission port 17 is directed the same as in FIG. 12 or FIG. 25 to heat the central portion of the food 6 first. When it is t4, the emission port 17 is rotated 180° into the same direction as in FIG. 13 or FIG. 26. Therefore, Tin rises quickly until t4 while Tout does not rise smoothly. The temperature rise rate is reversed after t4, that is, Tout rises more quickly than Tin. When the heating is stopped at t5, the peripheral portion and the central portion of the food are properly heated (Tout≈Tin≈Tref) in a very good state. Since an overheated portion is not generated in this way of heating, a heating loss is little and the heating is finished in a short time (t5<t3).

Figure 29:
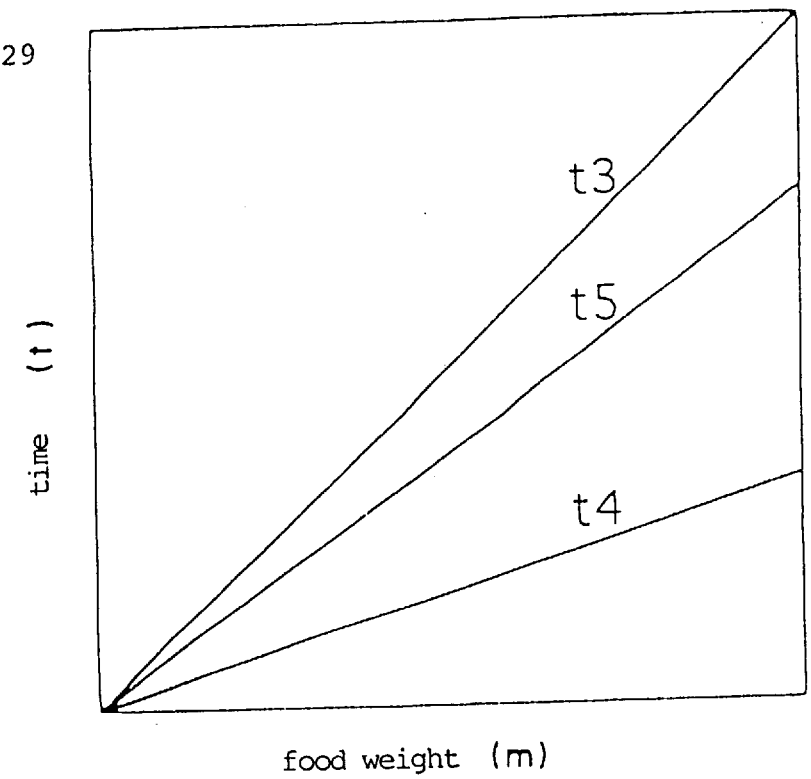
FIG. 29 is a characteristic diagram showing a timing for switching the direction of the emission port in the high frequency heating apparatus of th. present invention.

FIG. 29 is a characteristic diagram explanatory of how to determine a switching timing for the direction of the emission port 17 in FIG. 28. An axis of abscissa is a weight m of the food 6 detected by the w eight sensor 23 and an axis of ordinate is the time t. The heavier the food 6 is, the longer an optimum heating time becomes. Therefore, the switching time t4 of the emission port 17 can be calculated as a function of m in the control means 19. Needless to say, the heating end time t5 can be also determined in the same manner.

Figure 30:
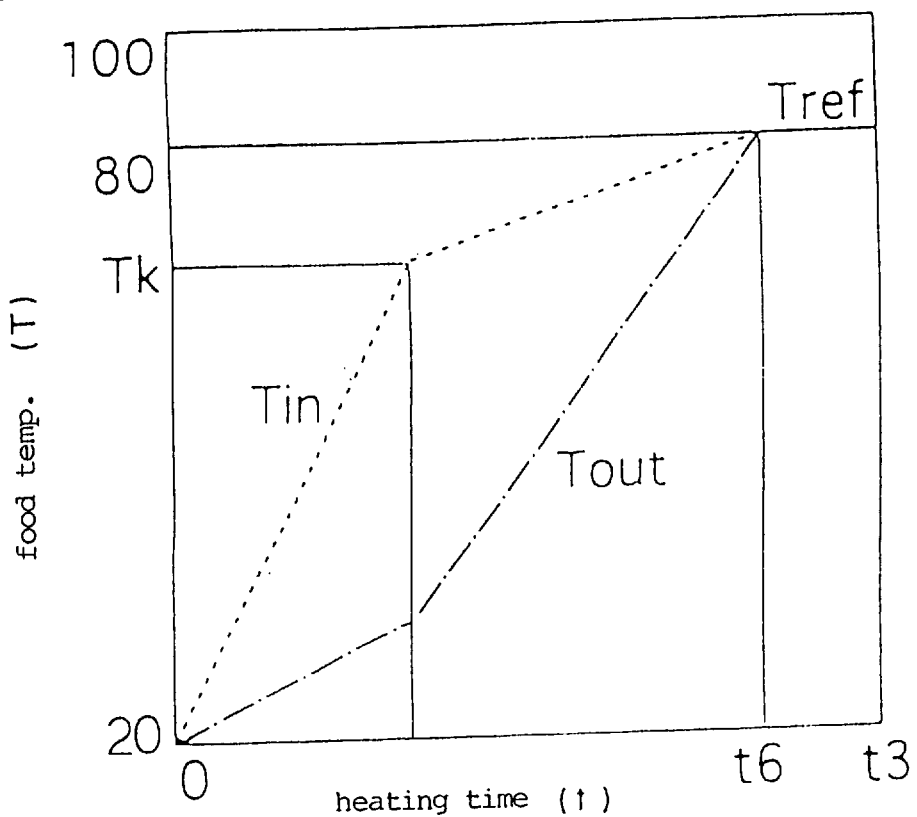
FIG. 30 is a characteristic diagram of a relation of the heating time and the temperature of food in a high frequency heating apparatus of an eighth embodiment of the invention.

Other switching methods may be used as well. For example, in an eighth embodiment of the present invention shown in FIG. 30, the switching timing for the emission port 17 is feedback-controlled by the temperature of the food 6. The method of FIG. 30 is slightly different from FIG. 28. The temperature of the food 6 is monitored by the temperature sensor 26 in real time, and the emission port 17 is switched when Tin reaches Tk (Tk is a value determined in the control means 19 and lower than Tref). The temperature is continuously monitored thereafter. The heating is finished at t6 when the food 6 truly becomes Tref. The temperature sensor 26 actually measures the temperature of the food 6 and therefore the method of FIG. 30 is more accurate as compared with when the temperature is estimated from the weight m.

The above switching is not necessarily limited to one time, and the switching by several times is rather preferred to avoid an increase of the temperature difference. When the temperature of the food is actually measure, and if a low temperature portion is detected in the food, it is suitable to locally heat the low temperature portion instantly.

In order to uniformly heat any food 6 at all times without irregularities in the heating distribution, data of the switching timing for the emission port 17 along with the optimum direction of the emission port in combination with the rotation of the turntable 1 and the oscillation of the magnetron 2, etc. may be stored beforehand as a database in a microcomputer of the control means 19 for every condition such as the material, shape, location, temperature and the like of the food 6. The present embodiment adopting this idea realizes the control for the optimum heating by comparing, by means of the control means 19, the input contents through the operation panel 64 and outputs from the temperature sensor 26, weight sensor 23 and photosensors 61, 62 with the database.

FIGS. 31–36 are characteristic diagrams when the food 6 in a frozen state (−20° C.) is defrosted.

Figure 31:
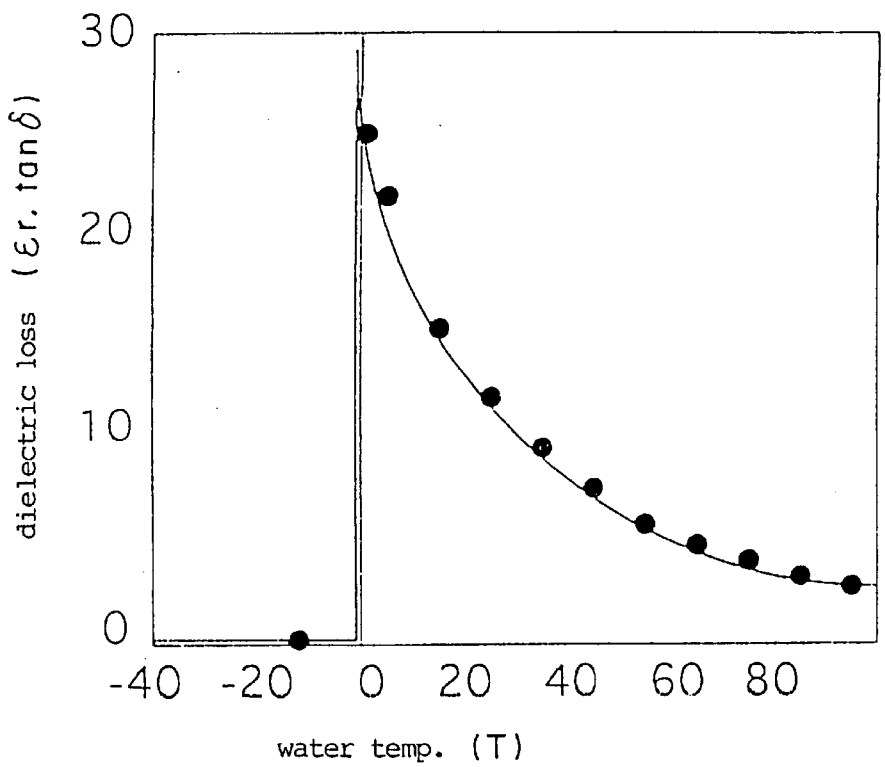
FIG. 31 is a temperature characteristic diagram of the dielectric loss of water.

Referring first to FIG. 31, a temperature characteristic of a dielectric loss $\epsilon_r \cdot \tan \delta$ of water is shown. An axis of abscissa is a temperature T of water and an axis of ordinate is the dielectric loss $\epsilon_r \cdot \tan \delta$ of water. The water in a frozen state (not higher than 0° C.) has a small dielectric loss and the melted water (not lower than 0° C.) shows an extraordinarily large dielectric loss (the dielectric loss is suddenly increased to approximately 1000 times). In the meantime, the electricity absorbed per unit volume by electromagnetic waves is proportional to the dielectric loss $\epsilon r \cdot \tan \delta$ as expressed by the equation (1). Therefore, it is considerably easy for the melted portion of the food is to absorb the electromagnetic waves, causing an increased temperature difference in the food in accordance with the progress of the heating. That is, the heating by electromagnetic waves, if continued with the same heating distribution as when the food is partially melted) always brings about the temperature irregularity.

The need for sensitive control is brought about.

When a frozen meat or fish is to be defrosted, after the food 6 is p-, in the heating chamber 4, a defrost key 68 shown in FIG. 24 is depressed, followed by the start key 66. The control means 19 judges that the food 6 is frozen from the signal of the operation panel 64, and detects various kinds of data of the food such as the amount, shape, set position, initial temperature, etc. from signals of the weight sensor 23 and photosensors 61, 62, thereby determining a suitable rotating number of the rotary waveguide 8. The motor 18 is consequently driven and the magnetron 2 is started to emit the electromagnetic waves almost simultaneously. At this time, the turntable 1 is rotated along with the rotary waveguide 8 to avoid the partial concentration of electric fields as much as possible.

If the temperature difference mentioned above starts to be generated, the rotary waveguide 8 is repeatedly controlled in such a manner, e.g., as to direct and stop the emission port 17 to face to the low-temperature portion of the food to locally heat the low-temperature portion. Although not shown here, the control means 19 includes a continuous control means for continuously rotating the motor, an intermittent control means for intermittently driving the motor, and a switch control means for switching the continuous control means and the intermittent control means. Therefore, the rotary waveguide 8 can be controlled easily.

Meanwhile, the temperature suddenly rises once a part of the food exceeds 0° C., which is unlikely to be coped with even by uniform heating to the low-temperature portion.

As a countermeasure to this inconvenience, the rotary waveguide 8 is controlled in association with the controlling of the output of the magnetron 2, an example of which will be depicted below.

Figure 32:
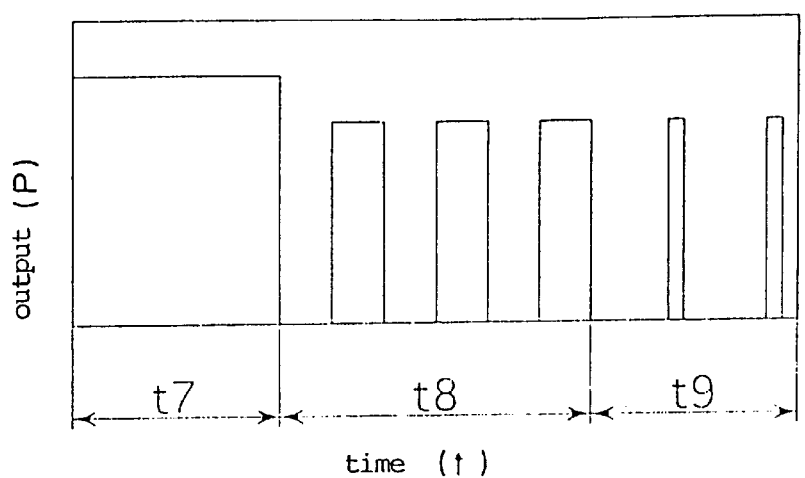
FIG. 32 is a characteristic diagram of a relation between the time an l the heating output when a frozen food is defrosted with the use of the conventional high frequency beating apparatus.
Figure 33:
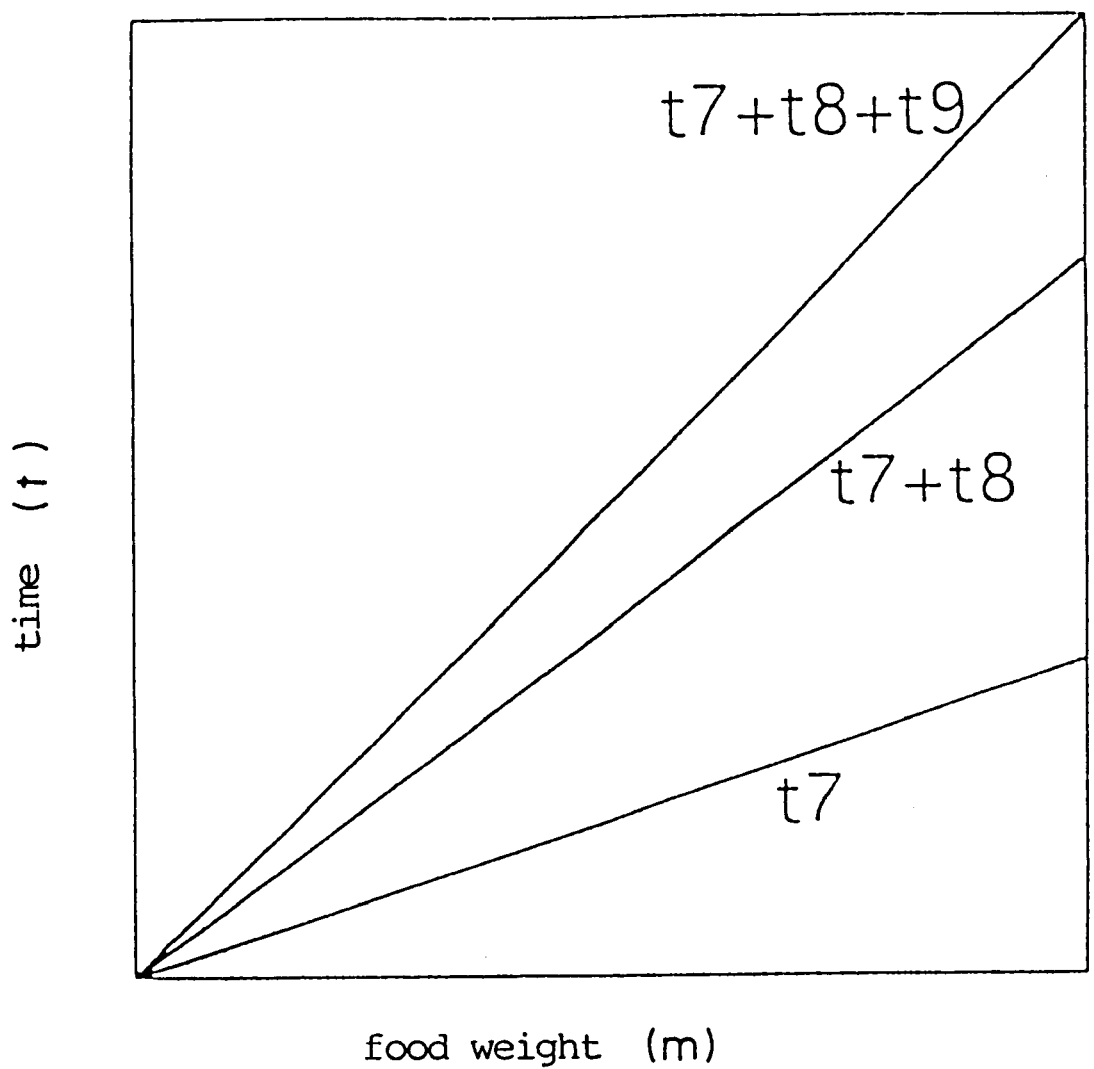
FIG. 33 is a characteristic diagram of a timing for switching the heating output in FIG. 32.

FIGS. 32 and 33 are characteristic diagrams of the conventional microwave oven.

FIG. 32 is a characteristic diagram of a change of the heating output by the magnetron 2 when the frozen food 6 is defrosted, in which an axis of abscissa shows the time t and an axis of ordinate is an output P. A high output is continuously generated for t7 at the initial stage of heating. The output is lowered for a succeeding time t8 and moreover, the intermittent heating is carries out. A ratio of stops and continuations of heating in the intermittent heating is changed for a last time t9 to decrease an average output. In short, the output is gradually decreased in FIG. 32. Since the temperature rise subsequent to the heating by the electromagnetic waves is reduced by lowering the output, and a ratio of the temperature rise due to the thermal transmission inside the food 6 and a temperature difference between the food 6 and an ambience in the heating chamber 4 is increased, the temperature irregularity is improved a little.

FIG. 33 is a characteristic diagram explanatory of how to determiner t7–t9 of FIG. 32, in which an axis of abscissa indicates the weight m and an axis of ordinate indicates the time t. The switching timing for the output from the magnetron 2 is determined only by m detected by the weight sensor 23 irrespective of how the food 6 is stored before being heated. For example, if the stored temperature of the food before heating is a little high, a part of the food is possibly melted and boiled before t7. In practice, therefore, the switching timing should be corrected based on the output of the temperature sensor 26. Nevertheless, since the heating with the constant heating distribution is kept unchanged even by the above correction, the temperature irregularity cannot be solved perfectly.

Figure 34:
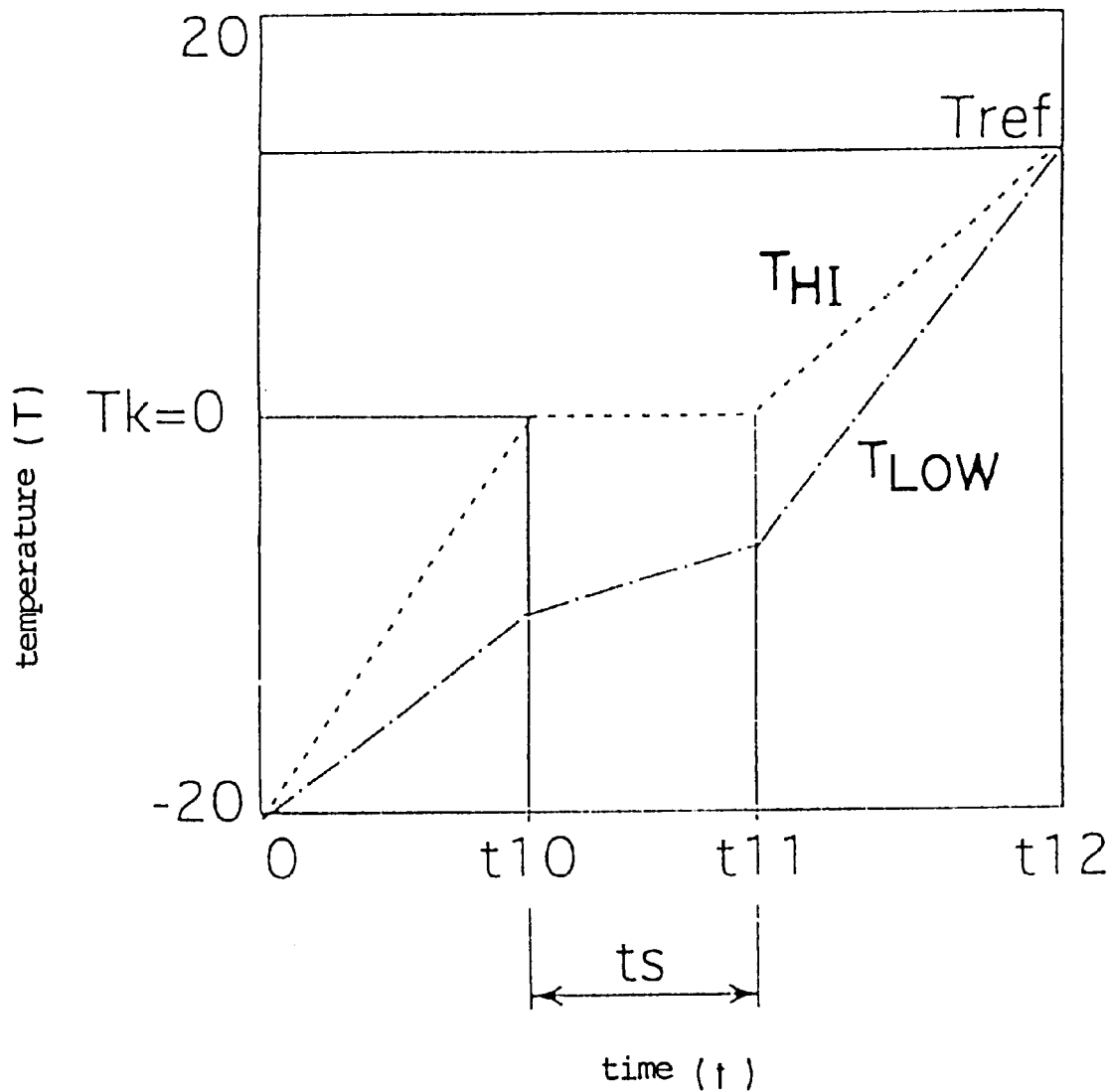
FIG. 34 is a characteristic diagram of a relation between the time and the temperature of frozen food when the food is defrosted with the use of the high frequency heating apparatus of the present invention.
Figure 35:
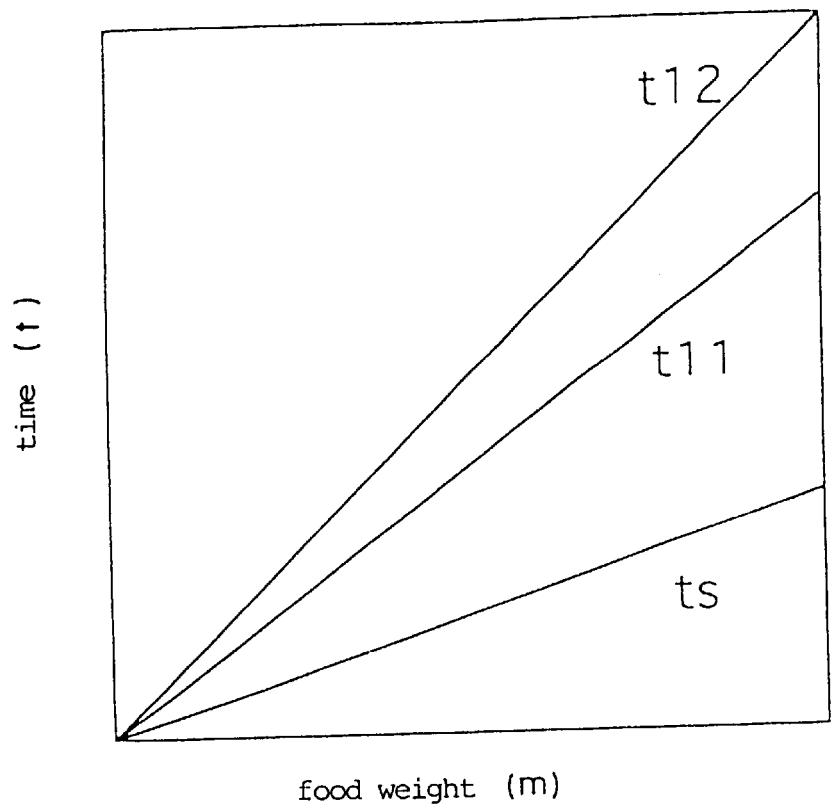
FIG. 35 is a characteristic diagram of a timing for switching the heating output in FIG. 34.
Figure 36:
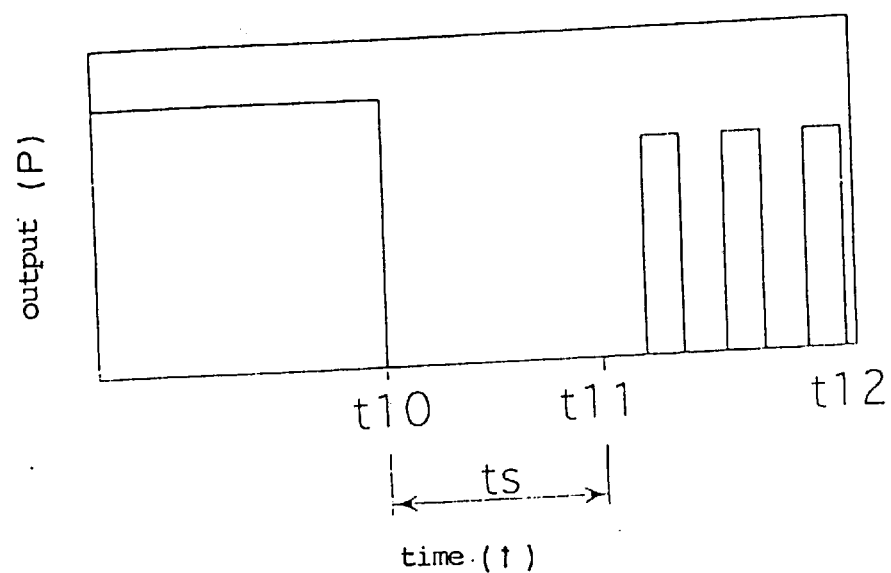
FIG. 36 is a characteristic diagram of a relation between the time and heating output in FIGS. 34 and 35.

FIGS. 34–36 are characteristic diagrams of the high frequency heating apparatus of the embodiment.

FIG. 34 is a temperature characteristic diagram when the emission port 17 is stopped at a position to heat the low-temperature portion of the food 6 to be defrosted after the rotary waveguide 8 is rotated constantly by the continuous control means which is switched halfway to the intermittent control means by the switch control means. An axis of abscissa indicates the time t and an axis of ordinate indicates the temperature T. In the first place, the rotary waveguide 8 and the turntable 1 are respectively rotated at a constant speed thereby to start heating. The set temperature Tk referred in FIG. 30 is set to be 0° C. The heating is stopped at t10 when a temperature of a high-temperature portion THI reaches Tk. At the same time, the emission port 17 and the turntable 1 are stopped in a state to heat the low-temperature portion or decelerated in a state close to the above state. The electromagnetic waves are not emitted for as afterwards or greatly reduced to wait until a temperature of the low-temperature portion TLow is raised to an extent. The heating output is increased again after t11.

The heated portion is the low-temperature portion by the emission port 17 and the turntable 1 in this case, and TLow rises faster to catch up with THI. The heating is stopped at t12 when THI≈TLow≈Tref. Due to the effects in this way of heating that the temperature is averaged in the wait time ts and the heating distribution is switched, the food is defrosted considerably well without generating a distribution irregularity.

FIG. 35 is a characteristic diagram explanatory of how to determine ts or t11 and t12 in FIG. 34, an axis of abscissa indicating the weight m and axis of ordinate showing the time t. In FIG. 35, ts, t11 and t12 are determined as a function of the weight m of the food 6 detected by the weight sensor 23. It is needless to say, however, that the factors ts, t11 and t12 may be determined by correcting with the output of the temperature sensor 26, which more accurately uniforms the heating.

FIG. 36 is a characteristic diagram of a change of the heating output of the magnetron 2 when defrosting the frozen food 6 in FIGS. 34 and 35, wherein an axis of abscissa represents the time t and an axis of ordinate indicates the output P. The heating is carried out continuously with a high output for t10 during the initial stage, then the output is suspended for ts. Finally the output is decreased until t12 while the heating is switched to intermittent heating to lower the average output.

In the embodiment, the rotary waveguide 8 is driven when the heating by the electromagnetic waves is stopped or greatly reduced. In comparison with the case where the electromagnetic waves are stirred by the stirrer or rotary waveguide always in the constant rotation as in the prior art, the embodiment is effective to restrict the unnecessary radiation or temperature rise of the magnetron 2.

Further, when the emission of the electromagnetic waves from the magnetron 2 is instable, for instance, immediately after the magnetron 2 is turner ON or while the rotary waveguide 8 is being switched, outputs of various sensors are adapted not to be taken in so as to avoid the influences by high frequency noises. More accurate control can hence be expected.

The locally heated portion is controllable in accordance with operations in the control means 19 based on the input set by the user or outputs cal various sensors.

For example, the switching timing for the local heated portion may be determined by the maximum temperature for every menu, a difference between the maximum and minimum temperatures or respective change rates of the temperatures to a time, etc.

Meanwhile, a greater amount of thought should be taken into account when a plurality of foods 6 are to be cooked simultaneously.

If a food to be heated and a food not to be heated such as fresh vegetables mingle, only the food to be heated should be subjected to local heating.

For such local heating as above, which zone is to be heated may be set by determining where to place the food. Alternatively, if the apparatus has a sensor to detect the nature of the food or how to cook the food, the heating zone can be automatically decided.

Figure 37:
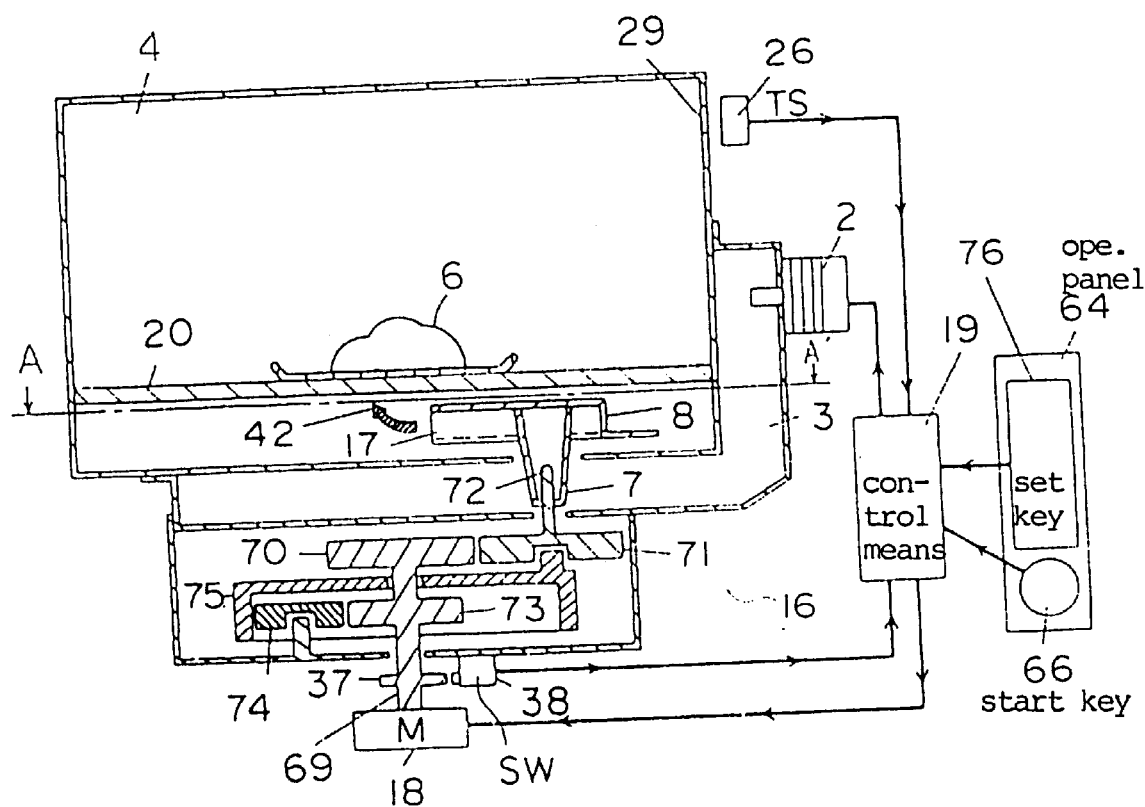
FIG. 37 is a view showing the constitution of a high frequency heating apparatus according to a ninth embodiment of the present invention.
Figure 38:
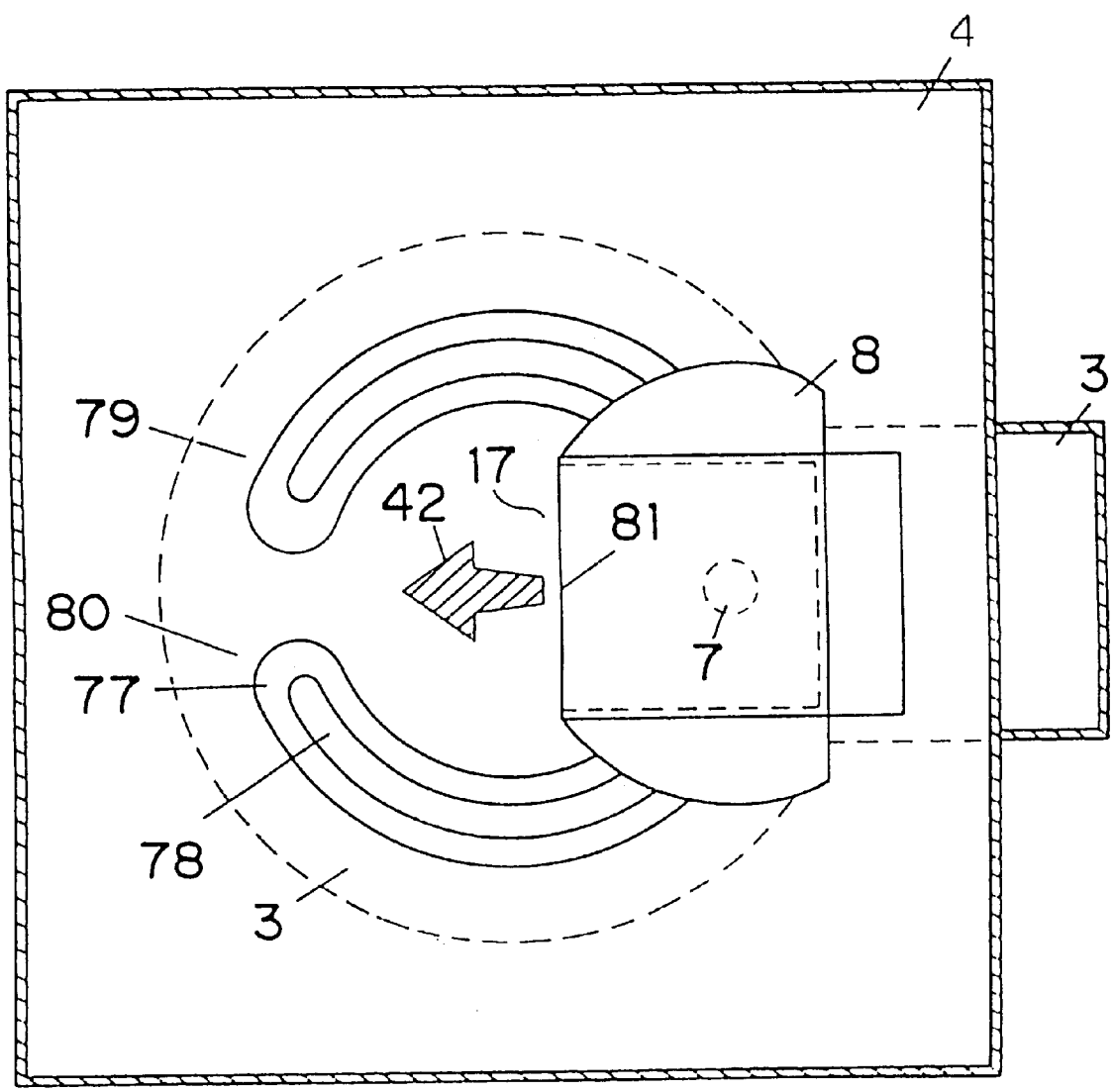
FIG. 38 is a sectional view taken along the line A–A' in FIG. 37.
Figure 39:
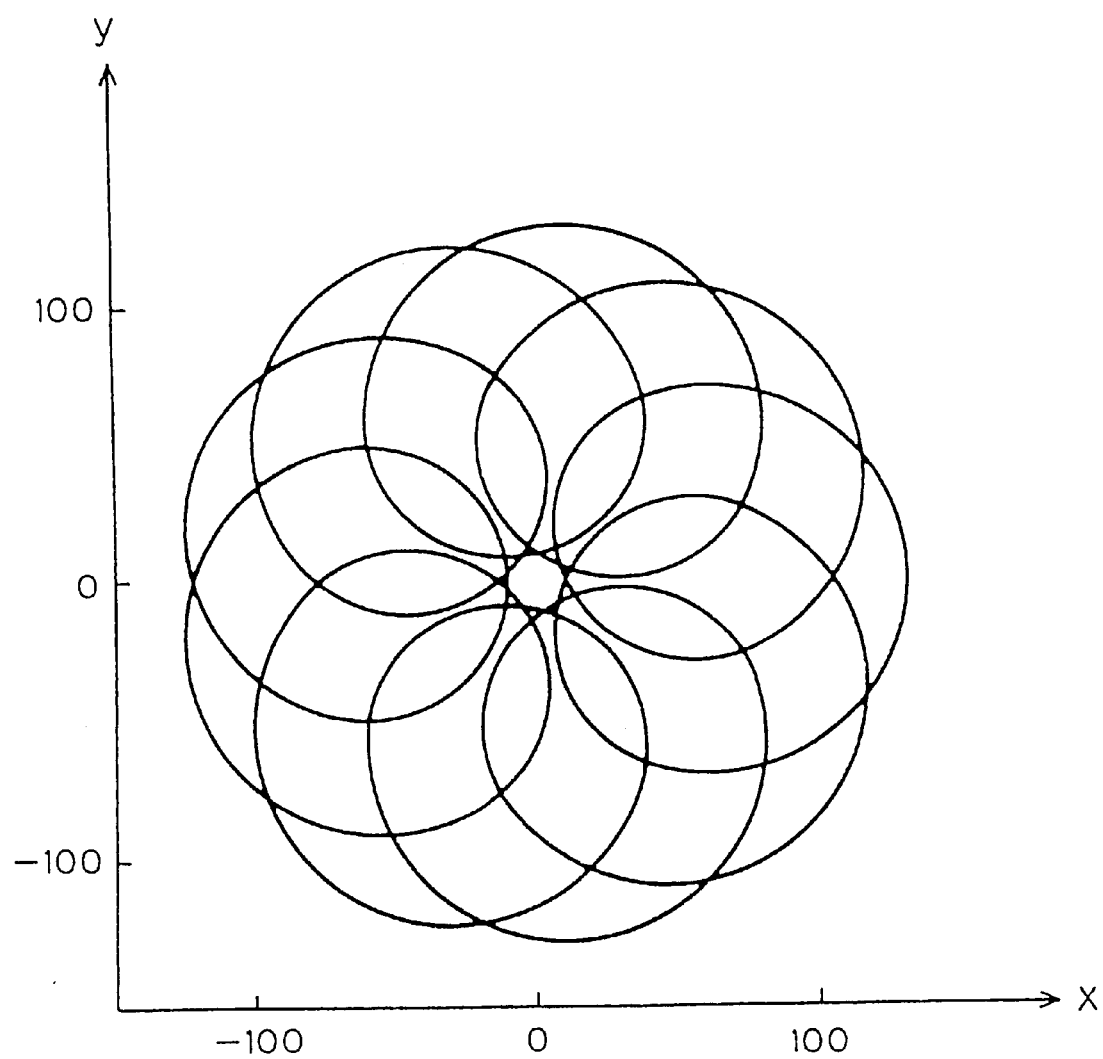
FIG. 39 is a characteristic diagram showing a change in direction of electromagnetic waves subsequent to the operation of a rotary waveguide in FIG. 38.

FIGS. 37–39 relate to a 9th embodiment of the present invention. The apparatus of the 9th embodiment has no turntable, but has a fixed stage 20 and controls the rotary waveguide 8 in two dimensions.

The rotary waveguide 8 is driven by the motor 18 to revolve on its axis as well as around an axis of the apparatus. Specifically, a gear 70 interlocking with a first rotary shaft 69 of the motor 18 applies a rotational force to a gear 71 with a gear ratio of 1:1, whereby a second rotary shaft 72 is rotated, thus letting the rotary waveguide 8 rotate at the same rotating speed as the motor 18. A gear 73 rotating interlockingly with the first rotary shaft 69 impresses the rotational force to a gear 75 via a gear 74 with a gear ratio of 1:10, so that the second rotary shaft 72 itself rotates around the first rotary shaft 69 to revolve the rotary waveguide 8 around the axis of the apparatus at 1/10 the rotating speed of the motor 18. Accordingly, the rotary waveguide 8 rotates 10 times on its own axis in one revolution around the axis of the apparatus.

The cam 37 rotating interlockingly with the first rotary shaft 69 is adapted to depress the switch 38 once in one cycle so as to change the direction of electromagnetic waves 42 to control the heated portion. The pressed number of times of the switch 38 or the driving time after the switch 38 is depressed determines the position of the emission port 17 thereby to control the emission direction of electromagnetic waves. If a stepping motor is used as the motor 18, the emission direction is more correctly position-controlled by the number of driving pulses after the switch 38 is depressed. In this case, the direction ol electromagnetic waves is set or detected by the cam 37 and switch 38.

The operation panel 64 is equipped with a first operation key 76 for setting the kind of the food 6, size of the heating output, heating time, heating manner, etc. and a second operation key, namely, start key 66 for starting heating.

The control means 19 drives the motor 18 in response to an input through the first operation key 76 thereby to control the rotary waveguide 8 at a proper position based on an output of the switch 38. When the start key 66 is manipulated, the electromagnetic waves are emitted from the magnetron 2. As the heating proceeds, the control means 19 drives the motor 18 if necessary on that basis of the input contents through the first operation key 76 or data of the heating distribution of the food 6 from the temperature sensor 26 to control the emission direction of electromagnetic waves from the emission port 17 or change the output of the magnetron 2 so as to eliminate heating irregularities.

In the embodiment, the stage 20 on which the food 6 is loaded works also as a protection covering the rotary waveguide 8, and therefore the stage 20 is a partition plate formed of a dielectric material of a low dielectric loss which is hard to absorb electromagnetic waves.

FIG. 38 is a sectional view taken along the line A—A' in FIG. 37. A notch 77 where the coupling part 7 of the rotary waveguide 8 can move is formal on the bottom face of the heating chamber 4 and a notch 78 where the second rotary shaft 72 can move is formed on the bottom face of the waveguide 3. The motor 18 reverses at either end face 79, 80 of the notches. A reversing timing is set by a stopper or the pressing number of times of the switch 38.

FIG. 39 is a characteristic diagram of a direction change of electromagnetic waves 42 by the rotary waveguide 8 of FIG. 38. The diagram is obtained by converting the direction change to a movement of a point 81 of the emission port 17. The bottom face of the heating chamber 4 is represented by xy coordinates. (0, 0) in the xy coordinates is the center of the bottom face of the heating chamber 4. By way of example, supposing that a distance between the first and second rotary shafts 69 and 72, i.e., a radius of the revolution of the rotary waveguide 8 around the shaft 69 is 70 mm, a distance from the center of the second rotary shaft 72 to the point 81, that is, a radius of the rotation of the motor around the shaft 72 is 60 mm, and a rotation cycle is 1/10 a revolution cycle, coordinates of the point 81 are expressed by expressions (2) and (3), and the point 81 assumes a spiral movement (cycloid) as in FIG. 39:

$$x = 70 \cos \theta + 60 \cos(10\theta) \quad (2)$$

$$y = 70 \sin \theta + 60 \sin(10\theta) \quad (3)$$

wherein θ is an angle of the revolution. While the motor 18 is constituted to reverse when it reaches either of the end faces 79 and 80 as mentioned earlier, this is neglected in FIG. 39.

Figure 40:
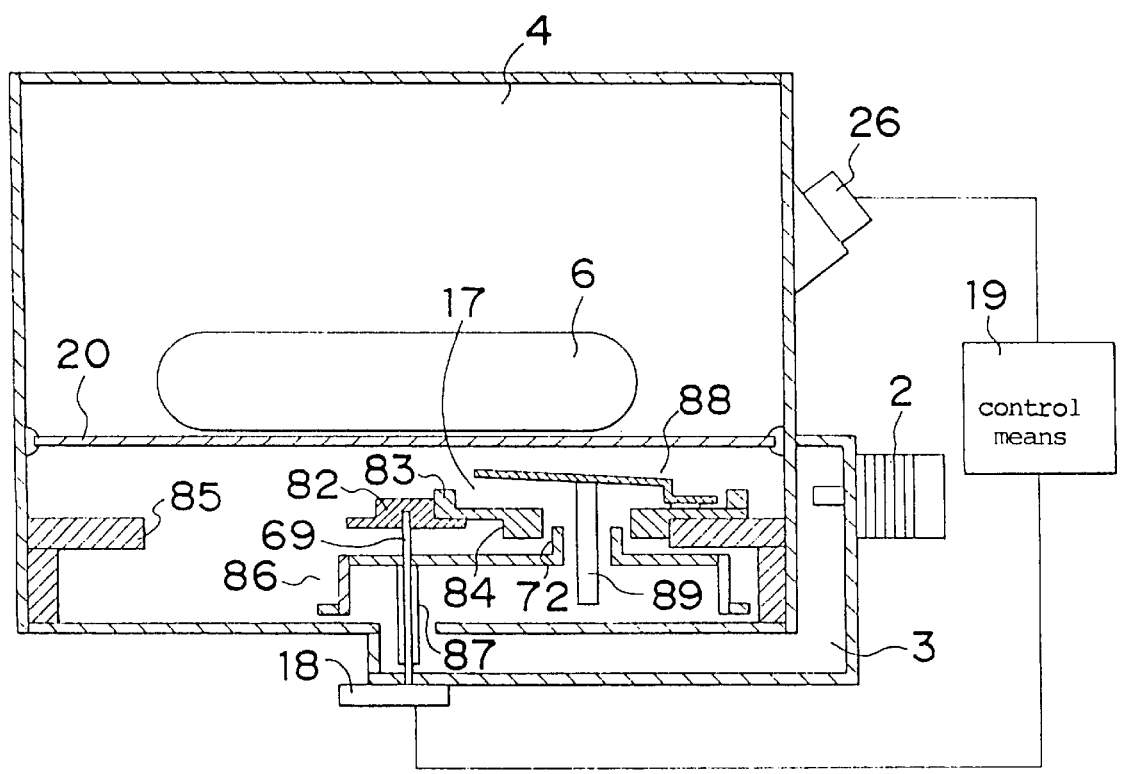
FIG. 40 is a view of the configuration of a high frequency heating apparatus according to a tenth embodiment of the present invention.
Figure 41:
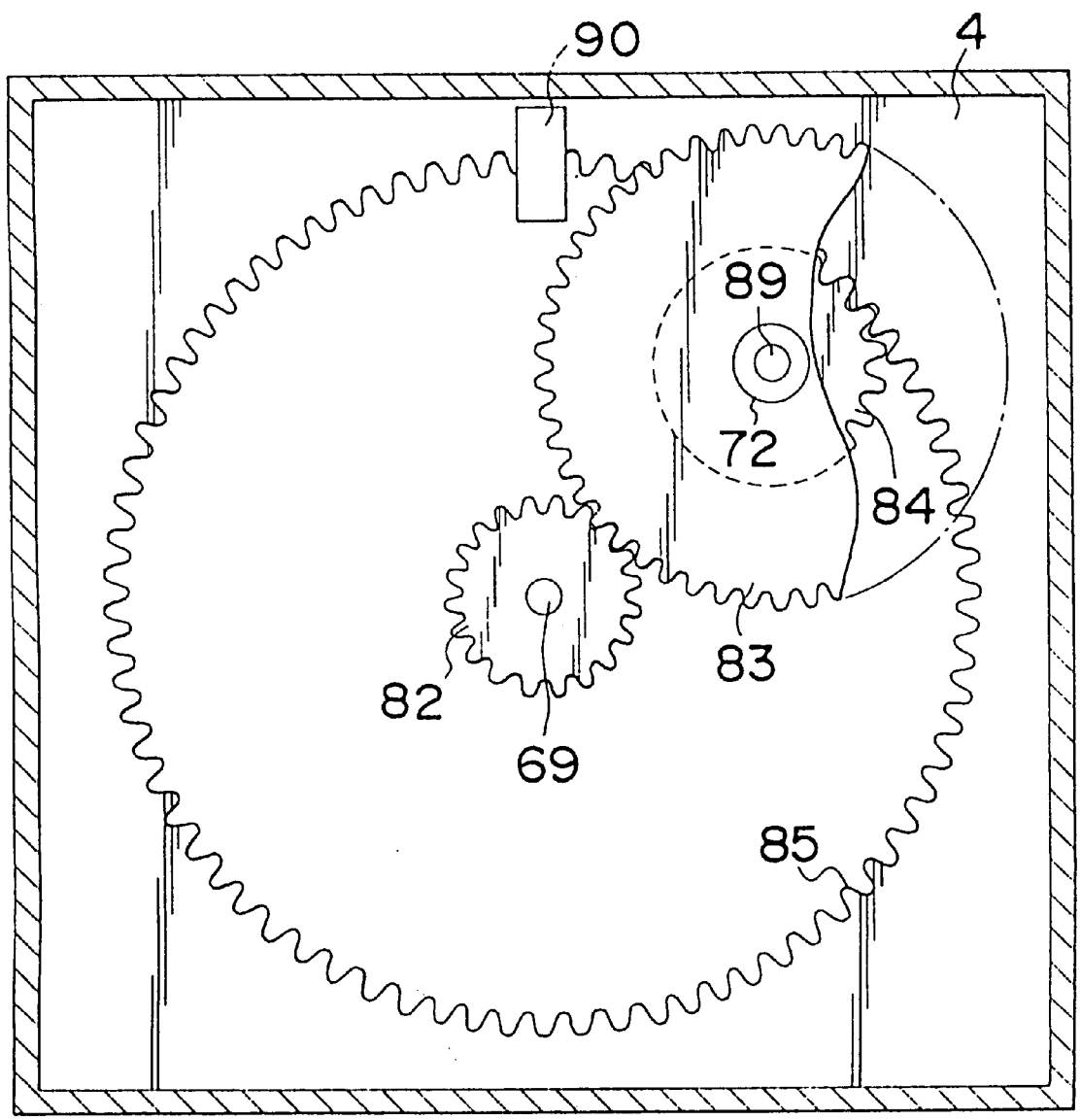
FIG. 41 is a horizontal sectional view of a lower part of a heating chamber of the high frequency heating apparatus of FIG. 40.
Figure 42:
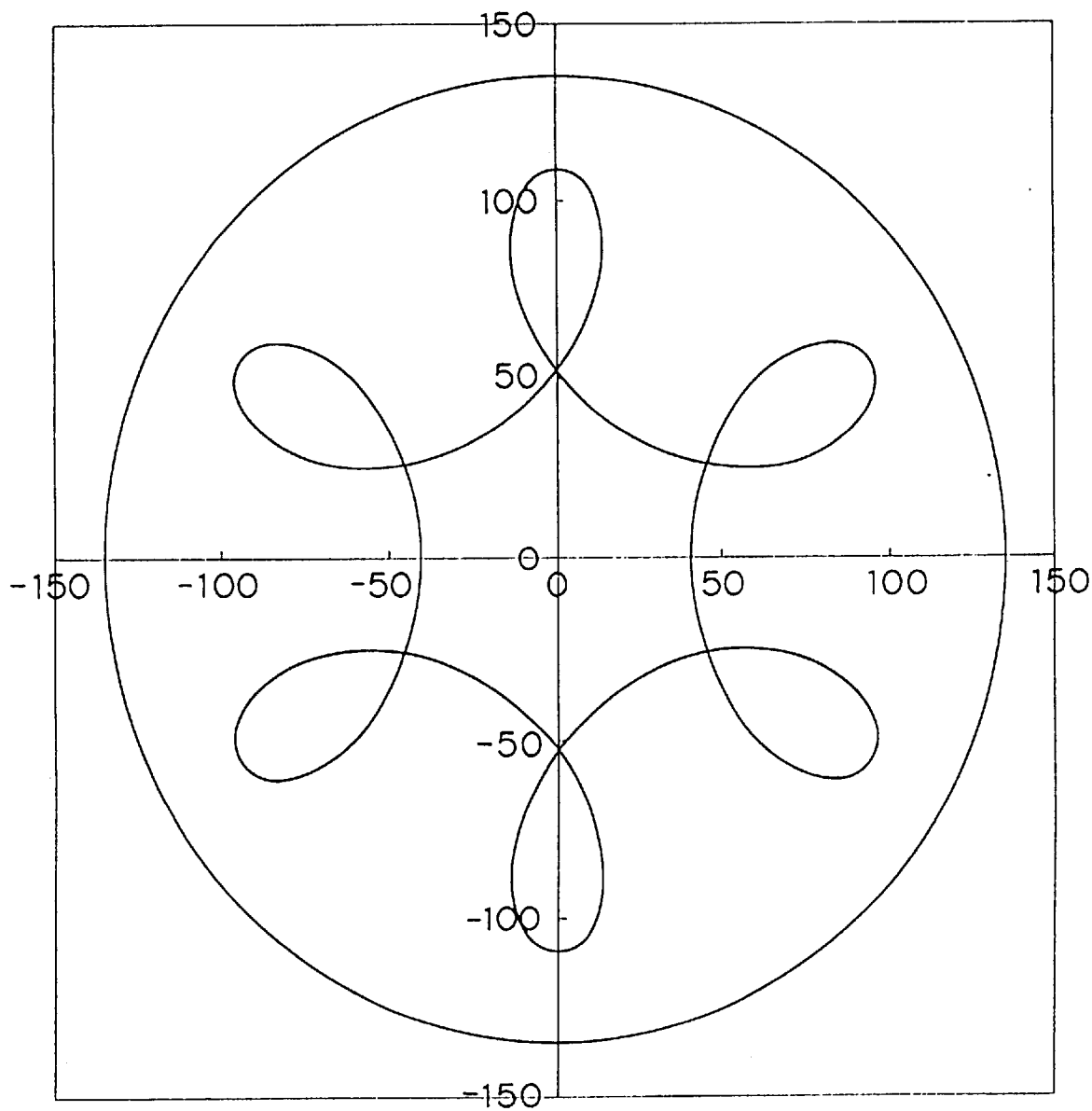
FIG. 42 is a characteristic diagram of a change in direction of electromagnetic waves subsequent to the operation of a rotary waveguide in the constitution of FIGS. 40 and 41.

FIGS. 40–42 show a 10th embodiment of the present invention as an improvement of the 9th embodiment.

The rotary waveguide is constructed in two stages according to the 10th embodiment. A rotating ratio of the two stages of the rotary waveguide is set by a gear ratio of gears when the rotary waveguides rotate and revolve.

The structure of the apparatus will be depicted with reference to FIG. 40 and FIG. 41 which shows an essential part of FIG. 40.

A gear 82 is rotated interlockingly with the first rotary shaft by the motor 18, and a gear 83 is rotated (around its own axis) by the gear 82. A gear 84 is integral with the gear 83, and therefore operates the same as the gear 83. When the gears 84 and 83 rotate together around the second rotary shaft 72, the gears 84, 83 and the second rotary shaft 72 are revolved around the gear 82 by the gear 85.

A coupling part 87 of a first rotary waveguide 86 is provided in the periphery of the first rotary shaft 69, with a coupling part 89 of a second rotary waveguide 88 set inside the second rotary shaft 72. Therefore, the electromagnetic waves emitted from the magnetron 2 are transmitted sequentially from the waveguide 3, coupling part 87, first rotary waveguide 86, coupling part 89 to the second rotary waveguide 88. The embodiment has a merit that distance between the magnetron 2 and coupling part 87 and between the coupling part 87 and coupling part 89 are kept constant at all times, independently of the rotation of the rotary waveguides.

As a result, the electromagnetic waves run a constant distance, which facilitates the matching and enhances the heating efficiency.

For positioning of the rotary waveguides in the embodiment, E stopper 90 is employed. A reference position is determined by butting the gear 84 to the stopper 90.

When a stepping motor is used, it is a simple way to drive the motor to a target position if the motor is started again after sent to the reference position.

In other words, a sufficiently larger number of pulses are input to drive the motor to the reference position, and thereafter a required number of pulses should be input.

When the rotation cycle is set to be ⅙ the revolution cycle by the gear ratios, the rotary waveguides draw a locus as shown in FIG. 42.

Figure 43:
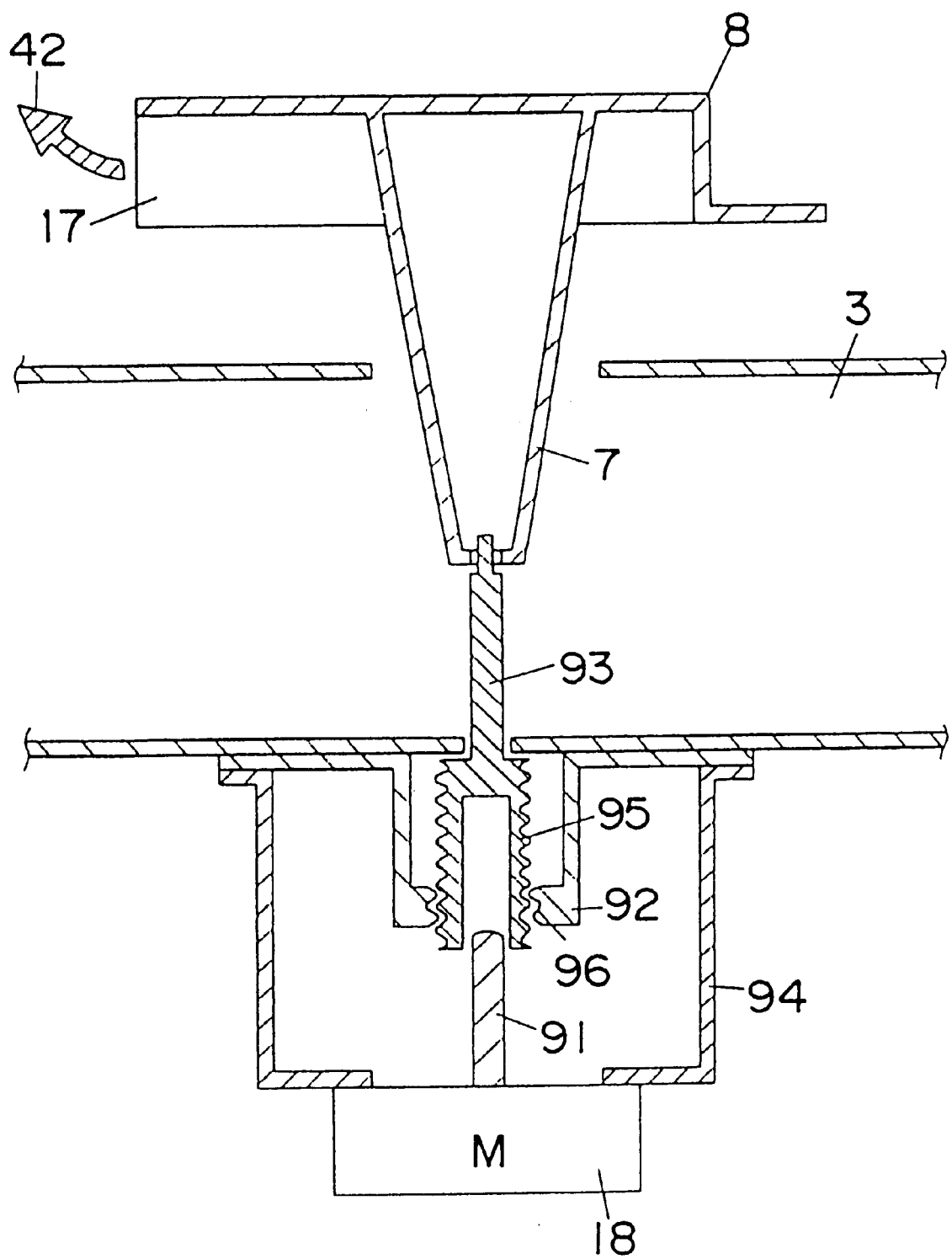
FIG. 43 is a longitudinal sectional view of an essential part of a high frequency heating apparatus according to an eleventh embodiment of the present invention, indicating a state where a rotary waveguide is moved up.
Figure 44:
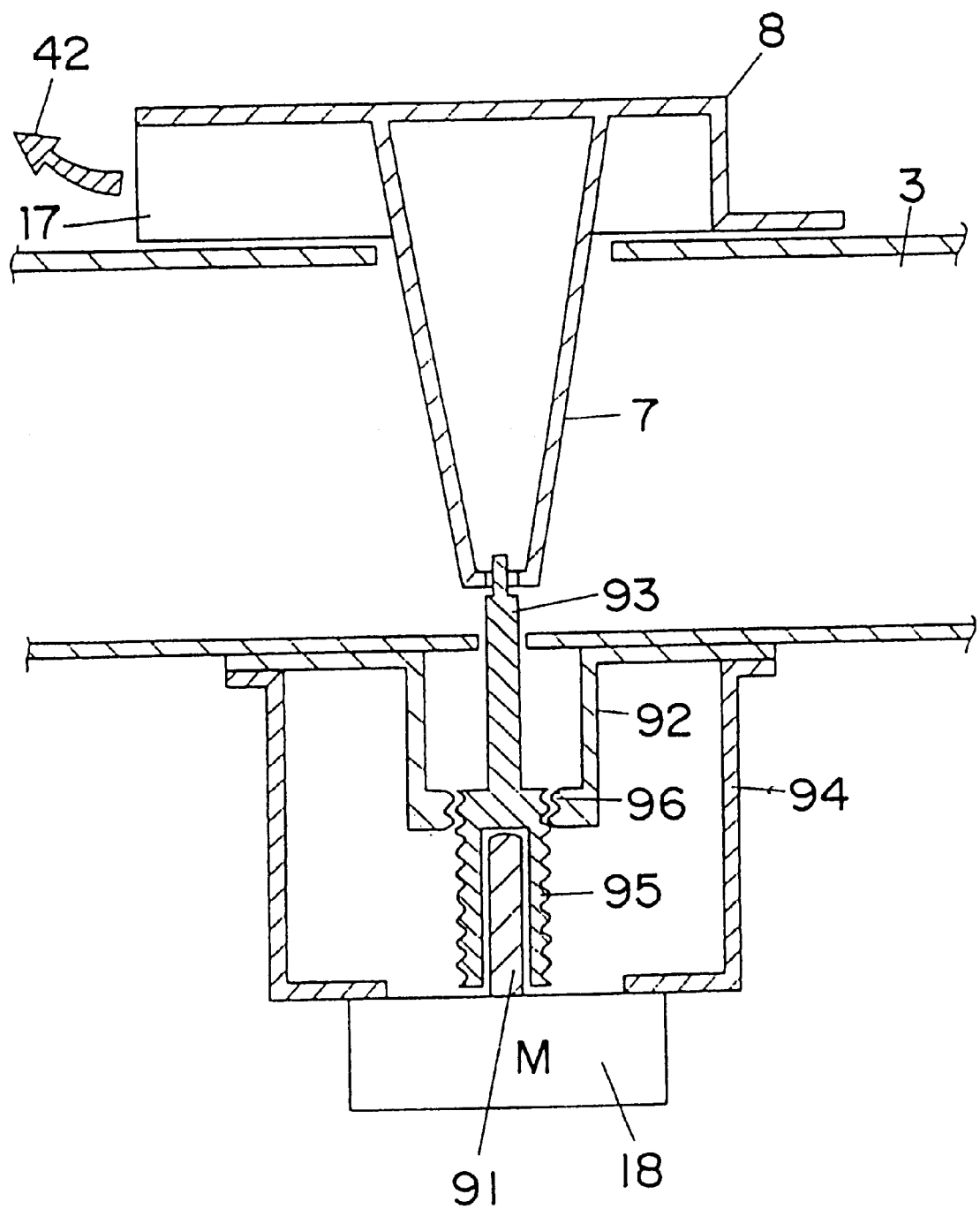
FIG. 44 shows a state where the rotary waveguide ol

FIGS. 43 and 44 are sectional views of an essential part of a high frequency heating apparatus according to an 11th embodiment of the present invention. The apparatus includes, as a driving part, the motor 18 with a rotary shaft 91 below the waveguide 3, a holding part 92, a driving shaft 93 and a fixing member 94. When the rotary shaft 91 of a rectangular cross section rotates, the driving shaft 93 having a rectangular opening fitted in a movable fashion in I vertical direction into the rotary shaft 91 rotates. Since there is a male screw 95 outside the driving shaft 93 and a female screw 96 inside the holding part 92, the driving shaft 93 moves up or down depending on the rotating direction of the motor 18. Therefore, the direction of the electromagnetic waves 42 from the emission port 17 of the rotary waveguide 8 can be controlled not only in a circumferential direction of the motor 18 by the rotation of the motor, but in the vertical direction by the movement of the driving shaft 93. FIG. 43 shows a state in which the driving shaft 93 is raised and FIG. 44 shows a descended state.

A combination of the rotational and vertical movements of the rotary waveguide 8 is utilized in the above 11th embodiment. The rotary waveguide 8 can be naturally controlled in two-dimensions or three-dimensions in other manners, e.g., by a combination of the operation of the turntable 1 and the spiral movement of the rotary waveguide discussed earlier.

Figure 45:
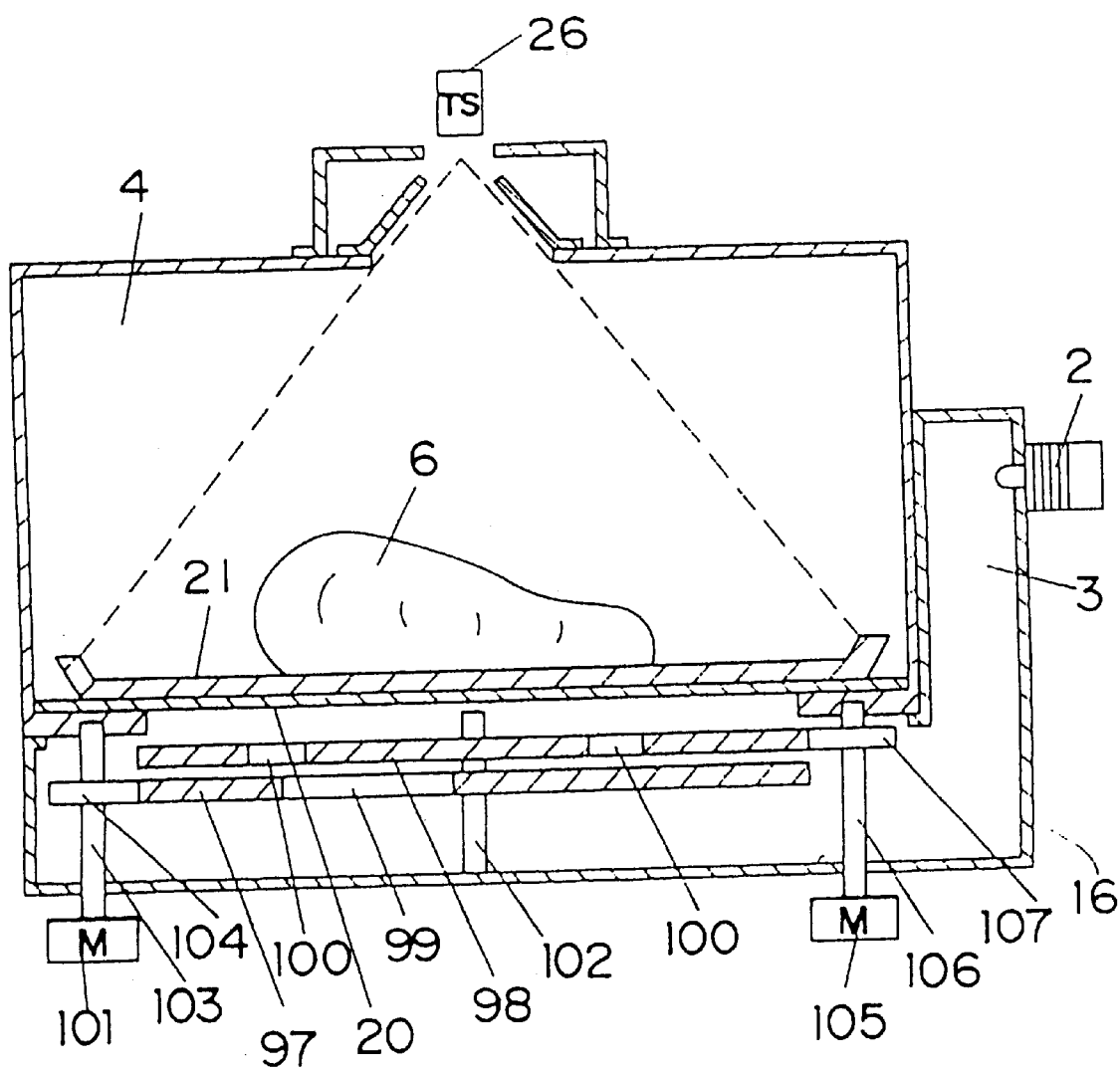
FIG. 45 is a view showing the constitution of a high frequency heating apparatus according to a twelfth embodiment of the present invention.

A 12th embodiment of the present invention will now be described with reference to FIGS. 45 and 46. FIG. 45 is a sectional view indicating the constitution of a high frequency heating apparatus of the embodiment and FIG. 46 is an enlarged view of an essential part of the apparatus.

According to the 12th embodiment, an opening position variation means is provided as the local heating means, and a turntable is not used. In FIG. 45, the electromagnetic waves from the magnetron 2 heat via the waveguide 3 the food 6 on the saucer 21 set inside the heating chamber 4. A position of an opening part connecting the waveguide 3 with the heating chamber 4 to guide the electromagnetic waves is determined by a first shielding plate 97 and a second shielding plate 98. That is, a combination of a notched part 99 in the first shielding plate 97 and a notched part 100 in the second shielding plate 98 determines the position of the opening part.

The first shielding plate 97 is rotated around a shaft 102 by the rotation of a first stepping motor 101 which is the opening position variation means. The first stepping motor 101 rotates a first rotary shaft 103, whereby a first gear 104 of the first rotary shaft 103 is rotated. A gear formed in the periphery of the first shielding plate 97 is rotated along with the rotation of the first gear 104. A second stepping motor 105 rotates a second rotary shaft 106, and consequently a second gear 107 of the second rotary shaft 106 is rotated. A gear in the periphery of the second shielding plate 98 is also rotated in accordance with the rotation of the second gear 107.

Figure 46A:
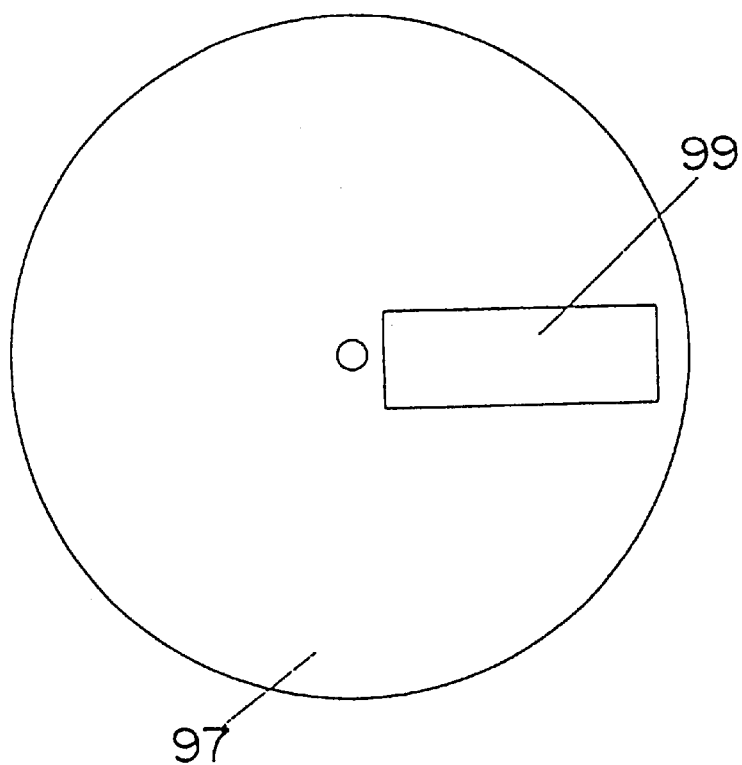
FIG. 46 shows two shielding plates set in the high frequency heating apparatus of FIG. 45, (a) being a top plan view of a first shielding plate and (b) being a top plan view of a second shielding plate.
Figure 46B:
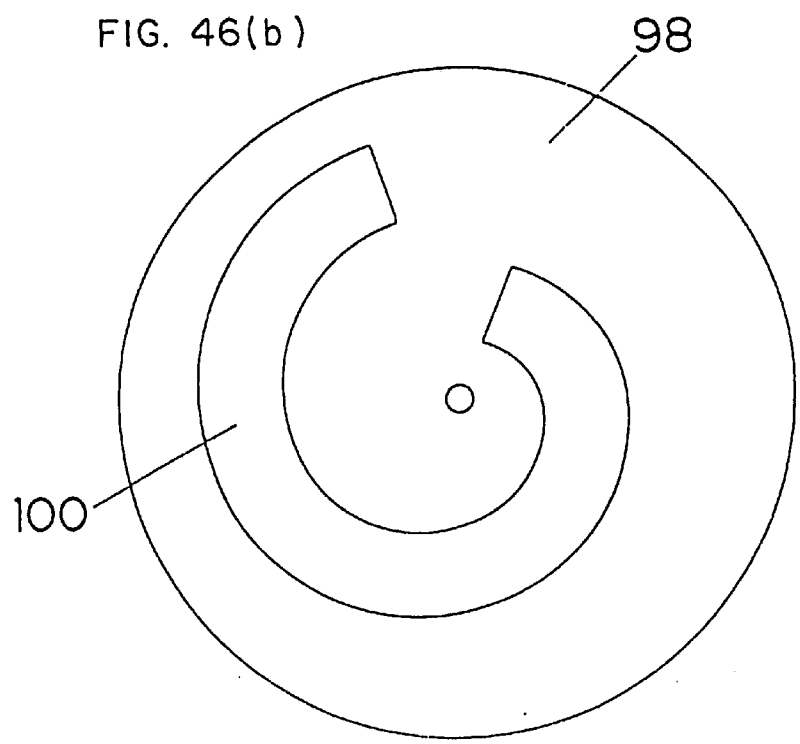

FIG. 46 is an enlarged view of the shielding plate, specifically, FIG. 46(*a*) showing the first shielding plate 97 and FIG. 46(*b*) the second shielding plate 98. Both of the shielding plates are circular as is clear from FIG. 46. The notched part 99 is formed in a radial direction of the first shielding plate 97, and the notched part 100 is spiral running from the center to the periphery of the second shielding plate 98. The two shielding plates are arranged tip and down, so that the opening part can be formed at an optional position within the circle of the shielding plates. In other words, an optional position in the whole area within the heating chamber 4 can be utilized as the opening part through which the electromagnetic waves are emitted for local heating. Moreover, if the shielding plates 97 and 98 are rotated with different cycles, the opening part is sequentially changed in position in the heating chamber 4, so that the whole area can be heated uniformly.

The control means 19 drives the shielding plates 97, 98 with different cycles at the initial stage when the heating is started, i.e., uniform heating is carried out. The control means 19 extracts the low-temperature portion of the food 6 based on the temperature distribution detected by the temperature sensor 26, thereby controlling angles of the two shielding plates 97, 98 to position the opening part below the low-temperature portion. The uniform heating for the whole food 6 without the low-temperature portion is realized by repeating the above control.

Although two motors are employed to drive the two shielding plates in the above embodiment, it is possible to change gear ratios by one motor, which is effective to improve the reliability with the driving parts reduced. Besides, the shielding plates may be driven linearly, not rotated, or many opening parts may be formed and equipped with shielding plates respectively.

In the foregoing first through 12th embodiments, the emission port or opening which is the position through which the electromagnetic waves are emitted by the local heating means is set at the bottom face of the heating chamber 4. This is because it is effective to emit and concentrate the electromagnetic waves as closely as possible to a portion of the food in order to locally heat the portion. However, the position of the emission port or opening is not limited to the bottom face according to the present invention and, the emission port or opening may be formed at a top face or side face. In the case where the opening is formed at the top face, either the food or the top face is moved in a vertical direction, so that the food and top face are close to each other to exert more effective control of heating. More concentrated local heating is accomplished in this way because of the absence of a saucer or stage between the opening and the food. If the opening is formed at the side face, the food is moved toward a side face at the side of the rotary waveguide or the side face is moved towards the food, so that the food and the side face at the side of the rotary waveguide are close to each other, making it possible to control in a vertical direction and locally heat the high food. Alternatively, emission ports or openings may be provided at two or more of the bottom and side faces of the heating chamber to variably control the heating distribution. This control is useful for large-size food.

Eventually, for local heating, the emission port or opening should be driven while in a state close to the food.

In the first through 12th embodiments, if the temperature distribution detection means is constituted of one infrared detection element thereby to detect the two-dimensional temperature distribution, the detection means is inexpensive and the output of the infrared detection element can be simply adjusted. However, driving the one infrared detection element does not limit the present invention. For example, a plurality of infrared detection elements may be arranged in two dimensions to detect the temperature distribution, which effectively improves the reliability because of the elimination of driving parts and realizes instantaneous detection of the temperature distribution. Moreover, a plurality of infrared detection elements may be linearly arranged thereby to detect a linear temperature distribution which is in turn combined with the rotation of the turntable thereby to detect a two-dimensional temperature distribution. In a different way, a plurality of the infrared detection elements disposed linearly may be shaken to detect the two-dimensional temperature distribution. The same effect is obtained in any method.

Although one waveguide runs from the magnetron to the emission part, the waveguide may be diverged in many directions and each is provided with the emission part. More delicately controlled local heating is realized by switching the emission parts.

A coaxial line may be employed instead of the waveguide.

Further, a semiconductor oscillation device may be used instead of the magnetron.

Figure 47:
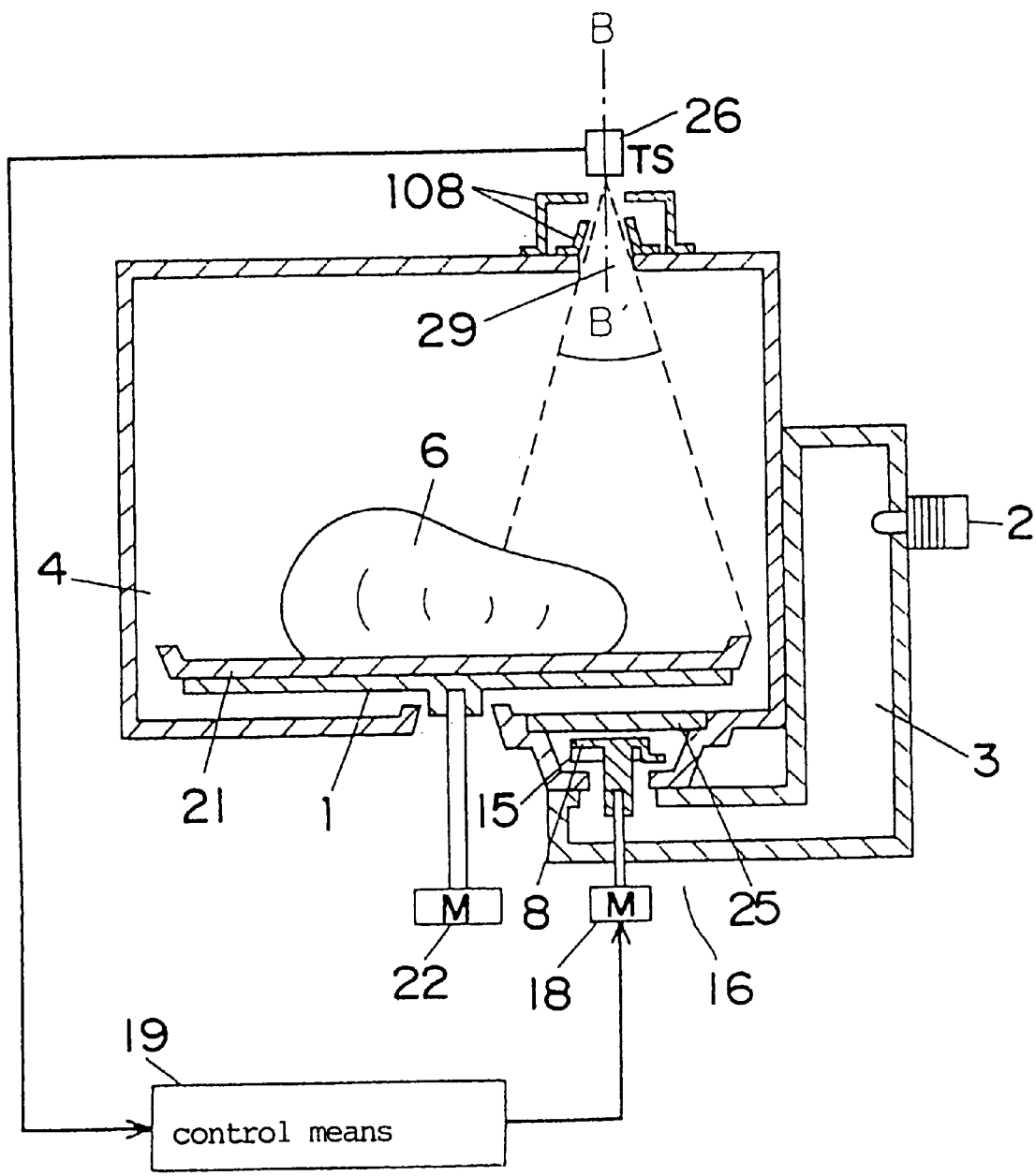
FIG. 47 is a view showing the constitution of a high frequency heating apparatus according to a thirteenth embodiment of the present invention.
Figure 48:
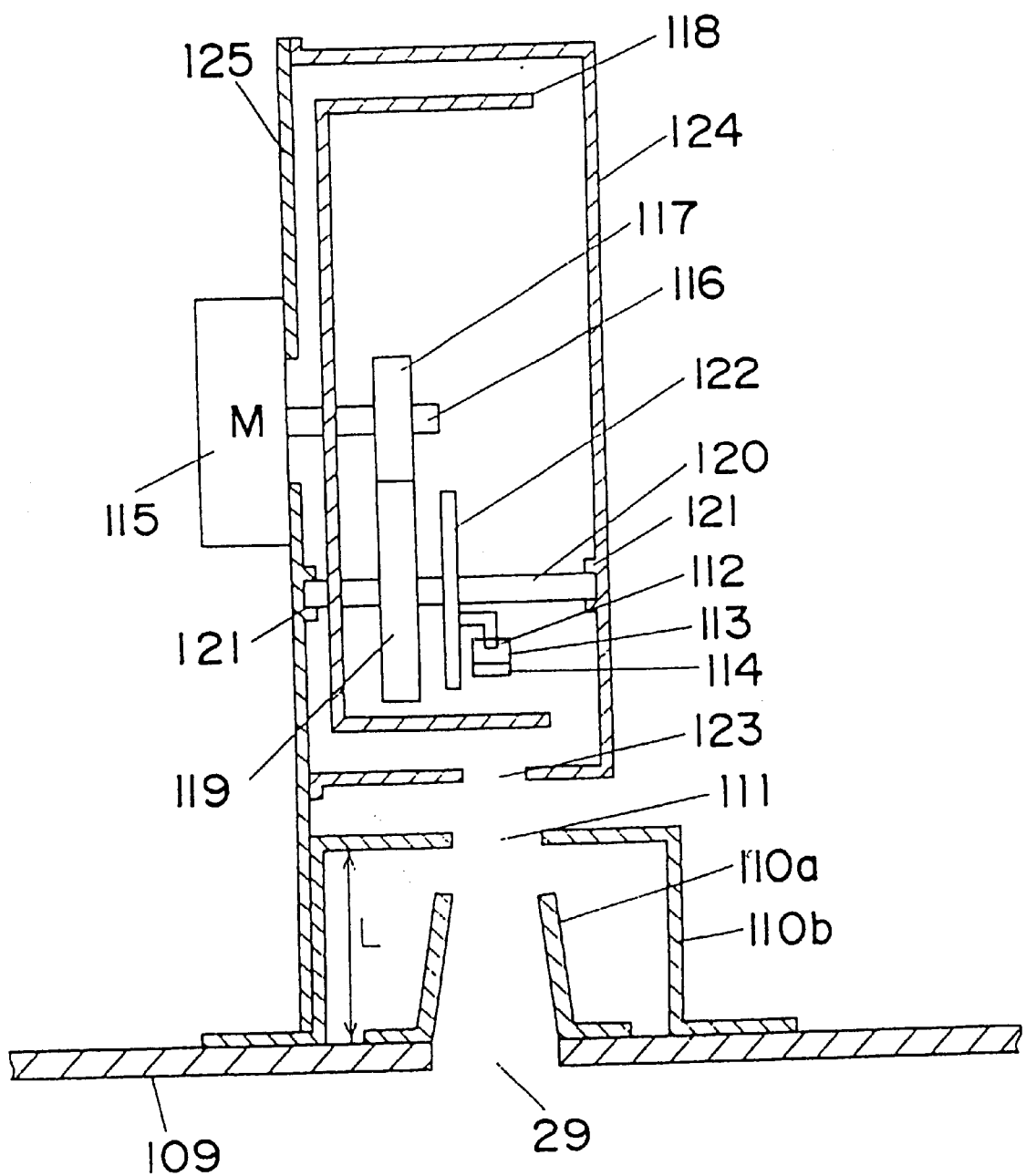
FIG. 48 is a sectional view taken along the line B—B' in FIG. 47.
Figure 49:
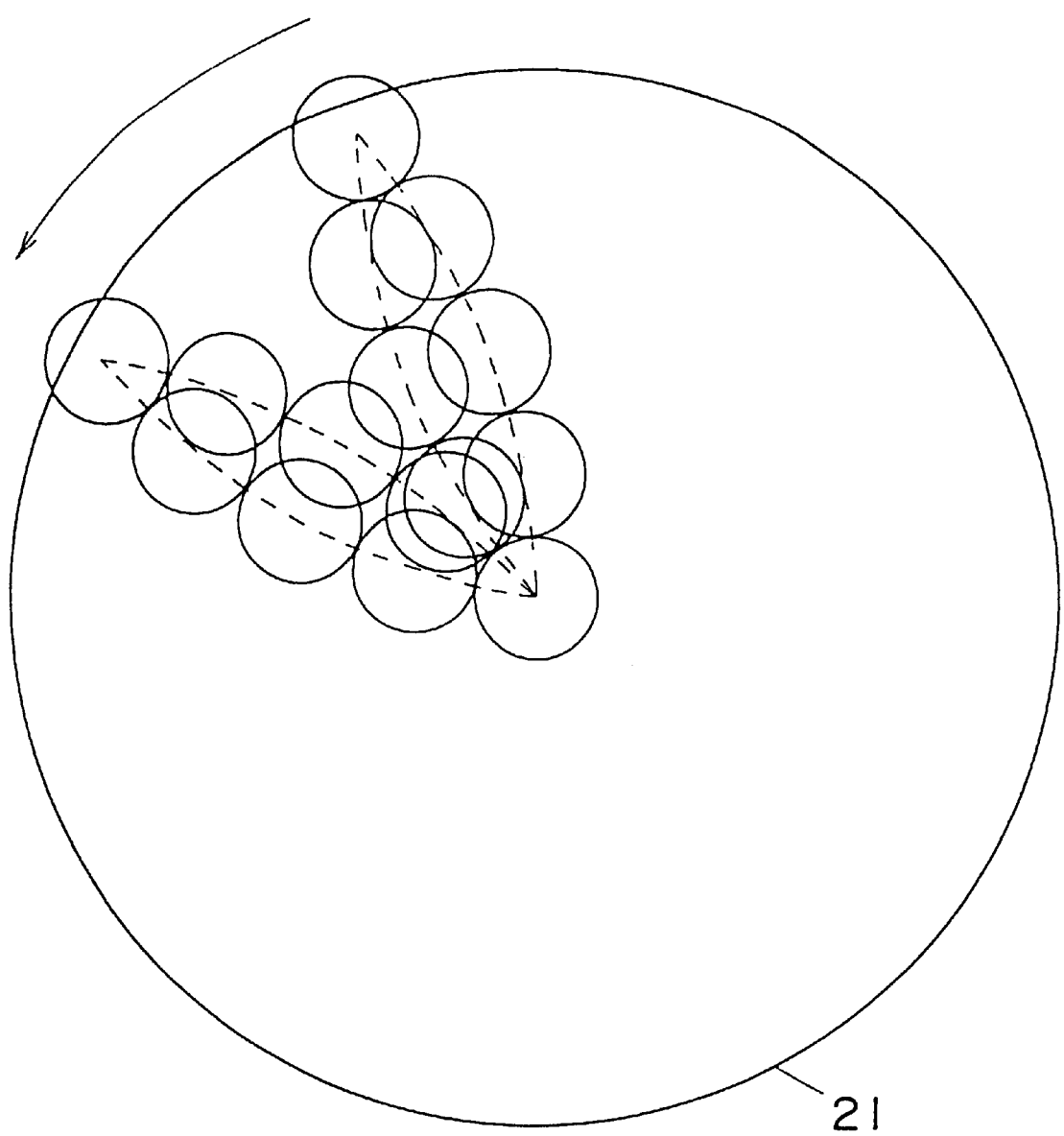
FIG. 49 is a diagram showing detection positions of an infrared detection element set in the high frequency heating apparatus of FIG. 47.
Figure 50:
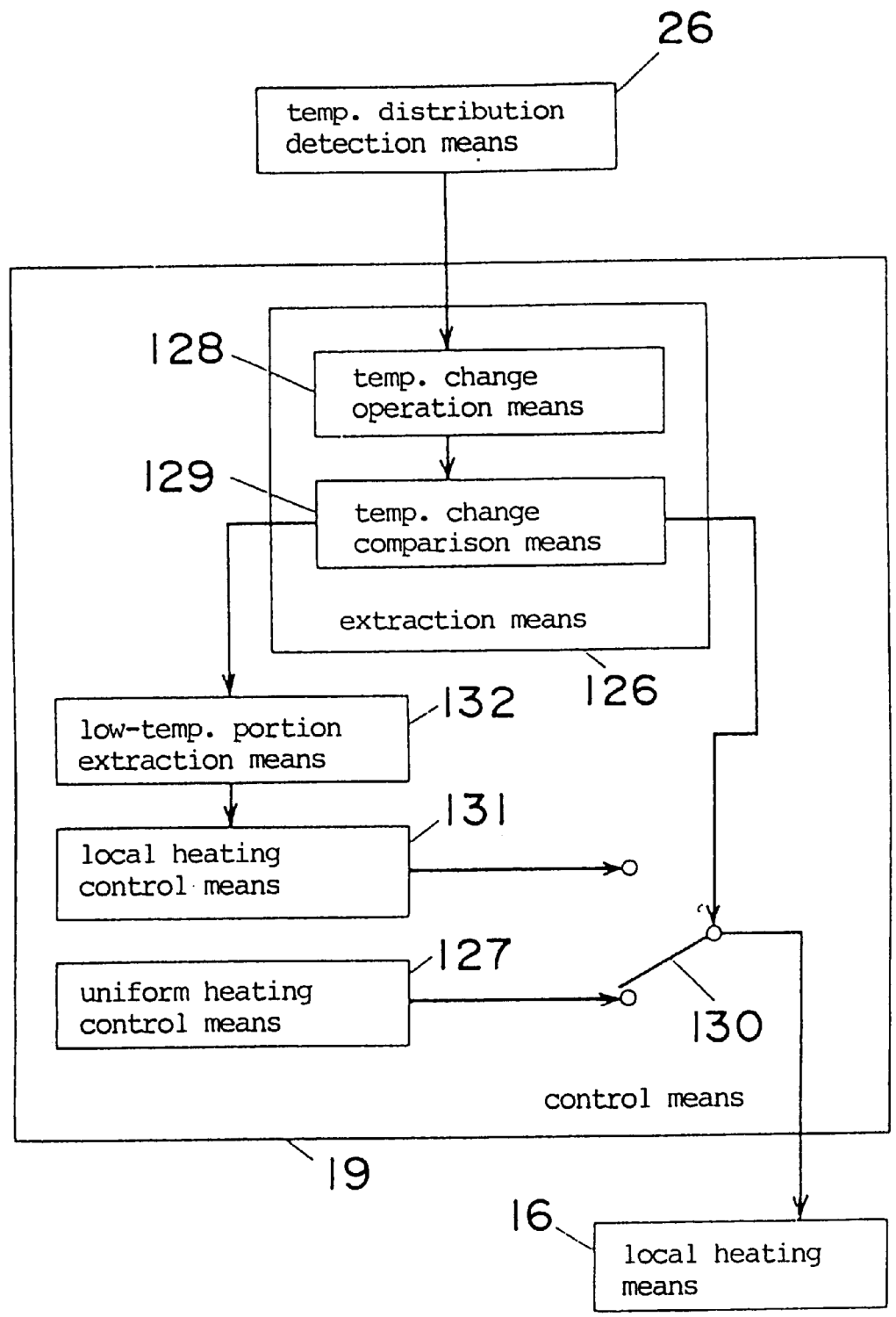
FIG. 50 is a block diagram of the high frequency heating apparatus of FIG. 47.
Figure 51:
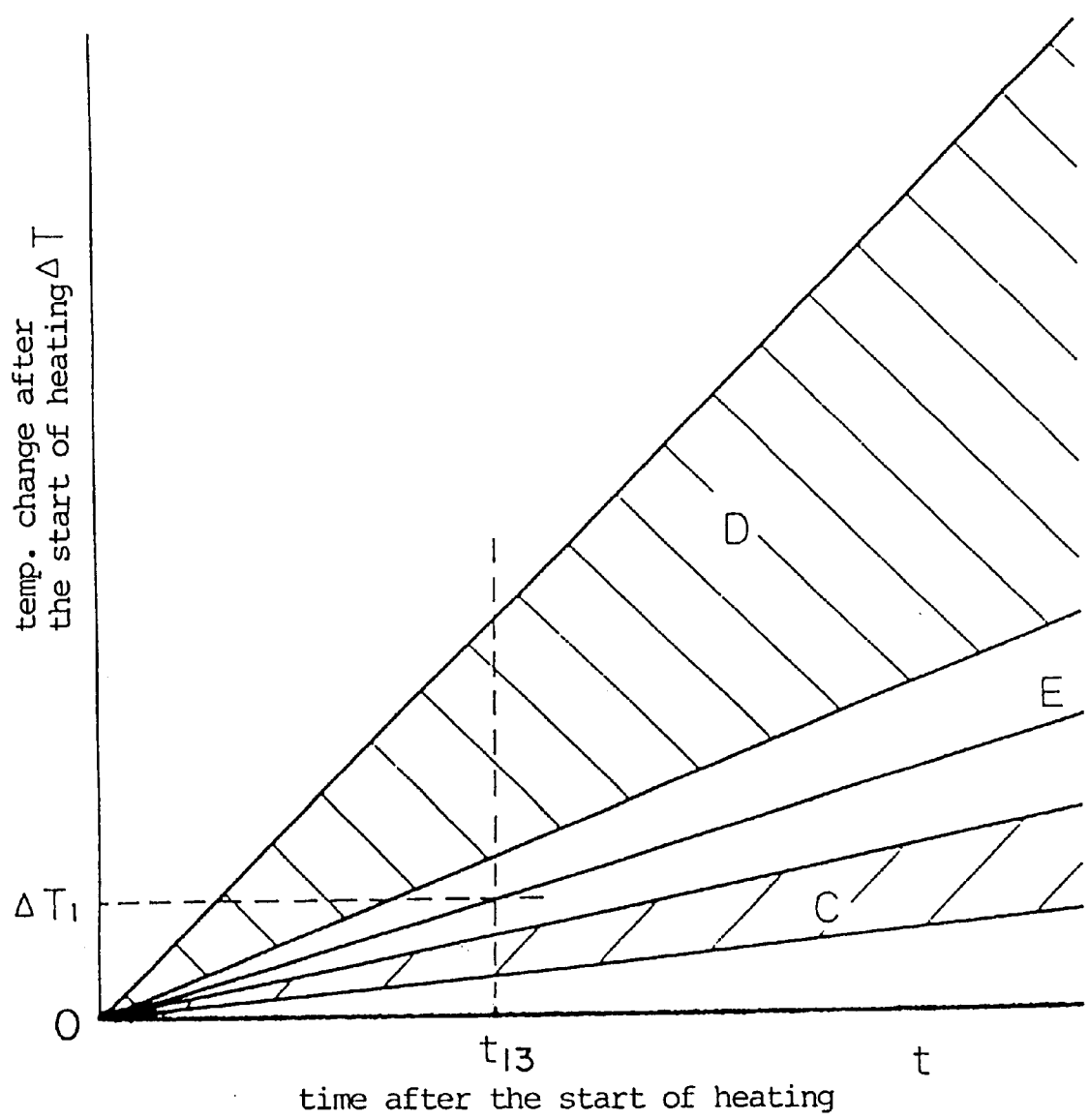
FIG. 51 is a characteristic diagram of a surface temperature change of food and a temperature change of parts other than the food in the high frequency heating apparatus of FIG. 47.

A 13th embodiment of the present invention will be discussed with reference to FIGS. 47–51. FIG. 47 is a sectional view showing the constitution of a high frequency heating apparatus in the 13th embodiment. FIG. 48 is a view particularly showing a detection characteristic of a physical amount detection means in the embodiment, and FIG. 49 is a sectional view of an essential part of the physical amount detection means. FIG. 50 is a block diagram explanatory of a controlling operation in the embodiment. FIG. 51 is a diagram of a temperature change characteristic in the embodiment.

The turntable 1 is rotated with a constant cycle by the motor 22 as a rotating means. A rotational center of the motor 22 is approximately at the center of the bottom face of the heating chamber 4, while a rotational center of the motor 18 is shifted from the center of the bottom face of the heating chamber 4, i.e., approximately in the middle of the center and a peripheral edge of the bottom face of the heating chamber. Because of this positional relationship, the heated portion of the food in the radial direction of the turntable 1 can be changed by the rotary waveguide 8. That is, an optional position on the saucer 21 can be heated in association with the rotation of the turntable 1.

The temperature sensor 26 is provided with the opening 29 for securing an optical path at the top face of the heating chamber 4. In the vicinity of the opening 29 is disposed a choke structure 108 not to leak the electromagnetic waves outside the heating chamber 4.

The temperature sensor 26 will be described more in detail. FIG. 48 is a sectional view taken along the line B—B' of FIG. 47. The opening 29 is formed at a ceiling face or top face 109 of the heating chamber 4. The choke structure is constituted of two sheet metals 110a and 110b. The sheet metal 110a. constituting the optical path is a cylindrical metallic part spreading at the top face 109 and in tight contact with the top face 109. The sheet metal 110b is a box-like part with a small hole 111 and in tight contact with the top face 109. The infrared rays from the heating chamber 4 are let outside through the small hole 111 due to the choke structure, but the electromagnetic waves in the heating chamber 4 are shielded and hardly leak outside. If a height L of the choke structure is set to be $\lambda/4$ in FIG. 48, specifically, about 30 mm when the frequency is 2.45 GHz, the impedance at the small hole 111 becomes indefinite, thus exerting the maximum effect to shut the electromagnetic waves.

In FIG. 48, a pyroelectric infrared detection element 112 detects the entering amount of infrared rays, that is, generates an output correlative to a temperature at a position in the heating chamber 4 that is a view field. The infrared detection element 112 is fixed to the interior of a fixed member 113 and detects the temperature in a narrow range through the reduced view field of a lens 114 fitted to the fixed member 113. The lens 114 is a Fresnel lens 114 formed 51 of a material passing infrared rays. A stepping motor 115 rotates a small gear 117 and a chopper 118 about a first rotary shaft 116.

The chopper 118 constitutes a slit, rotating while opening and closing the optical path to the infrared detection element 112. The small gear 117 is kept in touch with a large gear 119 which has a second rotary shaft 120 fitted thereto. The second rotary shaft 120 is rendered rotatable via a receptacle 121. Electronic circuits (not shown) such as an amplifier circuit and the like in addition to the infrared detection element 122 are mounted to a printed circuit board 122 set to the second rotary shaft 120. These parts are accommodated in a metallic case 124 having a small hole 123 at a position of the optical path for the infrared rays, covered with a metallic lid 125 and fixed to the choke structure 110 by the metallic lid 125.

In the constitution as above, the stepping motor 115 oscillates the infrared detection element 112 from front to back in FIG. 48, and simultaneously with this the optical path is opened and closed by the chopper 118. An oscillation cycle of the infrared detection element 112 is set to be an integral fraction of a rotating cycle of the motor 22, in other words, the rotating cycle of the motor 22 is set to be an integral multiple of the rotating cycle of the infrared detection element 112. Accordingly, the temperature of the same position can be detected every rotation of the motor 22.

A detection position by the infrared detection element 112 is indicated in FIG. 49. A detection field by the infrared detection element 112 is indicated by a small circle and a locus of the center of the detection field is indicated by a broken line. In the example of FIG. 49, a temperature detection point is changed five times in one way of the reciprocative oscillation of the infrared detection element 112. The detection position covers all over the whole saucer 21 because of the combination of the oscillation of the infrared detection element 112 and the rotation of the motor 22, and accordingly the temperature distribution is detected in two dimensions. Since the motor 22 is rotated with the cycle of an integral multiple of the oscillation cycle of the infrared detection element 112, a temperature difference from the temperature one cycle earlier during the rotation of the turntable or a temperature change from the initial temperature can be detected at every detection position.

The control operation by the control means 19 will be depicted with reference to FIG. 50. The control means 19 controls the motor 18 based on the temperature distribution detected by the temperature distribution detection means 26. An extraction means 126 distinguishes for every detection position whether the detected temperature shows the temperature of the food 6 or the saucer 21 or a wall face of the heating chamber 4. Since it is not known how large the food. 6 is or where the food 6 is located, etc. at the initial stage of heating, a uniform heating control means 127 controls the motor 18 in the first place. The uniform heating control means 127 rotates the motor 18 with a cycle shorter than the rotating cycle of the motor 22, reverses or, reciprocates the motor 18 after rotating half, drives at random, etc., so that the electromagnetic waves are stirred and uniformly distributed in the heating chamber 4. Whether or not the detected temperature shows the temperature of the food 6 is distinguished from the temperature rise at every detection position while the motor 18 is controlled by the uniform heating control means 127.

FIG. 51 is a graph of a surface temperature change of the food 6 and a temperature change of other parts than the food 6, e.g., saucer 21 or the like when the uniform heating control means 127 controls the motor 18. An axis of abscissa shows the time t passing after the start of heating and an axis of ordinate indicates a temperature change $\Delta T$ from the start of heating. More specifically, an area C indicated by slantwise lines shows the temperature change of other parts than the food 6, and an area D shows the temperature change of the food 6. Since the saucer 21 has a smaller dielectric loss than the food 6 and is hard to absorb the electromagnetic waves, the temperature of the saucer 21 hardly increases as is shown in FIG. 51. Accordingly, the food 6 and the other parts than the food 6 can be clearly distinguished from each other. A temperature change operation means 128 stores, for instance, temperatures corresponding to detection positions in the first cycle of the rotation of the motor 22 from the start of heating, and operates the temperature difference $\Delta T$ between a temperature at the detection position t13 later and the temperature at the same position in the first cycle. A temperature change comparison means 129 judges that it is the temperature of the food 6, when the temperature difference $\Delta T$ operated by the operation means 128 is larger than a preset predetermined value $\Delta T1$, or it is the saucer 21 if the temperature difference $\Delta T$ is smaller than the predetermined value $\Delta T1$.

Once the extraction means 126 distinguishes whether it is the food 6 or the saucer 21 at each detection position, a heating mode switch means 1309 switches from the uniform heating control means 127 to a local heating control means 131 to control the motor 18. The local heating control means 131 stops the motor 18 at a suitable position thereby to control a point where to concentrate the electromagnetic waves. A low-temperature portion extraction means 132 extracts a low-temperature portion among the detection positions judged to be the food 6 by the extraction means 126. The local heating control means 131 controls to drive the motor 18 so that the electromagnetic waves are emitted to the low-temperature portion extracted by the extraction means 132. When the electromagnetic waves are emitted to the low-temperature portion of the food 6 by the local heating control means 131 to remove the low-temperature portion and if the whole of the food 6 becomes a uniform temperature, the motor 18 is controlled again by the uniform heating control means 127.

The low-temperature portion extraction means 132 stores as a heating position a position of the lowest detected temperature among the detection positions judged to be the food 6 by the extraction means 126 in one reciprocation of the infrared detection element 112. While the reciprocative oscillation of the infrared detection element 112 is repeated in one rotation of the motor 22, the detected heating positions during the oscillation are all stored. When the motor 22 is rotated, an angle of the motor 18 is adjusted by the local heating control means 131 toward the stored heating position in the radial direction above the rotary waveguide (emission part) 8, so that the heating position, namely, the low-temperature portion of the food 6 is heated. By repeating this control, the low-temperature portion is eliminated from the food 6 and the food 6 is heated uniformly.

As a simple way to reduce the driving number of times of the motor 18, the detection positions by the infrared detection element 112 are arranged on concentric circles. Whether it is the food 6 or the saucer 21 is distinguished for every circumference of the concentric circles, the maximum temperature is extracted for each circumference judged to be the food 6, the circumference of the lowest maximum temperature is extracted by the low-temperature portion extraction means 132, and the angle of the motor 18 is adjusted to concentrate the electromagnetic waves onto the extracted circumference. The durability of the motor 18 is improved in this method.

Meanwhile, the "uniform" in the uniform heating control means 127 represents heating of a wide area in contrast to the local heating, not implying heating in a perfectly uniform manner not generating irregularities.

The physical amount detection means is the temperature distribution detection means in the 13th embodiment, but is not limited to the means in the present invention. For example, a solid image pick-up device called as a CCD image sensor capable of recognizing the shape or color of the food 6 may be used and, in this case, the control means controls the local heating means based on the color changing in accordance with the progress of heating and a color distribution. Concretely, in the case of meat, the local heating means is controlled so as to finish the whole meat light brown while monitoring the color changing from red, light brown finally to white. Alternatively, the local heating means may be controlled by the control means based on a change of the shape. For example, since a rice cake becomes soft and swells, the local heating means is controlled to let the whole rice cake swell equally. The same effect is obtained even when a plurality of light emitting elements and photodetecting elements are used thereby to recognize the shape of the food from a shut pattern of the optical path. If an optimum control pattern for the local heating means is preliminarily stored correspondingly to the shape of the food, the control means can control the local heating means simply by the initial recognition of the shape by the solid image pickup device or a plurality of light emitting elements and photodetecting elements. Furthermore, if the optimum control pattern for the local heating means is stored beforehand in conformity with the menu and weight, the weight sensor can be the physical amount detection means.

Figure 52:
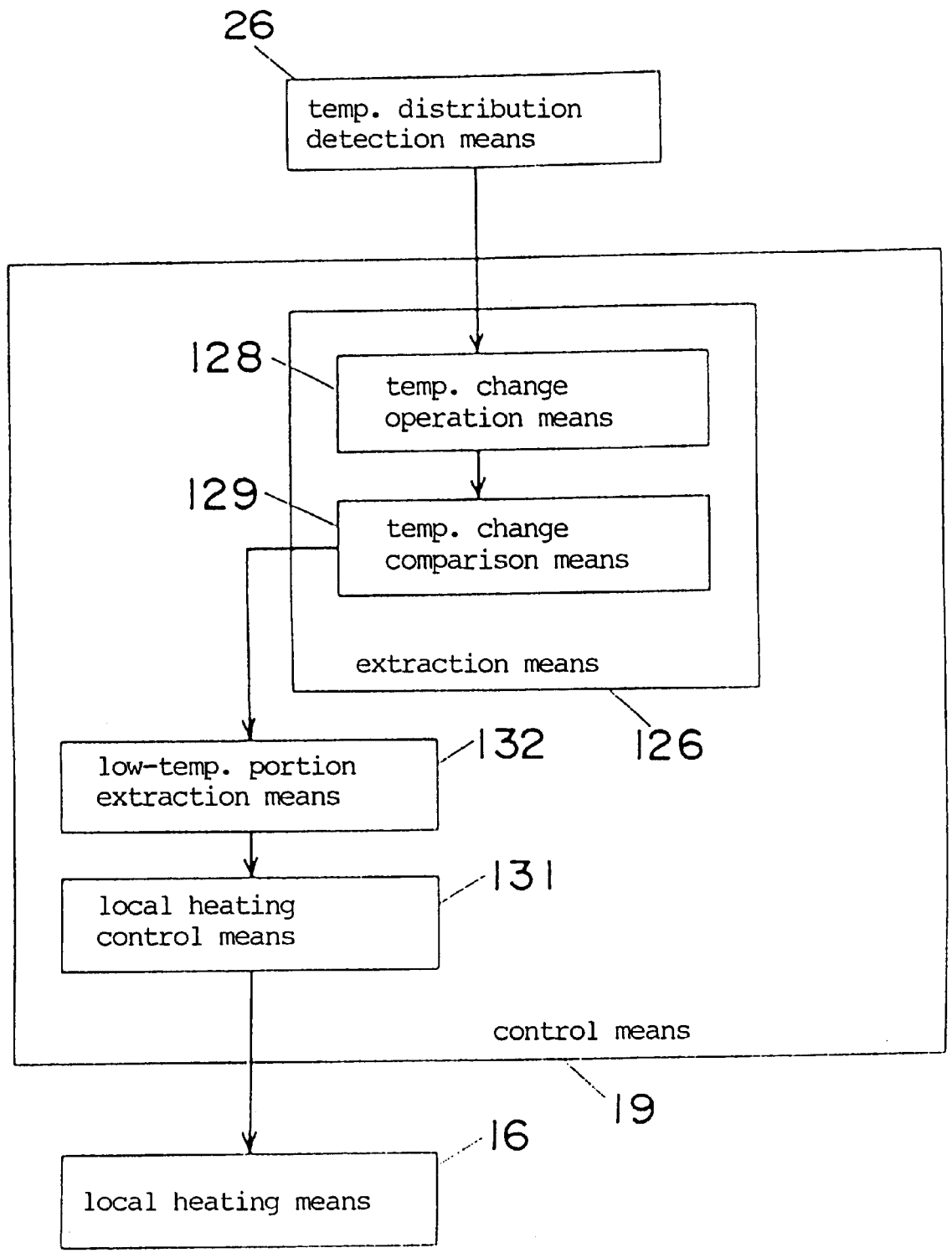
FIG. 52 is a block diagram of a modified example of FIG. 50.

The control means in the 13th embodiment is composed of the uniform heating control means, the local heating control means and the heating mode switch means. The present invention is not restricted to this. An example wherein the uniform heating control means and the heating mode switch means are eliminated will be described with reference to FIG. 52. FIG. 52 is a block diagram explaining the control operation in the high frequency heating apparatus. The extraction means 126 distinguishes whether it is the food 6 or the saucer 21 at the start of heating. The temperature change comparison means 129 carries out comparisons every moment with a predetermined temperature change determined by the passing time. When the temperature change is larger than the predetermined temperature change, it is judged to be the food 6. If the temperature change is smaller than the predetermined temperature change, it is judged as the saucer 21. The predetermined temperature change is indicated by a line E in FIG. 51 as a function determined by the passing time. The temperature change of the food 6 is small at the early stage of heating, and therefore the food 6 and the saucer 21 may be possibly incorrectly distinguished wrong. However, the error is corrected in accordance with the progress of the heating, therefore not influencing large to the total heating distribution.

According to a different method, the motor 18 is fixed at a predetermined position at the initial stage of heating. Generally, since the food 6 is placed at the center of the heating chamber 4 in many cases and the food is often in such a shape that the periphery is easy to heat whereas the center is hard to heat, the rotary waveguide (emission part) 8 is first fixed in direction as shown in FIGS. 12 and 25. Although the initial optimum heating position may not be possibly correct even in this method, the error is corrected as the heating proceeds, without adversely influencing the total heating distribution greatly. Even if the motor 18 is initially fixed not at the center, but in the periphery as shown in FIGS. 13 and 26 or at other positions than the center, the heating position is properly controlled in accordance with the progress of heating, resulting in the same effect.

Figure 53:
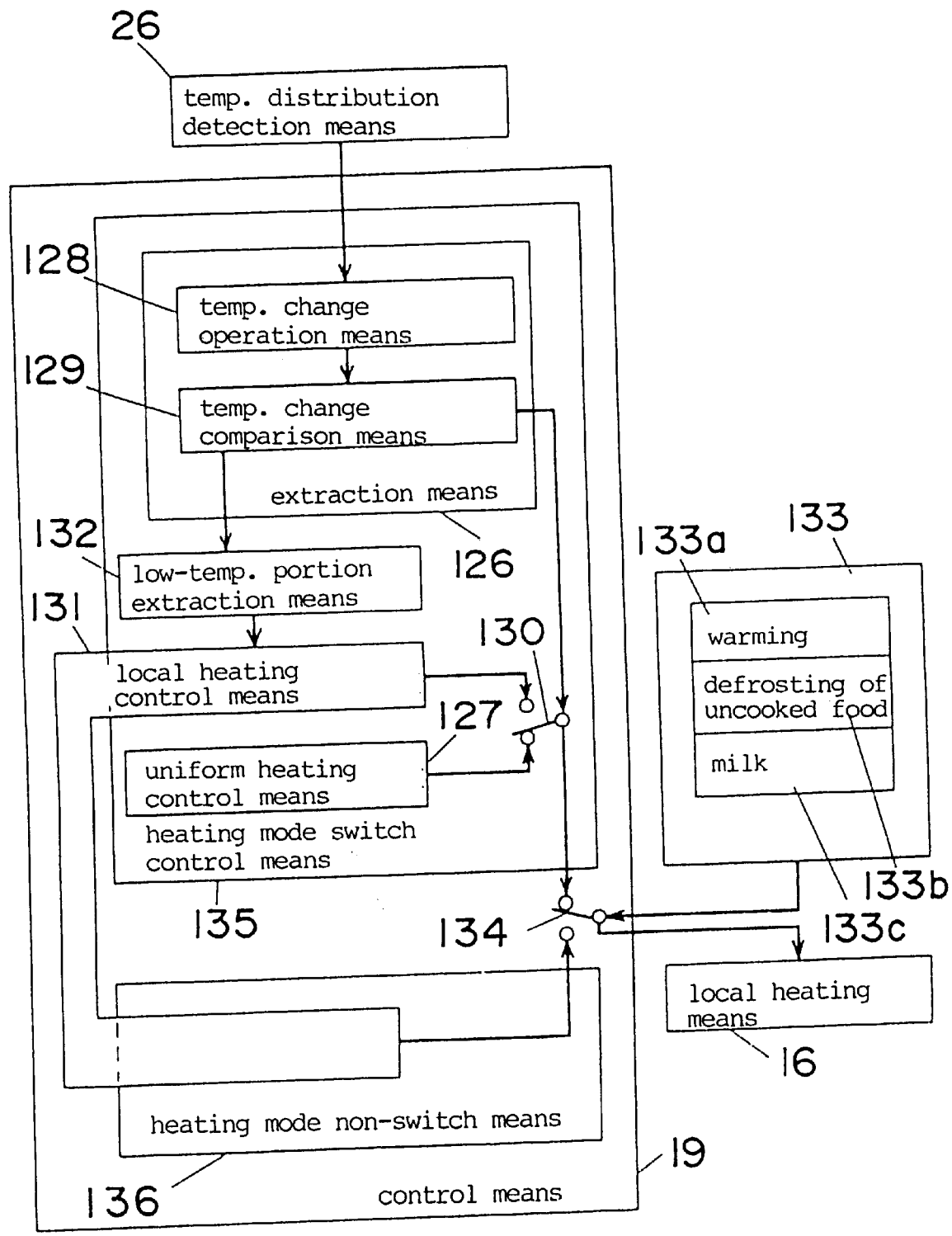
FIG. 53 is a block diagram of a high frequency heating apparatus according to a fourteenth embodiment of the present invention.

A 14th embodiment will be described with reference to FIG. 53. FIG. 53 is a block diagram explanatory of the control operation of a high frequency heating apparatus according to the 14th embodiment, in which the parts in the same constitution as in the 13th embodiment are denoted by the same reference numerals. A menu setting means 133 has keys corresponding to cooking menus, e.g., a "warming" key 133a, a "defrosting" key 133b, a "milk" key 133c, etc. A cooking menu is set when the user depresses any of the keys. A control mode selection means 134 is to select either of a heating mode switch means 135 and a heating mode non-switch means 136 to control the motor 18 in conformity with the cooking menu set by the setting means 133. The heating mode switch control means 135 operates to control the motor 18 in the manner as described in the foregoing 13th embodiment. That is, the motor 18 is first controlled by the uniform heating control means 127 at the heating start and, after the extraction means 126 distinguishes the food 6 from the saucer 21, the motor 18 is controlled by the local heating control means 131 for the low-temperature portion detected by the low-temperature portion extraction means 132. On the other hand, the heating mode non-switch control means 136 controls the motor 18 with the use of only the local heating control means 131 from the start of heating.

In order to reheat cold rice, boiled and seasoned substance or grilled substance, the food should be locally concentratedly heated and the heated portion should be controlled and changed to obtain the uniform temperature distribution as a whole. The same applies to defrosting of meat and fish. In contrast, when a liquid substance such as milk or the like is intensively heated from below a container containing the substance, the substance is uniformly heated in a vertical direction because of the convection. Therefore, supposing that the substance o: food is usually placed at the center of the heating chamber 4, the motor 18 should be controlled to fixedly position the emission part 8 to locally heat the central portion of the food in the case of liquid substance, as shown in FIGS. 12 and 25. If the food is not set at the center of the heating chamber, the extraction means 126 detects the position of the container and the motor 18 is controlled to fix the position of the emission part 8 to agree with the container. If a plurality of containers are placed on concentric circles, the motor 18 is controlled to fix the emission part 8 so as to locally heat the concentric circles. If the plurality of containers are not arranged on concentric circles, the motor 18 is controlled to change the direction of the emission part 8 each time to match the position of the container passing in the vicinity of the emission part 8.

When the user presses the key to set a cooking menu, the control mode selection means 134 selects the heating mode switch means 135 if the pressed key is the "warming" key 133a or "defrosting" key 133b, whereby the uniform heating control means 127 controls the motor 18 at the initial stage of the heating, and afterwards the local heating control means 131 controls the motor 18. If the key manipulated by the user is the "milk" key, the control mode selection means 134 selects the heating mode non-switch means 136. In this case, the local heating control means 131 first controls the motor 18 thereby to fix the emission part 8 to locally heat the center of the heating chamber 4. If the extraction means 126 recognizes that the container of the milk is located at the center of the heating chamber, the local heating to the center of the heating chamber is continued as it is. If it is recognized that the milk container is not at the center of the heating chamber or a plurality of containers are present, the motor 18 is controlled to set the position of the emission part 8 so that the center of the detected position of the milk container is locally heated.

In the case where the milk container is not at the center of the heating chamber, the magnetron may be stopped in a time interval while the container is separated away from the emission part 8 by the rotation of the turntable, thus refraining the electromagnetic waves from entering the heating chamber 4. Although this consumes time for heating, the temperature distribution is improved further and the energy is not wasted. Sake, miso soup, coffee and the like can be handled in the same manner as milk by adding these as menus to be set by the menu setting means 133.

Figure 54:
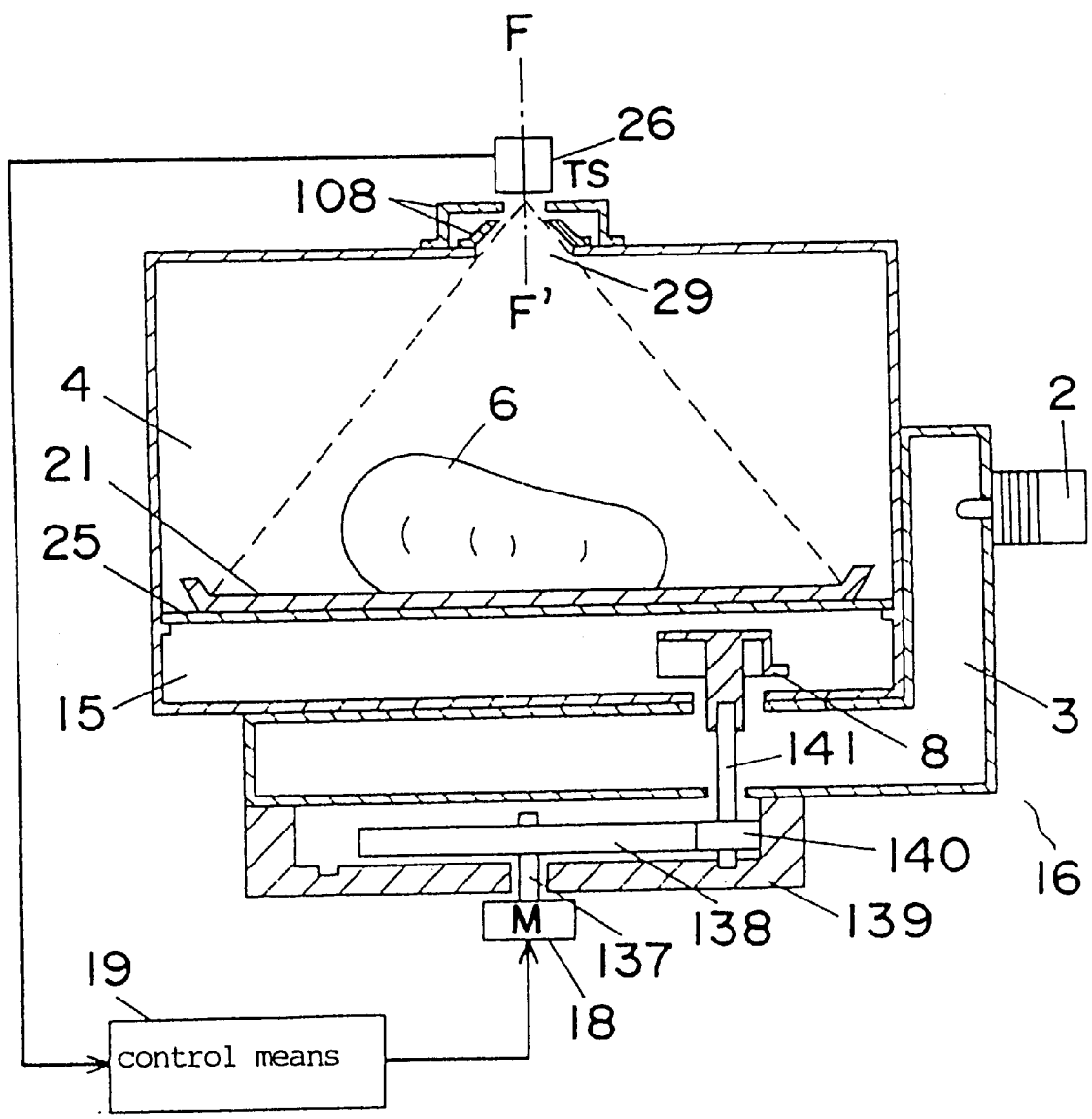
FIG. 54 is a view showing the constitution of a high frequency heating apparatus according to a fifteenth embodiment of the present invention.

A 15th embodiment will be described with reference to FIGS. 54 and 55. FIG. 54 is a sectional view indicating the constitution of a high frequency heating apparatus of the 15th embodiment and FIG. 55 is a sectional view of an essential part of a temperature distribution detection means of the embodiment, in which parts in the same constitution as in the foregoing embodiments are designated by like reference numerals and the description thereof is omitted.

In the 15th embodiment, the turntable motor as a rotating means is not employed. The electromagnetic waves from the magnetron 2 are, via the waveguide 3 and power feed chamber 15, sent into the heating chamber 4 to heat the food 6 in the heating chamber 4. The emission part 8 is provided in the power feed chamber 15, and rotated by the motor 18 which is the moving means for the waveguide. The power feed chamber 15 is covered with the cover 25. The stepping motor 18 rotates a first rotary shaft 137 having a large gear 138. A peripheral gear 139 fixedly mounted to the waveguide 3 has a gear formed therein and a groove as a bearing for a small gear 140. The small gear 140 is held in touch with the large gear 138 and peripheral gear 139. A second rotary shaft 141 fitted to the small gear 140 is rotatably held by the groove formed in the peripheral gear 139 as the bearing. The emission part 8 is mounted to the second rotary shaft 141. When the motor 18 is rotated in the above constitution, the second rotary shaft 141, while repeatedly rotating, moves in the periphery of the large gear 138 along the peripheral gear 139. The motor 18 is initially registered by an origin detection switch or a stopper, etc. A moving angle of the motor 18 from the initial position is sequentially accumulated, so that the rotating angle of the motor 18 is always detected, from which the position and direction of the emission part 8 are detected.

Figure 55:
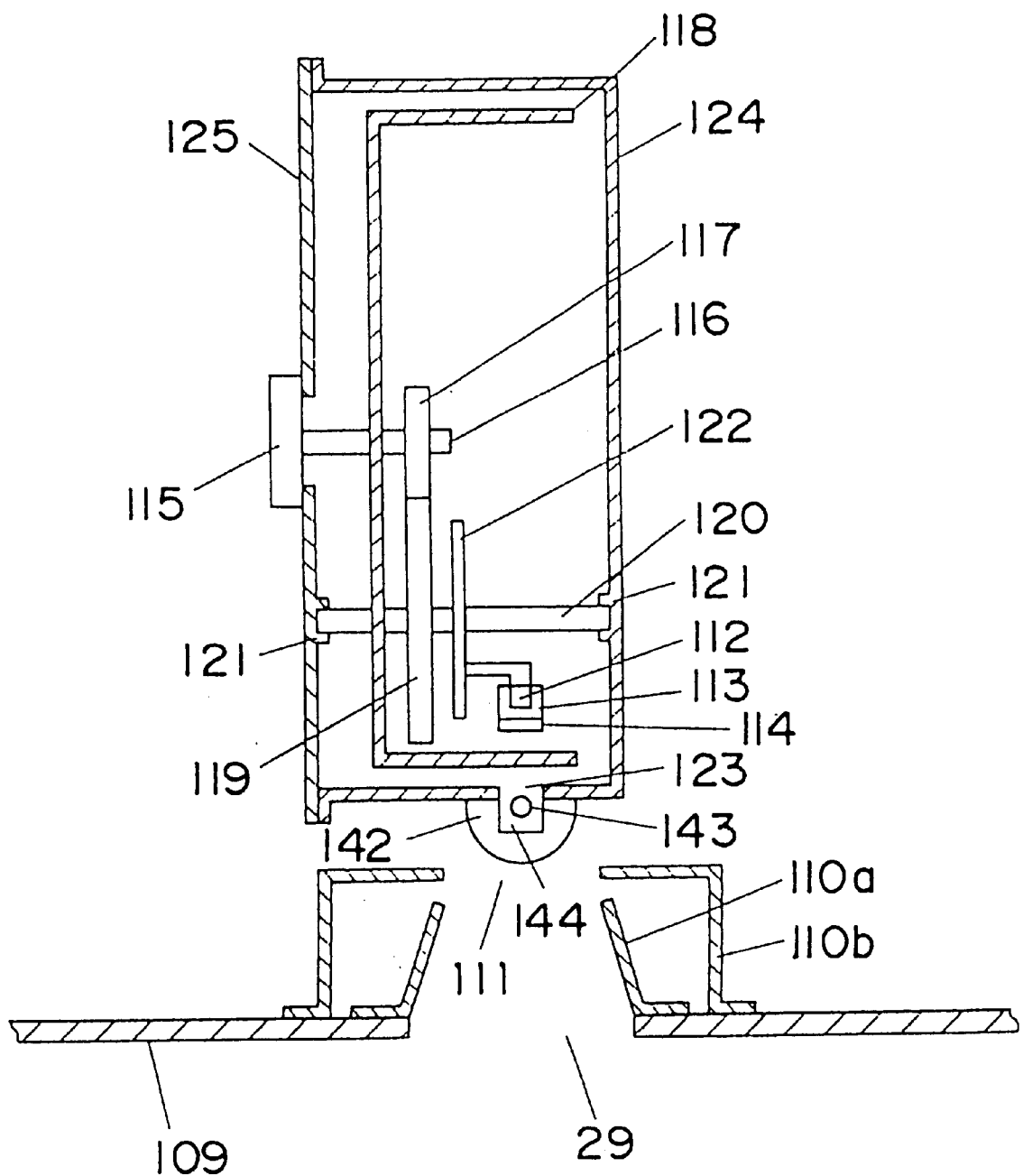
FIG. 55 is a sectional view taken along the line F—F' in FIG. 54.

FIG. 55 is the sectional view taken along the line F—F' of FIG. 54, in which parts of the same constitution as in the 13th embodiment in FIG. 48 are denoted by the same reference numerals and the description of the parts is omitted. The stepping motor 115 oscillates the infrared detection element 112 from front to back of FIG. 55 and at the same time, opens and closes the optical path by means of the chopper 118. A driving means 142 is constituted of a stepping motor for driving the whole metallic case 124 including the infrared detection element 112. The stepping motor 142 rotates a rotary shaft 143, thereby driving a coupling part 144 fitted to the rotary shaft 143 to oscillate the infrared detection element 112 right and left in FIG. 55. An oscillation cycle of the stepping motor 142 is a sufficiently small integral multiple of the oscillation cycle of the stepping motor 115. The temperature of the same position can hence be detected every one reciprocation of the stepping motor 142. In the thus constituted apparatus, the temperature of the whole area in the heating chamber 4 is detected and the two-dimensional temperature distribution is obtained. Since the temperature of the same position can be detected every reciprocation of the stepping motor 142, the temperature difference from the previous temperature or the temperature change from the initial temperature can be calculated for each detection position.

The control means 19 initially rotates the motor 18 with a constant cycle to uniformly heat the food. After the food is extracted, the control means 19 extracts the low-temperature portion in the extracted food and controls the angle of the motor 18 to direct the emission part 8 to the low-temperature portion. The low-temperature portion is thus eliminated from the food 6 by repeating the above operation, so that the food can be totally heated to a uniform temperature. In the embodiment, since the food 6 is not rotated, the food is allowed to be heavy in weight and the space in the heating chamber 4 can be efficiently utilized. While both the position and the direction of the emission part 8 are controlled by one motor in the description of the 15th embodiment, this arrangement does not limit the present invention. The direction and the position of the emission part 8 may be controlled separately by different motors, or controlled linearly by a biaxial movement, which effects more carefully controlled local heating.

A 16th embodiment of the present invention will be discussed with reference to FIGS. 56 and 57 respectively showing a sectional view of a high frequency heating apparatus and a sectional view of an essential part of an electromagnetic wave emission part of the apparatus. Those parts in the same constitution as in the 13th–15th embodiments are designated by the same reference numerals, the description of which is omitted here.

The opening position variation means is provided as a distribution variation means according to the 16th embodiment. In FIG. 56, the electromagnetic waves emitted from the magnetron 2 heat the food 6 on the saucer 21 in the heating chamber 4 via the waveguide 3. The opening part connecting the waveguide 3 with the heating chamber 4 and guiding the electromagnetic waves to the heating chamber has a first opening 145 and a second opening 146 respectively arranged closer to the center of the heating chamber 4 and closer to the periphery of the heating chamber 4. The first and second openings 145 and 146 are aligned in the radial direction of the rotary turntable 1. Either of the openings 145 and 146 is shut by a shielding plate 147. The shielding plate 147 is a semi-circular metallic plate and rotated by a rotary shaft 148 of a material of a low dielectric loss hard to absorb electromagnetic waves. The opening position variation means 18 consisting of a stepping motor shuts either one of the openings 145 and 146 by rotating the rotary shaft 148. A position through which the electromagnetic waves are radiated into the heating chamber 4 is changed in the above constitution. A portion of the food 6 immediately above the opening not shut by the shielding plate is intensively heated. The food 6 can be uniformly heated if the shielding plate 147 is rotated with a constant cycle.

Figure 56:
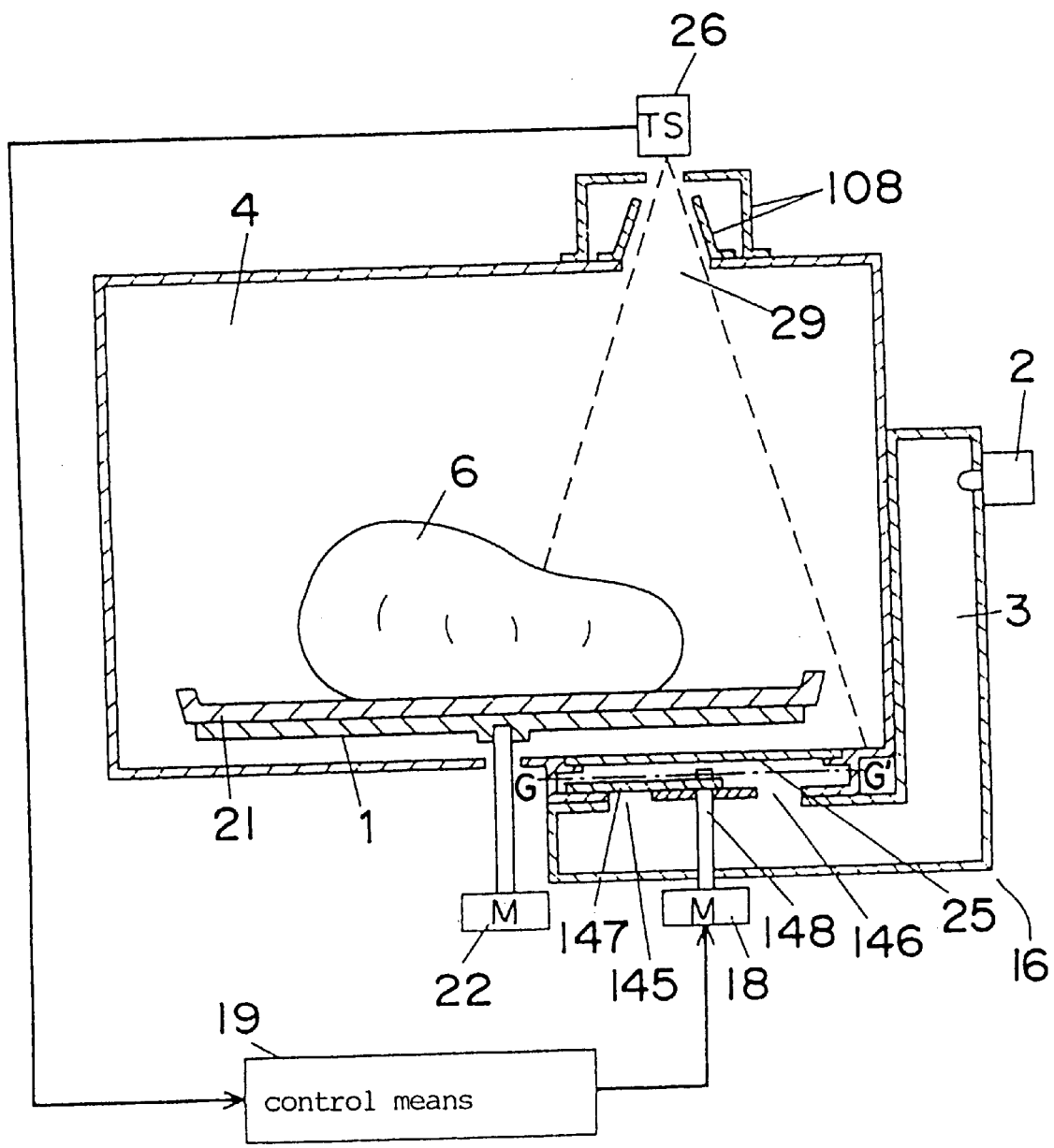
FIG. 56 is a view showing the constitution of a high frequency heating apparatus according to a sixteenth embodiment of the present invention.
Figure 57A:
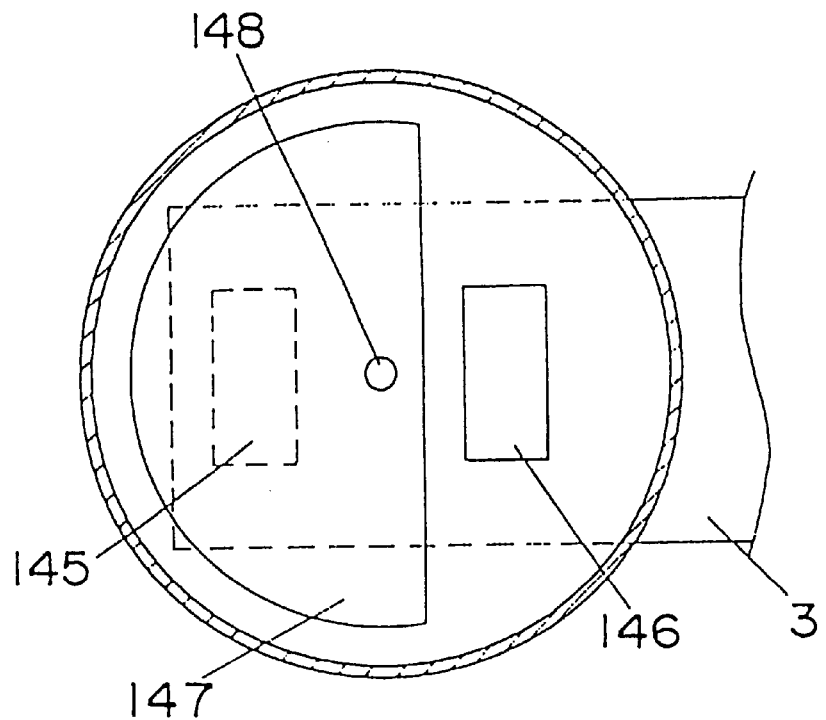
FIG. 57 is a sectional view taken along the line G–G' in FIG. 56, (a) be rig a view of a state when a first opening is shielded, and (b) being a view of a state when a second opening is shielded.
Figure 57B:
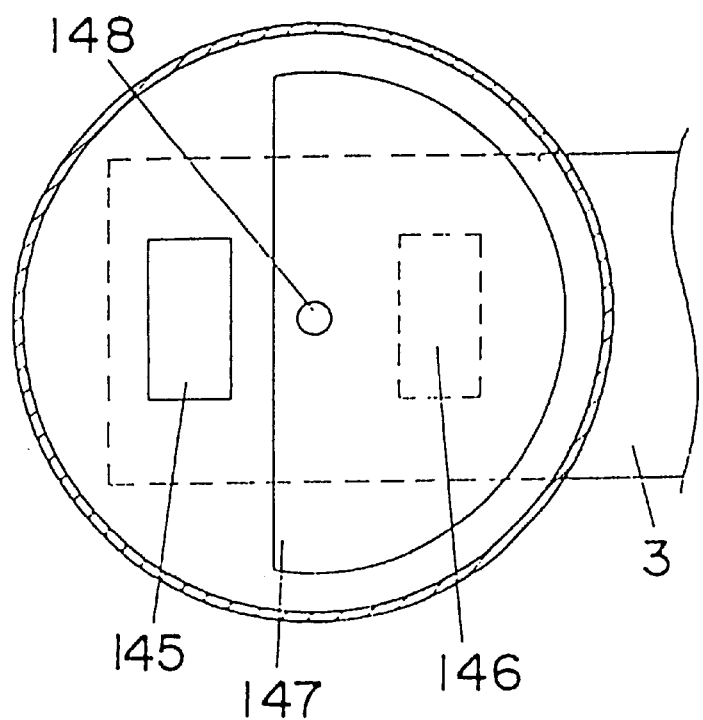

FIG. 57 is a sectional view taken along the line G—G' of FIG. 56. The openings 145 and 146 are rectangular and, the bottom face of the same rectangular heating chamber 4 is parallel to four sides of each opening. In FIG. 57(a), the electromagnetic waves are emitted from the second opening 146 into the heating chamber 4, with the first opening 145 being shut by the shielding plate 147 in the same manner as in FIG. 56, and consequently a portion of the food in the periphery of the heating chamber 4 is locally heated. On the contrary, in FIG. 57(b), the second opening 146 is shut by the shielding plate 147 and the electromagnetic waves are emitted through the first opening 145 to the heating chamber 4, whereby a portion of the food 6 in the vicinity of the center of the heating chamber 4 is locally heated.

The control means 19 initially rotates the shielding plate 147 with a constant cycle to achieve uniform heating. Once the food 6 is extracted based on the temperature distribution detected by the temperature sensor 26, the low-temperature portion of the food 6 is extracted and stored as a position to be heated. The position of the shielding plate 147, i.e., openings 145, 146 is changed every moment by rotating the turntable 1 to agree with the to-be-heated portion of the food in the radial direction. The control of optimum local heating is carried out in this manner. Since the low-temperature portion is removed by repeating the above process, the food 6 is uniformly heated as a whole.

In this embodiment, two openings are provided and opened and closed by the rotation of the semi-circular metallic plate. By so doing, the structure becomes simple and compact. However, the present invention is not limited to this structure. The number of the openings may be increased to more delicately control the uniform heating. The shielding plate may not be rotated, but may be moved linearly. Or a plurality of openings may be formed and each opening is equipped with the shielding plate.

Figure 58:
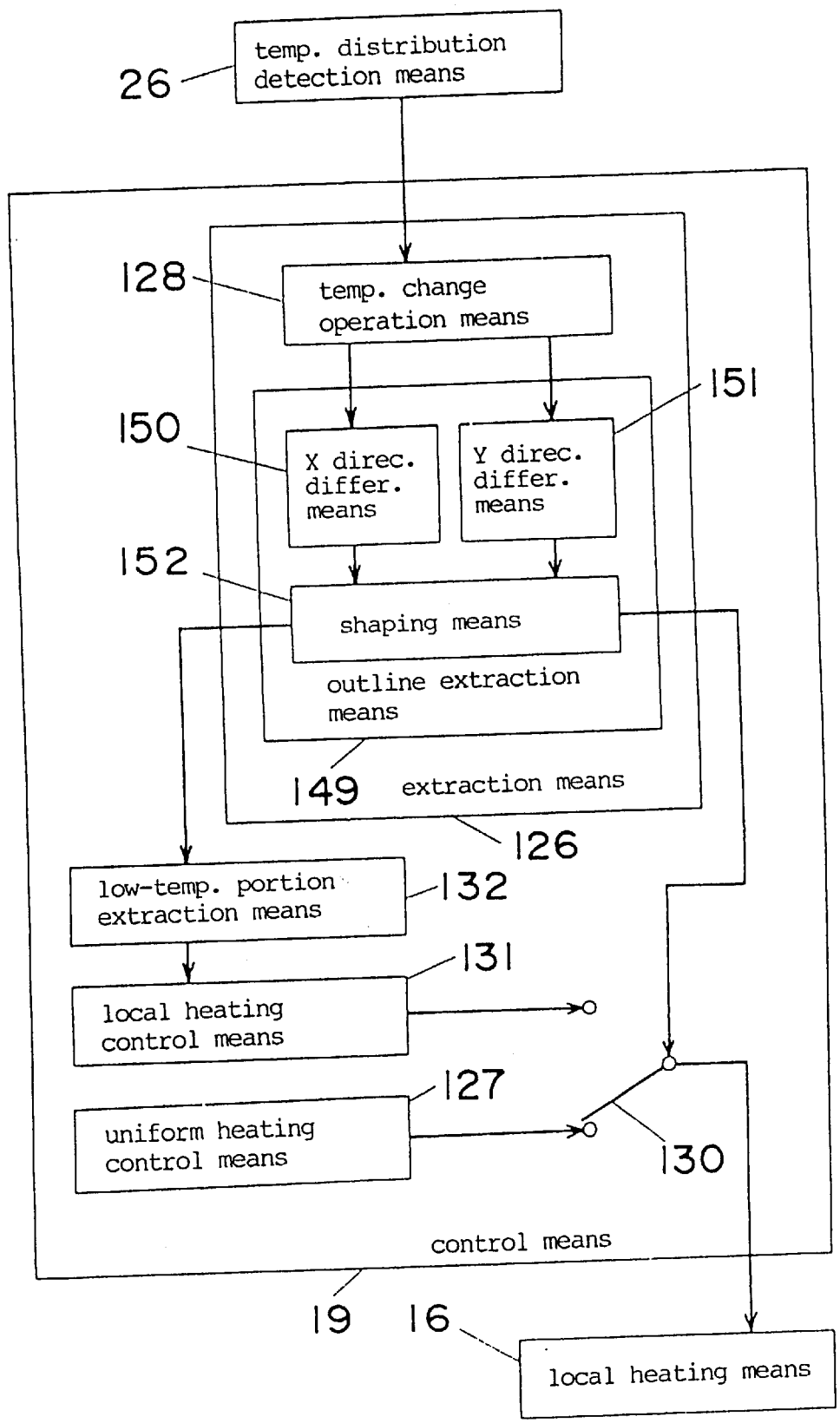
FIG. 58 is a block diagram of a high frequency heating apparatus according to a seventeenth embodiment of the present invention.

A 17th embodiment of the present invention will be described with reference to FIGS. 58 and 59. FIG. 58 is a block diagram explanatory of the control operation of a high frequency heating apparatus according to the 17th embodiment and FIG. 59 specifically shows a temperature characteristic diagram of an outline extraction means. Parts of the same constitution as in the 13th–16th embodiments are denoted by the same reference numerals in the drawings and the description thereof is omitted here.

Referring to FIG. 58, in the initial state of heating, the local heating means 16 is controlled by the uniform heating control means 127. When it is distinguished whether or not the food is present at each detection position by the temperature distribution detection means 26, the extraction means 126 switches the uniform heating control means 127 to the local heating control means 131 by the heating mode switch means 130 to control the local heating means 16.

The extraction means 126 is constituted of a temperature change operation means 128 and an outline extraction means 149. The temperature change operation means 128 storing temperatures corresponding to detection positions obtained by the temperature distribution detection means 26 at the start of the heating operates the temperature difference $\Delta T$ between the temperature at the detection position a predetermined time later and the initial temperature at the same detection position. The outline extraction means 149 extracts an outline of the food based on the temperature change $\Delta T$ at each detection position.

Figure 59A:
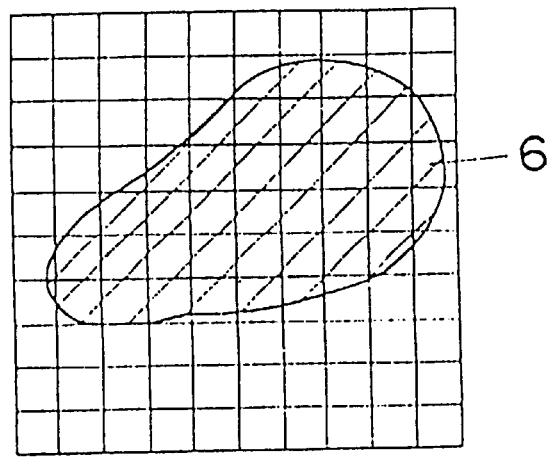
FIG. 59 is a temperature characteristic diagram explanatory of the operation of an outline extraction means set in the high frequency heating apparatus of FIG. 58, (a) indicating the position of the food, (b) indicating detection positions in an X direction, (c) indicating detection positions in a Y direction and (d) being a synthetic view of detection positions in the X direction and Y direction.
Figure 59B:
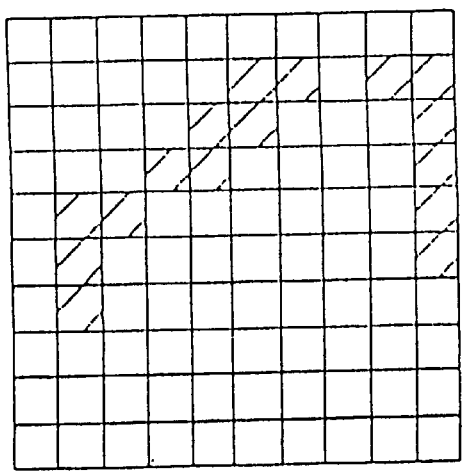
Figure 59C:
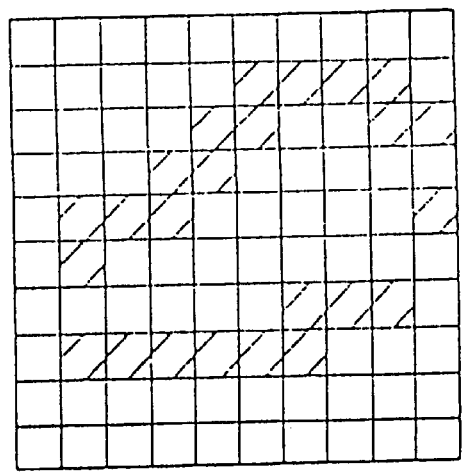
Figure 59D:
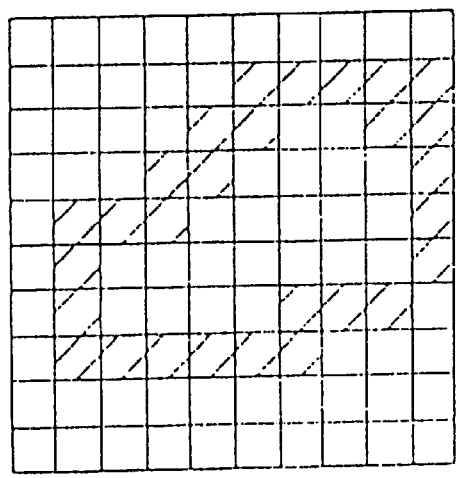

In FIG. 59(a), each square represents a detection position by the temperature distribution detection means 26 and a hatched part is the food 6. The temperature distribution detection means 26 consists of a plurality of infrared detection elements arranged in two dimensions or linearly. The temperature distribution is detected at detection positions in a matrix by oscillating the infrared detection elements. The temperature change of the food 6 from the start of the heating is normally larger than that at positions where the food is not present. An X direction differentiation means 150 operates a difference of temperature changes in the X direction of detection positions arranged in a matrix, namely, detection positions adjacent to each other in a lateral direction in FIG. 59, and stores detection positions larger than a predetermined value of the difference. Detection positions marked by slantwise lines in FIG. 59(*b*) are those larger than the predetermined value and stored in the differentiation means 150. Similarly, a Y direction differentiation means 151 operates a difference of temperature changes in the Y direction of detection positions arranged in a matrix, i.e., detection positions adjacent to each other in a longitudinal direction in FIG. 59 and stores the detection positions larger than a predetermined value of the difference. Detection positions marked by slantwise lines in FIG. 59(*c*) are larger than the predetermined value and stored in the differentiation means 151.

A shaping means 152 operates a logical OR of the detection positions stored in the X direction differentiation means 150 and the detection positions stored in the Y direction differentiation means 151. That is, the detection positions stored in either of the differentiation means 150 and 151 are judged to be the outline of the food. Although the food itself shows a distribution in temperature rise and therefore a large temperature difference exists between adjacent portions inside the food, the shaping means 152 judges the largest periphery as the outline of the food. If the periphery is partly broken, the shaping means 152 connects the broken parts and forms the outline. The extraction means 126 extracts the outline of the food as above. The inside of the outline is set as the food.

The low-temperature portion extraction means 132 extracts the low-temperature portion from the food extracted by the extraction means 126, and the local heating control means 131 controls the local heating means 16 to radiate the electromagnetic waves to the low-temperature portion extracted by the extraction means 132. Because of this arrangement that the food to be heated is extracted and the electromagnetic waves are emitted to the extracted food, the wasteful consumption of energy is eliminated and the food is heated efficiently.

Figure 60:
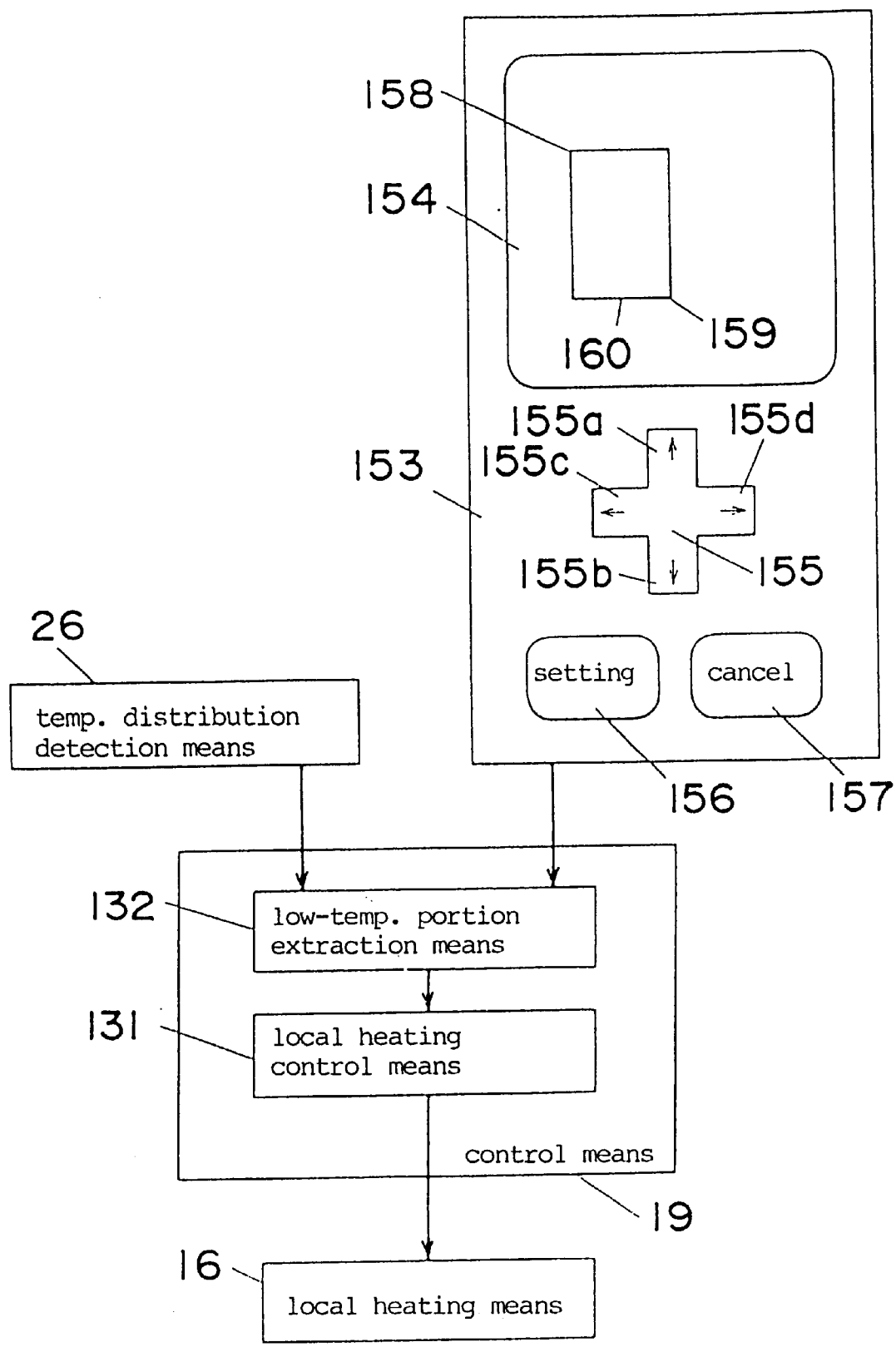
FIG. 60 is a block diagram of a high frequency heating apparatus according to an eighteenth embodiment of the present invention.

An 18th embodiment of the present invention will be described with reference to FIG. 60. FIG. 60 is a block diagram explanatory of the control operation of a high frequency heating apparatus according to the 18th embodiment, wherein parts in the same constitution as in the 13–17th embodiments are designated by the same reference numerals, with the description thereof being omitted.

The 18th embodiment is related to partial heating of food, for example, when a variety box lunch containing, in a box, a substance to be heated such as rice or the like and a substance not to be heated such as raw fish called sashimi, pickles or the like is to be heated. According to the 18th embodiment, only the rice is heated even if the whole lunch box is put in the heating chamber.

In FIG. 60, the user manipulates a heating range setting means 153 to set a heating range. The heating range setting means 153 consists of a setting screen 154 of a liquid crystal, a cross-shaped cursor key 155, a setting key 156 and a cancel key 157.

The user sets an area or range to be heated among the bottom face of the heating chamber with regarding the bottom face as the setting screen 154. The user first presses the setting key 156 to start setting. A first point 158 is displayed at an upper left corner of the setting screen 154. Then, the user manipulates the cursor key 155 thereby to move the first point 158 in the setting screen 154. The cursor key 155 comprises an up key 155*a*, a down key 155*b*, a left key 155*c* and a right key 155*d*. The first point 158 can be moved vertically and horizontally to an optional position by these keys. When the first point 158 is moved to an end of the heating range, the user presses the setting key 156. The first point 158 is accordingly fixed at the position, and a second point 159 is displayed at the same position. The user manipulates the cursor key 155 in the same manner as above to move the second point 159. At this time, a rectangle 160 having the first point 158 and the second point 159 on a diagonal line is displayed on the setting screen 154. The user moves the second point 159 to an optional position on the setting screen 154, thereby setting the heating range by the rectangle 160. When the setting key 156 is depressed again, the second point 159 and the rectangle 160 are certainly set. In the case where there are a plurality of ranges to be set, the user should press the setting key 156 again, when the first point 158 is displayed again on the setting screen 154, allowing the user to repeat the above procedures. If the user manipulates erroneously, the cancel key 157 should be used, whereby the content set by the setting key 156 immediately before the error is canceled.

In the manner as above, once the heating range is set by the user, the control means 19 controls to heat the heating range uniformly. The low-temperature portion extraction means 132 extracts the low-temperature portion from the heating range set by the setting means 153 in accordance with a signal from the temperature distribution detection means 26. The local heating control means 131 controls the local heating means 16 so as to radiate the electromagnetic waves to the low-temperature portion extracted by the extraction means 132. Accordingly, the low-temperature portion is eliminated from the heating range and the whole of the heating range is heated uniformly. Since the food outside the heating range is not heated, the food to be tasted at low temperatures is left at low temperatures.

Although the above embodiment is directed to simultaneous heating of the variety box lunch containing different kinds of stuff in one box, it is also unnecessary to extract the to-be-heated stuff at the start of heating once the heating range is set even if a single kind of stuff is to be heated. The control means is accordingly simplified in constitution. While the heating range setting means 153 is constituted of the setting screen 154, cursor key 155, setting key 156 and cancel key 157 in the embodiment, the present invention is not restricted to this constitution. For example, a touch panel or a mouse is utilizable, with the same effect achieved. Moreover, while the manipulation is simplified by setting the heating range by the rectangle, the same effect is obtained even when the setting range is set by a free curve. If the heating range is coded and printed by bar codes or the like on a package of the variety box lunch, the heating range can be set simply by reading of the codes optically. In this case, even a complicated heating range can be set through a remarkably simple manipulation.

Figure 61:
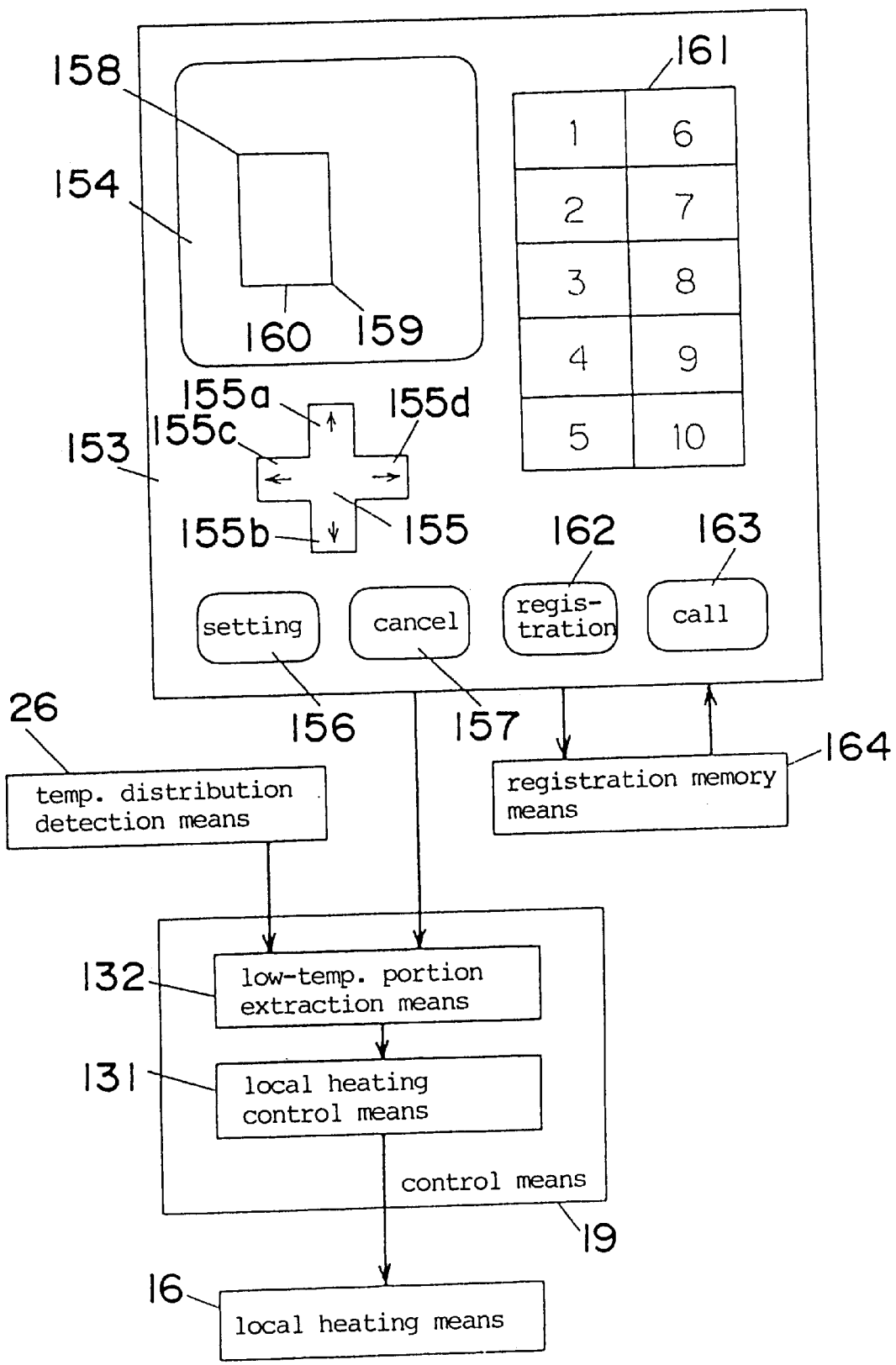
FIG. 61 is a block diagram of a high frequency heating apparatus according to a nineteenth embodiment of the present invention.

A 19th embodiment of a high frequency heating apparatus will be depicted with reference to a block diagram of FIG. 61 explanatory of the control operation of the apparatus. In the drawing, parts of the same constitution as in the 13th–18th embodiments are designated by the same reference numerals, the description of which is omitted.

The 19th embodiment is focused to a partial heating of food, similar to the above 18th embodiment, for instance, when a packed lunch is heated for a customer over the shop counter. In general, kinds of products served in this fashion are limited, e.g., variety box lunch, grilled meat box lunch, salmon box lunch, etc. and every stuff of the same kind is arranged at the same position in boxes. For example, the rice and grilled meat of a grilled meat box lunch are filled at respective fixed positions in the box. Since the apparatus is supposed to repeat heating of products of the same kind many times although there is only a limited number of kinds, if the heating range for each kind of the products is registered with a corresponding code, for example, "1" for the variety box lunch, "2" for the grilled meat box lunch, "3" for the salmon box lunch and the like, the heating range for the product selected by the customer can be set simply by the registered code.

The heating range setting means 153 in FIG. 61 consists of a group of numeral keys 161 from "1" to "10", a registration key 162 as a registering, means and a call key 163 as a registration calling means. In registering the heating range, first, the cursor key 155 and the setting key 156 are manipulated to set the heating range in the manner as described in the 18th embodiment. Thereafter, the registration key 162 is depressed and any numerical key in the group 161 is pushed. Upon depression of the setting key 156, the heating range is stored along with the code set by the numerical key in a registration memory means 164. In order to read out the heating range, the call key 163 is depressed and the numerical key in the group 161 corresponding to the product is depressed. The heating range stored in the memory means 164 corresponding to the code of the pressed numeral key is displayed at the setting screen 154. The setting key 156 should be depressed for confirmation. Once the heating range is registered, the heating range can be set afterwards by the calling operation alone.

When the heating is started, the control means 19 controls the local heating means 16 and heats the heating range at a uniform temperature, similar to the 18th embodiment. More specifically, the low-temperature portion extraction means 132 extracts the low-temperature portion from the heating range set by the setting means 153 based on the signal from the temperature distribution detection means 26, and the local heating control means 131 controls the local heating means 16 so as to emit the electromagnetic waves to the low-temperature portion extracted by the extraction means 132.

The registering means and the calling means consist of the numerical key group 161, registration key 162 and call key 163 in the 19th embodiment. The present invention is not restricted to the above. For instance, codes of manipulation procedures, numeric codes or alphabetical codes may be indicated on the setting screen 154 to be selected by the cursor key 155 or setting key 156. In this case, the number of keys is reduced and the structure is simplified. Alternatively, codes may be printed on the packages of products to be read optically, with the above numerical key group eliminated, whereby the user can readily manipulate.

Figure 62:
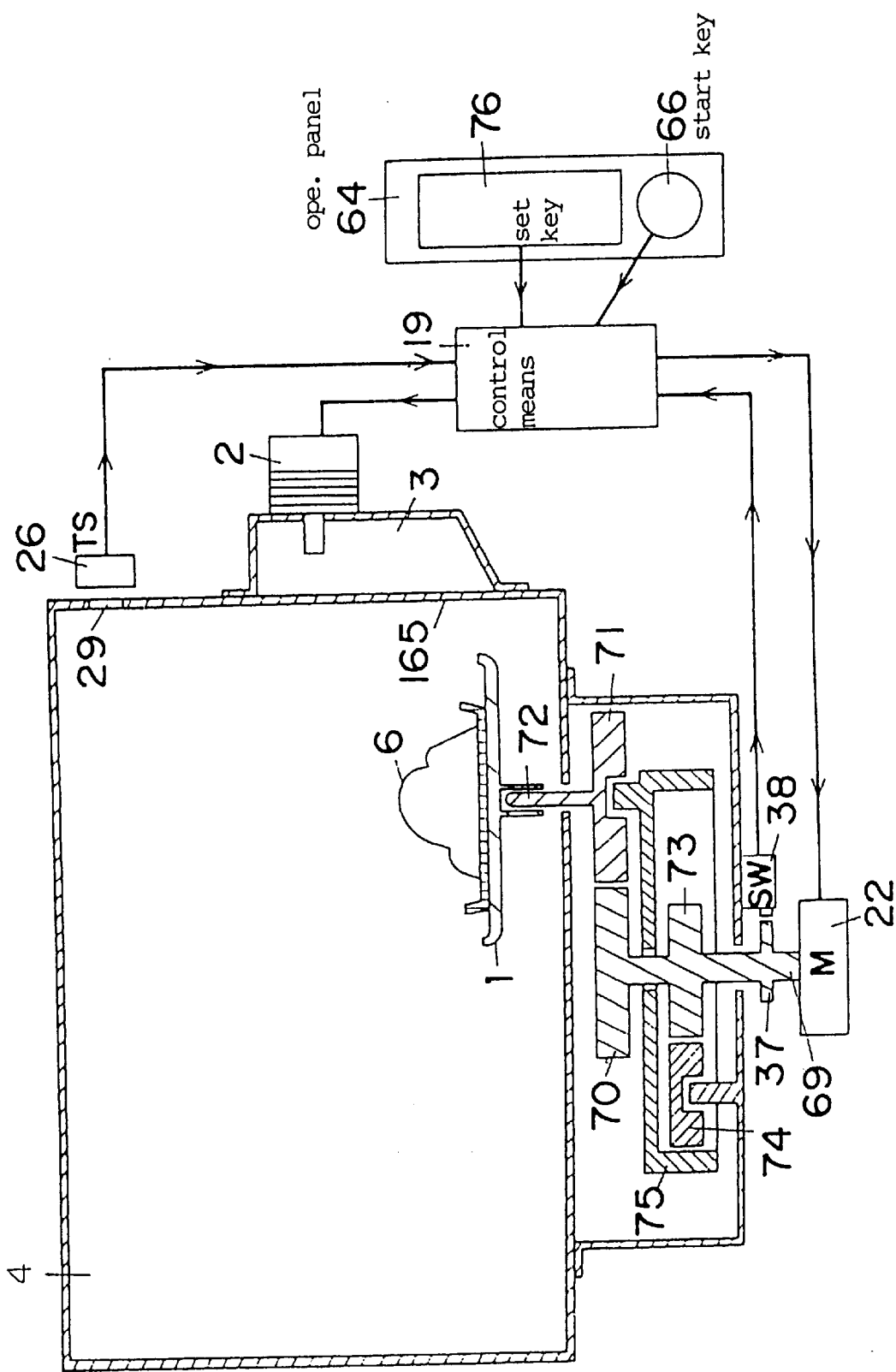
FIG. 62 is a view showing the constitution of an essential part of a high frequency heating apparatus according to a twentieth embodiment of th-: present invention.

FIG. 62 is a sectional view of the constitution of a high frequency heating apparatus according to a 20th embodiment of the present invention. The 20th embodiment is an applied example of the 9th embodiment shown in FIG. 37. The electromagnetic waves from the magnetron 2 are emitted to the heating chamber 4 via an opening 165 through the waveguide 3. The turntable 1 on which the food 6 is loaded is spirally driven. Accordingly, the food 6 itself is positioned in the embodiment, and the direction of electromagnetic waves entering the food 6 is changed by the position of the food 6. The embodiment is a representative example of switching the heated position, e.g., to heat the center of the food 6 or the periphery of the food. The cam 37 and switch 38 are the position detection part for detecting the position of the food.

Figure 63:
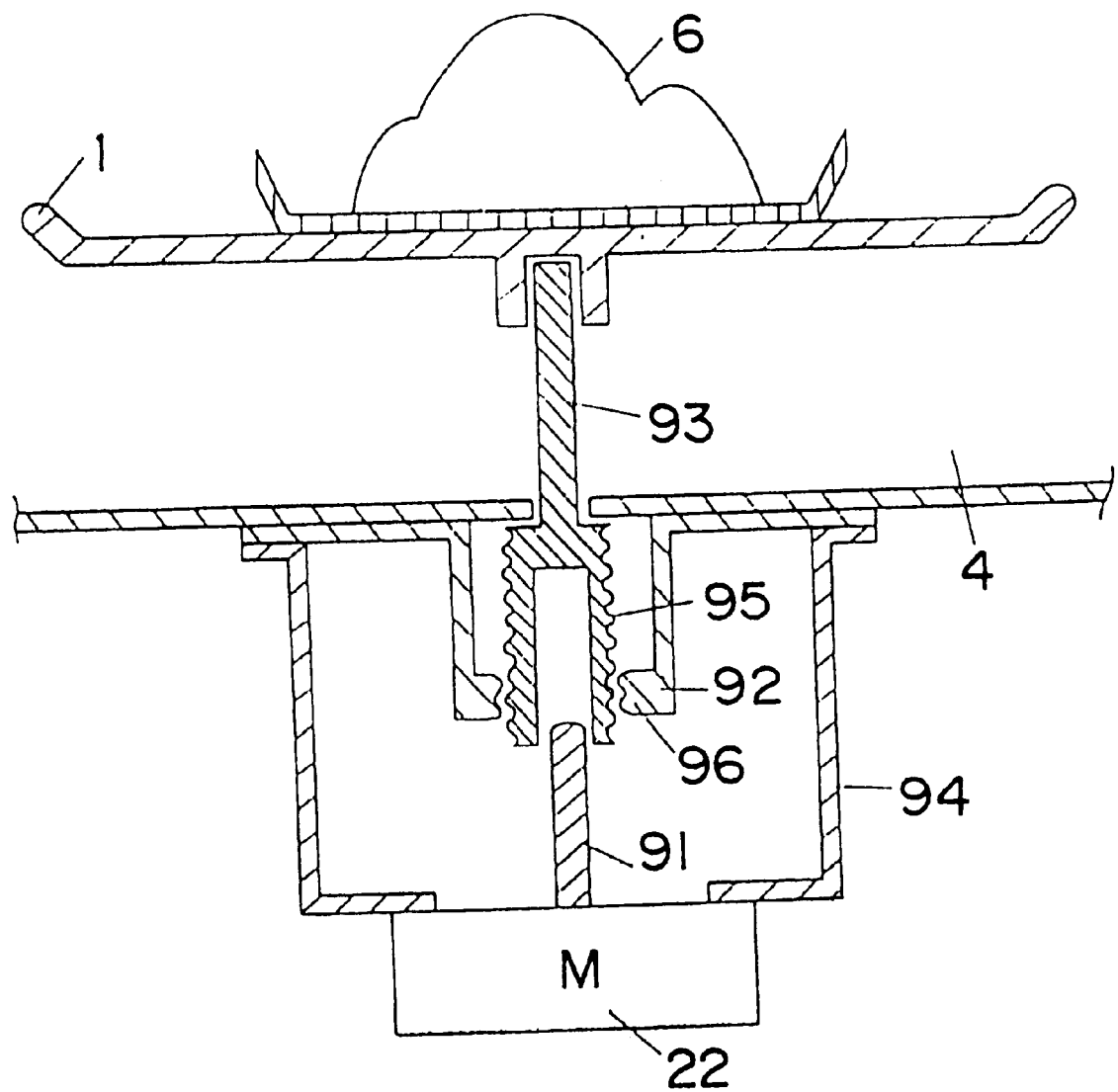
FIG. 63 is a longitudinal sectional view of an essential part of a high frequency heating apparatus according to a twenty-first embodiment of the preserve invention in a state where a turntable is raised.
Figure 64:
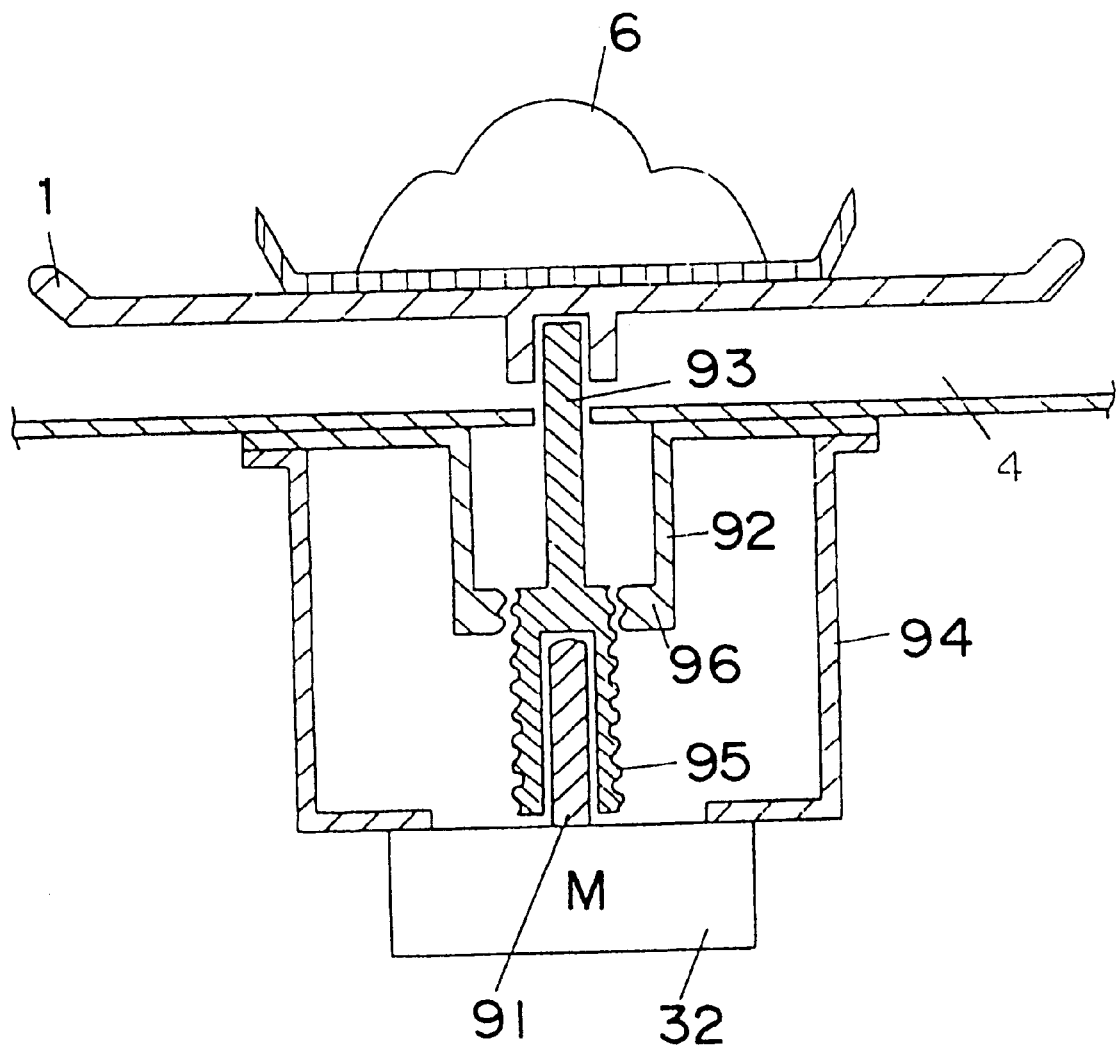
FIG. 64 is a state where the turntable of FIG. 63 is lowered.

FIGS. 63 and 64 are sectional views of an essential part of a high frequency heating apparatus in a 21st embodiment of the present invention. The embodiment is different from FIGS. 43 and 44 in that the food 6 is positioned, and also different from FIG. 62 in that the direction of electromagnetic waves is controlled not only in two dimensions by the rotation of the turntable 1, but by the vertical movement of the turntable, that is, the direction of the electromagnetic waves is controlled in three dimensions. FIG. 63 indicates a state where the turntable is raised and FIG. 64 is a state where the turntable is descended.

A combination of the rotation and vertical movements of the turntable is described here as a representative example of the three-dimensional control, for the sake of brevity. Needless to say, a spiral movement or the like other arrangement may be adopted or combined with the above.

Further, although it is not necessary to limit the switching number of times of the heating distribution, heating irregularities are less generated if the heating distribution is switched as many times as possible.

Figure 65:
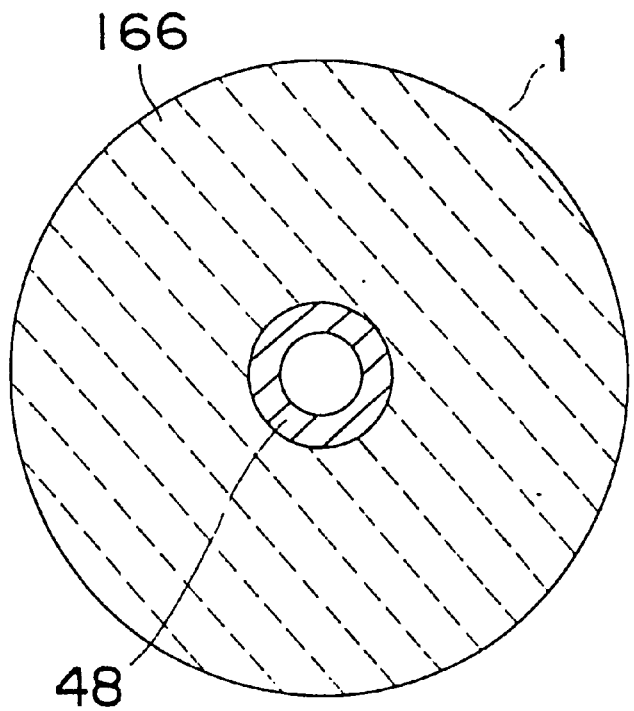
FIG. 65 is a bottom view of a turntable set in a high frequency heating apparatus according to a twenty-second embodiment of the present invention.

FIG. 65 shows the constitution of an essential part, namely, turntable 1 of a high frequency heating apparatus in a 22nd embodiment of the present invention, seen from below. The turntable in FIG. 65 which is different from FIG. 17 is made of a permeable material which is hard to absorb electromagnetic waves, e.g., ceramic or the like. The turntable 1 consists of a disk 166 and the rotary bearing 48 in such constitution as to easily pass the electromagnetic waves even without an opening .

When the electromagnetic waves are sent from below, the turntable 1 serves as a path for the electromagnetic waves. In the case where the microwave oven is provided with the heater 28, the devised turntable of FIGS. 17, 65 allows the electromagnetic waves to pass therethrough while keeping the heatproof properties to the heater.

Figure 66:
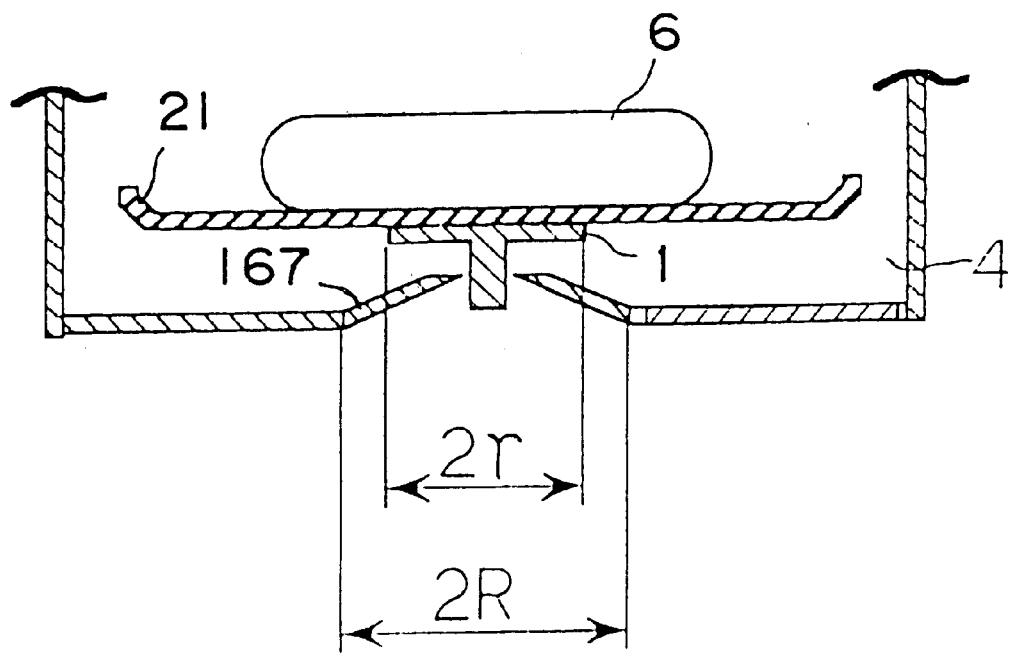
FIG. 66 is a longitudinal sectional view of an essential part of a high frequency heating apparatus according to a twenty-third embodiment of the present invention.

FIG. 66 is a sectional view of an essential part of a high frequency heating apparatus according to a 23rd embodiment of the invention, specifically showing a dimensional relationship of the turntable 1 and a central part 167 at the bottom face of the heating chamber 4. The turntable 1 has a radius of r (a diameter of 2r in FIG. 66) and the upwardly projecting central part 167 at the bottom face of the heating chamber 4 has a radius of R (a diameter of 2R in FIG. 66). Since 2R>2r, that is, R>r is held, even if the water is spilt on the turntable 1, it is prevented that the water runs down along the shaft of the turntable 1 to leak out of the heating chamber 4. Moreover, the water is gathered outside the projecting central part 167, making it possible to wipe the water without detaching the turntable. Particularly when the turntable 1 is formed of ceramic as in FIG. 65, although some sort of improvement should be devised to secure the durability of the turntable to prevent the turntable from breaking in repeated detachment/attachment operations to the rotary shaft because the ceramic is considered to be low in strength, the 23rd embodiment eliminates the necessity for detaching and attaching the turntable for cleaning. The durability is effectively improved.

Figure 67:
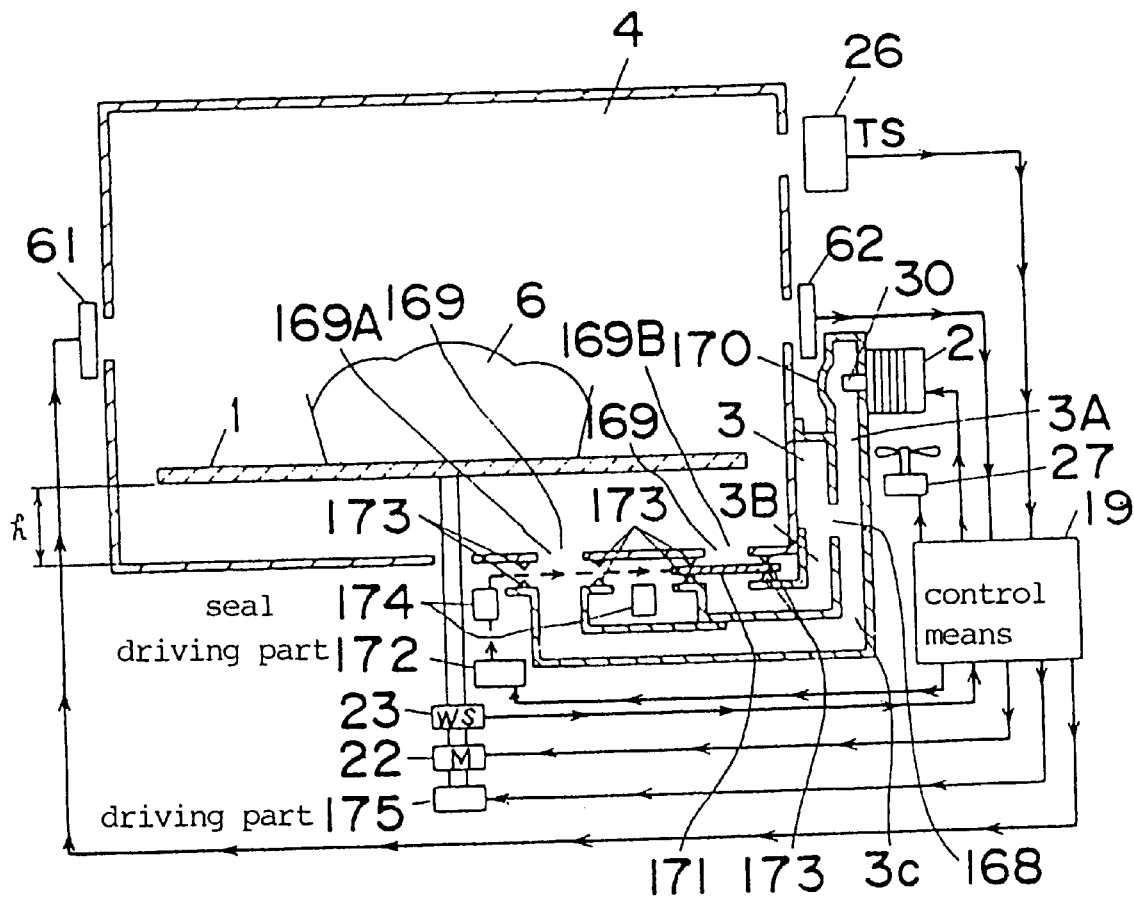
FIG. 67 is a view showing the constitution of a high frequency heating apparatus according to a twenty-fourth embodiment of the presence invention.

FIG. 67 is a sectional view indicating the constitution of a high frequency heating apparatus according to a 24th embodiment of the present invention.

The electromagnetic waves emitted from the magnetron 2 heat the food 6 on the turntable 1 in the heating chamber 4 via the waveguide 3. The electromagnetic waves from the magnetron 2 are diverged from a first waveguide 3A to waveguides 3B and 3C at a diverging point 169 and transmitted to the heating chamber 4 through openings 169A and 169B at the bottom face of the heating chamber 4. In this case, adjacent parts of wall faces of the waveguides 3B and 3C are constituted of a common metallic plate. A diverging point 168 is formed at a node in the first waveguide 3A where the electric field is weak. A wall face 170 of the first waveguide 3A facing the antenna 30 of the magnetron 2 is projected to increase a distance from the antenna 30. Meanwhile, no projection like the antenna 30 is present in the waveguides 3B and 3C and therefore the waveguides 3B and 3C can be separated little, i.e., reduced in sectional area as compared with the waveguide 3A. Accordingly, the constitution saves the space in spite of the presence of a plurality of waveguides. A sectional area of the first waveguide 3A is increased by the wall face 170 based on the sectional area of the waveguide 3B, 3C as a reference. A length of the waveguide 3B, 3C from the diverging point 168 to a terminal end is approximately an integral multiple of half the guide wavelength $\lambda g$ and a width of the diverging point 168 is not larger than ¼ the guide wavelength $\lambda g$, which will be more fully described later with reference to FIG. 68.

A metallic shielding part 171 is moved by a driving part 172 between openings 169A and 169B while held in contact with the heating chamber 4 and projecting parts 173 on the waveguides 3B and 3C, thus switching the openings 169A and 169B to transmit the electromagnetic waves easily. A seal part 174 prevents the electromagnetic waves from leaking outside the heating chamber 4 and the waveguide 3 irrespective of the position of the shielding part 171.

The control means 19 controls, based on detection signals from the temperature sensor 26 detecting the temperature of the food 6, weight sensor 23 connected to the turntable 1 and detecting the weight of the food 6 and photosensors 61, 62 detecting the shape of the food 6, the emission of electromagnetic waves from the magnetron 2, the operation of the fan 27 for cooling the magnetron 2, the operation of the driving part 172 for moving the shielding part 171, the operation of the motor 22 for rotating the turntable 1, and the operation of a driving part 175 for changing a height of the turntable 1. Particularly, the control means 19 controls to move the shielding part 171 when the magnetron 2 does not emit the electromagnetic waves. When the heating is completed, the control means 19 controls the position of the shielding part 171 or the height of the turntable 1 so as to obtain the best heating distribution and best heating efficiency to the light-weight food 6. At the heating time of any purpose, when the food 6 is started to be heated, the control means 19 controls to quickly generate electromagnetic waves and also controls not to take in or to neglect the outputs of the detection part, (e.g., weight sensor 23) which possibly malfunctions when the electromagnetic waves are instable immediately after the heating is started and before the detection part is stabilized (i.e., at a rise time). Moreover, depending on the kind of the food 6 (specially a large amount of food), the control means controls to change the position of the shielding part 171 or the height of the turntable 1 a plurality of number of times in the middle of heating, thereby optimizing the heating distribution and heating efficiency.

When the position of the shielding part 171 is changed by the driving part 172, the plurality of openings 169A and 169B are switched to change the electric field distribution in the heating chamber 4. Since the position of the shielding part 171 can be set freely in accordance with signals from the detection parts, the proper electric field distribution is obtained to fit the heating purpose. Although not shown in FIG. 67, if a reference point is set somewhere to correctly determine the position of the shielding part 171, the position of the shielding part 171 can be managed with ease by a moving distance from the reference point.

When a height h of the turntable 1 is changed by the driving part 175, the height of the food is consequently changed, whereby the heating distribution of the food 6 is changed even with the same electric field distribution. Similarly, if the height h of the turntable 1 is adjusted optimally in response to signals from the detection parts and in accordance with a difference of the electric field distribution by the position of the shielding part 171, the heating distribution is more properly arranged in conformity with the heating purpose. The height of the turntable 1 can be controlled by a reference point (not shown) and a moving distance, similar to the position of the shielding part 171.

The heating in the concentric direction of the food 6 seen from the rotational center of the turntable 1 is generally made uniform by rotating the turntable 1. The turntable can be freely rotated or stopped or changed in speed by the motor 22. For instance, when the temperature sensor 26 detects the temperature irregularity in the food during the heating, the heating distribution is changed by the shielding part 171 or the driving part 175 to search for a state to solve the temperature irregularity, and the rotation of the turntable is stopped or decelerated when the state is detected. The temperature irregularity can hence be eliminated quickly.

Figure 68:
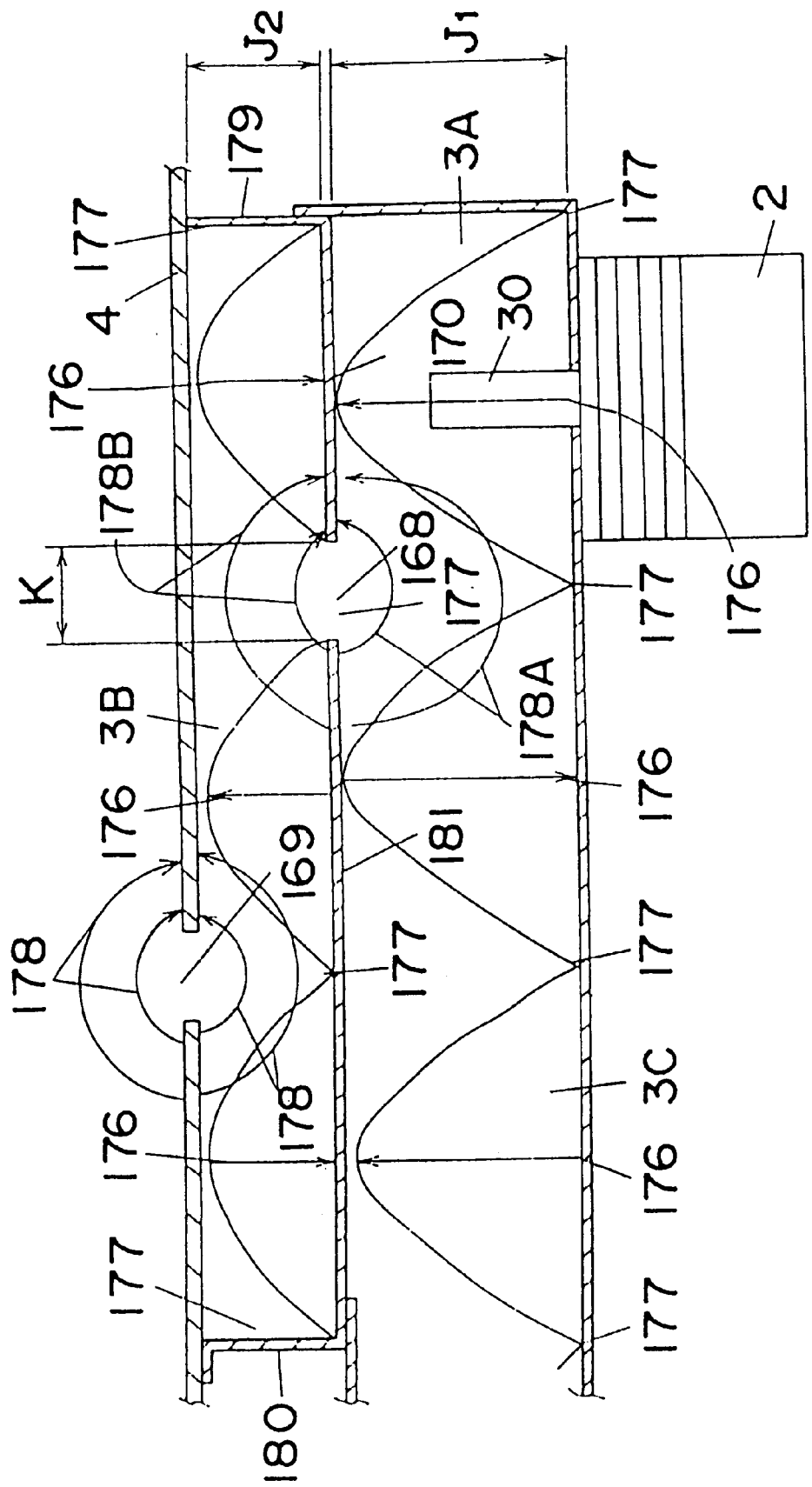
FIG. 68 is a longitudinal view of an essential part of a high frequency heating apparatus according to a twenty-fifth embodiment of the present invention, particularly showing a distribution state of electric fields.

FIG. 68 is a sectional view showing the constitution of an essential part of a high frequency heating apparatus in a 25th embodiment of the present invention. The electromagnetic waves supplied from the antenna 30 of the magnetron 2 to the waveguide 3A generate strong electric fields (antinodes 176) and weak electric fields (nodes 177) every ¼ the guide wavelength $\lambda g$ after showing the maximum intensity (antinode 176) at the antenna 30, to be transmitted to the right and left of FIG. 68. Since right and left end faces of the waveguide are arranged to correspond to nodes of the electric field, the electric field in each waveguide 3B, 3C orderly repeats antinodes 176 and nodes 177. The guide wavelength $\lambda g$ is determined by a distance I in a widthwise direction in FIG. 68. Therefore, a degree of freedom is allowed to a distance J1 in a vertical direction, whereas a certain distance should be secured between the antenna 30 and the opposite wall face 170 in case of an abnormal state, e.g., discharging or the like brought about if the distance is too small (not larger than 5 mm). The diverging point 168 is formed to be the node 177 in the middle of the waveguides 3A and 3C so as to prevent the electric fields in the waveguides 3A and 3C from being disturbed, because an electric field 178A is generated to hold therein the diverging point 168 which is an opening for the electromagnetic waves. The electromagnetic waves transmitted from the diverging point 168 into the waveguide 3B similarly generate an electric field 178B to hold the diverging point 168 therein and are transmitted right and left with the same guide wavelength $\mu g$ because of the same distance I in the widthwise direction in FIG. 68. Since a distance from the diverging point 168 to a right end face 179 is set to be ½ $\lambda g$ and a distance to a left end face 180 is set to be ⅔ $\lambda g$, the electric field in the waveguide 3B repeats antinodes 176 and nodes 177 orderly. Moreover, since no projecting part like the antenna 30 is present in the waveguide 3B, a distance J2 in the vertical direction can be reduced so much as not to bring about discharging between wall faces. The sectional area of the waveguide 3B is reduced to half or smaller by setting J2<J1/2. If an opening distance K of the diverging point 168 is too large, the electromagnetic waves in the waveguides 3A and 3C are disturbed from the order state. If the distance K is too small, the energy transmitted to the waveguide 3B is decreased. Therefore, the distance K is set to be slightly smaller than ¼ the guide wavelength λg. Likewise, an opening distance of the opening 169 for transmitting the electromagnetic waves to the heating chamber 4 is set to be slightly smaller than ¼ λg. Furthermore, the waveguides 3A and 3C are set adjacent to the waveguide 3B thereby to share a wall face 181.

Figure 69:
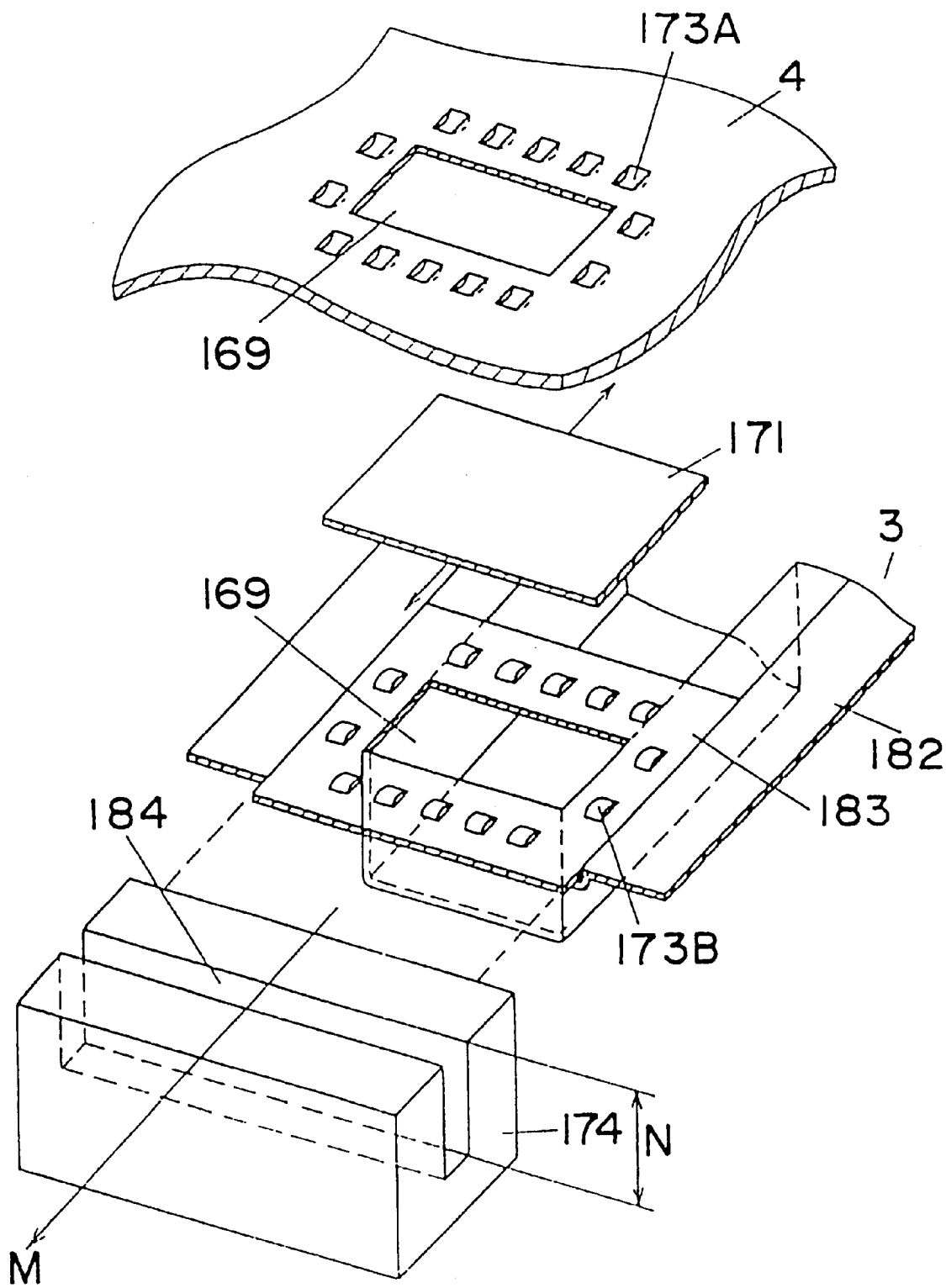
FIG. 69 is a perspective view of an essential part of a high frequency heating apparatus according to a twenty-sixth embodiment of the present invention.

FIG. 69 is a perspective view of the constitution of an essential part of a high frequency heating apparatus in a 26th embodiment. (Composing elements are actually connected with each other, but indicated in a separate state for easy understanding.)

Metallic projecting parts 173A and 173B are formed by notching in the heating chamber 4 and waveguide 3 respectively in a manner to surround the opening 169. (The waveguide 3 has a wall face part 182 and a projection part 183.) The projecting parts 173A and 173B project to face each other. The metallic shielding part 171 is constructed to be movable between the projecting parts 173A and 173B in touch with the projecting parts 173A and 173B. The electromagnetic waves in the waveguide 3 are transmitted into the heating chamber 4 only when the shielding part 171 is not present over the opening 169. The waveguide 3 and the heating chamber 4 are connected with each other so as to prevent the leak of the electromagnetic waves outside. Particularly, the leak of electromagnetic waves in an M direction is shut by a seal part 13. The seal part 13 is formed of metal having a groove of a depth of N. Since N≈λg/4, the electromagnetic waves are not transmitted to the M side from an upper surface 29 of the seal part 13. Generally, the impedance of the electromagnetic waves in the M direction (index showing how hard the electromagnetic waves are to transmit to the M side) is changed by N. The impedance is expressed by Zin=j·Z0·tan(2π·N/λg). When N=λg/4, |Zin|= Z0·tan(π/2)=∞ (the impedance is indefinite), and the electromagnetic waves are never transmitted to the M side from the position 184. This way of thinking of the impedance is the same as when a microstrip line often used in a wave seal device of the microwave oven or the like is considered. Many other embodiments are also proposed to make the apparatus compact (Japanese Patent Laid-Open Publication No. 6-13207).

FIGS. 70 and 71 show the constitution of an essential part of a high frequency heating apparatus according to a 27th embodiment of the present invention, wherein a plurality of openings 169A, 169B are switched by one driving part 172 and one shielding part 171.

Figure 70A:
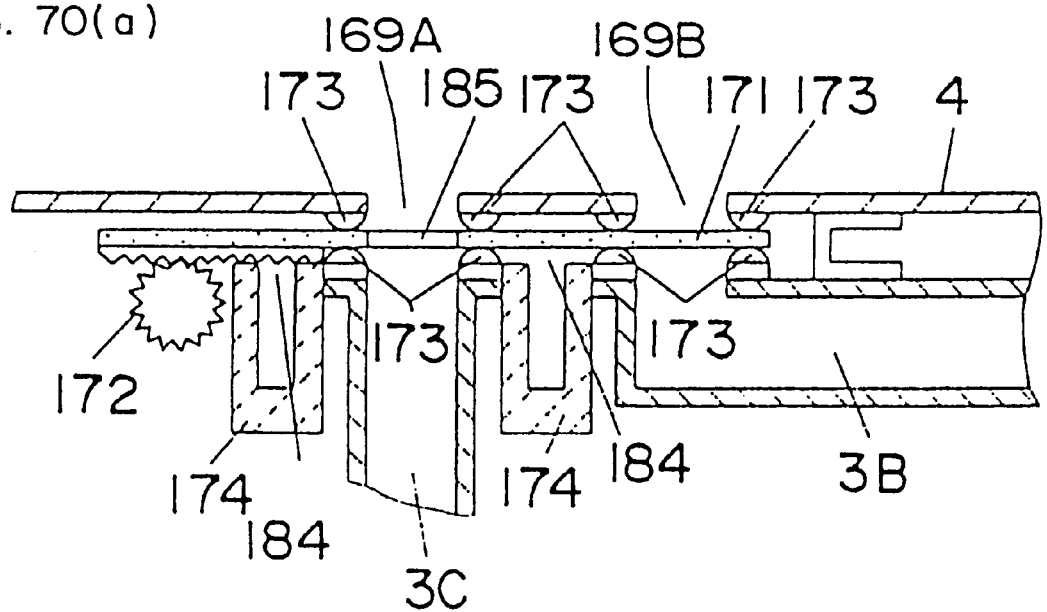
FIG. 70 is a view showing the constitution of an essential part of a high frequency heating apparatus according to a twenty-seventh embodiment of the present invention in a state where one of two openings is shielded, (a) being a. longitudinal sectional view and (b) being a top plan view.
Figure 70B:
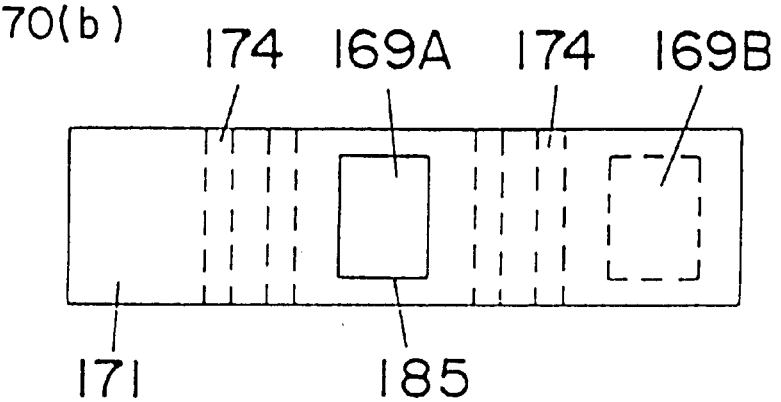

In FIG. 70, the opening 169A is opened while the other opening 169B is shut, specifically, FIG. 70(a) is a configurational sectional view and FIG. 70(b) is a view of a part below the shielding part 171 of FIG. 70(a) seen from above. In accordance with the rotation of the gear-like driving part 172, the shielding part 171 operates while keeping in touch with the projecting part 173 between the heating chamber 4 and the waveguide 3B, 3C, whereby the openings 169A, 169B through which the electromagnetic waves are transmitted are switched. In this case, the opening 169A overlaps with a notch 185 of the shielding part 171 thereby to be opened, while the opening 169B is shut by the shielding part 171.

Figure 71A:
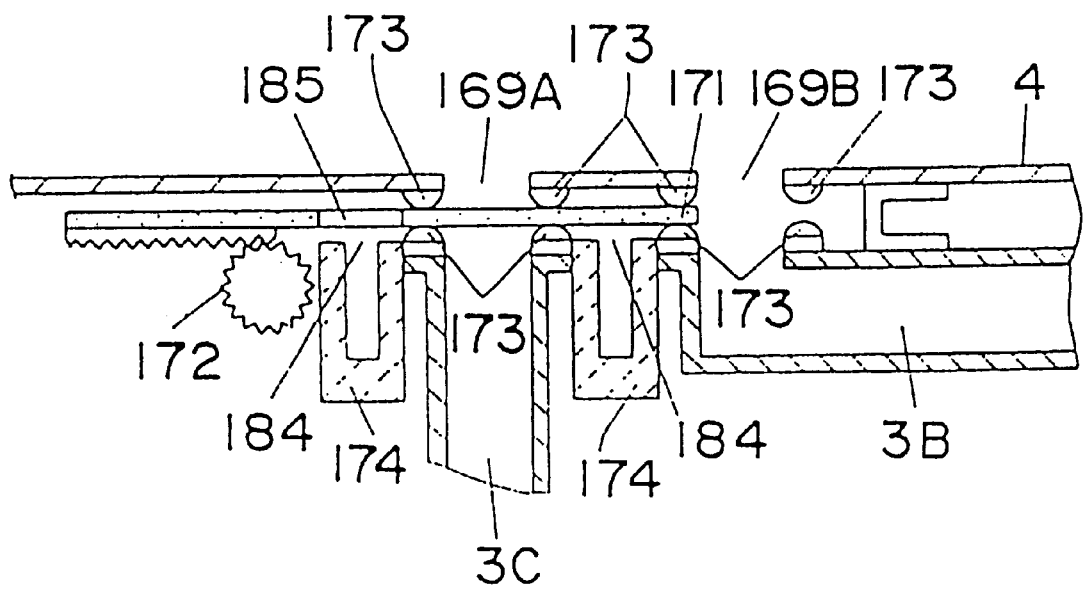
FIG. 71 shows a state where the other opening of FIG. 70 is shielded) (a) being a longitudinal sectional view and (b) being a top plan view.
Figure 71B:
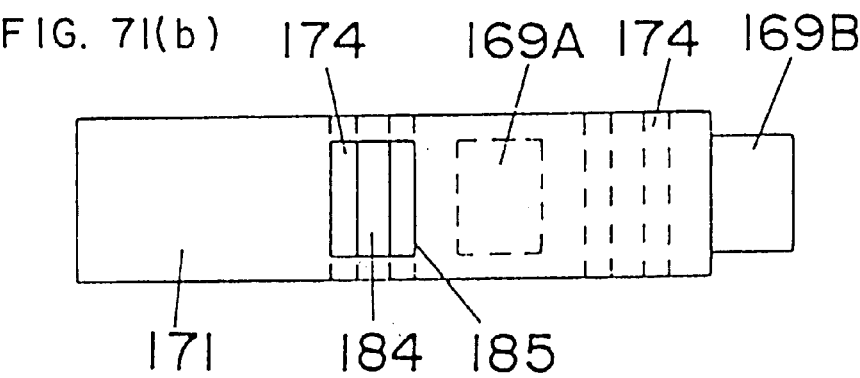

FIG. 71 shows a state where the opening 169A is shielded while the opening 169B is opened. FIG. 71(a) is a sectional view of an essential part and FIG. 71(b) is a view of the part below the shielding part 171 seen from above. In this case, the opening 169A is closed by the shielding part 171 and the opening 169B is shifted from the shielding part 171 and opened.

Figure 72:
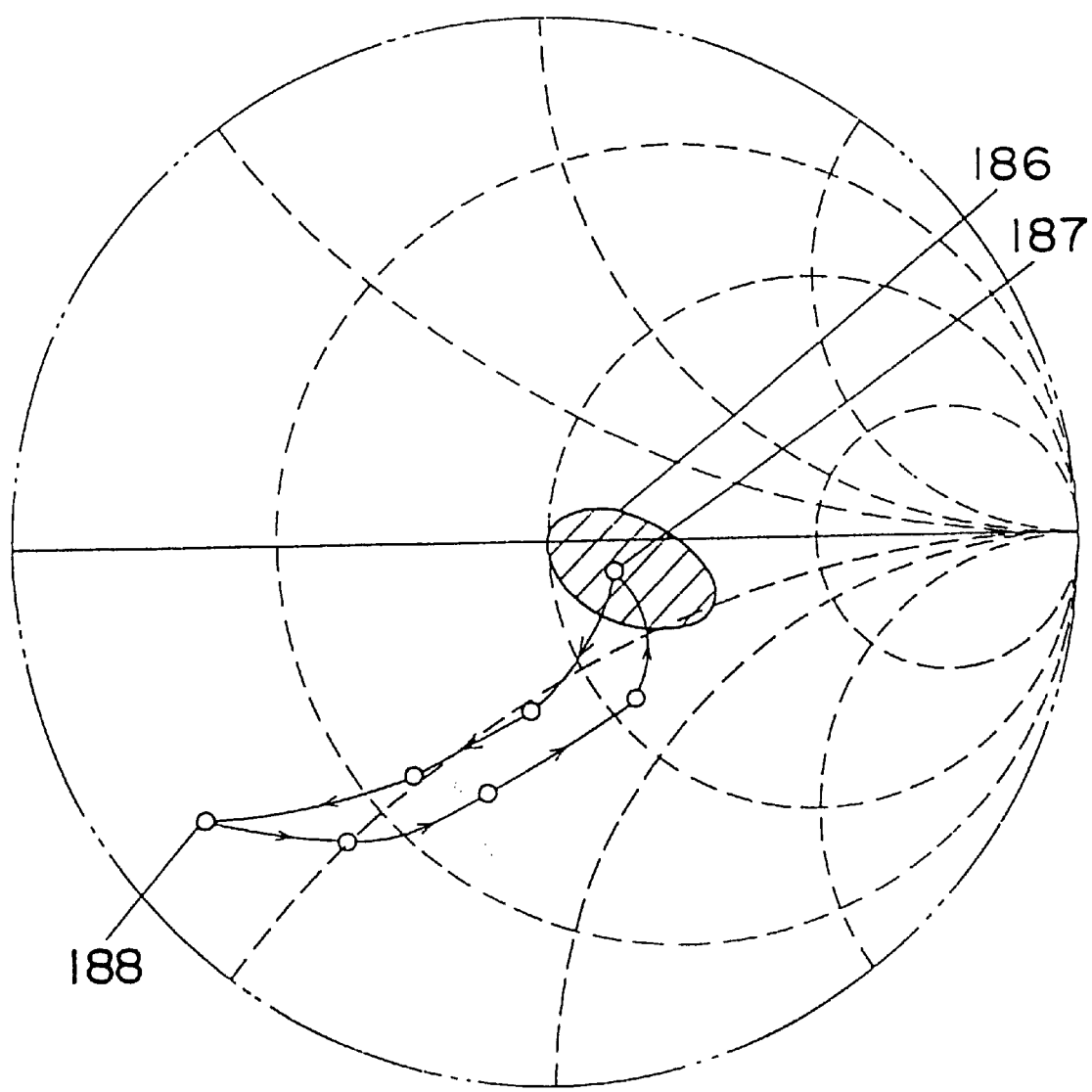
FIG. 72 is a Rieke diagram showing working points of a magnetron in the high frequency heating apparatus of FIG. 70.

FIG. 72 is a characteristic diagram of the high frequency heating apparatus, namely, a Rieke diagram representing working points of the magnetron 2 which shows how the electromagnetic waves are easy to enter the heating chamber 4. The electromagnetic waves are easiest to enter an area 186 and become harder to outer areas. When the electromagnetic waves are difficult to enter the heating chamber, the heating efficiency is clearly decreased to increase a loss by the generation of heat at the emission part. By way of example, in the case of switching the opening 169A to the opening 169B while the electromagnetic waves are continuously emitted, when a working point is 187 with the opening 169B being shut and the opening 169A opened, as the opening 169A and 169B are started to be gradually opened and closed, the working point 187 starts to move in a direction of an arrow, reaching a point 188 when both openings are half opened. The working point is returned to the point 187 when the openings are perfectly switched. In other words, there is brought about a state in the middle of the operation of the shielding part 171 that the electromagnetic waves become hard to enter the heating chamber. In the middle of the operation of the shielding part 171, not only the aforementioned loss at the emission part is increased, but the oscillation frequency is chanced or higher harmonic noises are generated, or the like inconveniences take place. The present invention solves this problem by controlling so as not to emit electromagnetic waves from the emission part when the shielding part 171 operates.

Figure 73A:
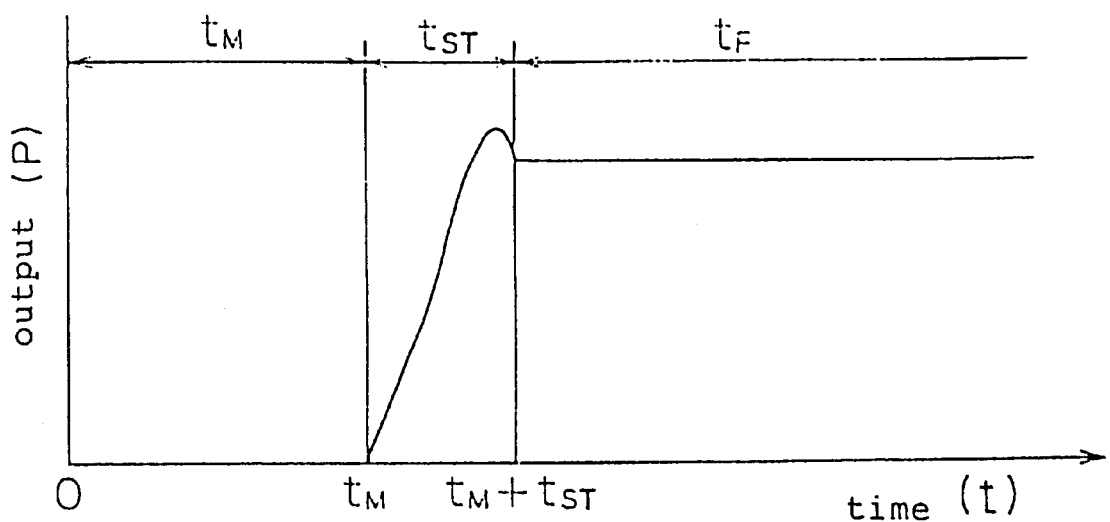
FIG. 73 is a characteristic diagram of a change of a high frequency output in the high frequency heating apparatus, (a) showing the output change in the prior art and (b) shoving the output change in the present invention.
Figure 73B:
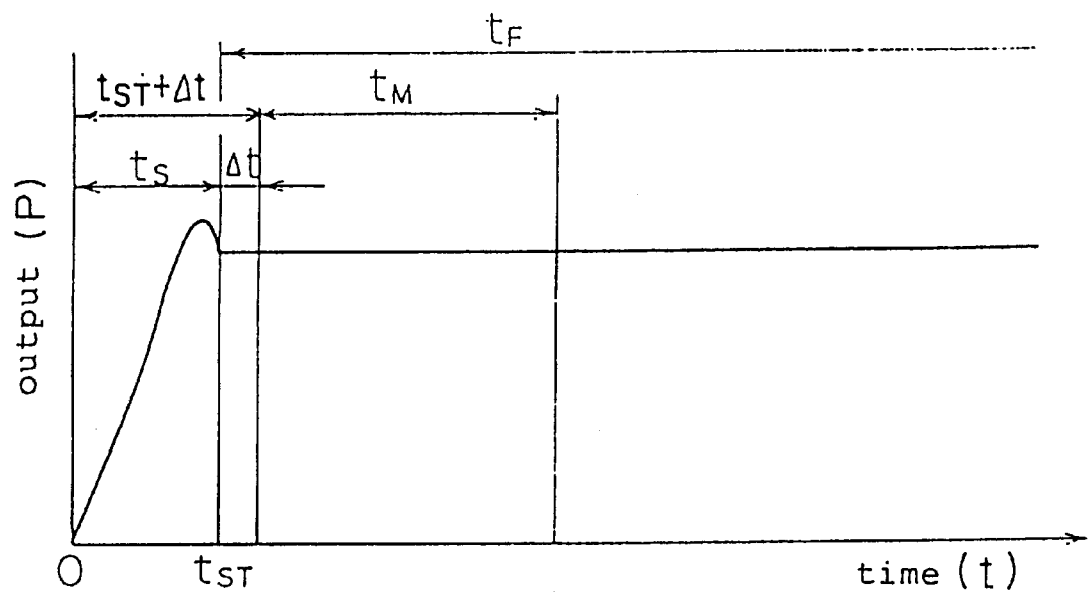

FIG. 73 is a characteristic diagram of the embodiment, an axis of ordinate showing the high frequency output P and an axis of abscissa showing the time t. In general, because of the instable state for a while $t_{ST}$ after the electromagnetic waves are emitted from the emission part, noises such as higher harmonics, etc. are apt to be generated. In order to eliminate this problem, conventionally, if a detection part not resistive to noises is employed to detect the state of the food 6 at the initial stage of heating, the food is detected while refraining the emission of the electromagnetic waves for $t_M$, then electromagnetic waves are emitted for $t_{ST}$ after the detection, and the heating reaches a stable state at $t_F$, as shown in FIG. 73(a). This manner of heating is considerably inefficient due to the non-heating time interval $t_M$. In contrast, according to the present invention, the electromagnetic waves are emitted immediately to start heating to reach the stable state at $t_F$ through $t_{ST}$ as soon as possible, as indicated in FIG. 73(b). The state of the food 6 at the initial stage is detected $t_{ST}+\Delta t$ later (soon after the heating state becomes stable). Therefore, the state of the food 6 can be detected accurately without lowering the heating efficiency.

Figure 74:
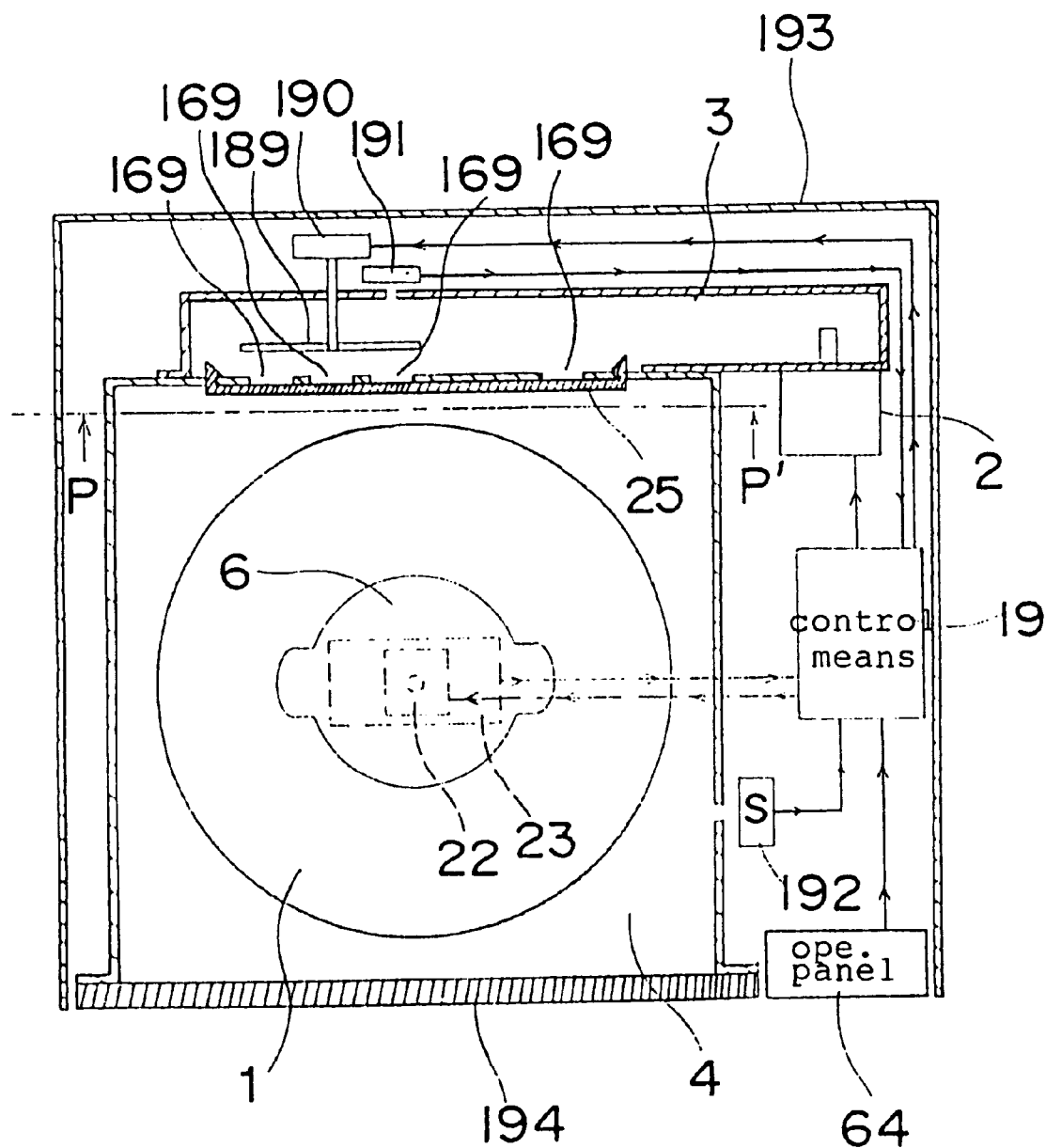
FIG. 74 is a view of the constitution of a high frequency heating apparatus according to a twenty-eighth embodiment of the present invention.

FIG. 74 is a sectional view showing the constitution of a high frequency heating apparatus of a 28th embodiment of the present invention.

The electromagnetic waves emitted from the magnetron 2 heat the food 6 on the turntable 1 in the heating chamber 4 via the waveguide 3. At this time, a plurality of openings 169 for guiding the electromagnetic waves from the waveguide 3 to the heating chamber 4 are covered with a transparent cover 25 made of a low dielectric loss and which is hard to absorb electromagnetic waves. A metallic stirrer vane 189 is set as a rotary body in the waveguide 3, which is driven and rotated by a stepping motor 190. The stirrer vane 189 assumes various operation patterns depending on purposes, and therefore a moving distance of the vane from a reference point is always monitored by a vane position detector 191. The control means 19 controls the emission of electromagnetic waves from the magnetron 2, driving of the stepping motor 190 by determining the operation pattern of the stirrer vane 189 or driving of the motor 22 by determining the rotation and stop of the turntable 1, based on signals from the operation panel 64 input through the key by the user, the weight sensor 23 or a state sensor 192 including other sensors such as the temperature sensor, etc., and the vane position detector 191. The apparatus has a body cover 193 and a freely openable and closable door 194.

The plurality of openings 169 are switched by the position of the stirrer vane 189, thereby to change the heating distribution. At the same time, the matching state can be changed. Since the position or the rotation of the stirrer vane 189 is freely set in conformity with the signal from the operation panel 64, weight sensor 23 or the other state sensor 192, the heating distribution or matching state fit to the heating purpose is attained. Moreover, since the rotation and stop of the turntable 1 is freely set as well, the food 6 can be uniformly heated in the concentric direction seen from the rotational center of the turntable by rotating the turntable 1 or, stopping the turntable 1 to improve the matching state if the food 6 is milk or soup, that is, liquid.

Figure 75:
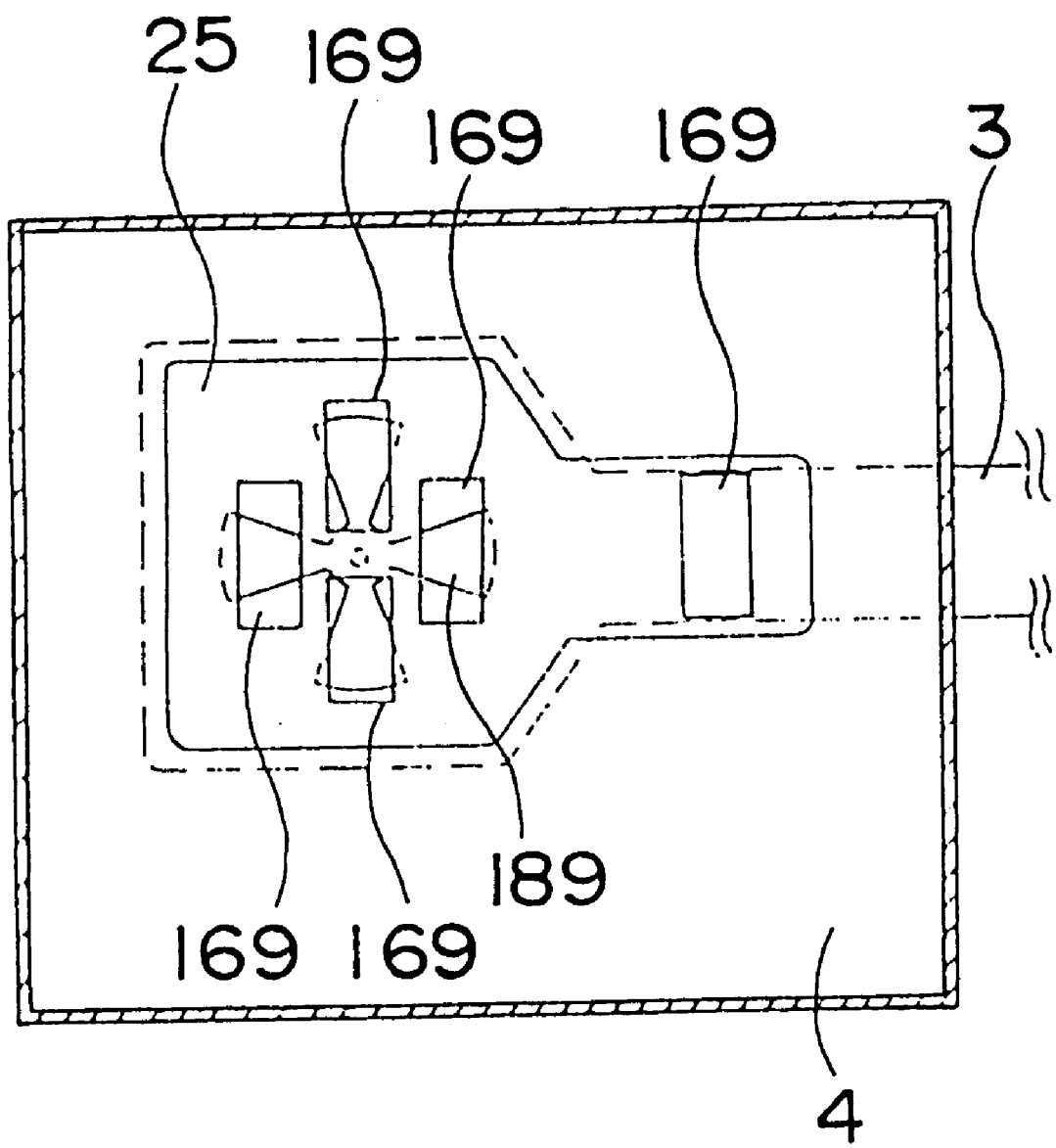
FIG. 75 is a sectional view taken along the line P—P' in FIG. 74.

FIG. 75 is a sectional view taken along the line P—P' of FIG. 74.

The waveguide 3 is widened in the middle, having the stirrer vane 189 installed therein. Since the opening cover 25 is transparent, the operation of the stirrer vane 189 is seen through five openings 169.

Figure 76:
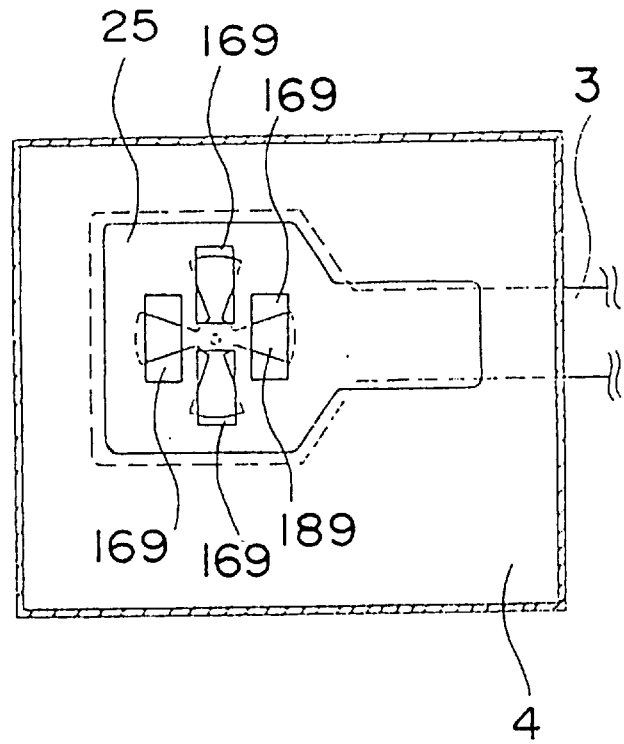
FIG. 76 is a sectional view of a high frequency heating apparatus; according to a twenty-ninth embodiment of the present invention, which corresponds to FIG. 75.
Figure 77:
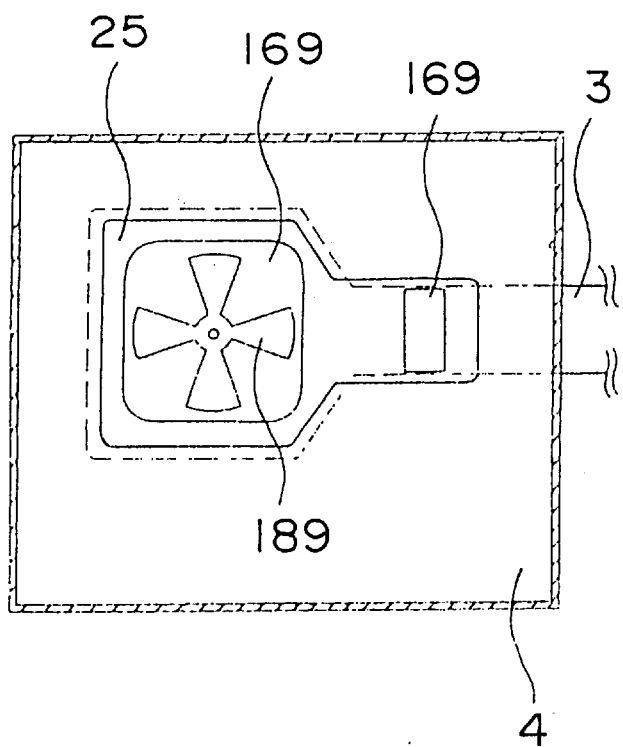
FIG. 77 is a sectional view of a high frequency heating apparatus according to a thirtieth embodiment of the present invention, which corresponds to FIG. 75.

FIGS. 76 and 77 are sectional views of high frequency heating apparatuses in a 29th and 30th embodiments of the present invention.

The apparatus of FIG. 76 has the openings 169 only in front of the stirrer vane 189, and the apparatus of FIG. 77 has only one opening 169 in front of the stirrer vane 189.

Although not shown in the drawings, the openings may be set farther than the stirrer vane 189 seen from the magnetron 2 depending on the shape of the heating chamber 4 or height of the turntable 1. Otherwise, the waveguide 3 may be extended in a vertical direction or slantwise direction, or a plurality of waveguides 3 may be extended in a plurality of directions, not in one direction from the magnetron 2 to constitute a plurality of openings 169. Further, the waveguide 3 may be bent astride two or three of the side faces, bottom face and top face of the heating chamber in addition to the rear face. The stirrer vane 189 may be constituted of a different number of vanes other than four. A simple plate or rod-like body may be used as the rotary body in place of the stirrer vane.

When milk is to be warmed, after the milk is set in the heating chamber 4, the milk key 65 of the operation panel 64 in FIG. 24 is manipulated and the start key 66 is pressed. The control means 19 judges from the signal of the operation panel 64 that the food 6 is milk and detects the amount, shape and temperature, etc. of the milk from the signals of the weight sensor 23 and state sensor 192. A suitable position for the stirrer vane 189 is consequently determined, and the stepping motor 190 is driven based on the signal from the vane position detector 191, when the electromagnetic waves are started to be emitted from the magnetron 2. The turntable 1 is kept still at this time to stabilize the matching state to efficiently heat. Thereafter, the milk is heated for a time determined by the weight sensor 23 or state sensor 192, and the heating is stopped when the milk becomes a suitable temperature. The milk is naturally heated in the good distribution by the convection and moreover in the stable appropriate matching state if the electric fields are concentrated onto the bottom face of the milk container.

Meanwhile, when frozen meat or fish is to be defrosted, the defrost key 68 is pressed after the food 6 is put in the heating chamber 4, followed by the pressing of the start key 66. The control means 19 judges from the signal of the operation panel 64 that the food 6 is a frozen food, detecting the amount, shape, temperature and the like data of the frozen food based on signals from the weight sensor 23 and state sensor 192 and determining a suitable revolution number of the stirrer vane 189. As a result, the stepping motor 190 is driven and rotated, and the electromagnetic waves are started to be emitted from the magnetron 2. At this time, the turntable 1 as well as the stirrer vane 189 is rotated to avoid the partial concentration of electric fields as much as possible. Subsequently, the food is heated for a time determined by the weight sensor 23 or state sensor 192 and stopped to be heated when reaching an appropriate temperature (completely defrosted). The food is undesirably partially boiled if the electric fields are concentrated and therefore the distribution is an important factor in the case of defrosting. Because of this reason, the distribution should be taken into primary account regardless of the deterioration of the efficiency.

When the food that has turned cold is to be warmed again (reheated), the start key 66 is depressed after the food 6 is set in the heating chamber 4. The control means 19 judges from the signal of the operation panel 64 that the food 6 is required to be reheated, and detects the amount, shape, temperature and the like of the food from the signals of the weight sensor 23 and state sensor 192. Most characteristically, the control means 19 detects whether the food 6 is liquid, solid or in the middle state of liquid and solid. In a way for this detection, the turntable 1 is rotated initially for a short time and stopped thereby to vibrate the food 6 and a change of the vibration with time is detected. The method is based on the principle that the vibration continues for a long time if the food is liquid, and stops in a short time if the food is solid. Thereafter, a suitable operation of the stirrer vane 189 is determined and the stepping motor 190 is driven and rotated, whereby the electromagnetic waves are started to be emitted from the magnetron 2. When the food 6 is liquid, similar to the case of milk, the matching state is stabilized to heat efficiently by holding the turntable 1 still. On the other hand, if the food 6 is solid, the turntable 1 is rotated to uniform the concentric heating distribution. Further, if the food 6 is in the middle of solid and liquid, the turntable 1 is repeatedly rotated and stopped. The heating is continued for a time determined by the weight sensor 23 or state sensor 192, or stopped when the food reaches a proper temperature. In the case of the liquid food 6, if the electric fields are concentrated at the bottom face of the food even when the turntable is stopped, the heating distribution is naturally good by the convection, and the matching state is stable and proper, thereby improving the heating efficiency.

Figure 78:
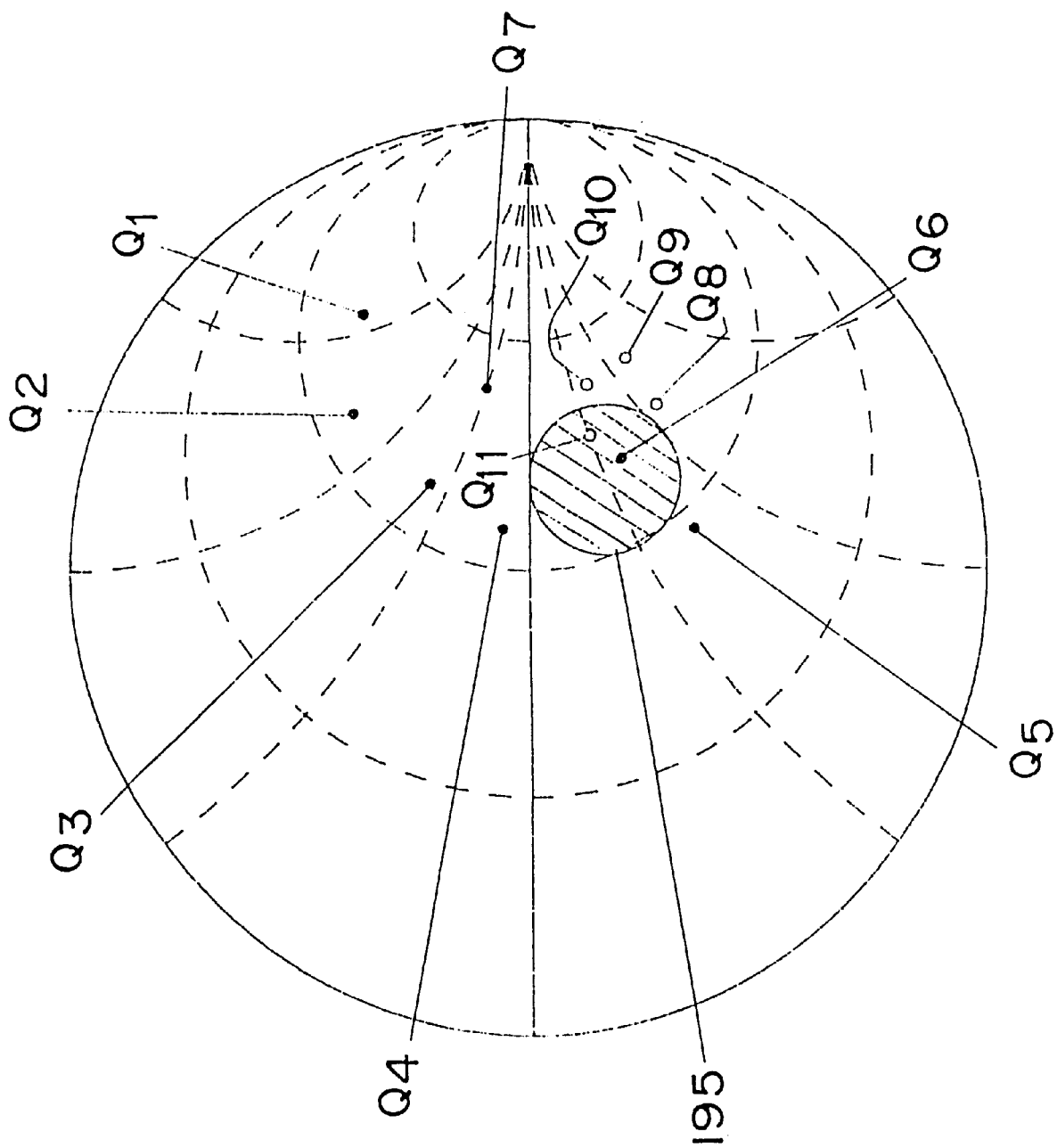
FIG. 78 is a Smith chart of a heating efficiency characteristic of the high frequency heating apparatuses of the twenty-eighth, twenty-ninth and thirtieth embodiments, indicating a matching state of a load seen from a magnetron.

FIG. 78 is a characteristic diagram of the heating efficiency in this embodiment. FIG. 78 is a Smith chart indicating the matching state of a load seen from the magnetron 2. A hatched area 195 is a high efficiency area (where the electromagnetic waves enter the heating chamber 4 most efficiently). When the stirrer vane 189 is rotated while the turntable 1 is stopped, the heating efficiency for the food 6 assumes a characteristic change of Q1-Q2-Q3-Q4-Q5-Q6-Q7-Q1 . . . . That is, the matching state is changed by the position of the stirrer vane 189. When the turntable 1 is rotated with the stirrer vane 189 stopped at a characteristic position Q6, the heating efficiency shows a characteristic change of Q6-Q8-Q9-Q10-Q11-Q6-Q10-Q11-Q6- . . . . In other words, the matching state is changed by the rotation of the turntable 1.

In short, the matching state can be changed by the position of the stirrer vane 189 and the turntable 1.

In order to heat most efficiently, the stirrer vane 189 should be stopped at the characteristic position Q6 with the turntable 1 held still. Needless to say, although both of the turntable and stirrer vane are required to be rotated in some cases for the purpose of the distribution as when the frozen food is defrosted, both can be stopped to achieve the optimum efficiency if the food 6 is liquid. However, since the characteristic diagram of FIG. 78 changes depending on the material, shape, location, temperature, etc. of the food 6, the optimum position of the turntable 1 and stirrer vane 189 should be preliminarily stored as a database in a microcomputer of the control means 19 for every condition of the material, shape, location, temperature, etc. of the food 6, or the matching state should be detected by the state sensor 192 or the like. The control means 19 can accordingly execute the control for optimum heating on the basis of the data from the operation panel 64, weight sensor 23, state sensor 192, etc. and the above database.

Figure 79:
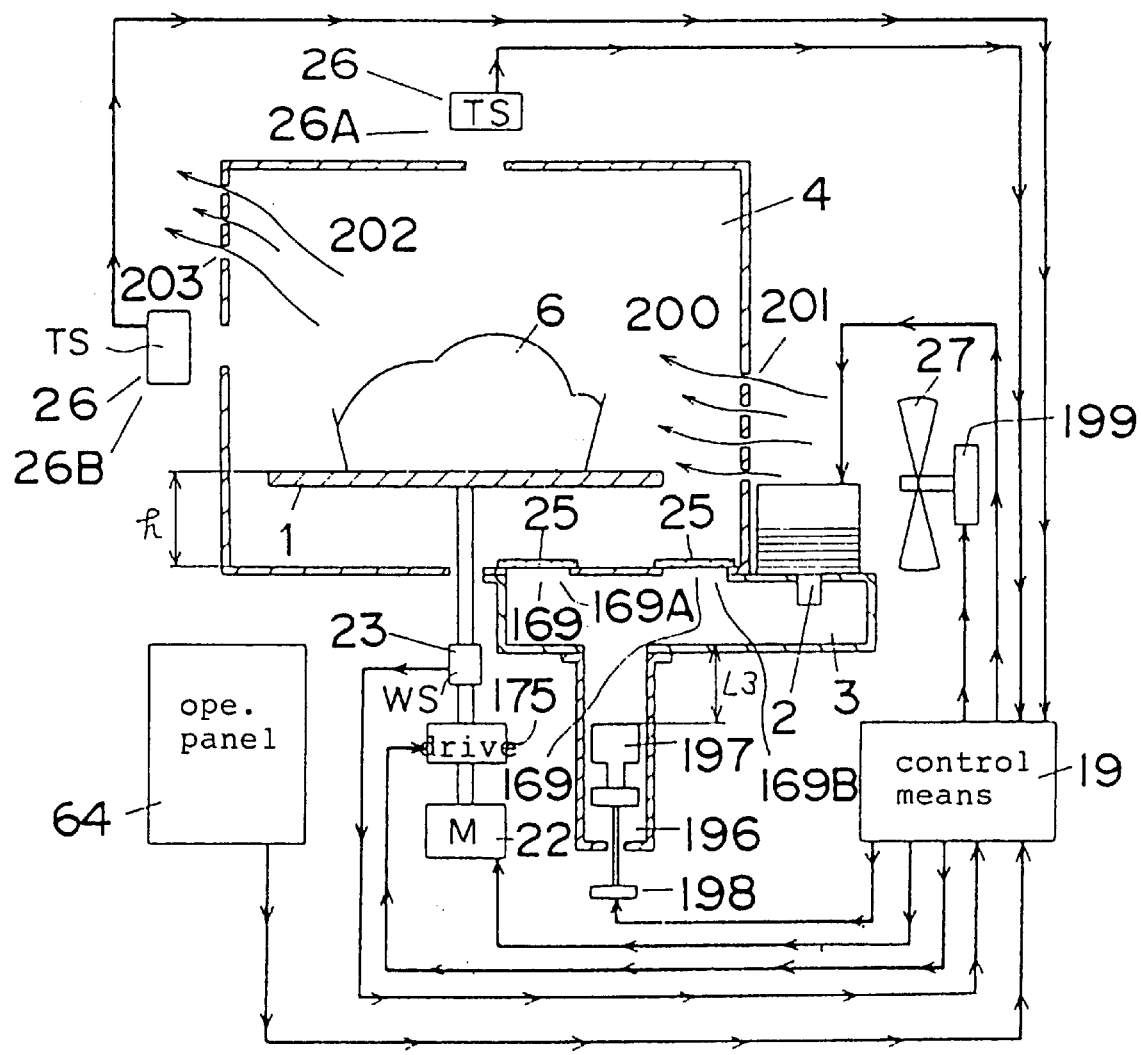
FIG. 79 is a view showing the constitution of a high frequency heating apparatus according to a thirty-first embodiment of the present invention.

FIG. 79 is a sectional view indicating the constitution of a high frequency heating apparatus of a 31st embodiment of the present invention.

The food 6 on the turntable 1 in the heating chamber 4 is heated by electromagnetic waves emitted from the magnetron 2 via the waveguide 3. A plurality of openings 169 are formed in the bottom face of the heating chamber 4 so as to guide the electromagnetic waves from the waveguide 3 to the heating chamber 4. The waveguide 3 has a sub waveguide 196 branching at a position between the plurality of openings 169A and 169B. There are provided a seal part 197 moving up and down in the sub waveguide 196, a seal driving part 198 for driving the seal part 197 or the transparent cover 25 formed of a low dielectric loss and which is hard to absorb electromagnetic waves. Based on signals from the operation panel 64 input through the key by the user, weight sensor 23 connected to the turntable 1 for detecting the weight of the food 6 or temperature sensor 26 detecting the temperature of the food 6, the control means 19 controls the emission of electromagnetic waves from the magnetron 2, impresses signals to the seal driving part 198 thereby to move the seal part 197, to the motor 22 rotating the turntable 1 thereby to control the rotation of the turntable, to the height driving part 175 thereby to change the height of the turntable 1, or to a fan driving part 199 to control the rotation of the fan 27 cooling the magnetron 2 and sending the air to the heating chamber 4.

When the seal part 197 is changed in position by the seal driving part 198, the plurality of openings 169A and 169B are switched thereby to change the electric field distribution. Particularly, the position of the seal part 197 can be freely set in accordance with the signal from the operation panel 64, weight sensor 23 or temperature sensor 26, and therefore the electric field distribution is generated suitably in conformity with the heating purpose. Although not shown in Fig,. 79, a reference point may be set for the seal part 197, whereby the position of the seal part 197 is easily managed and correctly detected from a moving distance from the reference point.

When the height of the turntable 1 is changed by the table height driving part 175, the height of the food 6 is changed accordingly. Therefore, the heating distribution of the food 6 can be changed even with the same distribution of electric fields. Likewise, when the height of the turntable 1 is adjusted optimally in accordance with a difference in electric field distribution due to the. position of the seal part 197 or based on the signal from the operation panel 64, weight sensor 23 or temperature sensor 26, the heating distribution fit to the heating purpose is realized. Similar to the seal part 197, the turntable 1 may be controlled by its reference position (not shown) and moving distance to be correctly positioned in a vertical direction.

The temperature sensor 26 comprises a temperature sensor 26A which monitors the food 6 from above the top face of the heating chamber 4 thereby to detect temperatures of a plurality of points of the food in a horizontal direction and temperature changes, and a temperature sensor 26B which monitors the food 6 from above a side face of the heating chamber thereby to detect temperatures at a plurality of points of the food in a vertical direction and temperature changes. The temperature sensor 26 can hence detect the temperature distribution of nearly the entire food 6. Needless to say, the temperature distribution can be detected if only the temperature sensors 26 are set at two points anywhere, even not in the horizontal and vertical directions.

Although the turntable 1 is generally rotated thereby to uniform the heating distribution in the concentric direction of the food 6 seen from the rotational center of the turntable 1, the rotation and stop of the turntable 1 can be freely set by the motor 22 or varied in speed. For example, when the temperature sensor 26 detects in the middle of the heating that a temperature irregularity is brought about, the heating distribution is changed by the seal part 197 or table height driving part 175 to search for a state whereby the temperature irregularity is resolved, and consequently the turntable 1 is stopped or decelerated in the state. The temperature irregularity can be eliminated quickly.

Further, the fan 27 is so constituted as to cool the magnetron 2 and send air 200 to the heating chamber 4 through an air suction port 201. Since the air 200 is hot because of the heat of the magnetron 2, the air is effective to heat the food 6 if the food 6 is cold or cool the food 6 if the food 6 has high temperatures. In any case, the air 200 averages the ambient temperature of the food 6. A revolution number of the fan 27 is increased if the temperature irregularity is large, thereby to increase the amount of the air 200, thus further uniforming the heating distribution. The air 200 becomes a discharge air 202 after uniforming the temperature of the food 6 and is let out of the heating chamber 4 through a discharge port 203. The amount of the air can be increased also by enlarging an opening size of the air suction port 201, facilitating the flow of the air into the heating chamber 4 with the use of a guide or the like, or the like manner.

Figure 80:
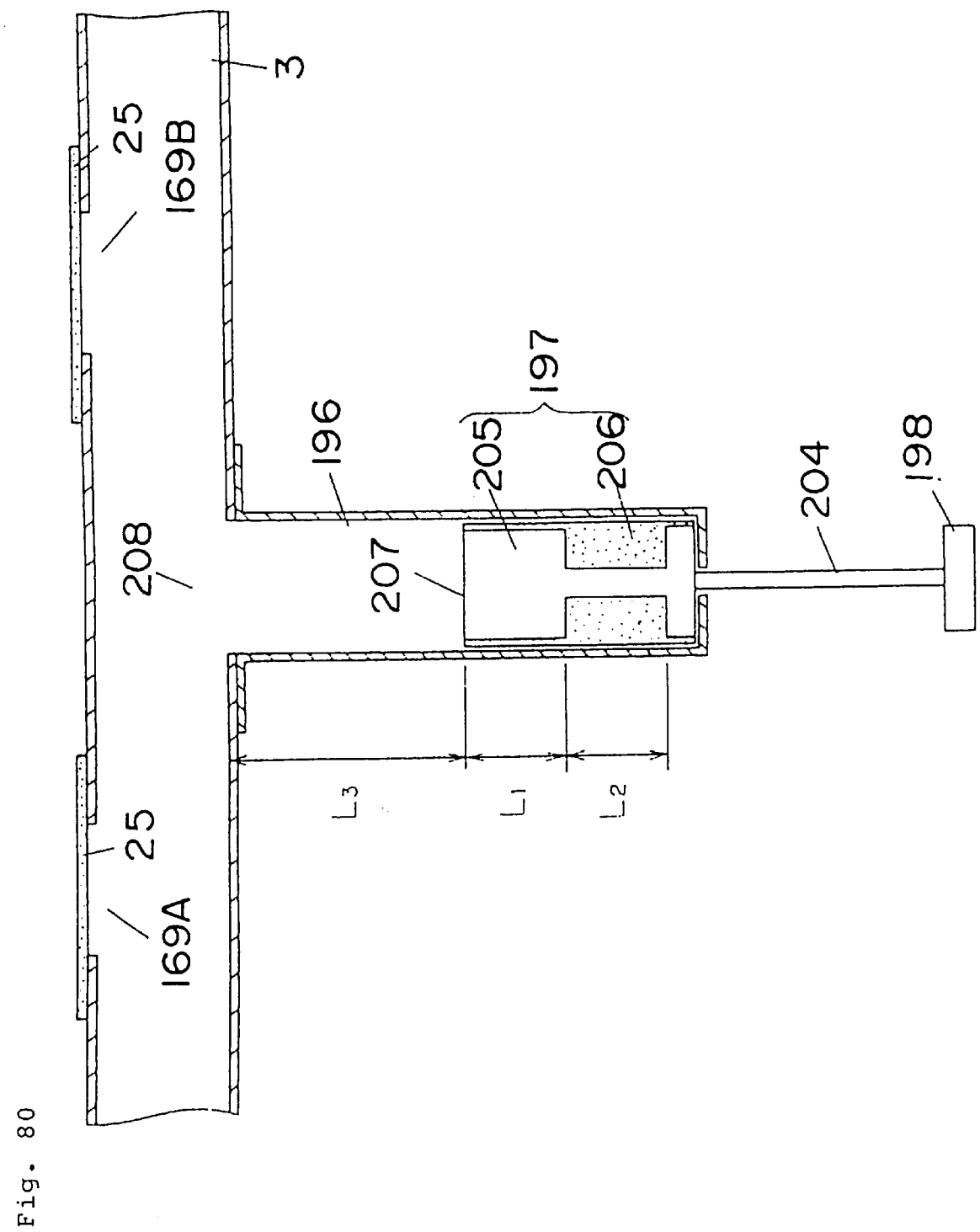
FIG. 80 is a longitudinal sectional view of an essential part of the high frequency heating apparatus of FIG. 79 in a state where a seal part is lowered.
Figure 81:
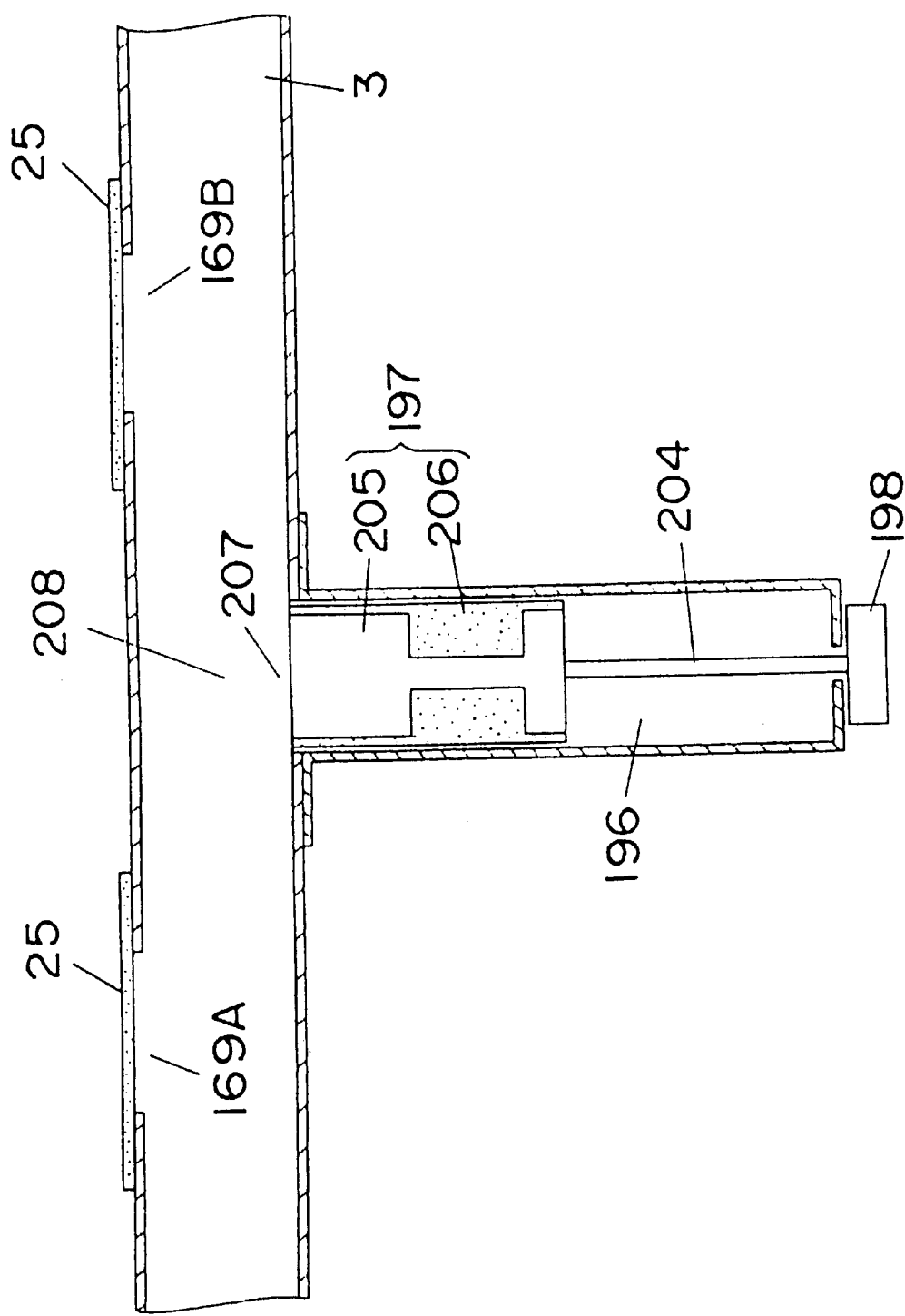
FIG. 81 shows a state where the seal part of FIG. 80 is raised.

FIGS. 80 and 81 show the structure of an essential part of the high frequency heating apparatus of the 31st embodiment. The openings 169A and 169B are apparently switched by the seal part 197 operating in the sub waveguide 196.

In FIG. 80, the seal part 197 is pulled to the lowest end in the sub waveguide 196 subsequent to the movement of a driving shaft 204 by the seal driving part 198. The seal part 197 is obtained by covering the periphery of a conductive member 205 with a spark prevention insulating body 206. The electromagnetic waves are not transmitted to a lower side than an end face 207 of the seal because $L1 \approx L2 \approx \lambda/4$ is satisfied. In the meantime, the impedance of the electromagnetic waves at a position 208 in the vicinity of a connecting point between the waveguide 3 and the sub waveguide 196 (easiness for the electromagnetic waves coming from the right direction in the drawing in the waveguide 3 to run left from the position 208) is changed by a length L3. More specifically, the impedance Zin=j·Z0·tan(2π·L3/λg). When L3=λg/4 is held, |zin|=Z0·tan(π/2)=∞ (the impedance is indefinite), and the electromagnetic waves are never transmitted left from the position 208.

In FIG. 81, the seal part 197 is pulled up to the uppermost end in the sub waveguide 196 as a result of the movement of the driving shaft 204 by the seal driving part 198. In this case, L3 is equal to 0 and |Zin|=Z0·tan(0)=0 (the impedance is 0) is held, whereby the electromagnetic waves are readily transmitted left from the position 208.

Accordingly, the opening 169 is apparently opened and closed by the position of the seal part 197. FIGS. 80 and 81 are based on the same concept of the impedance as in the microstrip line, and can be embodied into other examples.

Figure 82:
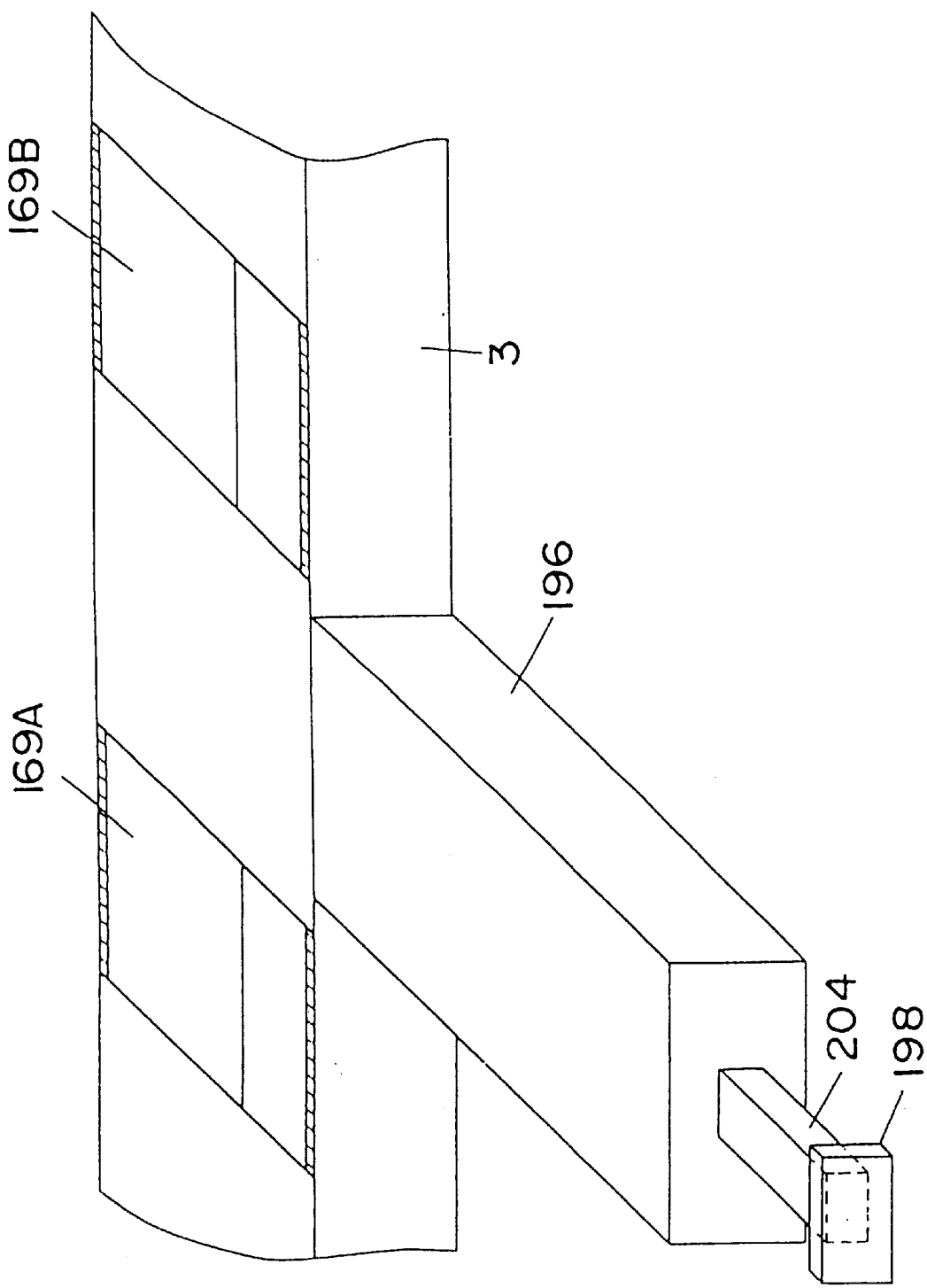
FIG. 82 is a perspective view of an essential part of a high frequency heating apparatus according to a thirty-second embodiment of the present invention.

FIG. 82 shows a 32nd embodiment of the present invention having the sub waveguide 196 connected in a different direction. Since the sub waveguide 196 occupies a smaller width under the bottom face of the heating chamber 4 in FIG. 82 than in FIGS. 79–81, the volume ratio of the heating chamber to the outer dimension is increased, realizing the compact high frequency heating apparatus.

FIGS. 83–89 are characteristic diagrams of the high frequency heating apparatus, views of an essential part of the apparatus and a flow chart respectively, indicating how the heating distribution is uniformed by a relation of the position of the opening 169 and height of the food 6.

Figure 83:
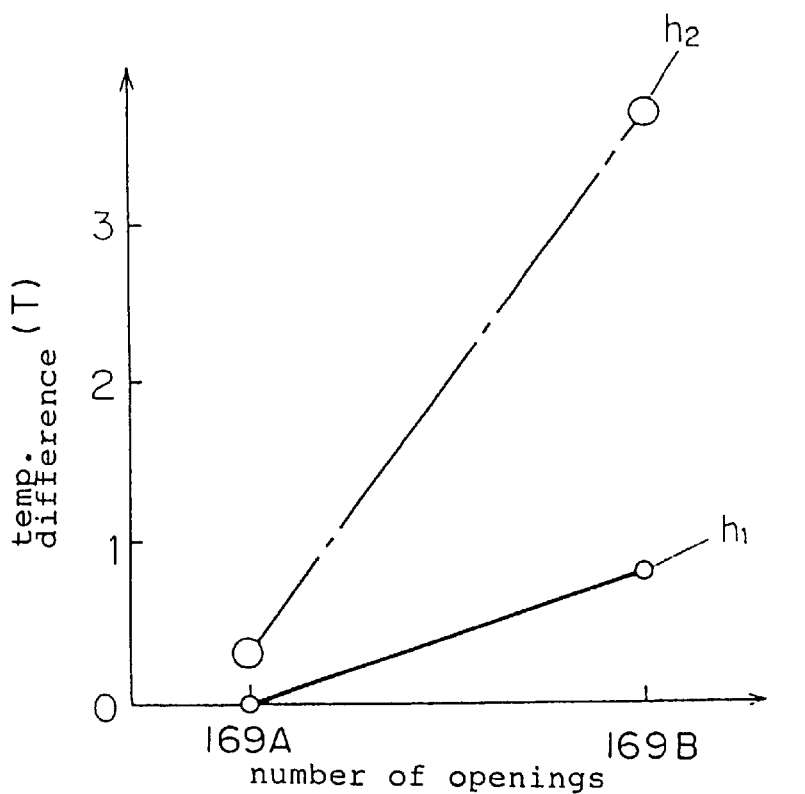
FIG. 83 is a characteristic diagram of a heating distribution irregularity when milk is heated in the high frequency heating apparatus of FIG. 82.

FIG. 83 is a characteristic diagram of a heating distribution irregularity detected when 200 cc of milk (a cup of milk) as the food 6 is heated while the electromagnetic waves are transmitted to the heating chamber 4 through either one of the openings 169A and 169B. The height h is changed during, the measurement. An axis of abscissa shows numbers of opened openings and an axis of ordinate indicates a difference of maximum and minimum temperatures measured at a plurality of points of the food. The smaller the temperature difference is, the less the temperature distribution irregularity is generated. A curve h1 is obtained when the height is 10 mm and a curve h2 is obtained when the height is 30 mm. From this characteristic diagram, the best condition is that the height h of the food is 10 mm with the opening 169A opened, with the effect of the temperature difference of 0°. Since the temperature difference is about 2–15° in the generally available microwave oven, the apparatus of the embodiment achieves a remarkable improvement. The diagram implies that it is good to concentrate the electric fields at the bottom face of the food 6 when the food 6 is liquid. The electromagnetic waves from the opening 169A heat the bottom face of the food 6, and accordingly the heating distribution is turned good due to the convection of the food 6 itself. The heating distribution irregularity in FIG. 83 when the opening 169B is used results from an increased temperature at an upper portion of the food 6. When the opening is separated from the bottom face of the food 6, that is, the height is large, the electromagnetic waves tend to enter the upper portion of the food 6 easily to cause the temperature rise at the upper portion of the food.

Figure 84:
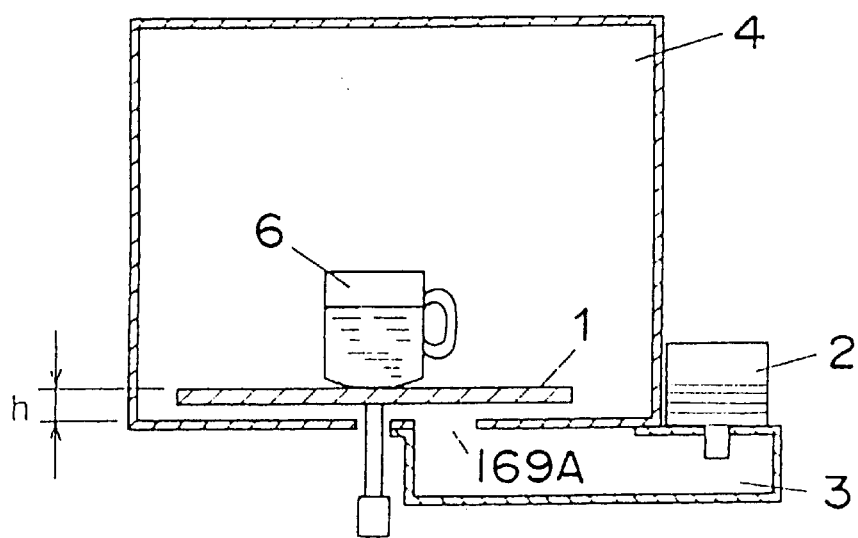
FIG. 84 is a schematic longitudinal sectional view of the high frequency heating apparatus under the optimum condition of FIG. 83.

FIG. 84 is a sectional view of the apparatus set under the optimum condition of FIG. 83, i.e., the height is 10 mm and the opening 169A is opened.

The key 65 in the operation panel 64 in FIG. 24 is constituted especially for milk. When the milk is to be warmed, after the milk is brought into the heating chamber 4, the milk key 65 is pressed and the start key 66 is then pressed. The control means 19 detects from the signal of the operation panel 64 that the food 6 is milk, and judging the amount, shape, temperature, etc. of the milk from the signals of the weight sensor 23 and temperature sensor 26, controls properly so that the height h is 10 mm and the opening 169A among the plurality of openings 169 is opened to radiate electromagnetic waves therethrough. Within a few minutes, the electromagnetic waves are started to be emitted from the magnetron 2. Thereafter, the heating is continued for a time determined by the weight sensor 23, temperature sensor 26 or the like and finished when the milk reaches a proper temperature. The milk is heated well with the good heating distribution in this manner.

Figure 85:
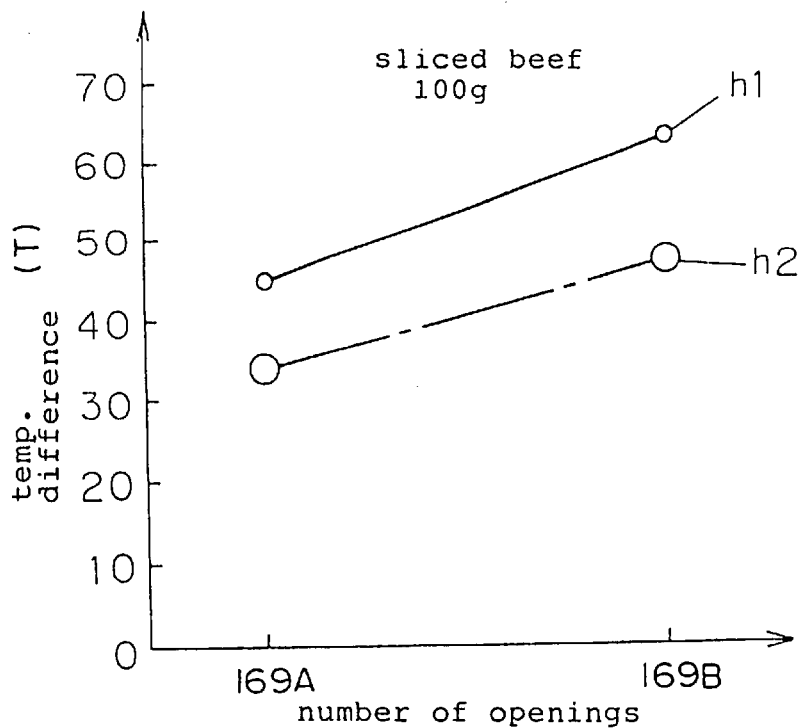
FIG. 85 is a characteristic diagram of the heating distribution irregularity when 100 g of frozen sliced beef is defrosted in the high frequency heating apparatus of FIG. 82.

FIG. 85 is a characteristic diagram when 100 g of sliced frozen beef as the food 6 is defrosted. The best condition is when the opening 169A is used and the height is 30 mm. Since the temperature irregularity in the general microwave oven is approximately 32–60°, the heating characteristic is improved in the embodiment. The 100 g sliced beef is of a representative shape among the food 6, that is, small in height (thickness t) and light in weight.

Figure 86:
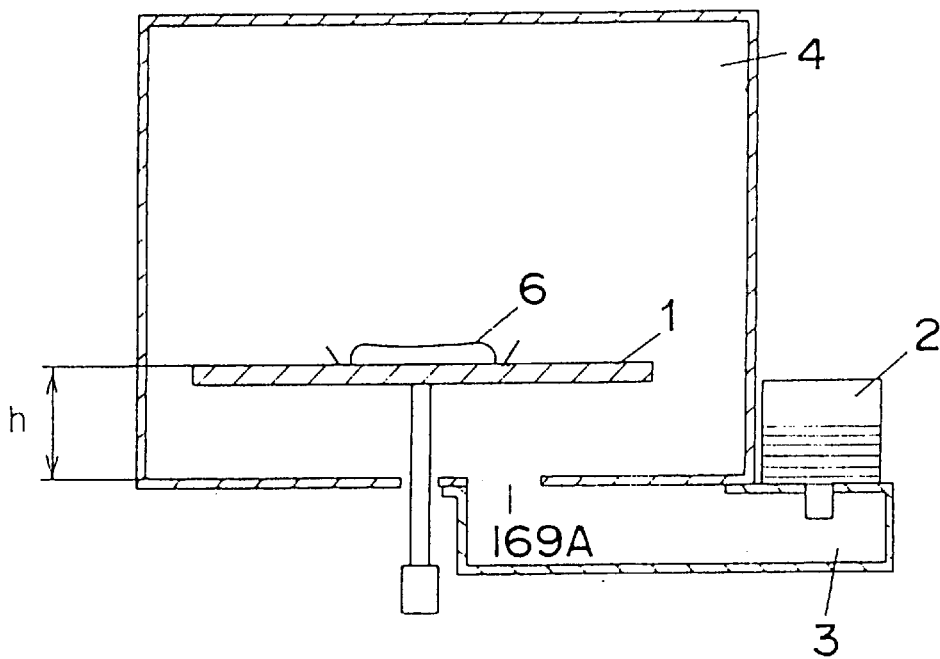
FIG. 86 is a schematic longitudinal sectional view of the high frequency heating apparatus under the optimum condition of FIG. 85.

FIG. 86 is a sectional view of an essential part of the apparatus with the opening 169A opened to the turntable 1 at a height of 30 mm, i.e., under the optimum condition of FIG. 85.

Figure 87:
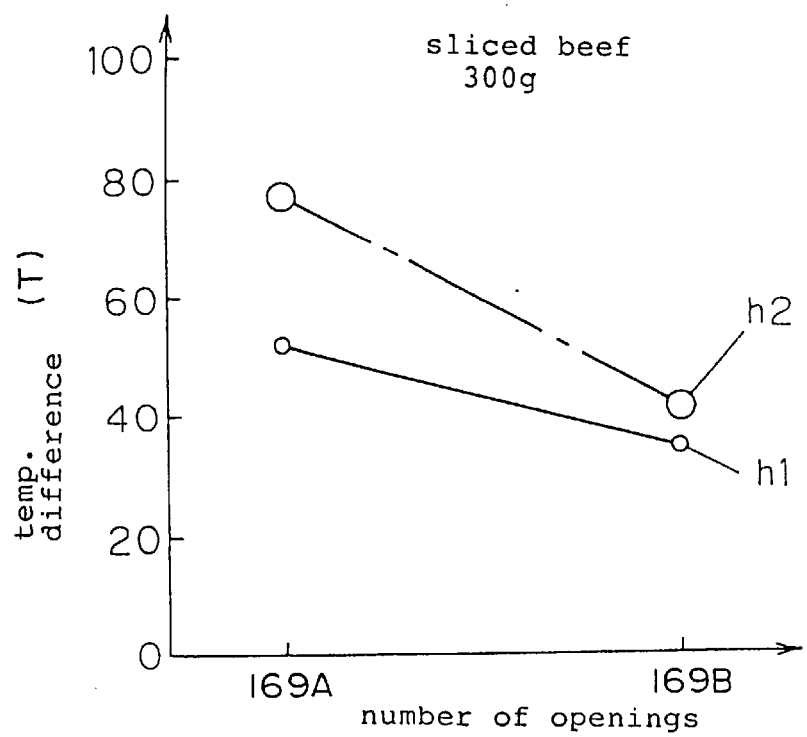
FIG. 87 is a characteristic diagram of the heating distribution irregularity when 300 g of frozen sliced beef is defrosted in the high frequency heating apparatus of FIG. 82.

FIG. 87 is a characteristic diagram when 300 g of frozen sliced beef as the food 6 is defrosted. The best condition is that the opening 169B is used and the turntable is at a height of 10 mm. Since the temperature irregularity of the general microwave oven measured in the same manner is approximately 32–75° C., the embodiment improves the irregularity. The 300g sliced beef is standard having a height (thickness t) and an ordinary weight.

Figure 88:
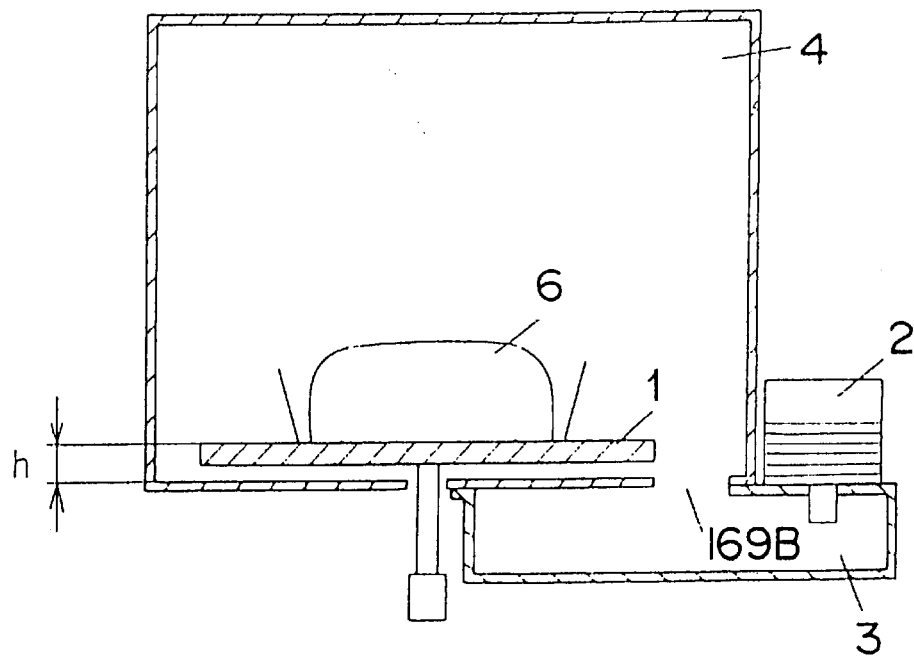
FIG. 88 is a schematic longitudinal sectional view of the high frequency heating apparatus under the optimum condition of FIG. 87.

FIG. 88 is a sectional view of an essential part of the apparatus when the opening 169B is used and the height is 10 mm, that is, under the optimum condition in FIG. 87.

When the user defrosts frozen meat, fish or the like frozen food, the user depresses the defrosting key 68 and the start key 66 on the operation panel 64 of FIG. 24 after sending the food in the heating chamber 4. In response to the signal from the operation panel 64, the control means 19 determines that the food 6 is a frozen food, and detecting the amount, shape, temperature and the like of the frozen food based on signals from the weight sensor 23 and temperature sensor 26, controls so that the proper opening 169 is selected and the proper height is set. Almost simultaneously with this, the emission of the electromagnetic waves from the magnetron 2 is started. Thereafter, the food 6 is heated for a time determined by the weight sensor 23 or temperature sensor 26, or stopped to be heated when the temperature becomes proper (the food is completely defrosted).

If the automatic cooking is carried out without using a special key, e.g., when the food turned cold is to be warmed again (reheated), the start key 66 is pressed after the food 6 is brought into the heating chamber 4. The control means 19 judges from the signal of the operation panel 64 that the food 6 is required to be reheated, and detects the amount, shape, temperature, etc. of the food based on signals from the weight sensor 23 and temperature sensor 26. What is to be most noted here is that the control means 19 makes judgment as to whether the food 6 is liquid or solid. For this judgment, the turntable 1 is rotated for a short time at the initial stage and stopped, thereby to vibrate the food 6, and a change of the vibration with time is detected. More specifically, the vibration continues for a long time if the food is liquid, while the vibration disappears shortly if the food is solid. Then, the control means 19 controls so that the proper opening is selected and the proper height is set. The electromagnetic waves are started to be emitted from the magnetron 2 soon thereafter, with the turntable 1 rotated again to uniform the concentric heating distribution. The food 6 is subsequently heated for a time determined by the weight sensor 23 or temperature sensor 26 and stopped to be heated when the food reaches the proper temperature. If the food 6 is liquid, similar to the case of milk, the food can be heated naturally in a good heating distribution due to the convection so long as the electric fields are concentrated onto the bottom face of the food.

In order to realize the uniform heating for any food 6 with eliminating irregularities in the heating distribution at all times, data of the optimum position of the opening 169 and the optimum height should be stored beforehand in the microcomputer of the control means 19 for every condition such as the material, shape, location, temperature, etc. of the food 6. This method makes it possible for the control means 19 to exert the control for optimum heating by comparing the outputs of the operation panel 64, weight sensor 23, temperature sensor 26, etc. with the database.

Figure 89:
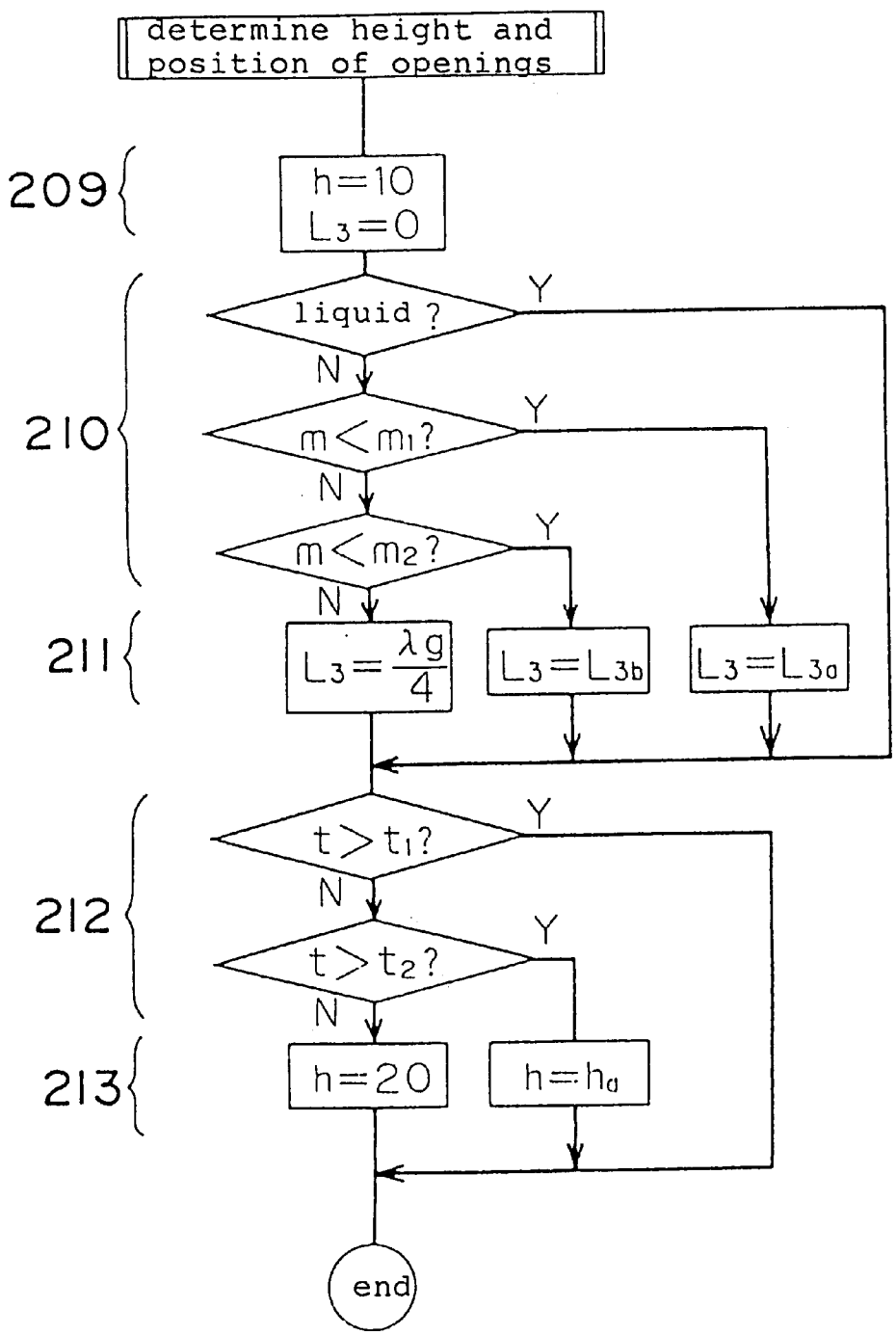
FIG. 89 is a flow chart of a sequence of procedures for determining a proper position of an opening and a proper height of food in an initial state in the constitutions of FIGS. 79–82.

FIG. 89 is a flow chart of an example of the above process for determining the optimum position of the opening 169 and the optimum height h of the turntable 1 in the constitution of FIGS. 79–82. A step 209 represents an initial state, wherein the height h is 10 mm and the seal part 197 is positioned at L3=0. In a step 210, it is detected by the weight sensor 23 whether the food 6 is liquid, the weight m of the food 6 is smaller than m1, or larger than m1 and smaller than m2, or larger than m2. In a step 211, the seal part 197 is moved by the seal driving part 198 to the proper position L3. In a step 212, the temperature sensor 26 and the other sensor is used to detect whether the height (thickness) t of the food 6 is larger than t1, or smaller than t1 and larger than t2, or smaller than t2. In a step 213, the food 6 is moved to the proper height h by the table height driving part 175. In the manner as described above, the optimum position of the opening 169 and the optimum height of the turntable are determined in accordance with the material (whether it is liquid or not), weight m, height (thickness) t of the food 6.

FIG. 89 indicates sequences when the proper position of the opening 169 and the proper height h of the turntable in the initial state are determined. The position of the opening 169 and the height of the turntable 1 may suitably be changed several times to feedback state changes of the food 6 (particularly, temperature changes of the food as the heating proceeds), thereby to eliminate the heating distribution irregularities.

The position of the opening 169 or the height h of the turntable 1 should be changed to attain the optimum heating distribution if the weight of the food 6 is different even when the food 6 is of the same material, as discussed before.

According to the present invention, every time the heating is finished, the opening 169A is selected and the height h is set to be 30 mm, in other words, the apparatus is set ready for a light-weight food 6 in order to prevent the heating distribution from not being improved in a short time because the light food requires merely the short heating time or prevent the short heating time from being lengthened if the heating is started with the poor heating efficiency. On the contrary, when the food 6 is heavy-weight, a long heating time is required, allowing the opening and the height to be changed. When the food 6 is actually heated, the emission of the electromagnetic waves from the magnetron 2 and the rotation of the turntable 1 are started, and the amount, shape, temperature, etc. of the food are detected from signals of the temperature sensor 26, weight sensor 23 or the other state sensor 192 (for example, photosensors 61, 62) in the middle of heating. Since the apparatus is set ready for heating the light-weight food 6 at the initial stage, if the food 6 is judged to be a large amount, the opening 169 and the height h are controlled and changed suitably, and thereafter the heating is conducted for a time determined and set by the user and stopped when the food becomes the proper temperature determined by the sensors.

FIGS. 90–95 are diagrams resulting from simulations of electric fields inside the high frequency heating apparatus.

Figure 90:
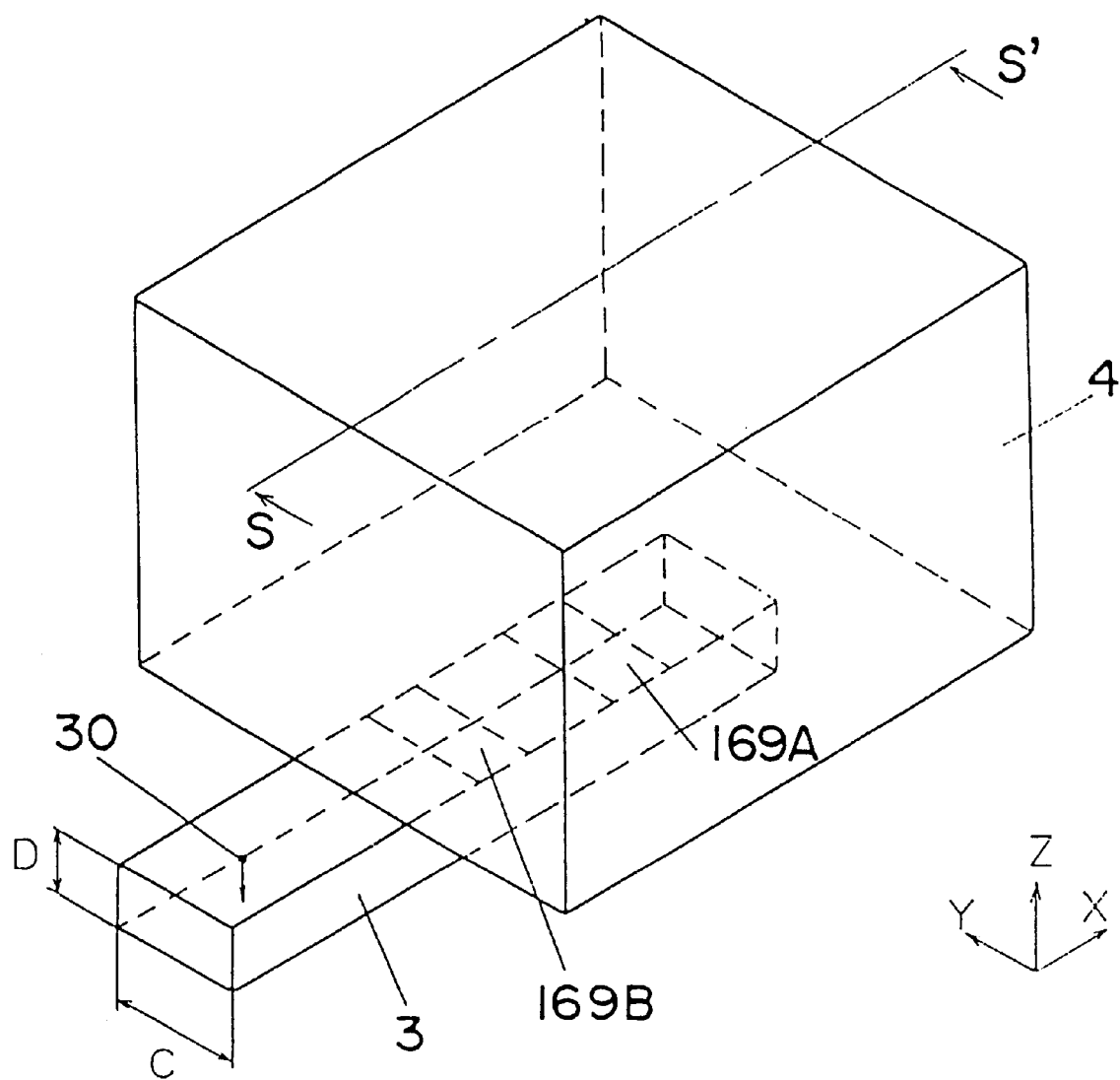
FIG. 90 is a view of a structure for simulating electric fields inside the high frequency heating apparatus.

FIG. 90 is a perspective view of the high frequency heating apparatus of one embodiment. The electromagnetic waves are excited and oscillated from the antenna 30 of the magnetron 2.

Figure 91:
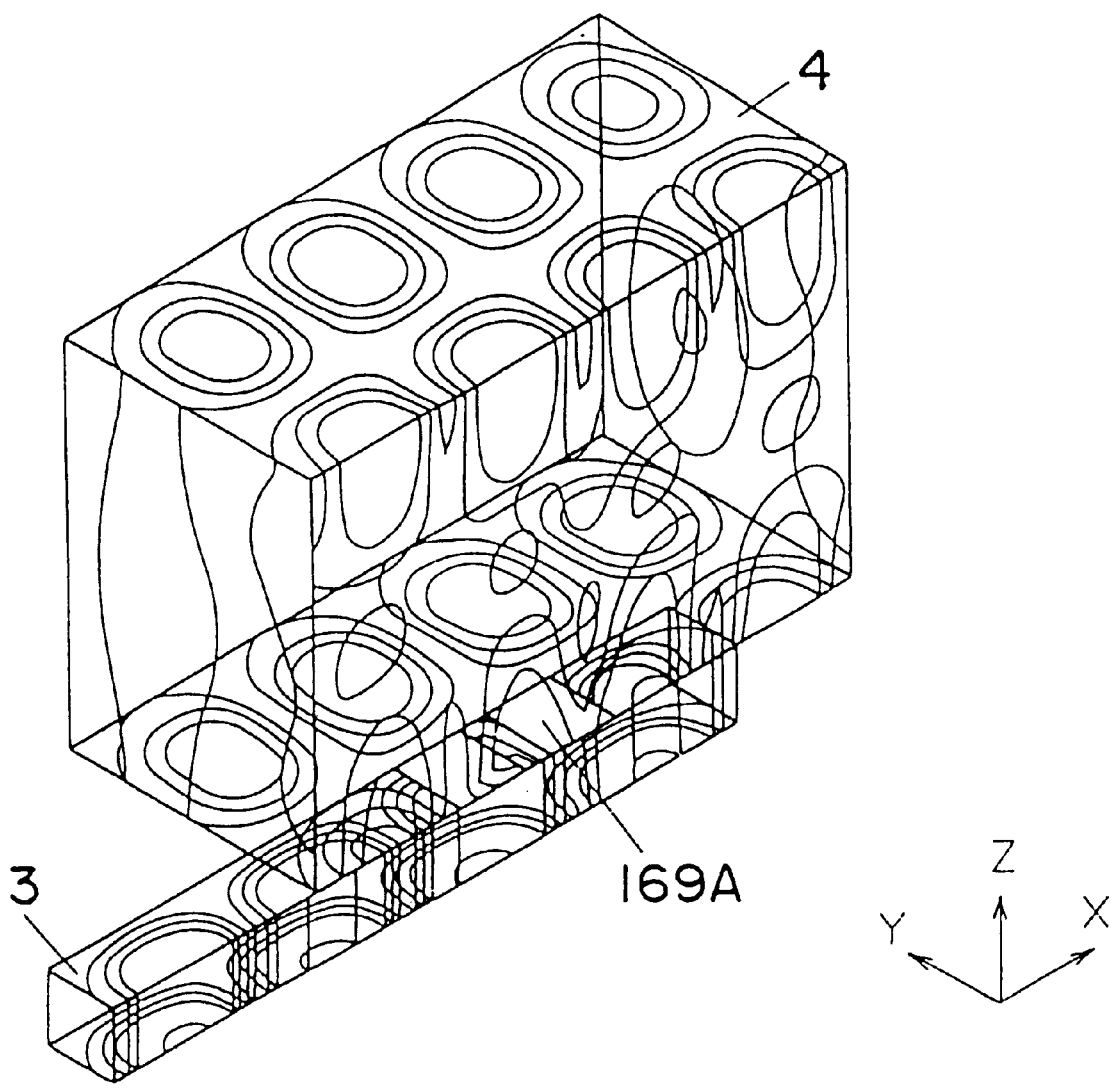
FIG. 91 is a perspective view taken along the line S—S' in FIG. 90 showing a characteristic of a simulation result when a first opening alone is opened.
Figure 92:
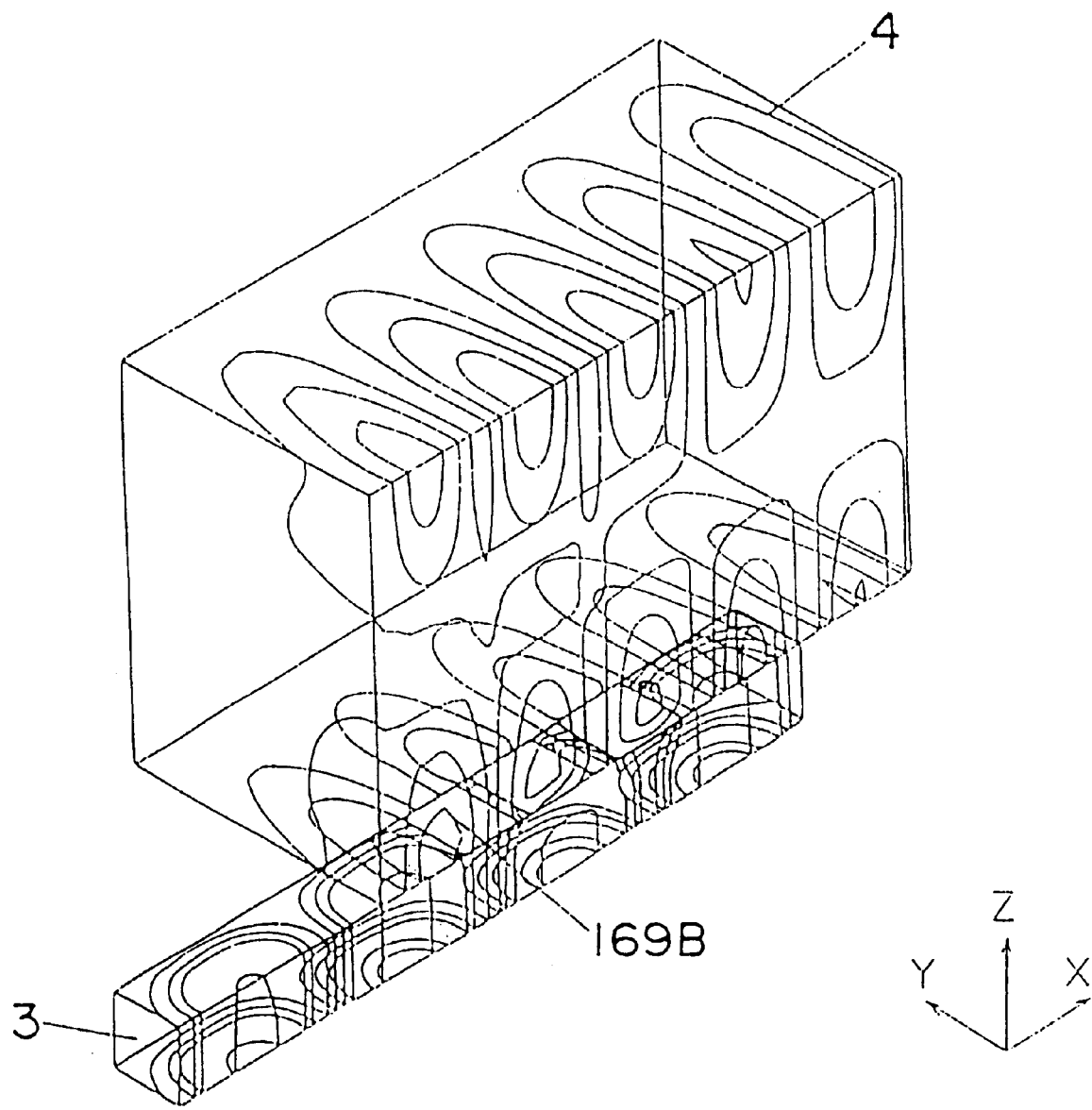
FIG. 92 is a perspective view taken along the line S—S' in FIG. 90 showing a characteristic of a simulation result when a second opening alone is opened.

FIGS. 91 and 92 are perspective views along the line S—S' of FIG. 90 obtained when the distribution of electric fields in the high frequency heating apparatus (without the food) is simulated. The electric fields generated at a resonant state are indicated by equal intensity lines. (The electric field is intense, i.e., antinode where the tree ring-like pattern is thick.) These drawings represent that the electric field distribution is different by the position of the opening 169.

Only the first opening 169A is opened in FIG. 91. There are four antinodes in the X direction, three antinodes in the Y direction and one antinode in the Z direction in the heating chamber 4.

In FIG. 92, only the opening 169B is opened and, five antinodes in the X direction, one antinode in the Y direction and one antinode in the Z direction are generated.

Figure 93:
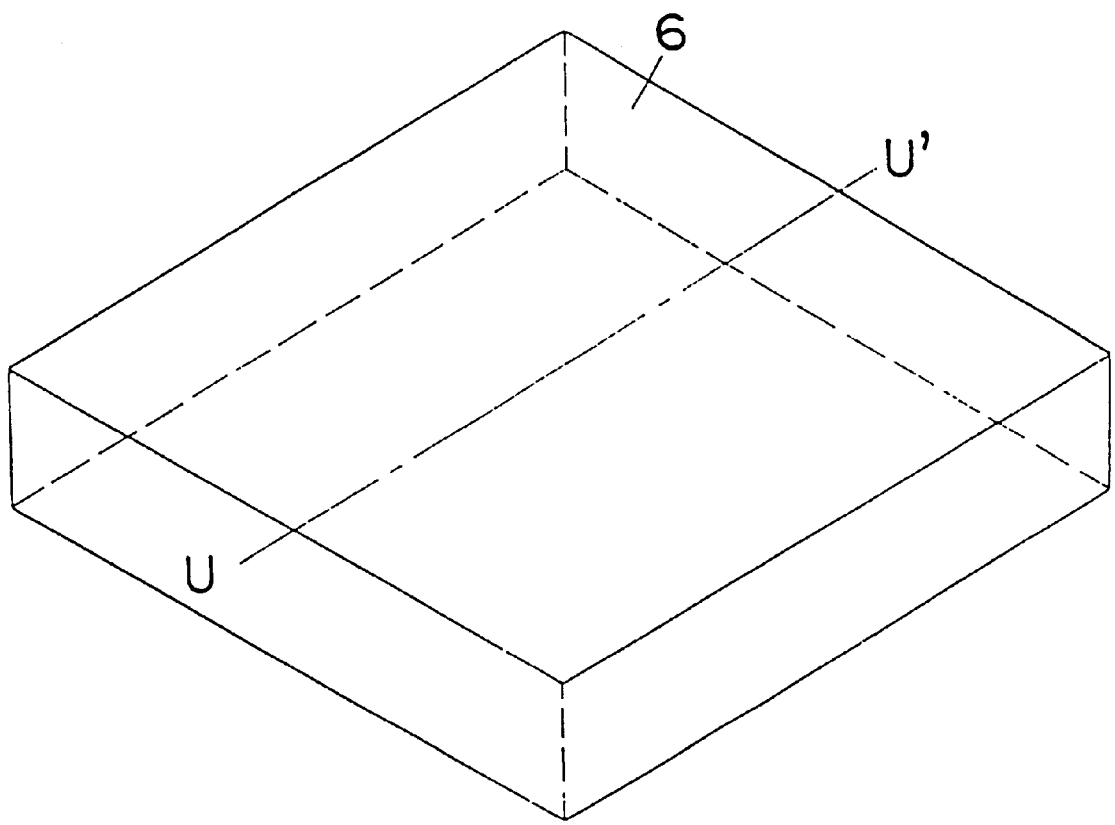
FIG. 93 is a perspective view of a flat food to be heated in the high frequency heating apparatus of FIG. 90.
Figure 93:
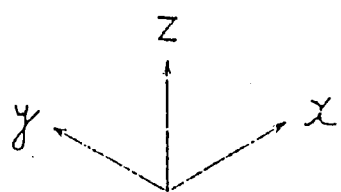

FIG. 93 is a perspective view of the flat food 6 such as shaomais or the like heated in the high frequency heating apparatus of FIG. 90.

Figure 94:
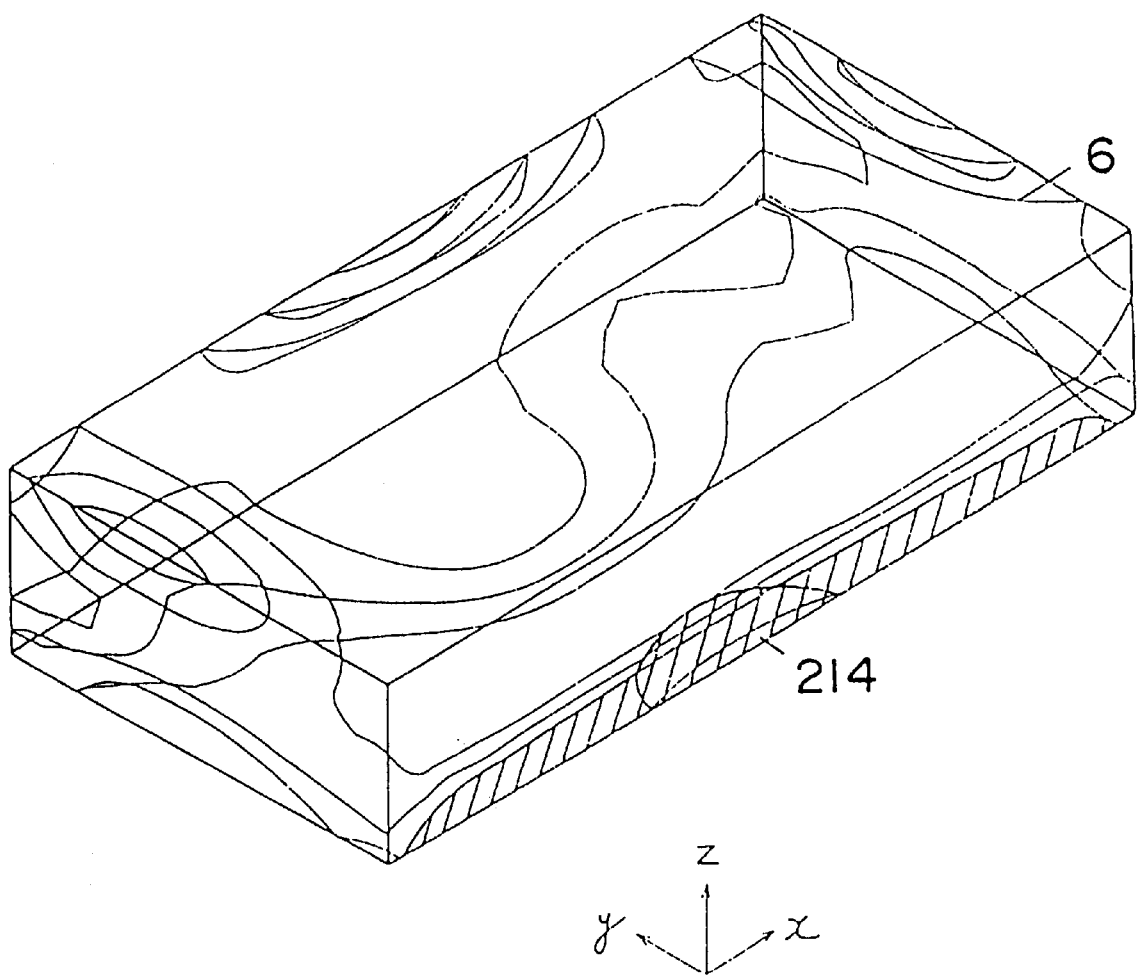
FIG. 94 is a perspective view taken along the line U—U' in FIG. 93 showing a characteristic of a simulation result when a first opening alone is opened.
Figure 95:
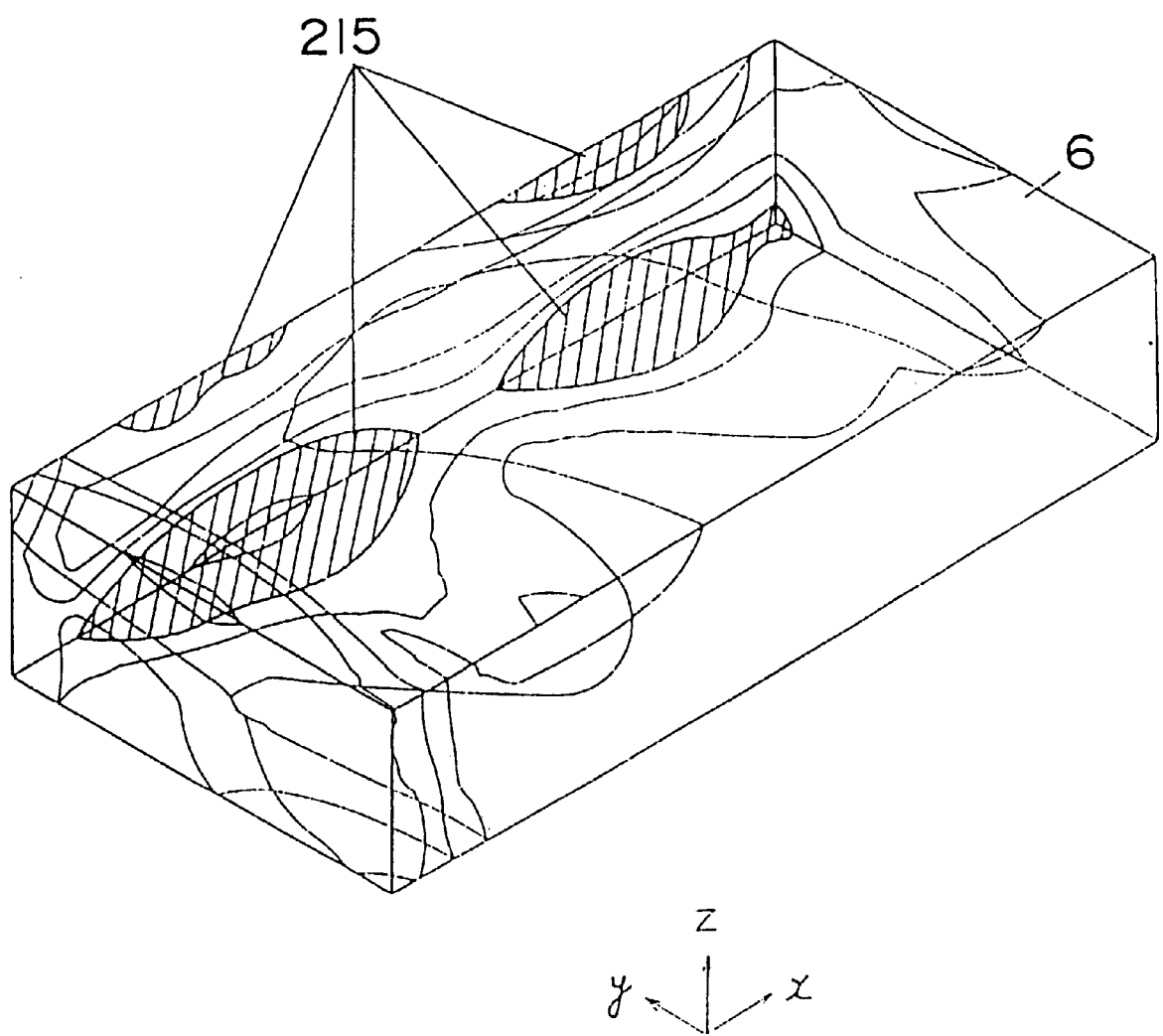
FIG. 95 is a perspective view taken along the line U—U' in FIG. 93 showing a characteristic of a simulation result when a second opening alone is opened.

FIGS. 94 and 95 are perspective views along the line U—U' of FIG. 93 resulting from simulations of the distribution of dielectric losses when the electromagnetic waves are supplied to the food over the first opening 169A of the high frequency heating apparatus of FIG. 90. The loss is larger and the temperature is more increased at hatched parts.

FIG. 94 is obtained when only the first opening 169A is opened, and the food 6 is heated at a central bottom portion 214.

FIG. 95 is obtained when only the second opening 169B is opened, whereby the food 6 is heated at end portions 215.

The cause for the electric field distribution as in FIGS. 91 and 92 will be depicted now.

The propagation of electromagnetic waves in the waveguide 3 will be first described.

Figure 96:
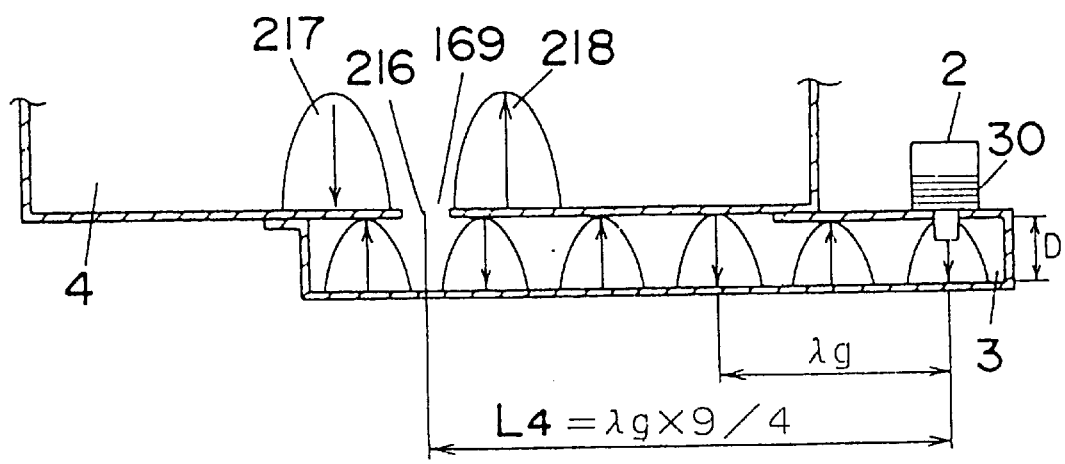
FIG. 96 is a longitudinal sectional view of an essential part of the high frequency heating apparatus for explaining the propagation of electromagnetic waves in a waveguide.

FIG. 96 is a sectional view showing the constitution of an essential part of the high frequency heating apparatus, specifically, only the magnetron 2, waveguide 3, heating chamber 4 and opening 169 are shown for the sake of brevity. A distance L4 between the antenna 30 of the magnetron 2 and a center 216 of the opening 169 is an odd multiple of $\lambda g/4$ supposing that $\lambda g$ is a wavelength (guide wavelength) of the electromagnetic waves transmitted left in the waveguide 3. This distance is selected because the electromagnetic waves are propagated left in FIG. 96 while repeatedly changing the intensity based on the guide wavelength $\lambda g$ determined by the shape of the waveguide 3 and the electric field becomes always weak at a position of an odd multiple of $\lambda g/4$ (Phases of the magnetic field and electric field agree with each other in the propagation within the waveguide, so that the magnetic field is weakened). L4 is set here to be $\lambda g \times 9/4$. A solid arrow indicates a direction of the intense electric fields. The electric field (as well as the magnetic field) is inverted in direction every $\lambda g/2$, and therefore the direction of the arrow is inverted every $\lambda g/2$ as away from the antenna 30. Both the electric field and the magnetic field are inverted with a frequency of 2.45 GHz.

Since the opening 169 connects the heating chamber 4 to the waveguide 3 at a position where the electric field (as well as the magnetic field) is weak in FIG. 96, the electric fields in the waveguide 3 are not disturbed and the electromagnetic waves are efficiently introduced into the heating chamber 4. The opening 169A is connected to the heating chamber 4 where the electric field as well as the magnetic field is weak, and the opening 169B is connected to the heating chamber 4 where the electric field (as well as the magnetic field) is intense in FIG. 79 in order to smoothly guide the electromagnetic waves into the heating chamber 4 through the opening 169A and prohibit the electromagnetic waves from entering through the opening 169B when the seal part 197 is at the position L3=0. On the contrary, when L3 is $\lambda g/4$, the electromagnetic waves are not transmitted to the opening 169A and eventually brought into the heating chamber 4 only through the opening 169B. Accordingly, the openings 169A, 169B can be switched apparently by changing the position of the seal part 197.

Figure 4:
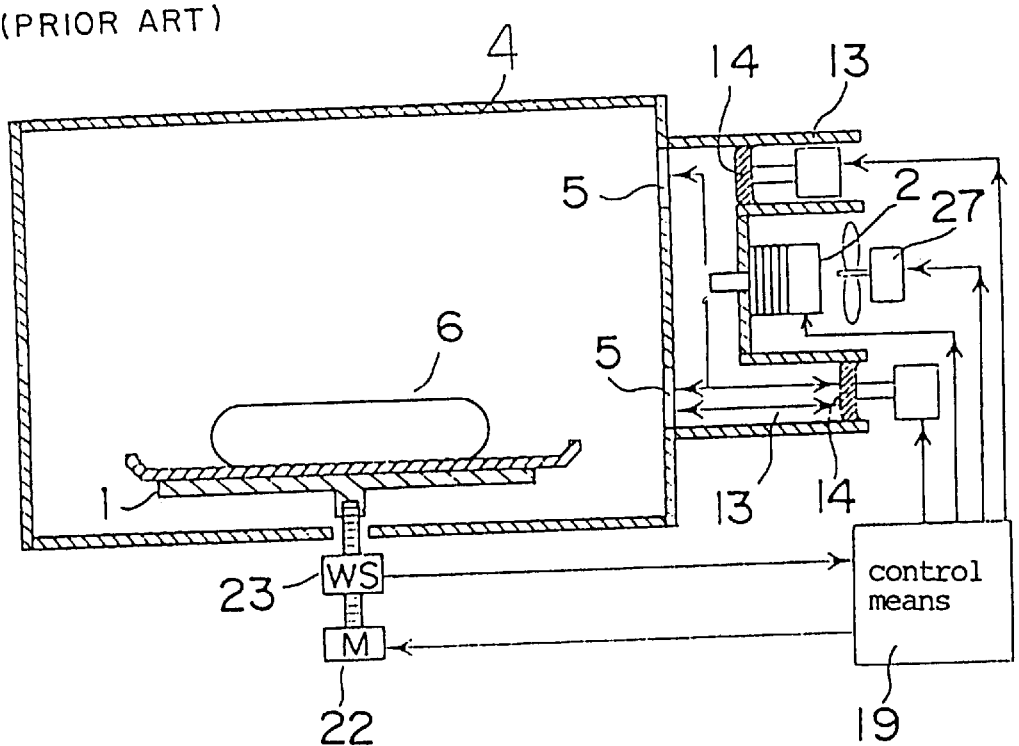
FIG. 4 is a view showing the constitution of a yet further conventional high frequency heating apparatus.
Figure 5:
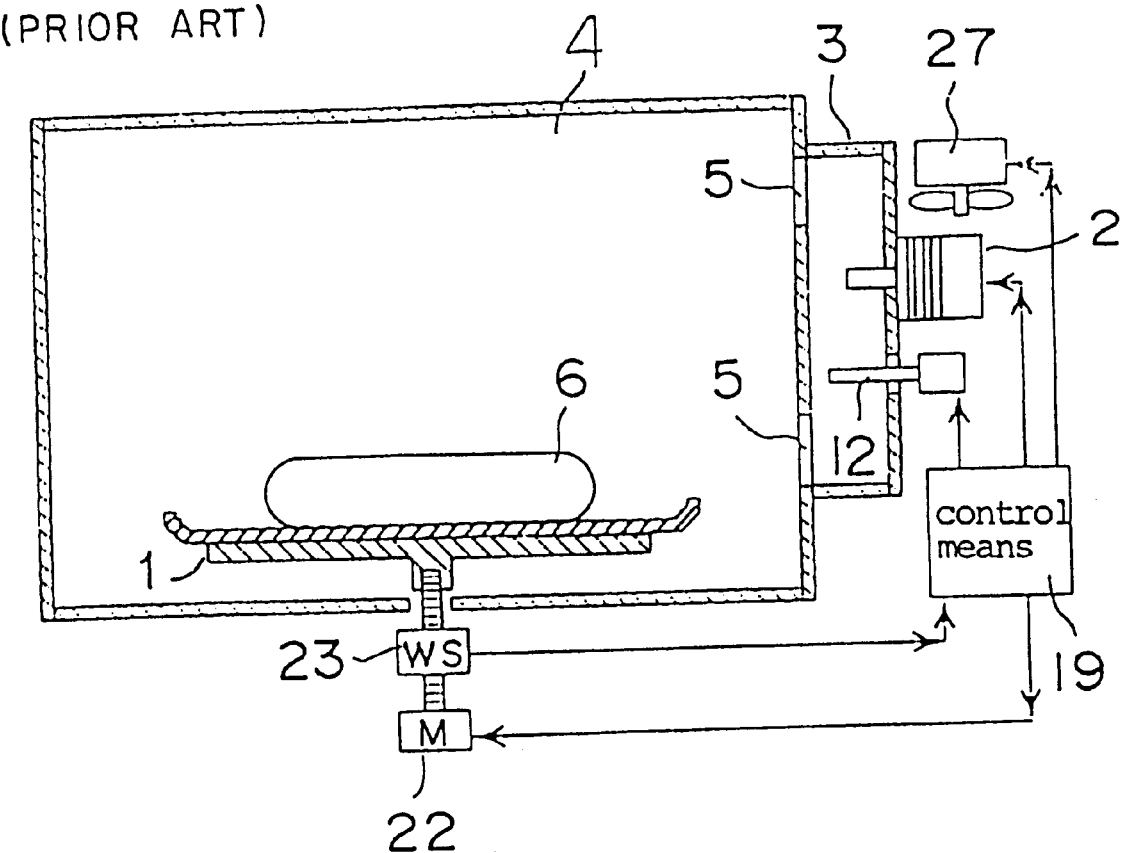
FIG. 5 is a view showing the constitution of a still further conventional high frequency heating apparatus.
Figure 6:
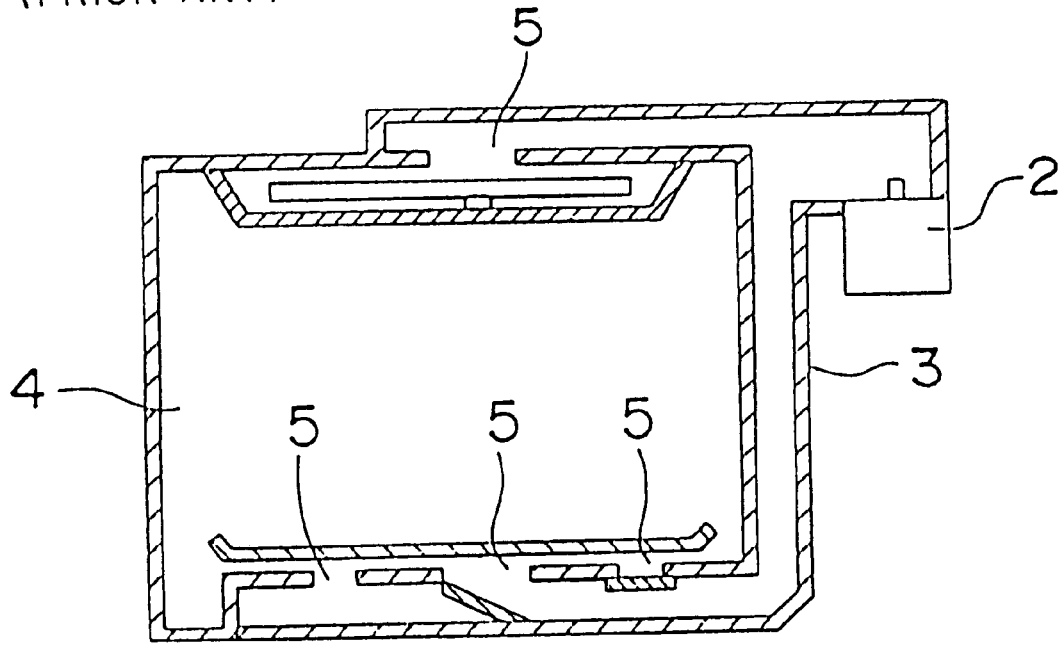
FIG. 6 is a view of another conventional high frequency heating apparatus.
Figure 7:
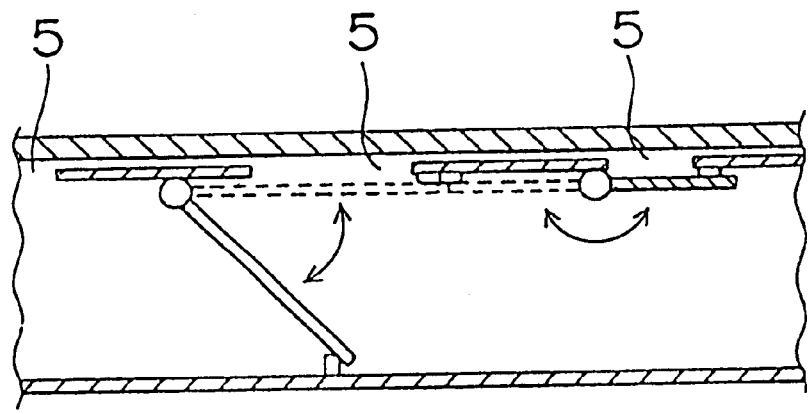
FIG. 7 is a sectional view of an essential part of the high frequency heating apparatus shown in FIG. 6.

In the conventional example of FIG. 4, end faces 14 of the two sub waveguides 13 confronting the openings 5 are moved thereby to independently open. and close the openings 5. According to the present invention, the opening 169A is constituted where the electric field is weak and the opening 169B is formed where the electric field is strong, with the seal part 197 interposed therebetween. Therefore, even with only one seal part provided in the apparatus, the openings 169A and 169B can be changed over.

Referring to FIG. 96, the guide wavelength $\lambda g$ of electromagnetic waves propagated in the waveguide 3 is defined by the following expression (4) supposing that a width of the waveguide 3 is C, a depth of the waveguide 3 is D, the number of strong and weak ridges of the electromagnetic waves in the widthwise direction is m, the number of strong and weak ridges of the electromagnetic waves in the depthwise direction is n, and a wavelength $\lambda$ of the electromagnetic waves in vacuum is approximately 122 mm:

$$\lambda g=\lambda/\sqrt{1-\lambda^2\{(m/2C)^2+(n/2D)^2\}} \quad (4)$$

In general, m=1 and n=0 and consequently an expression (5) is held:

$$\lambda g=\lambda/\sqrt{1-\lambda^2(1/2C)^2} \quad (5)$$

Specifically, when C=80 mm and D=40 mm, $\lambda g$ is approximately 188 mm (all are inside dimensions excluding the thickness of plates of the waveguide).

The resonance of electromagnetic waves in the heating chamber 4 will be described below.

In FIG. 96, strong electric fields 217, 218 (shown by solid arrows) directionally opposite to each other are generated to hold the opening 169 therebetween, so that the electromagnetic waves in the heating chamber 4 become stable in a resonating state in a manner to be weakened (nodes) at the opening 169. The electromagnetic waves enter the heating chamber 4 most efficiently at this time (however, the electric field is shifted 90° from the magnetic field in the resonating state, unlike in the transmitting state in the waveguide 3).

While the resonating state is determined by the shape of the heating chamber and the position of the opening, referring to FIG. 91 showing the electric field distribution in the heating chamber 4, four strong electric fields in the X direction, three strong electric fields in the Y direction and one strong electric field in the Z direction are generated in the heating chamber, which are antinodes of the electric fields resulting from that the electromagnetic waves are distributed as standing waves in the heating chamber because of the resonating state. A "mode" is denoted by the number of antinodes. Supposing that a size in each direction of the heating chamber 4 when represented in three dimensions is designated by x, y and z, a mode when the antinodes of the electric fields in respective directions are nm, n and p is designated by (mnp). In the instant embodiment, a center position of the first opening 169A is generally in agreement with a center position in the x and y directions of the bottom face of the heating chamber 4, and moreover, strong electric fields are generated to hold the opening 169 therebetween (to form the node at the opening 169A). Therefore, an even number (m: even number) of antinodes is apt to generate in the x direction and an odd number (n: odd number) of antinodes is easy to generate in the y direction. The other modes are hard to generate. It is readily understood that FIG. 91 represents a mode (431) and FIG. 92 a mode (511).

In summary, the electric field distribution (namely, heating distribution) is changeable by the position of the opening 169.

The heating chamber 4 is regarded as a hollow resonator when the heating chamber 4 is a parallelepiped without the food 4 therein. A potential mode is obtained from the size of the heating chamber 4 and the position of the opening 169. The number of modes estimated to rise in each direction of the heating chamber 4 of dimensions x, y and z(mm) is a combination of m, n and p satisfying an expression (6) wherein m, n and p are integers:

$$1/\lambda^2=[m/2x]^2+[n/2y]^2+[p/2z]^2 \quad (6)$$

On the other hand, when the food 6 is present, a shift from the expression (6) is caused due to influences of a wavelength compression by the dielectric constant of the food. Experiments demonstrate, however, that a mode satisfying the expression (6) tends to take place in the vicinity of the opening 169 even when the food 6 exists in the heating chamber, and the mode is apt to be disturbed at a position separated from the opening 169. Therefore, for obtaining the mode (431) when $\lambda$ is approximately equal to 122 mm, dimensions of, e.g., x=330 mm, y=300 mm and z=215 mm satisfying the expression (6) are selected.

In the present invention, since the opening 169 should be arranged in the vicinity of the food 6 in order to obtain the heating distribution targeting the food 6, the plurality of openings 169A, 169B generating different electric field distributions are formed at the nearest side face of the heating chamber 4 to the food 6, i.e., bottom face of the heating chamber 4.

Figure 97:
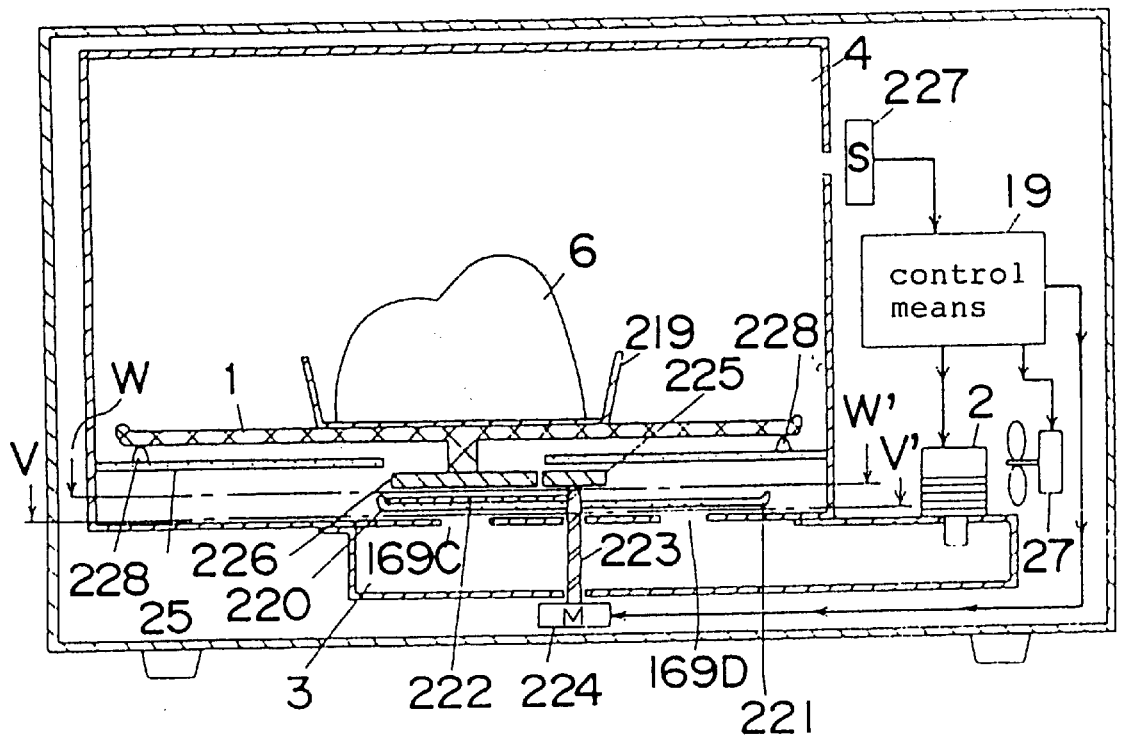
FIG. 97 is a view showing the constitution of a high frequency heating apparatus according to a thirty-third embodiment of the present invention.

FIG. 97 is a sectional view of a high frequency heating apparatus according to a 33rd embodiment of the present invention.

In FIG. 97, the electromagnetic waves from the magnetron 2 heat, through the waveguide 3, the food 6 on a plate 219 in the heating chamber 4. Openings 169C and 169D connect the waveguide 3 with the heating chamber 4 thereby introducing the electromagnetic waves to the heating chamber. The first opening 169C is formed at the center of the heating chamber 4 and the second opening 169D is formed closer to the magnetron 2, so that the weak parts (nodes) of the electric fields of the electromagnetic waves propagated in the waveguide 3 are connected with the weak parts (nodes) of the electric fields of the electromagnetic. waves distributed as standing waves in the heating chamber 4. In the meantime, an opening shielding part 220 is formed to cover the openings 169C and 169D so as to improve the heating efficiency and heating distribution for the food 6. The opening shielding part 220 is like a disc consisting of a wave permeable part 221 formed of material of a low dielectric loss and which is hard to absorb electromagnetic waves and a wave shielding part 222 formed of metal. The opening shielding part 220 is rotated by a rotary shaft 223 made of material of a low dielectric loss and which is hard to absorb electromagnetic waves. The rotary shaft 223 penetrating the heating chamber 4 and the waveguide 3 at a position between the openings 169C and 169D is connected to and rotated by a motor 224 as a driving part. As the motor 224 rotates, namely, the rotary shaft 223 rotates, the position of the opening allowing the electromagnetic waves to pass from the waveguide 3 to the heating chamber 4 is apparently changed, in other words, the first and second openings 169C and 169D are switched, whereby the electric field distribution is changed. The rotary shaft 223 is connected to a first gear 225, transmitting a rotational force to a second gear 226 via the first gear 225. The second gear 226 connected to the turntable 1 uniforms the concentric heating distribution seen from the rotational center of the turntable by rotating the food 6. The number of teeth of the second gear 226 is made different from that of the first gear 225, more specifically, the second gear 226 has a larger number of teeth than the first gear 225 in the embodiment. In consequence of this, the heating distribution is uniformed better. A shape recognition sensor 227 recognizes the shape of the food 6 and sends signals to the control means 19 which in turn controls the operation of the magnetron 2, motor 224 or fan 27 cooling the magnetron 2. In this case, an optimum power feed method (such as a switching pattern for the openings 169C and 169D, an emission pattern of electromagnetic waves by the magnetron 2 or the like) is set beforehand corresponding to the shape of the food, and switched in accordance with the signal from the shape recognition sensor 227. Moreover, the opening shielding part 220 is coated with the cover 25 for the sake of safety and the turntable 1 is held by supporting parts 228.

Figure 98:
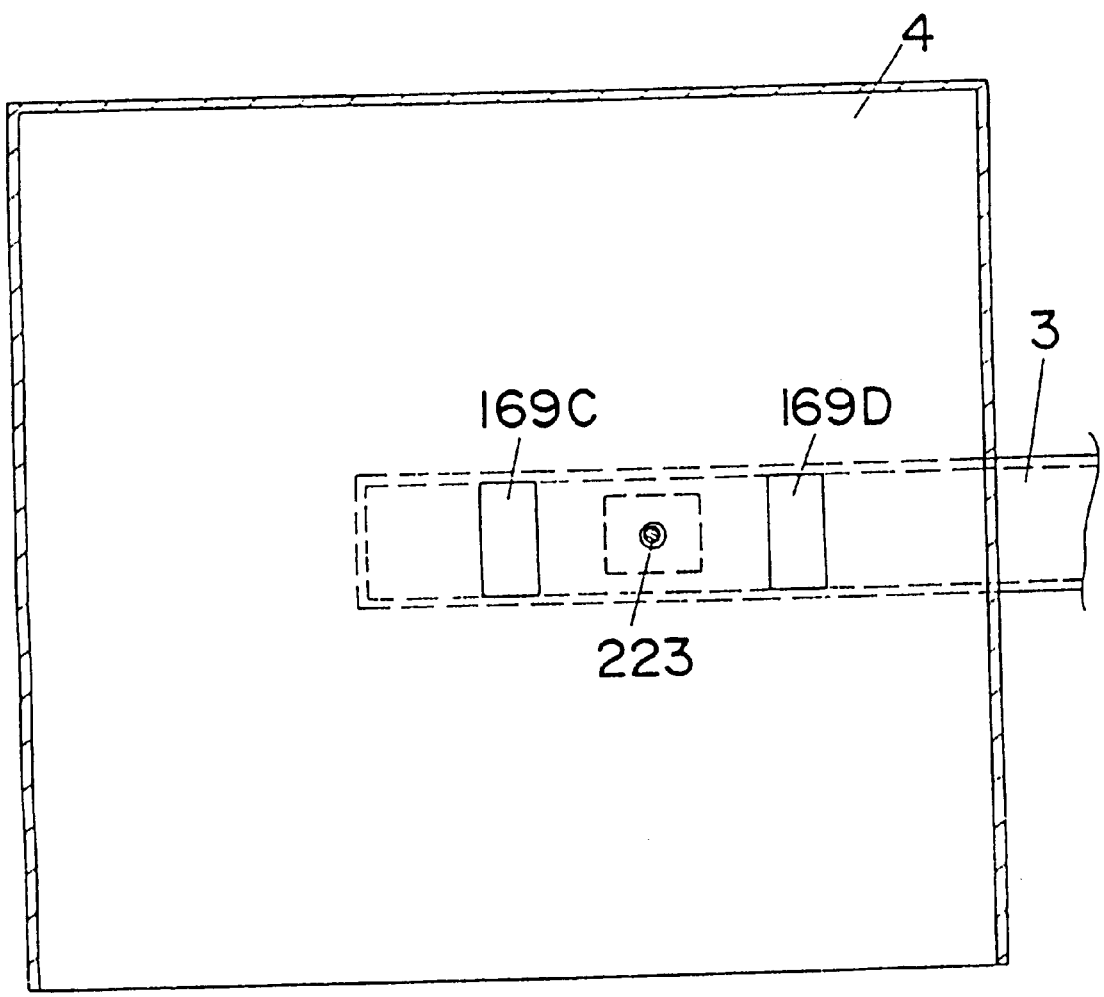
FIG. 98 is a sectional view taken along the line V—V' in FIG. 97.

FIG. 98 is a sectional view taken along the line V—V' in FIG. 97.

A center of the first opening 169C is located at the central part (both in the longitudinal direction and in the lateral direction) of the bottom face of the heating chamber 4. The second opening 169D is formed closer to the magnetron 2 than the first opening 169C. The openings 169C and 169D are rectangular, while having respective four sides parallel to the same rectangular bottom face of the heating chamber 4.

Figure 99:
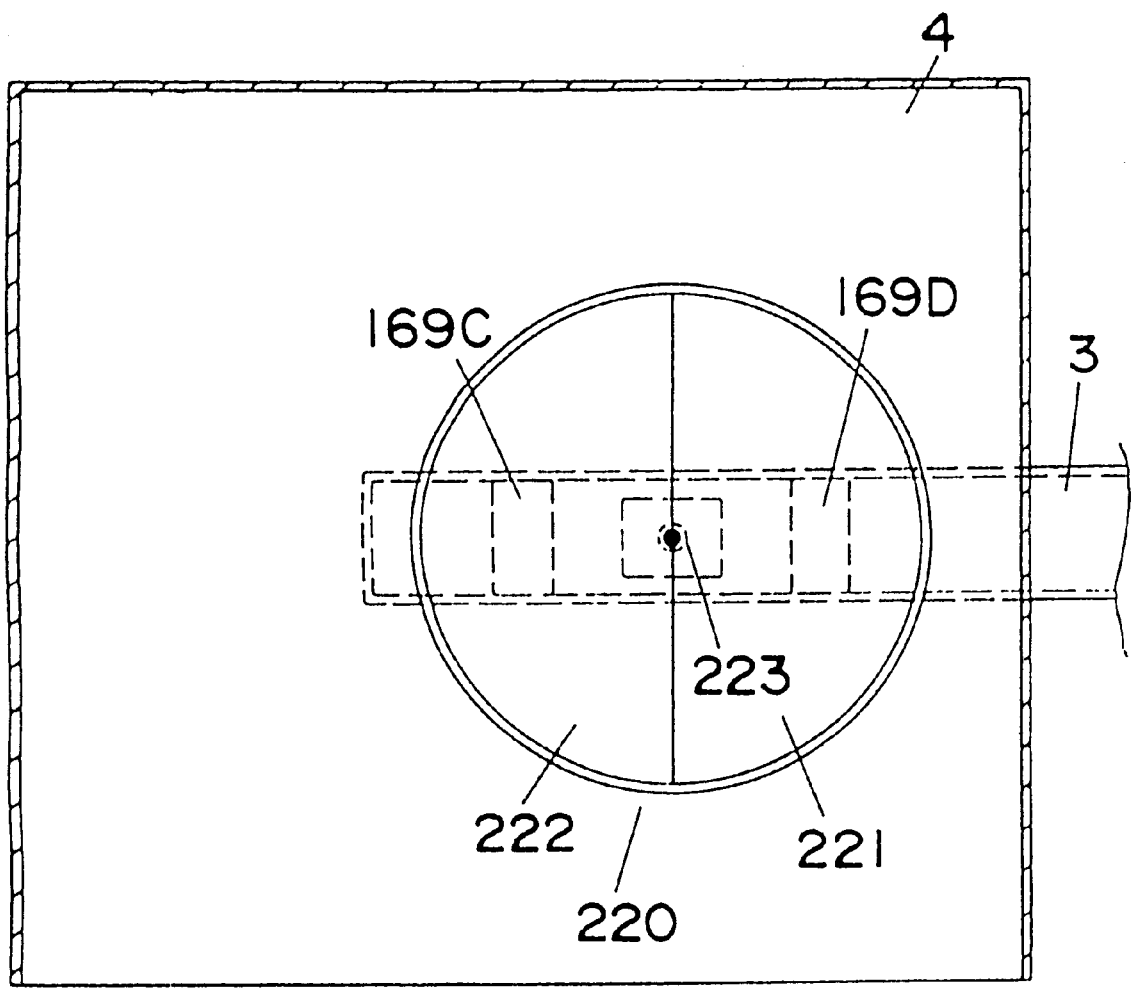
FIG. 99 is a sectional view taken along the line W—W' in FIG. 97.

FIG. 99 is a sectional view taken along the line W—W' in FIG. 97.

The opening shielding part 220 covers the openings 169C and 169D, having the semi-circular wave shielding part 222 arranged over the circular wave permeable part 221, and is rotated by the rotary shaft 223. In FIG. 99, the electromagnetic waves in the waveguide 3 are difficult to enter the heating chamber 4 through the first opening 169C because of the shielding part 222, but easy to enter from the second opening 169D. Meanwhile, when the rotary shaft 223 rotates half, the electromagnetic waves in the waveguide 3 become easy to enter the heating chamber 4 from the first opening 169C, and difficult to enter the heating chamber from the second opening 169D. Therefore, the openings 169C and 169D are apparently switched by the rotation of the opening shielding part 220.

According to this 33rd embodiment, both the opening shielding part 220 and the turntable 1 are rotated by one rotary shaft 223. Needless to say, however, the opening shielding part and turntable may be respectively provided with separate rotary shafts to more efficiently uniform the heating distribution. Although the opening shielding part 220 is rotated within the heating chamber 4, the shielding part 220 may be linearly moved right and left in the waveguide 3. Furthermore, although it is simplest if the motor 224 is an AC motor rotating at a constant speed, a stepping motor may be employed to control and uniform the heating distribution more delicately. The second opening 169D may be formed at the other side face of the heating chamber 4 than the bottom face of the heating chamber. Moreover, although the apparatus is controlled based on the signal from the shape recognition sensor 227, the detection part may be constituted of the other sensing means.

Figure 100:
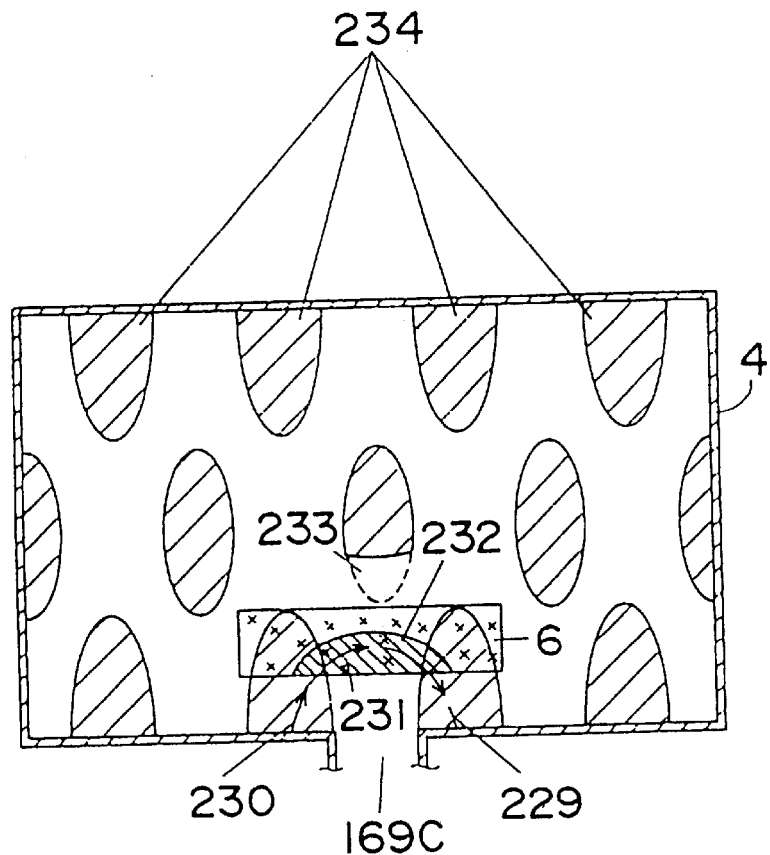
FIG. 100 is a characteristic diagram showing how an electric field is deflected in the high frequency heating apparatus of FIG. 97.

FIG. 100 is a diagram showing how the electric fields are bent when the flat food 6 (low in height) is placed in the *vicinity of the center of the heating chamber 4 (i.e., above the first opening 169C). The food 6 pushes to bend a pair of directionally opposite strong electric fields 229 and 230 holding the opening 169C therebetween, with generating an internal strong electric field 231. As a result, the food is heated by the internal strong electric field 231 and the electric power P of the expression (1) by the dielectric constant of the food 6. At this time, a heat generation portion 232 is brought about at a central lower part of the food 6, and therefore the interior of the food 6 is heated without an edge of the food boiled, resulting in the same distribution of the dielectric loss as shown in FIG. 94. However, FIG. 100 accompanies a perfectly contrary problem to that inherent in the conventional microwave oven, in other words, the central lower part of the food 6 is heated too much whereas the edge of the food is cold. For solving this problem, the opening 169 is switched between the openings 169C and 169D to uniform the heating distribution. The edge portion of the food 6 becomes hot unless the using opening is at the center of the bottom face of the heating chamber 4 (immediately below the food), probably because the electric field distribution in the heating chamber 4 is disturbed by the food 6 itself when the opening at a position other than the center of the bottom face of the heating chamber is used, and the electric fields are generated only in a direction to cover the edge portion of the food separated from the opening. Although the electric field distribution is also disturbed as it is far away from the opening 169C at the center of the bottom face of the heating chamber 4 (immediately below the food), the strong electric fields 229, 230 are kept stable in the vicinity of the opening 169C and therefore the interior of the food 6 is heated without boiling the edge portion. (Although FIG. 100 illustrates that only a strong electric field deformation part 233 is disturbed, the electric field distribution may be disturbed so much as to make four strong electric fields 234 at the top face of the heating chamber 4 to three or two in an extraordinary case.) Since the food is generally placed at the center of the heating chamber 4, the first opening 169C should be set at the center of the bottom face of the heating chamber 4, but the position of the second opening 169D may be determined with some degrees of freedom.

FIGS. 101–104 are sectional views of the heating chamber 4 explaining how differently the electric fields are generated depending on the position of the opening at the wall face of the heating chamber.

Figure 101:
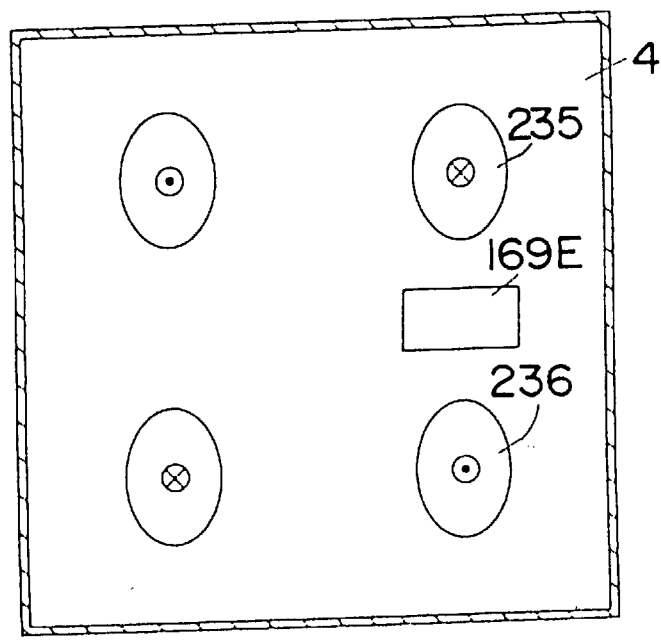
FIG. 101 is a sectional view of a heating chamber for explaining how differently the electric fields are generated depending on the position of the opening in the wall face of a high frequency heating apparatus.
Figure 102:
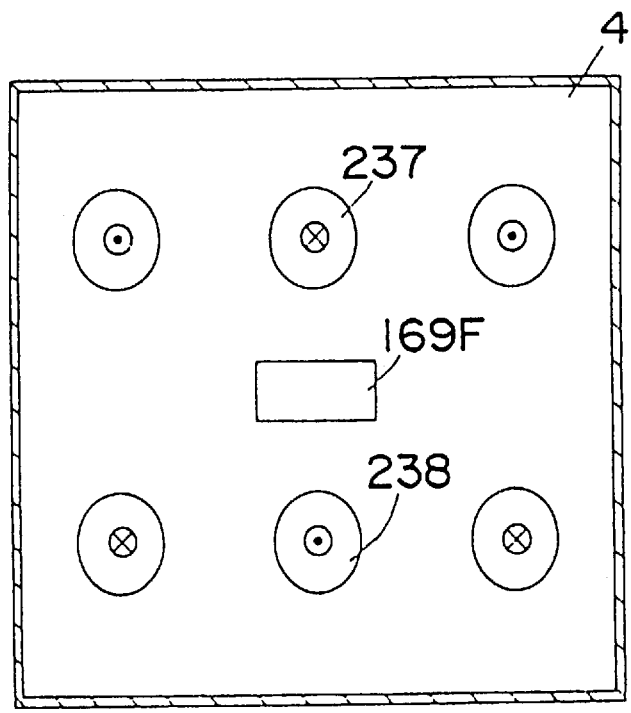
FIG. 102 is a view similar to FIG. 101 when the position of the opening is changed.
Figure 103:
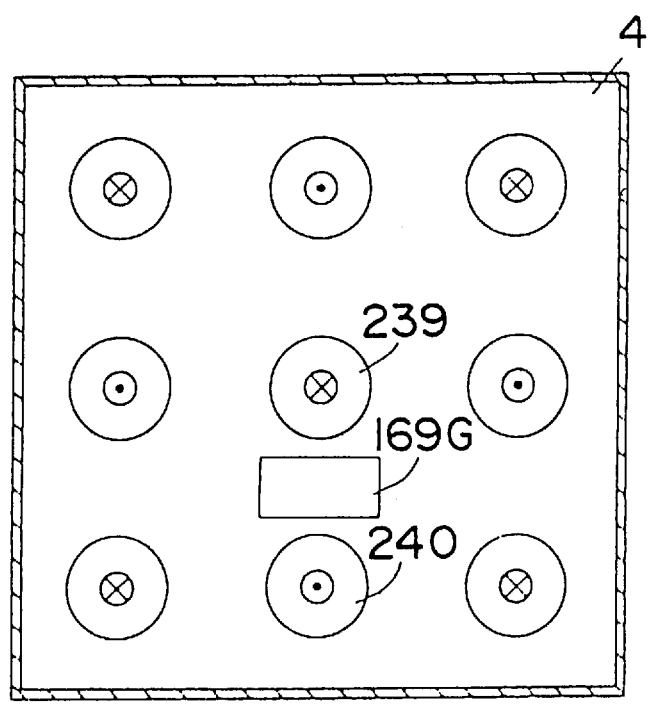
FIG. 103 is a view similar to FIG. 101 when the position of the opening is further changed.

In order to obtain the mode in compliance with the expression (6) supposing that the heating chamber 4 is a hollow resonator, the opening should be positioned as indicated in FIGS. 101–103. (Here, the opening is shown in the second dimension for the sake of brevity.)

In FIG. 101, strong electric fields 235, 236 opposite to each other are generated to hold an opening 169E therebetween, i.e., a mode (22*) is formed. A mode of (an even number, an even number, *) as described above is easily generated.

FIG. 102 shows a case where strong electric fields 237, 238 opposite to each other are generated to hold an opening 169F therebetween, to generate a mode (23*). The same mode as described above consisting of (an even number, an odd number, *) or (an odd number, an even number, *) is similarly easily conceivable.

FIG. 103 shows a case where strong electric fields 239, 240 opposite to each other and holding an opening 169G therebetween are generated to achieve a mode (33*). The same mode as described above consisting of (an odd number, an odd number, *) is easily obtained in the same manner.

Figure 104:
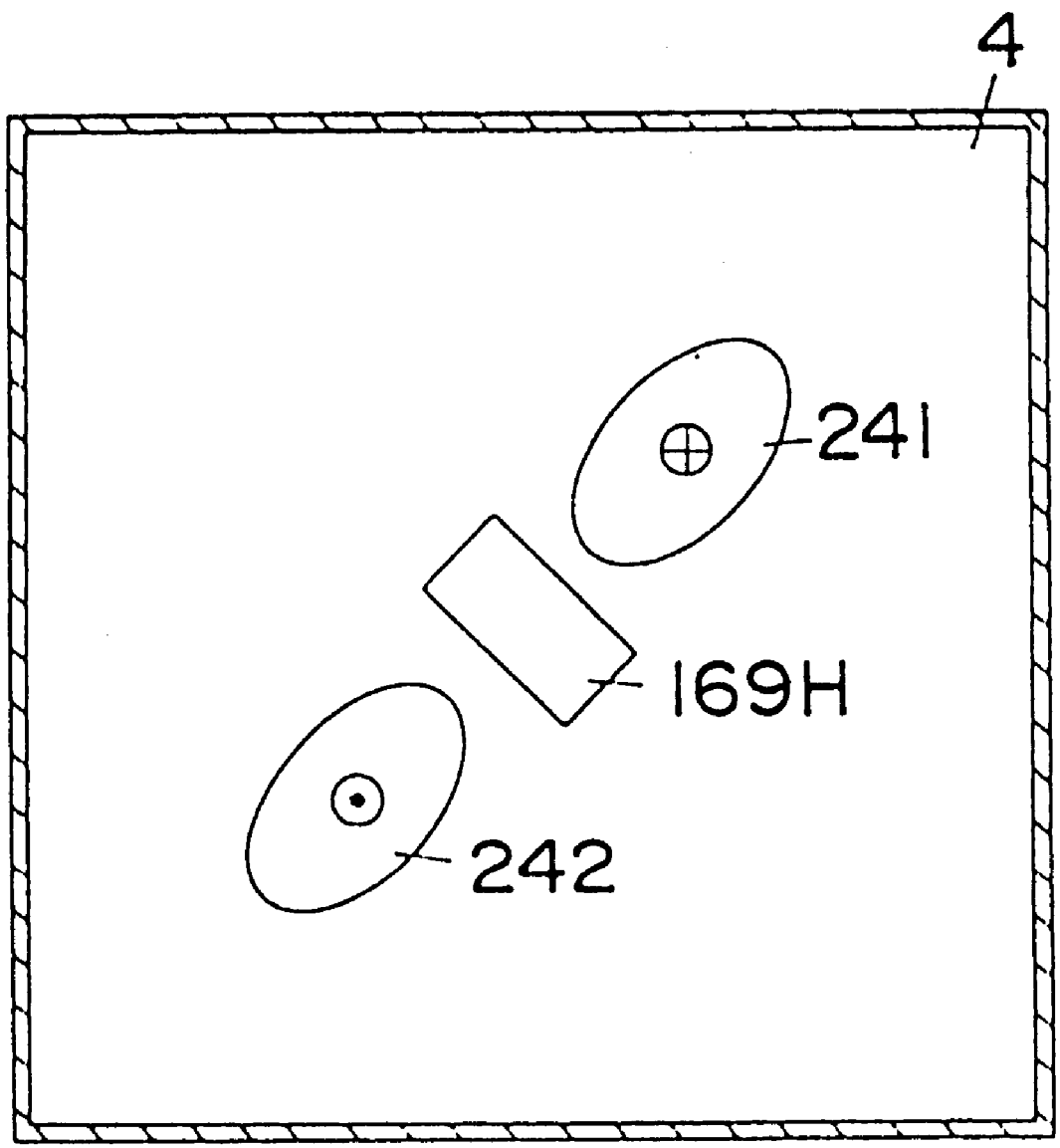
FIG. 104 is a view similar to FIG. 101 when the position of the opening is still further changed.

On the other hand, although the configuration in FIG. 104 tries to obtain strong electric fields 241, 242 opposite to each other and holding an opening 169H therebetween, a mode in compliance with the expression (6) is not gained, making it impossible to estimate the electric field distribution. The reason for this is that the wall faces of the heating chamber 4 are not parallel to the opening 169H.

As is made clear from the above, the electric fields can be generated as required if the opening 169 is provided in parallel to the wall faces of the heating chamber 4.

Figure 105:
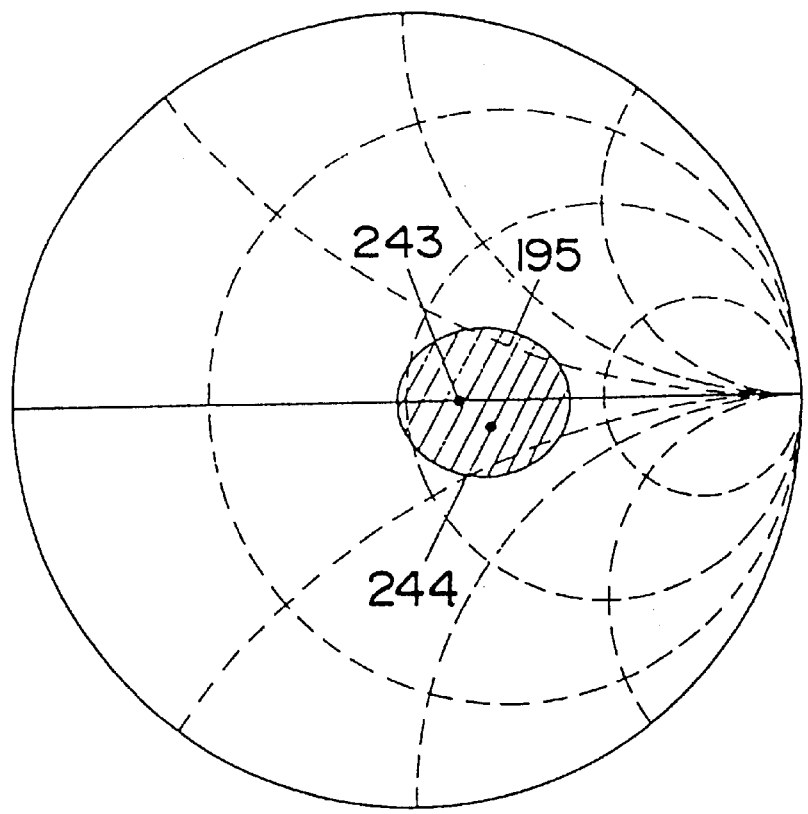
FIG. 105 is a Smith chart of a heating efficiency characteristic of a high frequency heating apparatus according to a thirty-fourth embodiment of the present invention, showing the matching state seen from the magnetron.

FIG. 105 is a characteristic diagram of the heating efficiency in a 34th embodiment of the present invention, more specifically a Smith chart showing a reflection state (matching state) seen from the magnetron 2. A hatched part is the high efficiency area 195 (where the electromagnetic waves most efficiently enter the heating chamber 4). In FIG. 105, the heating chamber and opening are matched so that a reflection characteristic point 243, 244 is in the high efficiency area 195 when only the first, second opening 169C, 169D is opened to obtain a rated output. Accordingly, the uniform heating is achieved and the heating efficiency is enhanced as described above.

Figure 1:
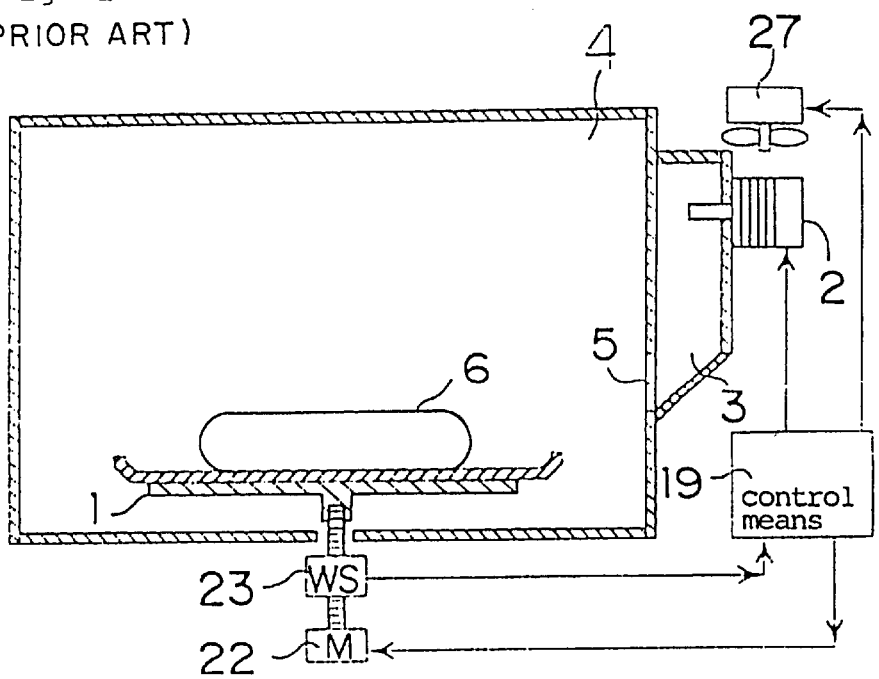
FIG. 1 is a view showing the constitution of a conventional high frequency heating apparatus.
Figure 2:
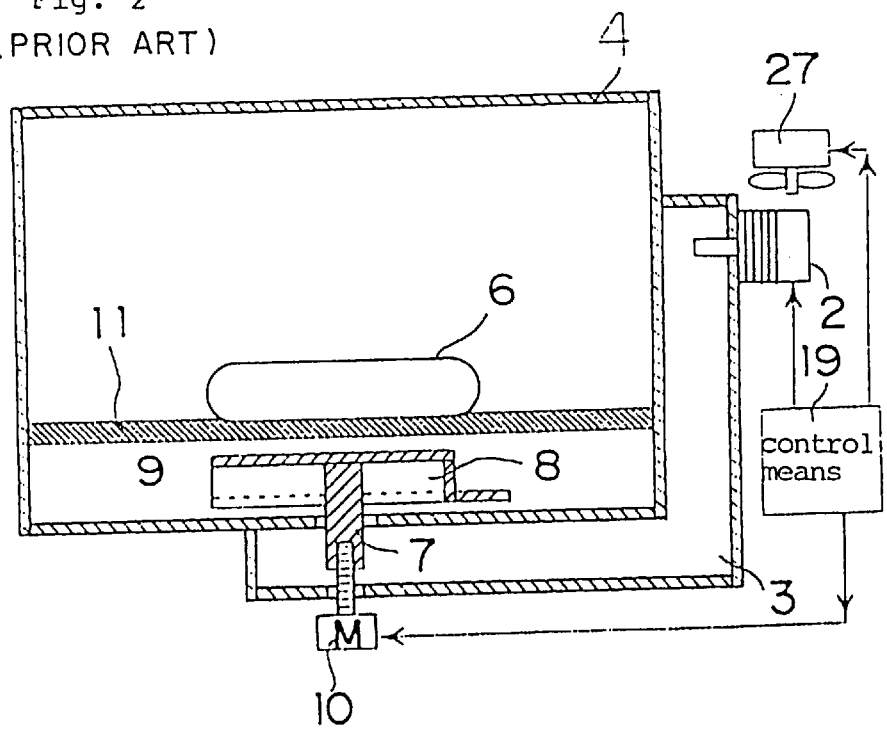
FIG. 2 is a view showing the constitution of another conventional high frequency heating apparatus.
Figure 3:
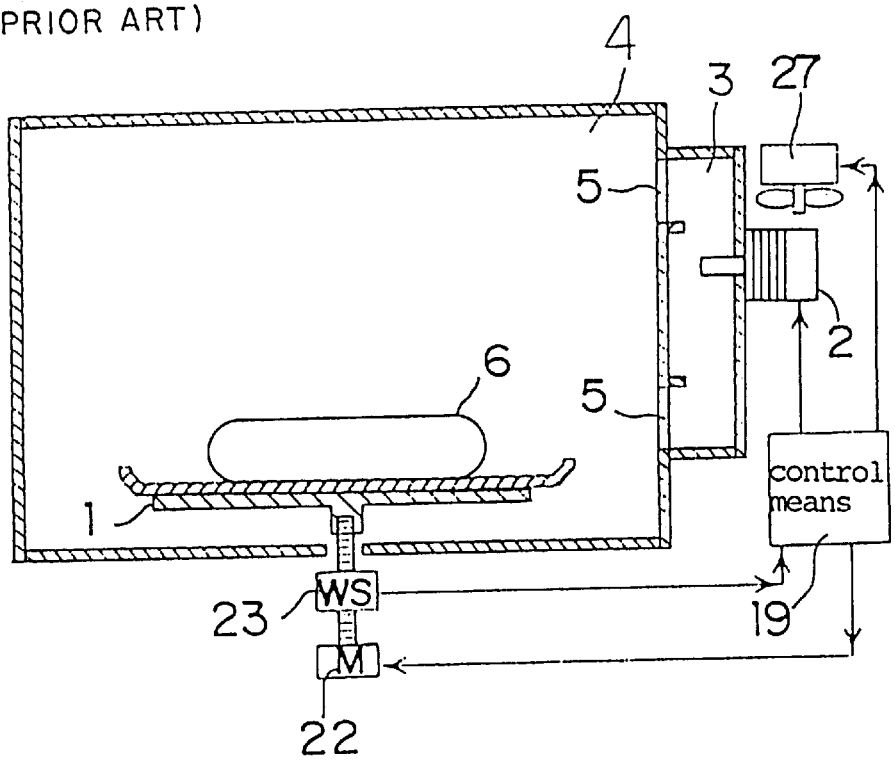
FIG. 3 is a view showing the constitution of a further conventional high frequency heating apparatus.
Figure 106:
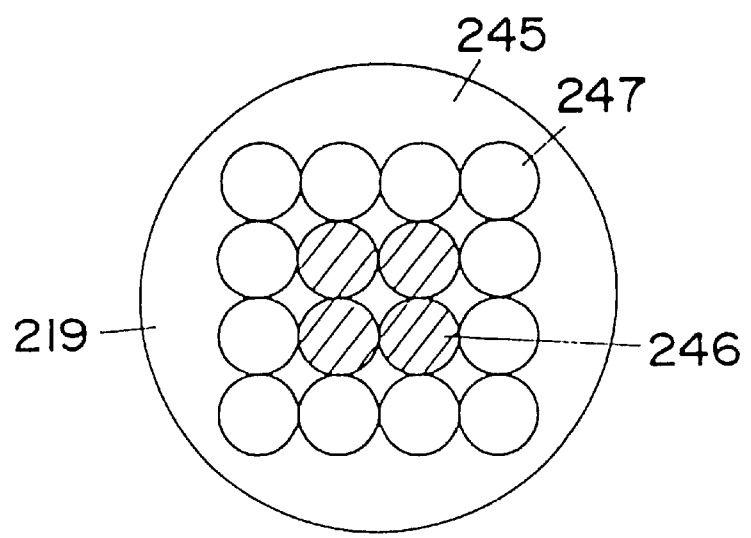
FIG. 106 is a top plan view of a plurality of shaomais placed on a plate.
Figure 107:
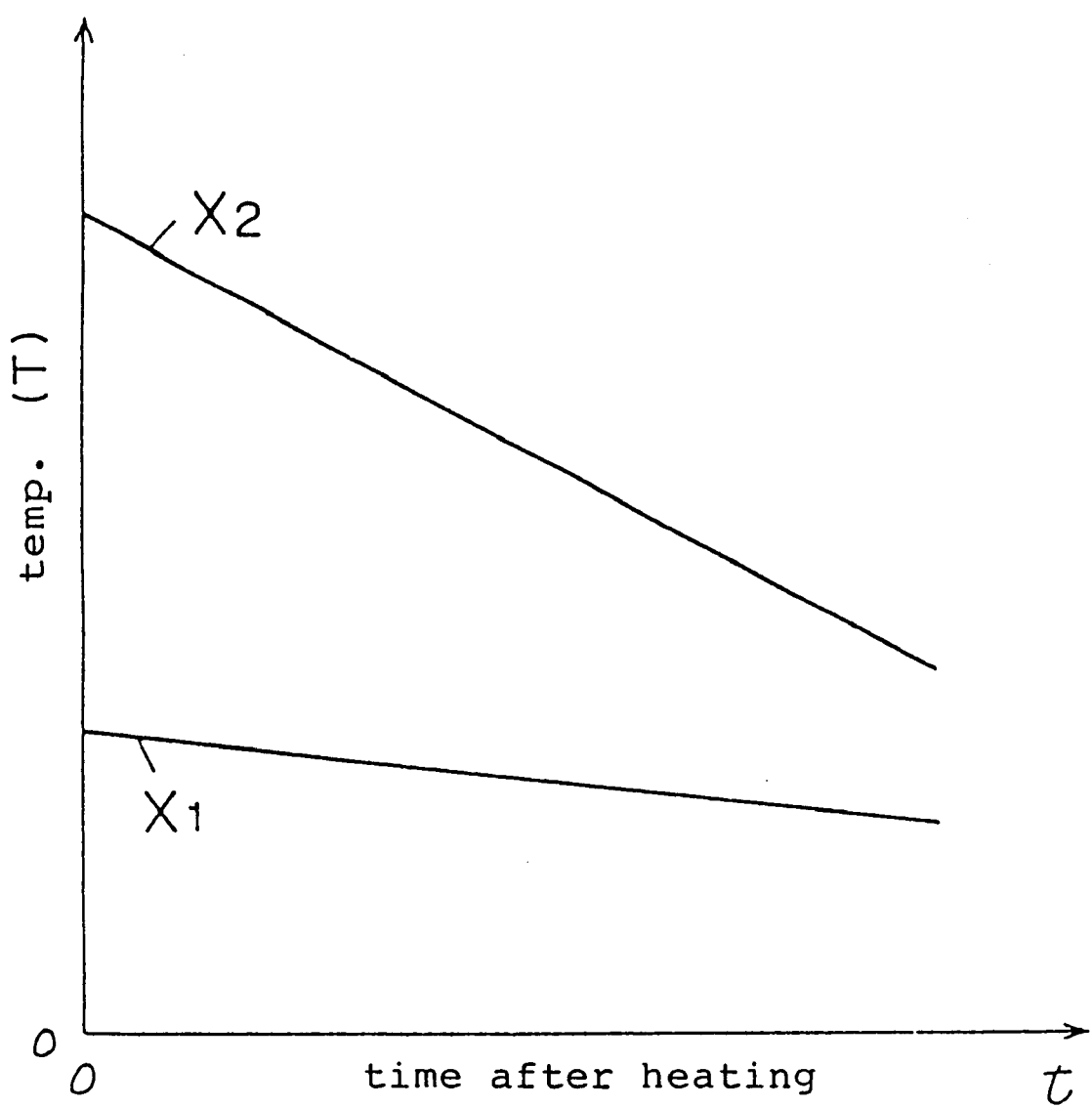
FIG. 107 is a characteristic diagram of a temperature irregularity when the shaomais of FIG. 106 are heated in the conventional high frequency heating apparatus. 18

FIG. 106 is a plan view of shaomais 245 on the plate 219 as a representative example of flat food, seen from above. When the shaomais are heated in the conventional microwave oven as shown in FIG. 1, a characteristic diagram of FIG. 107 is obtained. An axis of abscissa is the time while the shaomais are left after finished being heated and an axis of ordinate is the temperature. An average temperature of four shaomais at a central part 246 (hatched part) of the shaomais 245 is X1, and an average temperature of 12 shaomais at a peripheral part 247 (without hatches) of the shaomais 245 is X2. Therefore, the peripheral part 247 is hotter than the central part 246, which is a characteristic of the conventional microwave oven that the flat food like shaomais is heated only at the edge portion, and hardly heated at the central portion.

Figure 108:
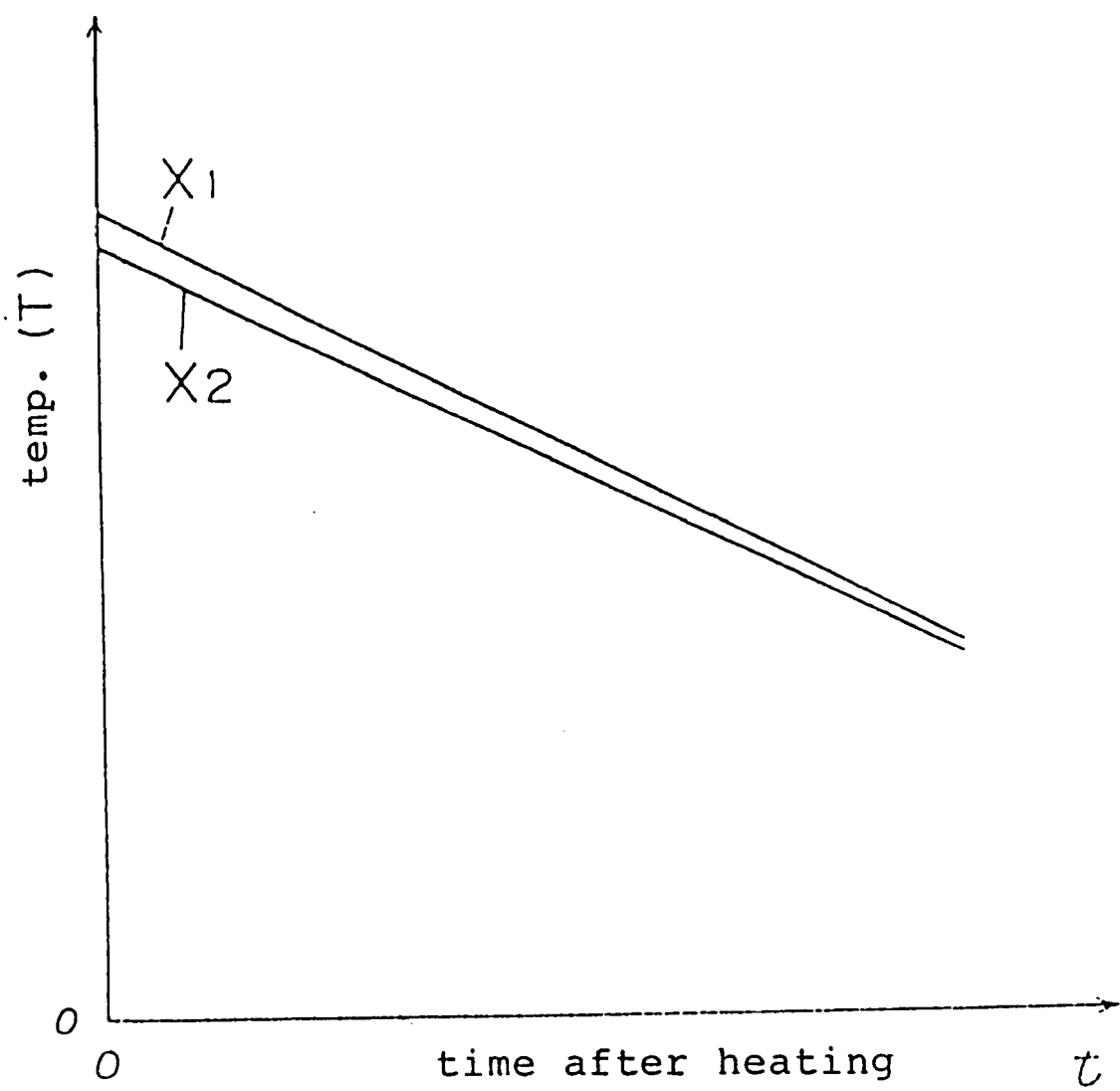
FIG. 108 is a characteristic diagram of a temperature irregularity when the shaomais of FIG. 106 are heated in the high frequency heating apparatus of the present invention.

FIG. 108 is a characteristic diagram of the temperature irregularity when 16 shaomais 245 of FIG. 106 are heated in the high frequency heating apparatus of the present invention. The time while the shaomais are left after the heating is finished is indicated on an axis of abscissa and the temperature is shown on an axis of ordinate in FIG. 108. The average temperature of four shaomais at the central part 246 is almost equal to the average temperature X2 of 12 shaomais at the peripheral part 247, and therefore the heating is made more uniform in the present invention.

Figure 109:
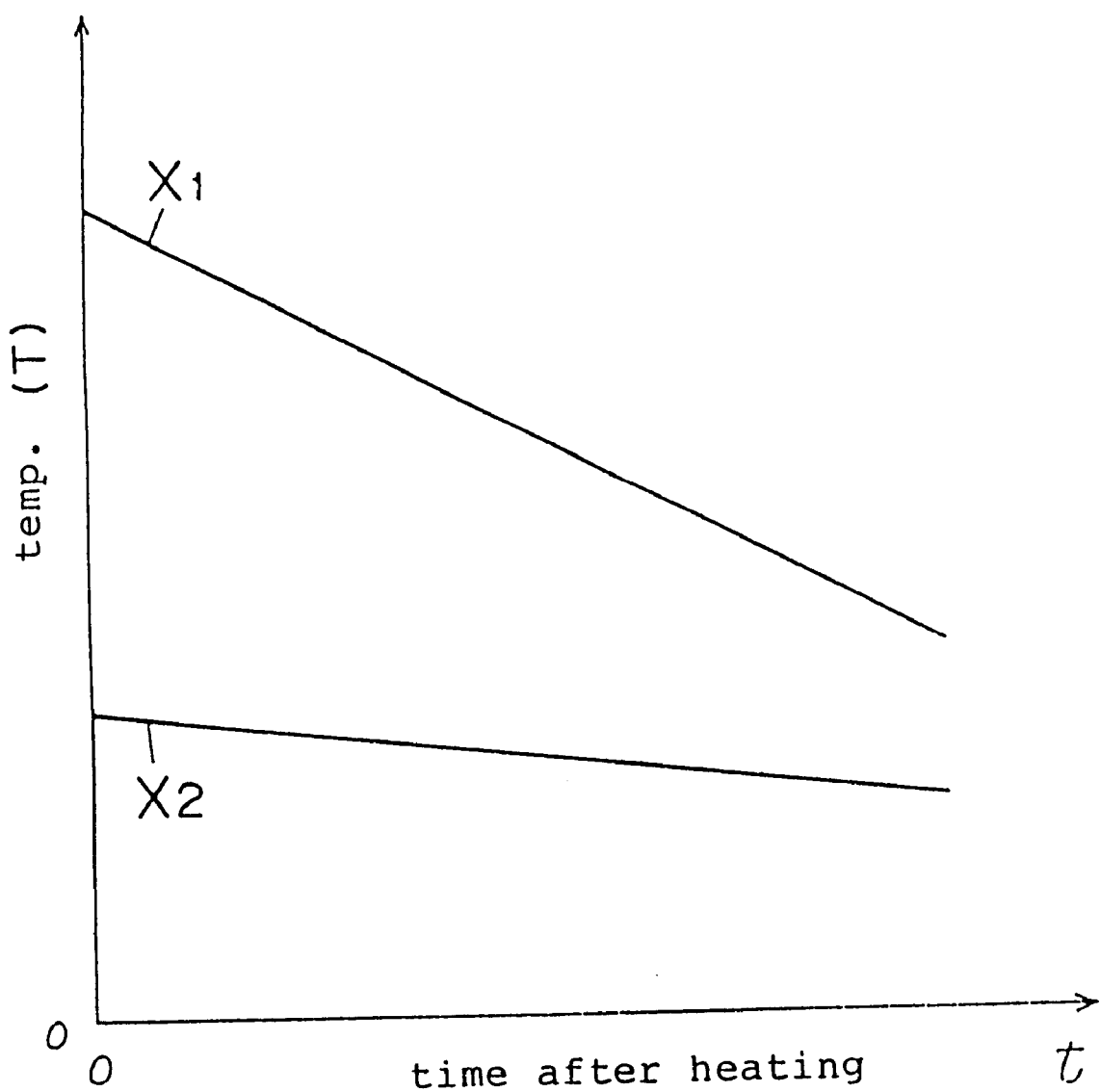
FIG. 109 is a characteristic diagram of a temperature irregularity when the shaomais of FIG. 106 are heated in another high frequency heating apparatus of the present invention.

However, the characteristic of FIG. 108 is not always achieved even if the heating chamber is matched with each of a plurality of openings independently. Although it is true that the first and second openings 169C and 169D tend to heat the central part 246 and peripheral part 247 respectively, the temperatures at the parts 246 and 247 do not always rise at the same speed. For instance, as shown in FIG. 109, the average temperature X1 of the central part 246 may be higher than the average temperature X2 of the peripheral part 247 (inverted from the conventional characteristic diagram of FIG. 107), because the central part 246 holding only four shaomais may increase the temperature more quickly than the peripheral part 247 with 12 shaomais even if the same amount of electromagnetic waves are brought into the heating chamber 4 from the openings 169C, 169D. As such, the temperature rise at the central part is adapted to be balanced with that at the peripheral part in 35th through a 37th embodiments of the present invention described below with reference to FIGS. 110–113.

Figure 110:
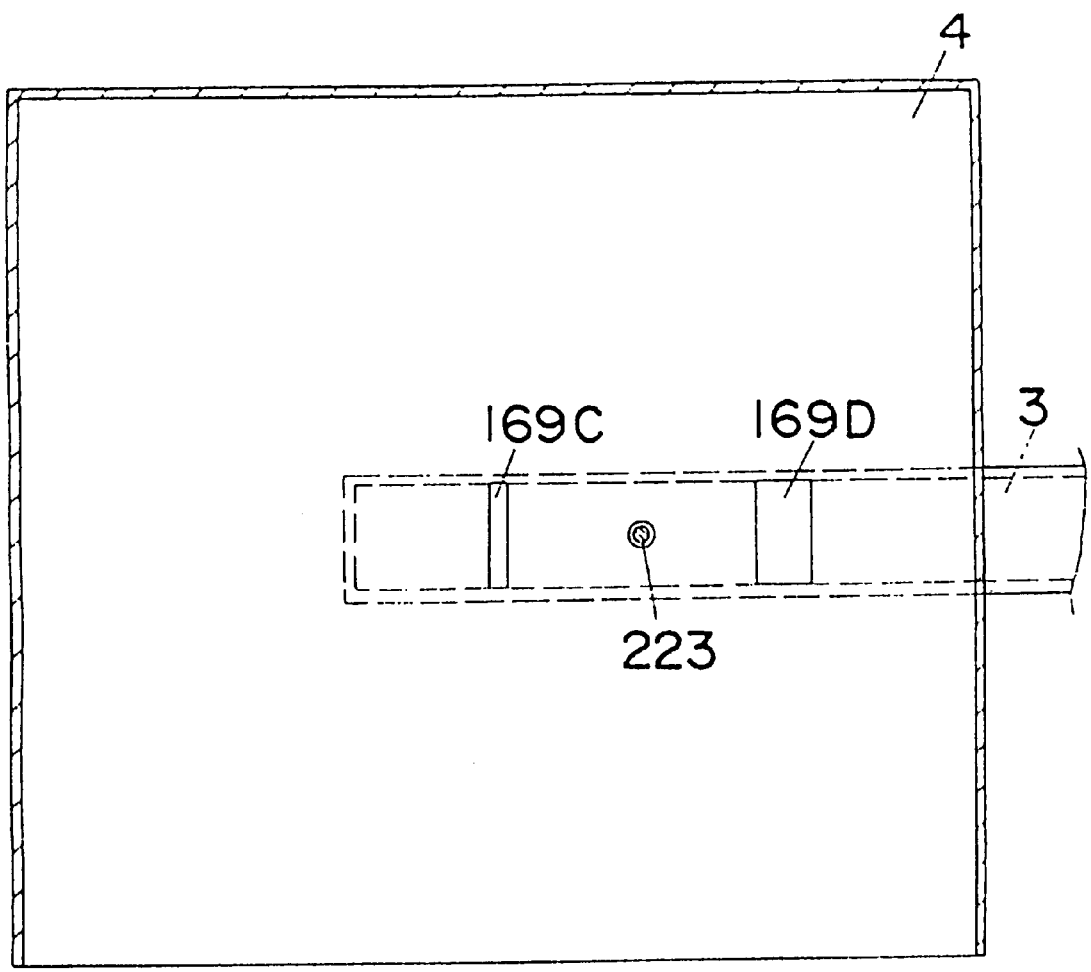
FIG. 110 is a horizontal sectional view of a high frequency heating apparatus according to a thirty-fifth embodiment of the present invention.

In the 35th embodiment in FIG. 110, an opening area of the first opening 169C is made smaller than that of the second opening 169D, different from the constitution in FIG. 98, thereby to reduce the amount of electromagnetic waves entering the heating chamber 4 through the first opening 169C. According to this arrangement, the temperature rise at the central part is restricted and the characteristic of FIG. 109 is optimized and turned to the characteristic of FIG. 108.

Figure 111:
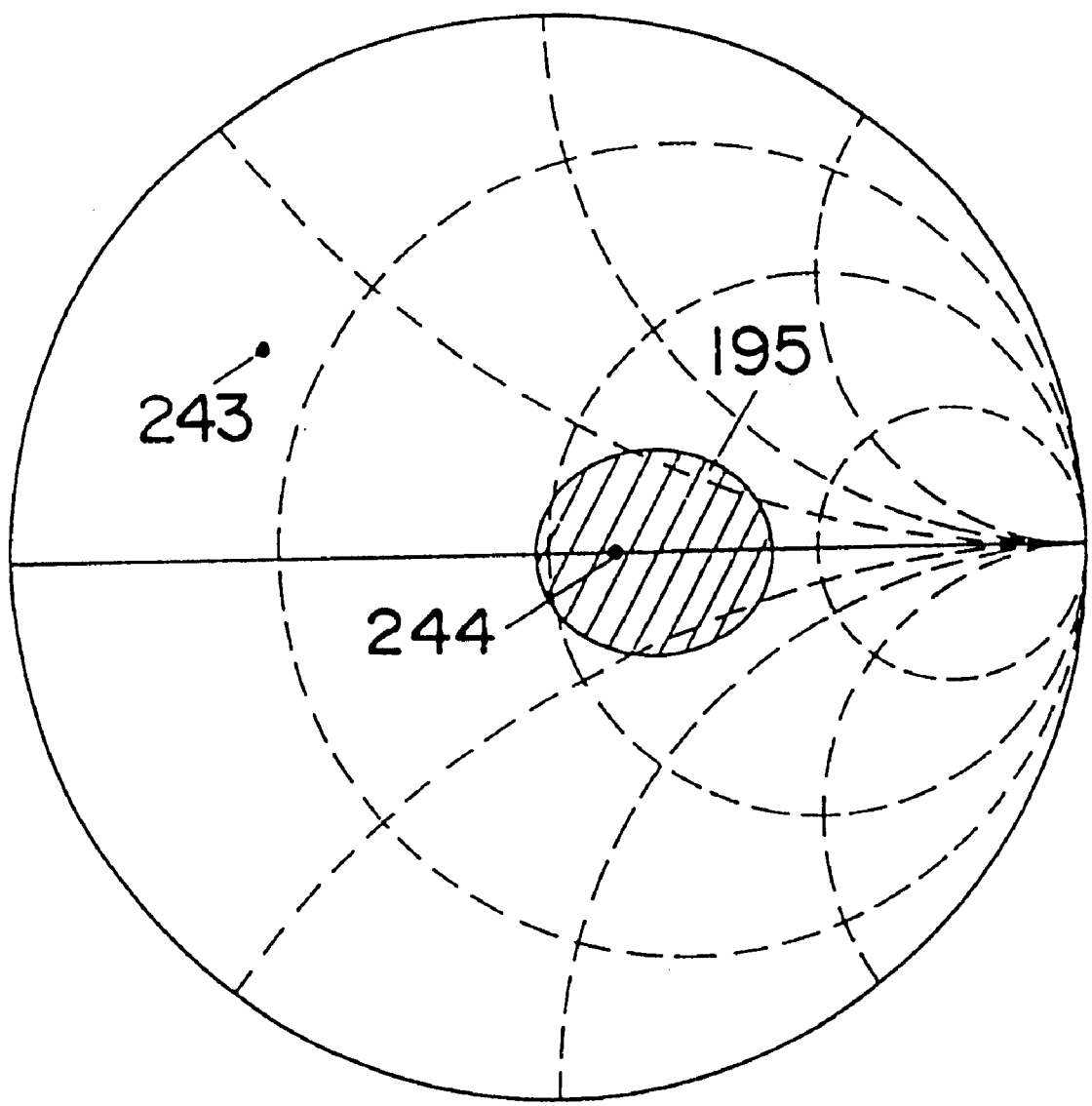
FIG. 111 is a Smith chart of a heating efficiency characteristic of a high frequency heating apparatus according to a thirty-sixth embodiment of the present invention, showing the matching state shifted at the first opening.

According to the 36th embodiment, the reflection state (matching state) at the first opening 169C is shifted, as exemplified in a characteristic diagram of FIG. 111 which is different from FIG. 105. While the characteristic point 244 is maintained in the high frequency area with the second opening 169D, the characteristic point 243 with the first opening 169C is shifted as indicated in FIG. 111. Similar to the effect accomplished in FIG. 110, since the electromagnetic waves entering the heating chamber 4 from the first opening 169C are reduced (reflected more), the temperature rise at the central part is suppressed. The characteristic of FIG. 109 is thus optimized to the characteristic of FIG. 108.

Figure 112:
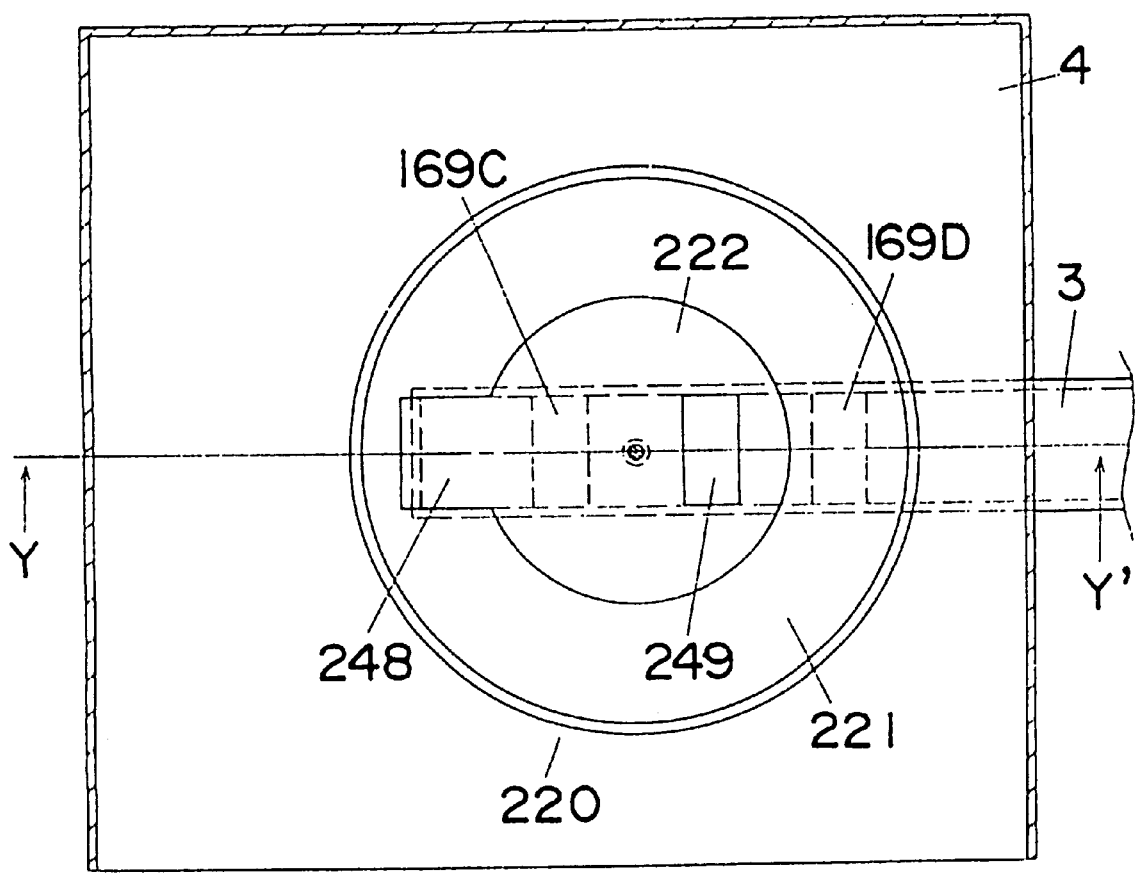
FIG. 112 is a horizontal sectional view of a high frequency heating apparatus according to a thirty-seventh embodiment of the present invention.
Figure 113:
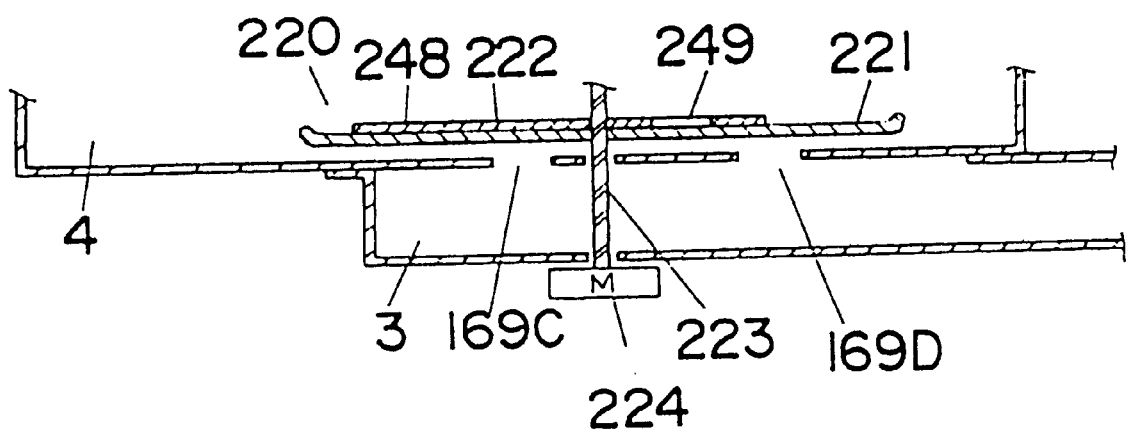
FIG. 113 is a sectional view taken along the line Y—Y' in FIG. 112.

In the 37th embodiment of FIGS. 112–113, a ratio of opening time intervals of the first and second openings 169C and 169D is changed. FIG. 113 is a sectional view taken along the line Y–Y' of FIG. 112 which is different from FIG. 97 in that the wave shielding part 222 is provided with a shield projecting part 248 and a shield opening part 249. In this case, for most of the time while the opening shielding part 220 is rotated once, the second opening 169D is opened. Only when the shield projecting part 248 is above the second opening 169D and the shield opening part 249 is above the first opening 169C, the first opening 169C is opened. As a result, the temperature rise at the central part is restricted and the temperature rise at the peripheral part is promoted, so that the characteristic of FIG. 109 is optimized to the characteristic of FIG. 108.

Although not shown in the drawings, a stepping motor may be used as the motor 224 not to rotate the opening shielding part 220 constantly to shorten a time for switching the openings 169C and 169D to be opened and closed. For example, even when either one of the characteristic points 243, 244 of the openings 169C, 169D is realized as in FIG. 111, it is highly possible that the electromagnetic waves are increasingly reflected when the openings are switched (for instance, when the openings 169C, 169D are respectively half opened), with decreasing the heating efficiency. Therefore, the opening shielding part 220 may be driven at high speeds only at the switching time so as not to lower the heating efficiency.

In the foregoing embodiments, how the heating efficiency is improved and how the heating distribution is uniformed are discussed for the flat food. However, there are various kinds of food in a variety of shapes, and also influences of the plate should be taken into consideration. Therefore, the opening time of the openings 169C, 169D may be changed depending on the food to be heated, or the like measures may be arranged to achieve the optimum heating distribution, not limited to the above embodiments.

Referring to the local heating, the embodiments are directed to heating of food of a relatively small size, for example, thawing of shaomais or sliced beef, etc. The present invention is not restricted to this, and applicable to local heating to a wide area, e.g., of a tuna by switching a central portion and an outside portion of the tuna.

The high frequency heating apparatus according to the present invention exerts the following effects.

The local heating means can heat an optional portion of the object to be heated. Therefore, the total heating distribution is uniformed and, the portion to be heated and the portion not to be heated can be surely distinguished.

When the protecting means is provided for protecting the local heating means between the object to be heated and the local heating means, while the optional portion of the object is not obstructed from heating in any case, such inconveniences that the local heating means malfunctions when hit by scums of the object, the direction of the electromagnetic waves is affected when scums of the object absorb the electromagnetic waves, etc. are eliminated. The target portion is stably locally heated.

When the local heating means is positioned lower than the stage and the protecting means is between the stage and the local heating means, the local heating means is protected also by the stage. If the local heating means is positioned always at a position close to the object to be heated, the electromagnetic waves are directly radiated to the target portion of the object without being reflected at other wall faces. The local heating is more effectively carried out.

If the protecting means loads thereon the object to be heated and the local heating means is placed lower than the protecting means, the protecting means serves also as the stage or the protecting means can be formed in one body with the stage, whereby the constitution of the apparatus becomes simple with a reduced number of parts. Accordingly, the apparatus can be made compact in size, light in weight and inexpensive.

If the protecting means is provided at least partly with a dielectric body, the local heating means is protected by the dielectric body and the electromagnetic waves from the local heating means are emitted through the dielectric body to the heating chamber. The target portion can thus be locally heatedly easily.

When the local heating means includes the waveguide part for guiding the electromagnetic waves emitted from the wave emission means and the emission part for emitting the electromagnetic waves guided by the waveguide part to the heating chamber, and a distance for the electromagnetic waves to run from the wave emission means to the emission part is made approximately constant at all times, the impedance of the electromagnetic waves is constant from the wave emission means to the emission part. Therefore, the matching state is easy to maintain thereby to keep the heating efficiency high irrespective of how the local heating means is controlled. The high heating efficiency eventually shortens the heating time and saves energy.

Supposing that the distance for the electromagnetic waves to run from the wave emission means to the emission part is nearly an integral multiple of $\lambda g/2$ when the running electromagnetic waves have a wavelength of $\lambda$, the electric fields at the emission part become strong. Therefore, if the object to be heated is set close to the emission part, the object is heated at a considerably high level of efficiency.

When the wave coupling part of the emission part is connected to the driving means and the driving means is controlled to rotate the emission part around the wave coupling part, the position where the electromagnetic waves are emitted from the emission part can be changed by controlling the driving means, that is, a heated portion of the object can be changed freely. The local heating is realized with ease.

When the waveguide part has the waveguide connecting the wave emission means with the heating chamber and the wave coupling part is astride the waveguide and the heating chamber, the wave coupling part works as an antenna, thereby efficiently guiding the electromagnetic waves in the waveguide into the heating chamber. The heating efficiency is accordingly further improved.

If a distance for the electromagnetic waves to be propagated from the wave emission means to the wave coupling part is nearly an integral multiple of $\lambda g/2$ when the running electromagnetic waves have a wavelength $\lambda g$, the electric fields become most intense at a position of the wave coupling part when standing waves are generated in the passing route of the electromagnetic waves, and therefore the wave coupling part guides the electromagnetic waves in the waveguide to the heating chamber most efficiently.

If the emission part is provided lower than the object to be heated, the emission part is located close to the object to be heated at all times, so that the electromagnetic waves are emitted directly to the target portion of the object without being reflected at other wall faces. The local heating is facilitated.

When the stage for loading the object to be heated is inside the heating chamber, with having a center thereof approximately agreed with a center of the heating chamber, the stage can be large in size, making it possible to efficiently utilize a space in the heating chamber. A large-size object can be loaded or many objects can be loaded on the stage, that is, the apparatus is convenient to use.

If the stage driving means is controlled so as to rotate the stage around the center of the stage, this restricts the vertical movement of the stage during the rotation, thereby achieving stable driving of the stage. The target portion is locally heated easily. At the same time, the object to be heated is prevented from vibrating and becomes hard to spill out during the rotation.

If the local heating means and the stage driving means are controlled interlockingly, the position of the local heating means to the object to be heated can be detected and changed easily. Furthermore, the target portion to be heated is locally heated more readily.

When the stage driving means is controlled to be decelerated or stopped simultaneously or approximately simultaneously when the local heating means is controlled, the stage driving means and the local heating means are maintained in an optimum positional relationship for local heating for a long time. The target portion is hence locally heated without fail in a reduced time.

If the driving means is controlled so that the emission part is driven in a range inside the bottom face of the heating chamber, a space required for driving the emission part and a space outside the heating chamber can be reduced. Moreover, since the electromagnetic waves are hard to leak outside the heating chamber from the driving range, a special sealing structure is eliminated, with the constitution simplified and the number of parts reduced. The apparatus can be made compact, light-weight and inexpensive.

If the stage includes the wave shielding part made of a conductive material and the wave permeable part in the vicinity of the center thereof, the object to be heated, specifically, the vicinity of the central bottom face of the object can be locally heated.

When the electromagnetic waves from the emission part is switched to be directed between a direction where the object to be heated is present and a direction without the object to be heated, it becomes possible to switch the heating, namely, to locally heat the object by directly radiating the electromagnetic waves to the object and to avoid the local heating and heat the object by means of the electromagnetic waves reflected at wall faces of the heating chamber. The electromagnetic waves are concentrated or prevented from being concentrated in this manner in accordance with the purpose of use, and therefore the heating distribution is more freely changed.

If the local heating means is controlled to switch the heating between approximately the central bottom face of the object and approximately the periphery of the object, the heating distribution of the object is made uniform in a simple manner.

If the local heating means is controlled to switch the portion to be heated of the object in two dimensions or in three dimensions, the heating distribution is yet delicately changed.

With the intermittent control means for intermittently controlling the local heating means, the portion to be heated of the object is switched intermittently. The electromagnetic waves can be concentrated only to a limited portion, so that the heating distribution is more freely changeable.

When the continuous control means is provided for continuously controlling the local heating means, the portion to be heated of the object is switched continuously. The heating is prevented from being partially concentrated and achieved uniformly in a wide area.

If there are the intermittent control means for intermittently controlling the local heating means, the continuous control means for continuously controlling the local heating means and the switch control means for switching the intermittent control means and the continuous control means, the heating is easily switched in accordance with the heating purpose.

When the setting means which can be set by the user is installed in the apparatus and the local heating means is controlled by the setting means, the local heating suitable to input contents is realized.

When the apparatus is equipped with the detecting means for detecting, as a detection amount, at least one of a physical amount of the object to be heated, a change amount of the physical amount, a physical amount indicating a state inside the heating chamber and a change amount of the state physical amount, if the local heating means is controlled by the detection amount of the detecting means, the appropriate local heating in conformity with a state of the object itself or the state inside the heating chamber is achieved.

In the case where the local heating means is adapted to be controlled by the temperature distribution detection means detecting a temperature distribution of the object to be heated, this control to the local heating means is based on the actual temperature data, so that the optimum local heating is achieved.

At least one of the shape detection means for detecting a shape of the object and the weight detection means for detecting a weight of the object is set in the apparatus, whereby the state of the object is schematically detected without starting the heating. The local heating is accordingly performed more efficiently without waste.

Before or after the heating is started, the area judging and controlling means judges where to heat with the use of at least either of the shape detection means and the weight detection means. Therefore, the area to be heated is detected irrespective of whether the heating is started or not, and only the area, namely, only the object to be heated can be efficiently locally heated.

When the local heating means and the wave emission means are controlled in association with each other, the heating is controlled more minutely. That is, the electromagnetic waves are emitted only in a state ready to heat the portion to be locally heated or the electromagnetic waves are refrained from coming out when the portion not to be locally heated is focused.

When the local heating means is controlled after the wave emission means is controlled to decrease its output or turn the output zero, wasteful heating to the portion not to be heated is avoided even if the electromagnetic waves pass through the portion not to be heated before the local heating means is completely controlled.

The same effect as above is obtained when the wave emission means is controlled after the local heating means is controlled thereby to increase the output.

If the local heating means is controlled by the position detection means detecting a position of the local heating means, the local heating means is correctly controlled at the target position, whereby the local heating is carried out more accurately.

When the local heating means is controlled to a predetermined position either when the heating is started or when the heating is finished, it is enough to control the local heating means to a target position at the next heating time based on the predetermined position, thus facilitating the position control.

The object to be heated in the heating chamber is extracted by the extraction means, and moreover a low-temperature portion of the object is extracted by the low-temperature portion extraction means, thereby to control-the distribution variation means. The object is heated properly without a waste of the heating, thus decreasing the energy consumption.

If the low-temperature portion is extracted by the low-temperature portion extraction means in the heating area set by the area setting means thereby to control the distribution variation means, various kinds of food of different optimum temperatures can be heated and cooked simultaneously at respective optimum temperatures.

If the heating range is registered by the registration means into the registration memory means and called up by the registration calling means, the apparatus becomes simple to manipulate, thereby improving the user's convenience of using the apparatus.

When the heating position switch part is started to be controlled before the heating is started by the second operation key after at least one of a kind of the object to be heated, a size of the heating output of the electromagnetic waves, a heating time and a heating method is input through the first operation key, the apparatus is already turned into a state to be able to heat the proper portion when the heating is started. Therefore, an unnecessary portion is never heated, heating irregularities are eliminated and the heating is performed uniformly. At the same time, since the unnecessary portion is prevented from being heated, the heating time is shortened, the user is not kept waiting for a long time, the heating efficiency is improved and the power is saved. If the heating position switch part is controlled before the heating is started, it is not necessary to control the heating position switch part in the middle of the heating and the controlling number of times is reduced. Accordingly, such problems are eliminated that the electric fields are disturbed or the reflecting waves are increased while the heating position switch part is being controlled. The wave emission means is prevented from abnormally generating heat, thus enhancing the durability of the apparatus. In addition, higher harmonics are prevented from being generated. Noises are restricted and the malfunction of other parts or external devices of the high frequency heating apparatus can be prevented.

If the portion to be heated is changed in accordance with the heating purpose, the apparatus is so adaptable to some extent as to uniformly heat the object or intensively heat a specific portion of the object. By using a microwave oven as a representative example of the high frequency heating apparatus, a single food can be heated uniformly or many kinds of food can be selectively heated (e.g., boiled or fried stuff is heated while fresh vegetables on the same plate are not heated).

If the driving part controls the local heating means to drive with a constant cycle immediately after the heating is started and change the cycle or stop in the middle of the heating, the heating distribution in the middle of the heating is changed from that immediately after the start of heating. Even if a specific portion of the object is delayed in heating, this portion can be intensively heated thereafter according to this manner of heating and therefore the object is uniformly heated. Thus, intensive concentrated heating to only the required portion is enabled.

The control part controls to hold the heating output of the wave emission means constant immediately after the heating is started and change or stop the heating output, depending on a state of the local heating means, during the heating, thereby changing the heating distribution immediately from a time after the heating is started to a time in the middle of the heating. Particularly, the control part can refrain a specific portion of the object from being heated at the middle stage of the heating, and therefore a portion heated more may be stopped to be heated to eliminate the heating irregularity thereby providing a uniform heating or, a portion not to be heated may be refrained from being heated.

When the electromagnetic waves are guided to the heating chamber through the power feed chamber which is provided with the feed port switch part, if the waveguide is connected with the heating chamber via the power feed chamber, the electromagnetic waves are restricted not to be reflected and the waveguide is matched easily with the heating chamber. If the feed port switch part does not project in the heating chamber and is coated with a cover to prevent the user from touching, the bottom face of the heating chamber including the cover becomes flat, which facilitates cleaning of the heating chamber. When the local heating means is covered, it is enough for the cover to cover the power feed chamber, not the whole bottom face of the heating chamber. The cover can be small and inexpensive.

When the turntable is made of metal or a conductive material having an opening of ½ or larger the wavelength of the electromagnetic waves in the rotating direction, the electromagnetic waves are allowed to pass through the opening of the turntable up and down. The portion to be heated of the object is hence switched easily.

If the turntable is made of metal or conductive material, the turntable is employable in such structure that the heater is installed below the bottom face of the heating chamber of, e.g., a highly heat-proof, popular microwave oven with the function of a range.

If the turntable is formed of a material passing the electromagnetic waves, the electromagnetic waves pass up and down via the turntable without being reflected. The portion to be heated of the object can be easily switched.

If a circle of a radius R is projected upward centering the rotational center of the turntable of a radius r on the bottom face of the heating chamber when R>r, even if the liquid object to be heated is spilt on the turntable or in the periphery of the turntable, the heating chamber can be cleaned with good workability without detaching the turntable.

When the local heating means is controlled so that the center of the object is heated after the heating is started and then the periphery of the object is heated, it is effective not to heat the edge, i.e., periphery of the object too much, thus eliminating heating irregularities. The elimination of heating irregularities reduces wasteful heating, enhances the heating efficiency and saves the energy. The heating time is shortened, with the user's wait time decreased.

If the electromagnetic waves are directed to the center of the bottom face of the heating chamber by the local heating means after the heating is started, the center of the object is mainly heated. Thereafter, the electromagnetic waves are directed to the outside of the bottom face of the heating chamber, whereby the periphery of the object is mainly heated. In this method, heating irregularities are less generated.

In accordance with the output of the detection part detecting the physical amount of the object or the state of the heating chamber, the power feed switch part is driven before the object is partially overheated. The portion to be heated is accordingly switched to thereby suppress the heating irregularities.

When the frozen object is to be defrosted, the electromagnetic waves are continuously emitted to heat the object when the maximum temperature of the object is estimated to be not higher than 0° C. The emission of the electromagnetic waves is temporarily stopped when the maximum temperature is estimated to exceed 0° C. In this manner of control, the temperature difference after the maximum temperature is beyond 0° C. is restricted not to be increased. Moreover, the temperature irregularities are reduced due to the thermal conduction within the object to be heated while the emission of electromagnetic waves is stopped. The frozen food is defrosted with reduced heating irregularities.

When the local heating means is driven while the electromagnetic waves are stopped or reduced, the electromagnetic waves in the heating chamber are never stirred during the operation. Therefore, the wave emission means is used in a stable operation range, so that the unnecessary radiation of electromagnetic waves or the temperature rise of the wave emission means is restricted, making it easy to counteract noises and arrange a cooling structure.

If the local heating means is constituted of the rotary waveguide, rotary antenna or stirrer, the direction of the electromagnetic waves is switched easily in a simple constitution and by a simple driving method. Therefore, the apparatus becomes inexpensive and reliable as is apparent from previous results.

When the driving part for driving the local heating means is constituted of a stepping motor or a combination of the other motor and a switch, the position of the local heating means can be controlled correctly with ease, so that the direction of the electromagnetic waves is correctly controlled with ease. The portion to be heated is switched more accurately in the simple and inexpensive arrangement of the apparatus.

If the temporary stop time, while the emission of the electromagnetic waves is suspended, is determined by the output of the detection means, a rate of the temperature rise because of the thermal conduction in the object to be heated or a temperature difference of the object from the ambient temperature in the heating chamber can be set in accordance with the state of the object or heating chamber. The heating is properly executed to restrict defrosting irregularities.

When a plurality of waveguides are made adjacent to each other, the apparatus is constituted of a small number of parts in a small space, to be compact, light-weight and inexpensive.

If the waveguide is branched at a node of the electric field, the electromagnetic waves are efficiently transmitted to the branching waveguides and further to the heating chamber through a plurality of openings. The good heating efficiency shortens the heating time and reduces the user's wait time. Moreover, the unnecessary consumption of power is fairly suppressed. The reliability is improved due to the reduced loss at the wave emission means.

When a sectional area of each of the branched waveguides is made small, the apparatus is constituted of a small number of members in a small space, i.e., becomes compact, light and inexpensive. Because of the branched waveguides having a length of an integral multiple of half the guide wavelength $\lambda g$ and not smaller than 0, the electromagnetic waves resonate with the guide wavelength $\lambda g$ also in the branched waveguides. The electromagnetic waves are accordingly transmitted efficiently into the heating chamber through the plurality of openings.

If a width of a branching point of the waveguide branching from the first waveguide is set to be not larger than ¼ the guide wavelength $\lambda g$, the resonating electromagnetic waves in the first waveguide are efficiently transmitted to the branched waveguide while maintaining the resonant state. The heating efficiency is good, because the electromagnetic waves are transmitted to the heating chamber efficiently through the plurality of openings.

When the shielding part having a plurality of openings is designed to shut the openings while keeping contact with projections of either a metallic or a conductive member fixed to at least one of the heating chamber and the waveguide, the electromagnetic waves are never transmitted through between the shielding part and projections and thus completely shut. Since the openings from which the electromagnetic waves are emitted are correctly switched, the heating distribution can be changed freely to be optimum for the heating purpose, that is, any food can be heated uniformly. Similarly, since the electromagnetic waves are prevented from leaking outside from between the shielding part and projections, the apparatus operates safe and is prevented from malfunctioning, without generating noises to external devices.

When the seal part having a plurality of openings is provided in a member fixed to at least one of the heating chamber and the waveguide, the electromagnetic waves are not transmitted from between the shielding part and openings and restricted not to leak outside.

If the one shielding part is designed to close and open the plurality of openings on the same wall face, the shielding part becomes simple in structure with a small number of parts and becomes inexpensive. Even if the shielding part were obliged to stop by an accident, any of the openings is always opened, thus ensuring the supply of electromagnetic waves to the heating chamber. It is prevented that every opening is shut and no electromagnetic wave is supplied to the heating chamber. The wave emission means or waveguide is hardly accompanied with an abnormal loss or an abnormal generation of heat, in other words, safety and high reliability are achieved.

When the shielding part for opening and closing the plurality of openings is adapted to be driven by one driving part, the driving part is rendered simple in structure with a reduced number of parts and is easy to control. The apparatus becomes compact, light-weight and inexpensive.

When the shielding part is driven while the emission of electromagnetic waves is stopped, it is prevented that the electric fields are disturbed during the operation of the shielding part and the wave emission means generates an abnormal loss or higher harmonics. Thus, the apparatus is safe with high reliability without generating noises to external devices or malfunctioning.

If the shielding part is set at a position suitable for the object of a light weight or for short-time heating when the heating is started or finished, the apparatus is prepared for short-time heating for the light-weight object, etc. every time the heating is started. Accordingly, the heating for the light object never fails according. On the other hand, when the object of a large quantity is to be heated which requires a long time, there is enough time even when the shielding part is moved to a suitable position after the heating is started. In other words, according to the present invention, since the adequate heating distribution is obtained immediately after the start of heating for the light object and the shielding part is not necessary to move so much when the light object is to be heated, the power for moving the shielding part or the power loss during the operation of the shielding part is eliminated, thereby enhancing the heating efficiency. The heating time is shortened. Since the driving part is controlled so that the object to be heated is set at the position suitable for the light-weight object or for short-time heating when the heating is started or finished, the apparatus is always ready for short-time heating for the light-weight object every time the heating is started.

If the apparatus is arranged not to take in the output of the detection means or neglect the output for a while after the heating is started, the detection means is freed of wrong detections when the electromagnetic waves are instable at the initial stage of heating and can correctly detect in the stable state. The control based on the output of the detection means becomes correct, ensuring highly reliable operation of the apparatus. Since it is unnecessary to secure an interval to withhold the emission of electromagnetic waves after the heating is started in order to detect the initial state of the object by the detection means, the heating is efficiently performed from the beginning. The wait time for the user is shortened.

Depending on the output of the detection means, the shielding part is rotated a plurality of number of times from the start to the end of heating, whereby the heating distribution is changed. The heating is thus achieved suitably to correspond to the state of the object to be heated. Any object can be heated uniformly and efficiently.

Depending on the output of the detection means, when the driving part is so controlled as to change the position of the object to be heated a plurality of number of times from the start to the end of heating, the heating distribution is changed to heat suitably to correspond to the state of the object. Any object can thus be heated uniformly and efficiently.

If the apparatus includes the driving body such as the rotary body in the waveguide, etc. and a plurality of openings, the plurality of openings are switched one another by the rotation of the rotary body. The electric fields can be apparently switched delicately. The whole of the object is heated uniformly.

When the driving body such as the rotary body or the like is constituted within the waveguide, the constitution is simple not occupying a space thereby to maintain the effective volume inside the heating chamber to the entire apparatus.

If the driving body is switched among a plurality of operation patterns in accordance with the input through the operation key, the electric field distribution is changed to be optimum in accordance with the object to be heated or the total heating sequence, different from when the driving body is rotated constantly. More uniform heating is achieved.

In contrast, in the case where no such sensitive electric field distribution as requires switching is indicated (for instance, when it is enough to simply heat the bottom face of the object to obtain the uniform distribution from the convection because the object is liquid such as milk or the like), the rotary body may be stopped at a position of the best matching state. In this case, the object is heated efficiently, and the heating time, eventually the user's wait time is shortened. At the same time, the loss is reduced and the power is saved. Further, the thermal stress at the wave emission means is decreased, increasing the reliability.

When the state of the object to be heated or inside the heating chamber is detected and the rotary body is switched among the plurality of operation patterns in accordance with the state, the optimum electric field distribution fit for the state of the object is generated during the heating, and therefore the object is heated more uniformly.

On the other hand, if it is detected by the detection means that the object does not require such distribution as needs switching (e.g., when it is enough to heat the bottom face of the object to obtain the uniform distribution from the thermal convection as the object is liquid such as milk or the like), the rotary body can be stopped at a position of the best matching state afterwards. Since the object is efficiently heated in this case, the heating time, eventually the wait time for the user is shortened. At the same time, the loss is reduced to save the power. Moreover, the thermal stress at the wave emission means is reduced, whereby the reliability is increased.

Since the rotary body is rotated in the case of frozen food (at the defrosting time), the electric fields in the heating chamber are always changed and prevented from being concentrated to a part of the frozen food. The distribution irregularity peculiar to the defrosting time that the food is partially boiled although the whole is frozen is avoided.

The matching state is never changed by the rotation of the stage if the stage is not rotated when milk or soup is input through the operation key. The matching state in this case realizes the most efficient heating. The electricity for rotating the turntable becomes unnecessary and is saved. In general, the heating distribution in the liquid object such as milk, soup, etc. is less influenced by the rotation and stop of the turntable, and therefore distribution irregularities are not generated.

If the stage is not rotated when the detection means detects that the object to be heated is liquid, the matching state is not subjected to change by the rotation of the stage, whereby the object is most efficiently heated. Since the electricity for rotating the stage is unnecessary at this time, the power is saved.

When the electromagnetic waves are introduced to the heating chamber through the plurality of openings, the electric field distribution is different at every opening, so that the object is more uniformly heated than when there is only one opening.

If the opening is in the bottom face of the heating chamber, which portion of the object should be heated intensely is almost determined by the position of the opening. A target distribution is easy to form. When the opening is in the bottom face of the heating chamber, the object to be heated is relatively close to the opening and therefore the heating efficiency is good. The heating time is reduced to thereby shorten the user's wait time and limit the excessive consumption of electricity. The energy is saved and the loss at the wave emission means is reduced which improves the reliability.

When a position of the object in a vertical direction is changed or a distance between the object and conductive member below the bottom face of the object is changed, the heating distribution in the object to be heated can be changed even with the same electric field distribution in the heating chamber. The heating distribution is controlled freely.

When the plurality of openings are switched in accordance with the input through the operation key or the output of the detection part to allow the electromagnetic waves to pass through, the heating distribution is conformed to the content of the operation key or detected content by the detection means, and uniformed.

If the electromagnetic waves are controlled by switching of the openings and emitted from the opening closest to the center of the bottom face of the object to be heated if the object is liquid, the center of the bottom face of the object can be intensively heated to raise the temperature higher than the other portion of the object. Since the object is liquid, the thermal conduction is brought about in this case and the temperature is naturally averaged in the vertical direction. Accordingly, the problem peculiar to the liquid object that the upper portion is overheated is eliminated and thus the object is uniformly heated with no temperature difference in the vertical direction.

If the object to be heated is higher than a certain height or heavier than a certain weight, the plurality of openings are switched so that the electromagnetic waves are hard to come out from the opening closest to the center of the bottom face of the object. The problem peculiar to the large object that the bottom face is heated too much and scorched or the lower portion is overheated is consequently eliminated. The uniform heating distribution without a temperature difference in the vertical direction is realized.

When the position of the object to be heated in the vertical direction is changed or the distance between the object and the conductive member below the bottom face of the object is changed in accordance with the input through the operation key or the output of the detection means, the heating distribution is changed in accordance with the content input through the operation key or the defected content by the detection means. The heating distribution is optimized to meet the heating purpose.

In the case where the object to be heated is lower than a certain height or lighter than a certain weight, the object is moved up or the distance between the object and the conductive member below the bottom face of the object is increased, whereby the annoying local concentration of electric fields which is peculiar to the small object is eliminated, thereby to achieve the uniform heating distribution.

If the seal part is made movable within the sub waveguide branching from the waveguide between the first and second openings among the plurality of openings, the movement of the seal part apparently switches to select the opening that is easier to transmit electromagnetic waves to the heating chamber from the waveguide. That is, the heating distribution is changed freely.

At the same time, a spark or leakage of electromagnetic waves is not brought about when the openings are switched, with ensuring safety of the apparatus.

When the openings are switched by way of the movement of the seal part to one that is easier to guide the electromagnetic waves from the waveguide to the heating chamber in accordance with the input through the operation key or output of the detection part, the heating distribution conforming to the content input through the operation key or detected by the detection part is formed, so that the heating distribution of the object to be heated is made uniform.

The first temperature sensor detects temperatures at a plurality of points of the object to be heated in the vertical direction or temperature changes, and the second temperature sensor detects temperatures of a plurality of points of the object in the horizontal direction and temperature changes. Therefore, the temperature distribution of the whole object to be heated is accurately detected.

When the object to be heated is moved in the vertical direction or the distance between the object and the conductive member below the object is changed by detecting the temperature distribution of the object by the temperature sensor, and if the electromagnetic waves are concentrated to the low-temperature portion of the object or prevented from being concentrated to the high-temperature portion of the object, heating distribution irregularities are restricted in accordance with the actual temperature of the object. Considerable uniform heating is hence achieved.

When the temperature distribution of the object to be heated is detected by the temperature sensor and the opening which is easier to emit electromagnetic waves among the plurality of openings is selected, thereby to concentrate the electromagnetic waves to the low-temperature portion of the object or prevent the electromagnetic waves from being concentrated to the high-temperature portion of the object, heating distribution irregularities can be restricted in accordance with the actual temperature of the object, thereby achieving fairly uniform heating.

When it is detected from the output of the temperature sensor that the temperature rise of the low-temperature portion of the object to be heated is large or the temperature rise of the high-temperature portion of the object is small, in other words, that it becomes possible to improve the temperature irregularity, the stage is stopped to be rotated or decelerated, whereby the heating distribution is improved quickly to eliminate the irregularity and realize considerably uniform heating.

When it is detected from the output of the temperature sensor that a temperature difference at each of a plurality of points of the object to be heated is not smaller than a certain value, the rotating number of the fan part is increased, the air suction port is opened wide or the air flow is facilitated, etc. thereby to increase the amount of the air entering the heating chamber. As a result, the total ambient temperature is averaged and moreover, the temperature is averaged due to the thermal conduction within the object to be heated, so that the distribution irregularities are eliminated.

The heating chamber is connected with the waveguide via the plurality of openings, and the first opening is formed at the central part of the bottom face of the heating chamber (in the longitudinal direction and also in the lateral direction). In the constitution, the central bottom portion of the object is heated at the first opening and the edge portion of the object is heated at the other opening. Accordingly, the object is heated uniformly as a whole.

When every side of the rectangular bottom face of the heating chamber is made in parallel to any one side of the rectangular opening, strong electric fields are generated by the electromagnetic waves emitted from the wave emission means in opposite directions to hold the opening. The aimed electric field distribution is calculated on the assumption that the heating chamber is a hollow resonator is obtained as a standing wave distribution on the bottom face of the heating chamber. Therefore, the mode in the heating chamber (at least in the vicinity of the opening) is as required, resulting in the required heating distribution of the object.

When at least one of the plurality of openings is shielded by the opening shielding part, the standing wave distribution formed at every opening not shielded can be switched or various standing waves are mingled. Therefore, the heating distribution of the object is switched or combined thereby to be made uniform.

In the constitution that the matching state (rated output) is obtained when other openings of the plurality of openings than an optional opening are closed, the object can be efficiently heated even when the power is fed from any of the openings. Therefore, the heating time, in other words, the user's wait time is shortened. The power is also saved. Furthermore, the thermal stress of the wave emission means is reduced thereby to increase the reliability.

If the opening shielding part shields the opening by rotating about the rotary shaft at a position other than the central part of the bottom face of the heating chamber (both in the longitudinal direction and in the lateral direction), the electric field distribution in the heating chamber is stirred, so that the heating distribution of the object is made uniform. In this case, the opening can be formed at the central part of the bottom face of the heating chamber, and therefore the central portion of the bottom face of the object can be switched to be heated or not to be heated in the simple constitution. Thus, the heating is made more uniform.

If the opening shielding part is to shield the opening by way of the rotation thereof at a constant speed, the idea is realized by the driving part rotated at a constant speed. The electric field distribution in the heating chamber is changed in the simple constitution (the constitution which is inexpensive and easy to construct) to uniform the heating distribution of the object.

When the opening shielding part is shaped like a disc, the shielding part has no angular part. The electric field distribution in the heating chamber is changed in this simple constitution which is inexpensive and easy to construct, thereby to uniform the heating distribution of the object. Because of the opening shielding part without angular parts, the opening part is less likely to be broken through contact with other components, thereby enhancing in safety.

If the opening shielding part is constituted of the wave permeable part of resin or the like and the wave shielding part of metal or the like, when the position of the shielding part is changed by the driving part, the electromagnetic waves arc switched to be transmitted and shut. As a result, the standing wave distribution in the heating chamber is switched, various standing waves are mixed or the electric field distribution is stirred, whereby the heating distribution of the object is made uniform. Moreover, a spark between the opening and the wave shielding part is prevented by the wave permeable part, so that the safety is enhanced.

Regarding an opening area of each opening, if the area of the opening closest to the center of the bottom face of the object to be heated is made minimum, the electromagnetic waves from the minimum opening are less than those emitted from other openings. Accordingly, influences that are too large on the distribution at the opening closest to the bottom face of the heating chamber and also closest to the object are limited if the openings have the same area, with the influences on the distribution at the other openings enhanced. The heating distribution of the object is thus made uniform.

In the constitution that the matching state (rated output) is not attained when other openings than the opening closest to the central bottom face of the object to be heated are shielded, the electromagnetic waves emitted at this time from the opening are reduced than from the other openings. Therefore, too large influences on the distribution, if in the same matching state, by the opening closest to the central bottom face of the object as compared with the influences on the distribution by the other openings are restricted, thereby to increase the influences on the distribution of the other openings. The heating distribution of the object is made more uniform according to this manner.

When the opening shielding part is adapted to shield the opening while operating at a non-constant speed, the time required for opening and closing the opening, the opened time and the shut time can be changed for every opening. Since the time required for opening and closing the opening or the shut time without the electromagnetic waves sent in the heating chamber is reduced, while the opened time while the electromagnetic waves stably enter the heating chamber thereby to generate the standing wave distribution is lengthened, the object can be heated efficiently. The heating time, namely, the user's wait time is shortened. Moreover, the power is saved and the thermal stress at the wave emission means is reduced to increase the reliability.

INDUSTRIAL APPLICABILITY

As described hereinabove, the high frequency heating apparatus of the present invention can heat an optional portion of the object. If heating of the optional portion is combined with one another, the heating distribution of the object to be heated is uniformed. The present invention is accordingly suitable for use in microwave ovens or the like for cooking various kinds of food.

What is claimed is:

1. A high frequency heating apparatus comprising:
   a heating chamber for accommodating an object to be heated;
   an electromagnetic wave emission means for emitting electromagnetic waves;
   a local heating means for focusing the electromagnetic waves emitted from said electromagnetic wave emission means on a local portion of the object;
   a detection means for detecting a physical amount of the object to be heated;
   a driving means for driving said detection means; and
   a control means for controlling said driving means to detect the physical amount of the object to be heated at any portion thereof, said control means controlling said local heating means based on an output of said detection means.

2. A high frequency heating apparatus according to claim 1, further comprising a stage on which the object to be heated is placed and a stage driving means for rotating and driving said stage, wherein a detection point to be detected by said detection means is reciprocated in the radial direction of said stage.

3. A high frequency heating apparatus according to claim 2, wherein a rotation cycle of said driving means is an integral multiple of a cycle of the reciprocation of said driving means.

4. A high frequency heating apparatus according to claim 1, wherein said detection means has a temperature detection means capable of detecting temperatures of any portions of the object to be heated.

5. A high frequency heating apparatus according to claim 4, wherein said control means has an extraction means for extracting a portion to be heated from said temperature detection means and a low-temperature portion extraction means for extracting low-temperature portions from the portion to be heated extracted by said extraction means.

6. A high frequency heating apparatus according to claim 5, wherein said extraction means has a temperature change operation means for operating, from an initial stage of heating, a temperature change of each detection point by said temperature detection means, and a temperature change comparison means for comparing operation results of said temperature change operation means with a predetermined value, wherein based on comparison results by said temperature change comparison means, a detection point where an operation result by said temperature change operation means is greater than the predetermined value is determined as the object to be heated.

7. A high frequency heating apparatus according to claim 5, wherein said extraction means has a temperature change operation means for operating, from an initial stage of heating, a temperature change of each detection point by said temperature detection means, and an outline extraction means for operating differences between adjacent detection points of operation results of the temperature change operation means, to thereby extract an outline of the object to be heated.

8. A high frequency heating apparatus according to claim 1, further comprising a heating range setting means for a user to set a heating range, wherein said control means has a low-temperature portion extraction means for extracting a low-temperature portion in the heating range set by said heating range setting means, thereby controlling said local heating means based on an extraction result of said low-temperature extraction means.

9. A high frequency heating apparatus according to claim 8, wherein said heating range setting means has a registration means for registering the heating range set by the user along with a registration code, a registration memory means for storing the heating range registered by said registration means along with the registration code, and a registration call means used when the user calls the heating range corresponding to the registration code.

10. A high frequency heating apparatus to claim 1, wherein said detection means has at least one of a shape detection means for detecting a shape of the object to be heated and a weight detection means for detecting a weight of the object to be heated.

11. A high frequency heating apparatus according to claim 10, wherein said control means has an area judging and controlling means for judging an area to be heated by at least one of said shape detection means and said weight detection means approximately at the start of heating.

12. A high frequency heating apparatus according to claim 1, wherein said control means controls said local heating means based on a change of the output of said detection means.

13. A high frequency heating apparatus according to claim 1, wherein the output of said detection means is prevented from being received by said control means for a while after said electromagnetic wave emission means starts to emit electromagnetic waves.

14. A high frequency heating apparatus according to claim 1, wherein said control means disregards the output of said detection means for a while after said electromagnetic wave emission means starts to emit electromagnetic waves.

* * * * *

UNITED STATES PATENT AND TRADEMARK OFFICE
CERTIFICATE OF CORRECTION

PATENT NO. : 6,172,348 B1
DATED : January 9, 2001
INVENTOR(S) : Koji Yoshino et al.

It is certified that error appears in the above-identified patent and that said Letters Patent is hereby corrected as shown below:

<u>Title page,</u>
Item (62), please rewrite as follows:

-- Division of application No. 08/809,436, filed as application No. PCT/JP95/02145 on October 19, 1995, now Pat. No. 5,986,249. --

Signed and Sealed this

Twenty-fifth Day of September, 2001

Attest:

*Nicholas P. Godici*

NICHOLAS P. GODICI
*Attesting Officer*     *Acting Director of the United States Patent and Trademark Office*